(12) United States Patent
Miyaho et al.

(10) Patent No.: US 7,760,625 B2
(45) Date of Patent: Jul. 20, 2010

(54) EXCHANGE NODE AND EXCHANGE NODE CONTROL METHOD

(75) Inventors: Noriharu Miyaho, Tokyo (JP); Kazunori Miyahara, Tokyo (JP)

(73) Assignee: Tokyo Denki University, Tokyo (JP)

( * ) Notice: Subject to any disclaimer, the term of this patent is extended or adjusted under 35 U.S.C. 154(b) by 767 days.

(21) Appl. No.: 11/577,215

(22) PCT Filed: Sep. 16, 2005

(86) PCT No.: PCT/JP2005/017140
§ 371 (c)(1),
(2), (4) Date: Apr. 13, 2007

(87) PCT Pub. No.: WO2006/040903
PCT Pub. Date: Apr. 20, 2006

(65) Prior Publication Data
US 2008/0084898 A1    Apr. 10, 2008

(30) Foreign Application Priority Data
Oct. 14, 2004    (JP)    ............................ 2004-300783

(51) Int. Cl.
H04L 12/26    (2006.01)
H04L 12/28    (2006.01)
H04J 3/00    (2006.01)
(52) U.S. Cl. .................... 370/229; 370/401; 370/498
(58) Field of Classification Search .......... 370/229–235, 370/307, 400, 401, 419, 498
See application file for complete search history.

(56) References Cited

U.S. PATENT DOCUMENTS
4,751,697 A * 6/1988 Hunter et al. ............... 370/400
(Continued)

FOREIGN PATENT DOCUMENTS
JP    2000-183914 A    6/2000
(Continued)

OTHER PUBLICATIONS
Konosuke Kawashima et al., Basis of latest computer metwork technology, The Telecommunication Association, Nov. 1, 2003, pp. 3-214.
(Continued)

Primary Examiner—Hong Cho
(74) Attorney, Agent, or Firm—Ohlandt, Greeley, Ruggiero & Perle, L.L.P.

(57) ABSTRACT

The present invention reduces the delay time to extremely short by monitoring the output/distribution unit of the exchange node to specify the unused time slot as write destination of the data and performing priority control by the priority control signal contained in the data. The traffic congestion is resolved by performing write output to the specified time slot regardless of the communication speed of the transmission path of the data. Furthermore, the present invention aims to provide the exchange node and the exchange node control method that ensures communication quality by using the connection type as the communication method since the delay time in communication can be reduced.

The exchange node 100 according to the present invention includes an input buffer unit 2, an identification unit 7, a distribution unit 5, a multiplexing circuit 9, a time slot allocation circuit 12, and an output/distribution unit 10. More preferably, a frame compression circuit 16, a frame decompression circuit 18 and a priority determination circuit 20 are arranged.

17 Claims, 67 Drawing Sheets

U.S. PATENT DOCUMENTS

| | | | |
|---|---|---|---|
| 5,121,385 A * | 6/1992 | Tominaga et al. | 370/435 |
| 5,166,930 A * | 11/1992 | Braff et al. | 370/235 |
| 5,912,890 A * | 6/1999 | Park | 370/375 |
| 5,936,958 A | 8/1999 | Soumiya et al. | |
| 6,118,762 A * | 9/2000 | Nomura et al. | 370/230 |
| 6,425,060 B1 * | 7/2002 | Mounes-Toussi et al. | 711/158 |
| 6,859,434 B2 * | 2/2005 | Segal et al. | 370/230 |
| 2003/0103450 A1 * | 6/2003 | Chapman et al. | 370/229 |

FOREIGN PATENT DOCUMENTS

| | | |
|---|---|---|
| JP | 2002-164916 A | 6/2002 |
| JP | 2002-325092 A | 11/2002 |
| WO | 95/03657 A1 | 2/1995 |

OTHER PUBLICATIONS

Noriharu Miyaho, et al., Study on a Novel Switching Node Architecture for the Next Generation IP Network, Proceedings of the 2005 IEICE Society Conference, Sep. 7, 2005, B-6-28.

Akiyoshi Yamazaki, et al., Examination of Performance Evaluation of a Super-High-Speed Exchange Node, Proceedings of the 2005 IEICE Society Conference, Sep. 7, 2005, B-6-99.

* cited by examiner

FIG. 37

| Address | CID | TSF | α | β | | | | | | |
|---------|-----|-----|---|---|---|---|---|---|---|---|
| | | | | | TS1 | TS2 | TS3 | ... | TSN | Des-IPA | Sor-IPA |
| #1 | 3 | 1 | | | 1 | 1 | 0 | ... | 0 | IP2 | IP4 |
| #2 | 4 | 1 | | | 0 | 0 | 1 | ... | 0 | IP3 | IP1 |
| #3 | 1 | 0 | | | | | | | | | |
| ... | ... | | | | | | | | | | |
| #N | | | | | | | | | | | |

EXCHANGE NODE AND EXCHANGE NODE CONTROL METHOD

CROSS REFERENCE TO PRIOR RELATED APPLICATIONS

This application is a U.S. national phase application under U.S.C. §371 of International Patent Application No. PCT/JP2005/017140, filed Sep. 16, 2005, and claims the benefit of Japanese Patent Application No. 2004-300783, filed Oct. 14, 2004, both of which are incorporated by reference herein. The International Application was published in Japanese on Apr. 20, 2006 as International Publication No. WO 2006/040903 A1 under PCT Article 21(2).

TECHNICAL FIELD

The present invention relates to an exchange node for performing priority control in a connection type packet data communication and a connectionless type packet data communication, and an exchange node control method.

BACKGROUND ART

Recently, use of multimedia communication such as image communication, voice communication, high-speed data communication is increasing with widespread use and expansion of the internet, and communication service suited for data communication of large capacity is being desired. The line side must be able to transmit large capacity of data as in optical fiber network, and furthermore, the exchange node such as router must be able to process the large capacity of data in order to perform data communication of large capacity, and higher performance of the exchange node is being advanced.

The configuration of the exchange node used in the conventional connectionless type IP (Internet Protocol) data communication is shown in FIG. 22. In FIG. 22, the reference numeral 81 is denoted for an input side line control unit for writing input data 87 from an external transmission path, 82 for a common control unit for performing routing control, 83 for a common memory, 84 for a common bus, 85 for an output side line control unit for controlling the input data 87 towards the direction path of the outgoing line, and 86 for a multiplexing unit. Furthermore, 90 is denoted for a conventional exchange node, 88 for an input side clock, and 89 for an output side clock in FIG. 22. A dotted line from the input data 87 to the output side line control unit 85 indicates the flow of packet transfer. The dotted line connecting the input side line control unit 81 and the common control unit 82 and the dotted line connecting the input side line control unit 81 and the common memory 83 indicate update and the like of a routing table.

The flow of input data in FIG. 22 will now be described. The input data 87 is input to the input side line control unit 81, and written in a shift register. After all the input data 87 are written in the input side line control unit 81, the input data 87 is output to the common bus 84. The input data 87 outputs to the common bus 84 is written in the common memory 83 to be performed with routing control in the common control unit 82. The common memory 83 holds the input data 87 until the turn of the input data 87 to be performed with the routing control, and again outputs the input data 87 to the common bus 84 when its turn for control arrives. The input data 87 performed with routing control in the common control unit 82 is input to the output side line control unit 85, and output to the direction path corresponding to the direction path information contained in the input data 87. The output data is multiplexed to one bus in the multiplexing unit 86, and transmitted to the outgoing line.

However, a great number of buffers such as the input side line control unit 81, the common memory 83, the output sideline control unit 85 are required in the exchange node used in the conventional connectionless type IP data communication, as described above, and such buffer processes produce the delay time in the communication. Moreover, when accommodating lines of different communication speeds in a mixed manner, an uncertain delay time that cannot be assured is produced depending on the traffic congestion state that occurs when lines of the same communication speed are used in the same period of time thereby inhibiting the enhancement of real-time property.

An ATM (Asynchronous Transfer Mode) technique has been proposed as a technique of improving the delay time in communication. In the ATM method, the signals of each channel are divided into packets referred to as cells of fixed length regardless of their speed, and sent in an asynchronous manner. A mechanism of writing a channel number in the header of the cell at the transmission side and sending the cell is adopted so that each channel can be identified on the reception side. A priority control that takes the delay time into consideration is possible in the exchange node adopting the ATM method, but it is essentially difficult to completely guarantee the quality of real-time communication when the amount of flow-in traffic differs greatly from the expected value such as fluctuation in delay time or loss of packet when unexpected traffic load flows in since the relevant method assumes that the buffer control is performed in the exchange node.

A communication model when transferring voice as IP data is shown in FIG. 23. RTP (Real Time Protocol) is a protocol for controlling the order of data by a time stamp, and reproducing the data in the transmitted order, but UDP (User Datagram Protocol) is used in the transport layer in voice communication. Generally, the connectionless type UDP is used on the Internet since greater throughput of information transfer can be performed compared to the TCP. The UDP does not have the function of re-ordering the order of arrived data to the original order, error restoring function of performing restoration or the like, and thus lacks in reliability and adequate voice quality may not be guaranteed. In the connection type communication, compliance with respect to the communication quality is possible within a reference range defined in advance in the network, but the connectionless communication must sometimes be used due to problems in that the overhead in communication necessary in call set up control is large and the call set up time until starting the communication is long since it takes a great amount of processing time when occupying the line corresponding to a specific logic channel for communication, the software control on the terminal side and the exchange node side involved in call set up control is complex etc. (e.g., see non-patent document 1).

A case of performing priority control transfer of IP data and the like on the premise of connection type communication by discarding the common control buffer used in the conventional exchange node and router, and utilizing instead, an ultra high-speed electronic circuit or superconductive element for communication path common bus has been described.

Such method shows a possibility of avoiding a phenomenon in which an uncertain delay time that cannot be assured is produced due to waiting time in the common buffer and the output line buffer. However, a technical countermeasure for constantly guaranteeing stable quality in the exchange node is required in the connectionless type communication, and real time communication in which interactive voice, picture information are targets and in which a variety of communication quality (QoS: Quality of Service) and high-quality communication precision or the like are required. In particular, realization of the method of resolving the problems related to the delay time of the exchange node is being desired in the connectionless type communication in which the overhead in communication required for the setting control of calls is not present.

A priority control method referred to as Diffserv (Differentiated Services) method has been conventionally developed as a connectionless type communication method of controlling the quality with respect to voice, specific application flow and the like. In the Diffserv method, the priority information is given to each IP packet to be transferred by the user so that a relative transfer performance difference is created between a plurality of priority classes, whereby the internet user is able to identify the type of traffic to be transmitted and received without using the signaling procedures, and provide the communication quality corresponding to the relevant type, but the problems related to the delay time in the exchange node are not resolved depending on the communication traffic congestion state even with the Diffserv method.

[Non-patent document 1] Noriharu Miyaho and two others, "Basis of latest computer network technology", The Telecommunication Association, Nov. 1, 2003, p. 3-214

DISCLOSURE OF THE INVENTION

Problems to be Solved by the Invention

With respect to the problems regarding communication delay time produced by the internal buffer processes of the conventional exchange node, conventional traffic congestion produced when lines of different communication speeds are mixed in the exchange node, and guaranteeing of communication quality that arises since the conventional communication method is connectionless type, an object of the present invention is to provide an exchange node that significantly reduces the delay time by monitoring an exchange node output/distribution unit, specifying an unused time slot as data write destination, and performing priority control by a priority control signal contained in the data; resolves the traffic congestion by performing write output to the specified time slot irrespective of the communication speed of the transmission path of the data; and ensures communication quality by using the connection type for the communication method as the delay time in communication can be reduced, and an exchange node control method.

An object of present invention is also to provide an exchange node for avoiding the necessary delay time in the exchange node irrespective of the communication traffic congestion with respect to the packets to be performed with connectionless type communication, and an exchange node control method.

Means for Solving The Problems

In order to solve the above problem, the present invention provides an exchange node and an exchange node control method, which does not require an output buffer of identifying the priority control signal contained in the input data, monitoring the usage state of the time slot of the output/distribution unit, preferentially writing the identified data in the unused time slot, and outputting.

Specifically, the exchange node according to the present invention is an exchange node including an input buffer unit for writing input data which is connection type packet data to a shift register and outputting input buffer data at completion of the writing of the input data; a distribution unit, which is input with the input buffer data from the input buffer unit, for outputting the input buffer data from the input buffer unit as priority control processing data by a priority control signal indicating that the input data input to the input buffer unit is priority control processing data; an identification unit for identifying the priority control signal contained in the input data input to the input buffer unit, and outputting the priority control signal to the distribution unit; a time slot allocation circuit for obtaining time slot information indicating that a time slot for writing the priority control processing data is unused, and outputting a time slot specifying signal specifying a time slot of write destination of the priority control processing data from the unused time slots; a multiplexing circuit for writing the priority control processing data from the distribution unit to the shift register allocated by the time slot specifying signal from the time slot allocation circuit, and outputting multiplexed data at completion of the writing of the priority control processing data; and an output/distribution unit for transmitting the multiplexed data from the multiplexing circuit to an outgoing line and outputting information of the unused time slot of the multiplexed data from the multiplexing circuit to the time slot allocation circuit as time slot information.

The buffer for data processing inside the exchange node is not required and the delay time in communication is reduced by identifying the priority control signal to preferentially process the priority control processing data, monitoring the output/distribution unit to obtain the time slot information and specifying the unused time slot as the write destination of the priority control processing data. The communication quality is ensured by using the connection type as the communication method.

The exchange node according to the present invention is an exchange node including an input buffer unit for writing input data which is connection type packet data to a shift register and outputting input buffer data at completion of the writing of the input data; a distribution unit, which is input with the input buffer data from the input buffer unit, for outputting the input buffer data from the input buffer unit as priority control processing data by a priority control signal indicating that the input data input to the input buffer unit is priority control processing data; an identification unit for identifying the priority control signal contained in the input data input to the input buffer unit, and outputting the priority control signal to the distribution unit; a time slot allocation circuit for obtaining time slot information indicating that a time slot for writing the priority control processing data is unused, and outputting a time slot specifying signal specifying a time slot of write destination of the priority control processing data from the unused time slots; a frame compression circuit, which is input with the priority control processing data from the distribution unit, for compressing time width of the priority control processing data and outputting compressed data; a multiplexing circuit for writing the compressed data from the frame compression unit to the shift register allocated by the time slot specifying signal from the time slot allocation circuit, and outputting multiplexed data at completion of the writing of the compressed data; a frame decompression circuit, which is input with the multiplexed data from the multiplexing circuit, for decompressing the time width of the multiplexed data and outputting decompressed data; and an output/distribution unit for transmitting the decompressed data from the frame decompression circuit to an outgoing line and outputting information of the unused time slot of the decompressed data from the frame decompression circuit to the time slot allocation circuit as time slot information.

The buffer for data processing inside the exchange node is not required and the delay time in communication is reduced by identifying the priority control signal to preferentially process the priority control processing data, monitoring the output/distribution unit to obtain the time slot information and specifying the unused time slot as the write destination of the priority control processing data. The communication quality is ensured by using the connection type as the communication method. Furthermore, a great number of time slots can be formed in one frame of the time division multiplexing line by compressing the time width of the priority control processing data by means of the frame compression circuit, a great amount of data can be multiplexed in a short period of time, and the delay time in communication can be reduced. Moreover, the number of connections of the input side transmission path can be increased since the time slot in one frame can be increased.

The exchange node according to the present invention preferably further includes a priority determination circuit for detecting priority contained in the priority control processing data and outputting priority information to the time slot allocation circuit, wherein the time slot allocation circuit specifies a time slot according to the priority of the priority information. The data having priority can be transmitted without delay by specifying the time slot prior to the data without priority if the priority control processing data has priority.

The exchange node according to the present invention preferably further includes a priority determination circuit for detecting priority contained in the priority control processing data and outputting priority information to the time slot allocation circuit, wherein the time slot allocation circuit varies the number of time slot to be specified according to the priority of the priority information. The empty time slot can be efficiently used, and the delay time in communication can be reduced since the number of time slots is distinguished between the data having priority and the data without priority.

In the exchange node according to the present invention, the multiplexing circuit includes a plurality of shift registers which can perform parallel processing. The priority control processing data having large data amount is divided and simultaneously multiplexed in parallel, and the delay time in communication can be reduced by arranging a plurality of shift registers which can perform parallel processing in the multiplexing circuit.

In the exchange node according to the present invention, the time slot allocation circuit specifies the time slot according to the priority with respect to the priority control processing data containing the priority information of two or more stages. If the priority is two or more stages, the data having high priority can be transmitted without delay by specifying the time slot in order of high priority.

In the exchange node according to the present invention, the time slot allocation circuit preferably specifies the number of time slots according to the length of the priority control processing data. If the priority control processing data exceeds the data amount that can be written in one time slot, one frame of the time division multiplexing line can be used without waste by specifying the appropriate number of time slots with respect to the length of the priority control processing data. The delay in communication is thereby reduced.

In the exchange node according to the present invention, the time slot allocation circuit preferably outputs the time slot specifying signal specifying the time slot for every connection. The specification of the time slot is performed according to the condition for each connection such as the communication speed corresponding to the allocation speed band in the transmission path or the length of the priority control processing data. The number of time slots in one frame of the time division multiplexing line is thereby set for each connection, and priority control corresponding to the communication speed or the length of the priority control processing data becomes possible.

In the exchange node according to the present invention, the time slot allocation circuit specifies the time slot regardless of communication speed of a transmission path for transmitting the input data to the input buffer unit. The output/distribution unit is monitored to write the priority control processing data to the time slot and outputs to the transmission path of different communication speed regardless of the communication speed of the transmission path of the input data. Therefore, transmission at maximum value of the physical line speed becomes possible in the communication between the relay nodes depending on the traffic congestion state. If the transmission path of a certain communication speed is in traffic congestion, the relevant transmission path can be avoided thereby reducing the delay time of the entire communication network.

In the exchange node according to the present invention, the time slot allocation circuit preferably outputs a "time-series order" of each time slot to the multiplexing circuit as "time-series order" of time slot signal when specifying a plurality of time slots for the priority control processing data; and the multiplexing circuit writes the priority control processing data in the order of the "time-series order" of time slot signal. If the priority control processing data exceeds the data amount that can be written in one time slot, and if a plurality of time slots is to be specified, the "time-series order" of time slot signal indicating which order each specified time slot is at in the "time-series order" is output to the multiplexing circuit. The multiplexing circuit thereby writes the priority control processing data divided in "time-series order". Reordering is thereby facilitated and damage of the data is avoided when external exchange node or terminal receives the output of the exchange node according to the present invention.

In the exchange node according to the present invention, the time slot allocation circuit preferably resets specification of the time slot after a predetermined time has elapsed after specifying the time slot. The state in which the time slot cannot be specified although it is in an empty state is avoided by resetting the time slot information specified by the time slot allocation circuit after a predetermined time has elapsed.

In the exchange node according to the present invention, the time slot allocation circuit resets specification of the time slot by a priority control release signal contained in the priority control signal after specifying the time slot. The state in which the time slot cannot be specified although it is in an empty state is avoided by containing the priority control release signal in the priority control signal, identifying the same, and resetting the time slot information specified by the time slot allocation circuit.

In the exchange node according to the present invention, wherein the time slot allocation circuit preferably resets specification of the time slot by writing another packet data to the input buffer unit after specifying the time slot. The state in which the time slot cannot be specified although it is in an empty state for each input data is avoided by resetting every time another packet data is input to the exchange node.

The exchange node control method according to the present invention includes an input step in which an input buffer unit writes input data which is connection type packet data to a shift register and outputs input buffer data at completion of the writing of the input data; a distribution step in which a distribution unit, which is input with the input buffer data output in the input step, outputs the input buffer data output in the input step as priority control processing data by a priority control signal indicating that the input data input in the input step is priority control processing data; an identification step in which an identification unit identifies the priority control signal contained in the input data input in the input step, and outputs the priority control signal to the distribution unit; a time slot allocation step in which a time slot allocation circuit obtains time slot information indicating that a time slot for writing the priority control processing data is unused, and outputs a time slot specifying signal specifying a time slot of write destination of the priority control processing data from the unused time slots; a multiplexing step in which a multiplexing circuit writes the priority control processing data output in the distribution step to the shift register allocated by the time slot specifying signal output in the time slot allocation step, and outputs multiplexed data at completion of the writing of the priority control processing data; and an output step in which an output/distribution unit transmits the multiplexed data output in the multiplexing step to an outgoing line and outputs information of the unused time slot of the multiplexed data output in the multiplexing step to the time slot allocation circuit as time slot information.

The buffering step for data processing inside the exchange node is not required and the delay time in communication is reduced by identifying the priority control signal to preferentially process the priority control processing data, monitoring the output to obtain the time slot information and specifying the unused time slot as the write destination of the priority control processing data. The communication quality is ensured by using the connection type as the communication method.

The exchange node control method according to the present invention includes an input step in which an input buffer unit writes input data which is connection type packet data to a shift register and outputs input buffer data at completion of the writing of the input data; a distribution step in which a distribution unit, which is input with the input buffer data output in the input step, outputs the input buffer data output in the input step as priority control processing data by a priority control signal indicating that the input data input in the input step is priority control processing data; an identification step in which an identification unit identifies the priority control signal contained in the input data input in the input step, and outputs the priority control signal to the distribution unit; a time slot allocation step in which a time slot allocation circuit obtains time slot information indicating that a time slot for writing the priority control processing data is unused, and outputs a time slot specifying signal specifying a time slot of write destination of the priority control processing data from the unused time slots; a frame compression step in which a frame compression circuit, which is input with the priority control processing data output in the distribution step, compresses time width of the priority control processing data and outputs compressed data; a multiplexing step in which a multiplexing circuit writes the compressed data output in the frame compression step to the shift register allocated by the time slot specifying signal output in the time slot allocation step, and outputs multiplexed data at completion of the writing of the compressed data; a frame decompression step in which a frame decompression circuit, which is input with the multiplexed data output in the multiplexing step, decompresses the time width of the multiplexed data and outputs decompressed data; and an output step in which an output/distribution unit transmits the decompressed data output in the frame decompression step to an outgoing line and outputs information of the unused time slot of the decompressed data output in the frame decompression step to the time slot allocation circuit as time slot information.

The buffering step for data processing inside the exchange node is not required and the delay time in communication is reduced by identifying the priority control signal to preferentially process the priority control processing data, monitoring the output to obtain the time slot information and specifying the unused time slot as the write destination of the priority control processing data. The communication quality is ensured by using the connection type as the communication method. Furthermore, a great number of time slots can be formed in one frame of the time division multiplexing line by compressing the time width of the priority control processing data by the frame compression step, a great amount of data can be multiplexed in a short period of time, and the delay time in communication can be reduced. Moreover, the number of connections of the input side transmission path can be increased since the time slot in one frame can be increased.

The exchange node control method according to the present invention further preferably includes a priority determination step in which a priority determination circuit detects priority contained in the priority control processing data and outputs priority information to the time slot allocation circuit, wherein the time slot allocation circuit specifies a time slot according to the priority of the priority information in the time slot allocation step. The data having priority can be transmitted without delay by specifying the time slot prior to the data without priority if the priority control processing data has priority.

The exchange node control method according to the present invention further preferably includes a priority determination step in which a priority determination circuit detects priority contained in the priority control processing data and outputs priority information to the time slot allocation circuit, wherein the time slot allocation circuit varies the specified number of time slots according to the priority of the priority information in the time slot allocation step. The empty time slot can be efficiently used, and the delay time in communication can be reduced since the number of time slots is distinguished between the data having priority and the data without priority.

In the exchange node control method according to the present invention, the multiplexing step includes a step in which the multiplexing circuit writes data to a plurality of shift registers which can perform parallel processing. The priority control processing data having large data size is divided and simultaneously multiplexed in parallel, and the delay time in communication can be reduced by arranging a step in which the multiplexing circuit writes the data to plurality of shift registers which can perform parallel processing.

In the exchange node control method according to the present invention, the time slot allocation circuit specifies the time slot according to the priority with respect to the priority control processing data containing the priority information of two or more stages in the time slot allocation step. If the priority is two or more stages, the data having high priority can be transmitted without delay by specifying the time slot in order of high priority.

In the exchange node control method according to the present invention, the time slot allocation circuit preferably specifies the number of time slots according to the length of the priority control processing data in the time slot allocation step. If the priority control processing data exceeds the data amount that can be written in one time slot, one frame of the time division multiplexing line can be used without waste by specifying the appropriate number of time slots with respect to the length of the priority control processing data. The delay in communication is thereby reduced.

In the exchange node control method according to the present invention, the time slot allocation circuit preferably outputs the time slot specifying signal specifying the time slot for every connection in the time slot allocation step. The specification of the time slot is performed according to the condition for each connection such as the communication speed of the transmission path. The number of time slots in one frame of the time division multiplexing line is thereby set for each connection, and priority control corresponding to the communication speed becomes possible.

In the exchange node control method according to the present invention, the time slot allocation circuit specifies the time slot regardless of communication speed when the input data is input to the input buffer unit in the time slot allocation step. The output is monitored to write the priority control processing data to the time slot and output to the transmission path of different communication speed regardless of the communication speed of the transmission path of the input data. Therefore, transmission at maximum value of the physical line speed becomes possible in the communication between the exchange nodes. If the transmission path of a certain communication speed is in traffic congestion, the relevant transmission path can be avoided thereby reducing the delay time of the entire communication network.

In the exchange node control method according to the present invention, the time slot allocation circuit preferably outputs a "time-series order" of each time slot to the multiplexing circuit as "time-series order" of time slot signal when specifying a plurality of time slots for the priority control processing data in the time slot allocation step; and the multiplexing circuit writes the priority control procesing data in the order of the "time-series order" of time slot signal. If the priority control processing data exceeds the data amount that can be written in one time slot, and if a plurality of time slots is to be specified, the "time-series order" of time slot signal indicating which order each specified time slot is at in the "time-series order" is output to the multiplexing circuit. The multiplexing circuit thereby writes the priority control processing data divided in "time-series order". Reordering is thereby facilitated and damage of the data is avoided when external exchange node or terminal receives the output of the exchange node according to the present invention.

In the exchange node control method according to the present invention, the time slot allocation circuit preferably resets specification of the time slot after a predetermined time has elapsed after specifying the time slot in the time slot allocation step. The state in which the time slot cannot be specified although it is in an empty state is avoided by resetting the time slot information specified by the time slot allocation circuit after a predetermined time has elapsed.

In the exchange node control method according to the present invention, the time slot allocation circuit resets specification of the time slot by a priority control release signal contained in the priority control signal after specifying the time slot in the time slot allocation step. The state in which the time slot cannot be specified although it is in an empty state is avoided by containing the priority control release signal in the priority control signal, identifying the same, and resetting the time slot information specified by the time slot allocation circuit.

Preferably, the time slot allocation circuit resets specification of the time slot by writing another packet data to the input buffer unit after specifying the time slot in the time slot allocation step. The state in which the time slot cannot be specified although it is in an empty state for each input data is avoided by resetting every time another packet data is input to the exchange node.

A connectionless type data allocation circuit for allocating a time slot of connectionless type packet data and outputting a time slot specifying signal to the multiplexing circuit is further preferably arranged, wherein the distribution unit outputs the header information of the connectionless type data to the connectionless data allocation circuit when the input data input to the input buffer unit is the connectionless type packet data; and the multiplexing circuit further multiplexes the connectionless type packet data on the multiplexed data.

The connectionless type packet data and the connection type packet data are allocated with time slot and multiplexed. The connectionless communication and the connection communication thus can be mixed.

The exchange node and the exchange node control method according to the present invention provides a means for guaranteeing the real time communication for a constant time by adding the priority control bit, differentiating the transfer control with the non-priority connectionless type communication packet, and rapidly allocating the time slot in the common bus at ultra-high speed as the time slot in multiplexing to the common bus within a certain time using the time where the packet is received by the input buffer installed corresponding to the line.

Specifically, the exchange node according to the present invention is an exchange node including an input buffer unit for writing input data which is connectionless type packet data to a shift register and outputting input buffer data at completion of the writing of the input data; a distribution unit, which is input with the input buffer data from the input buffer unit, for outputting the input buffer data from the input buffer unit as priority control processing data by a priority control signal indicating that the input data input to the input buffer unit is priority control processing data; an identification unit for identifying the priority control signal contained in the input data input to the input buffer unit, and outputting the priority control signal to the distribution unit; a time slot allocation circuit for obtaining time slot information indicating that a time slot for writing the priority control processing data is unused and the priority control signal from the identification unit, and outputting a time slot specifying signal specifying a time slot of write destination of the priority control processing data from the unused time slots; a time slot information acquiring unit for outputting information on unused time slot of the time slot specifying signal from the time slot allocation circuit to the time slot allocation circuit as time slot information; and a multiplexing circuit for writing the priority control processing data from the distribution unit to the shift register allocated by the time slot specifying signal from the time slot allocation circuit, and outputting multiplexed data at completion of the writing of the priority control processing data.

The priority control signal contained in the header information of the packet data is identified and the time slot is allocated, and thus the allocation of the time slot is performed before all the data of the packet data which header information has been received are input to the input buffer unit. Furthermore, the buffer for data processing inside the exchange node is not necessary and the delay time in communication is reduced since the priority control processing data is preferentially processed, the time slot information monitored by the time slot information acquiring unit is obtained and the unused time slot is specified as the write destination of the priority control processing data.

The exchange node according to the present invention further preferably includes a shift register for storing the priority control processing data output from the distribution unit, and outputting the priority control processing data to the multiplexing circuit when the time slot specifying signal is input from the time slot allocation circuit.

A waiting adjustment of a very small time can be performed even if a slight delay exists in the processing in the time slot allocation circuit or the time slot information acquiring unit since the shift register for temporarily storing the priority control processing data is further arranged.

An exchange node according to the present invention includes an input buffer unit for writing input data which is connectionless type packet data to a shift register and outputting input buffer data at completion of the writing of the input data; a distribution unit, which is input with the input buffer data from the input buffer unit, for outputting the input buffer data from the input buffer unit as priority control processing data by a priority control signal indicating that the input data input to the input buffer unit is priority control processing data; an identification unit for identifying the priority control signal contained in the input data input to the input buffer unit, and outputting the priority control signal to the distribution unit; a time slot allocation circuit for obtaining time slot information indicating that a time slot for writing the priority control processing data is unused and the priority control signal from the identification unit, and outputting a time slot specifying signal specifying a time slot of write destination of the priority control processing data from the unused time slots; a time slot information acquiring unit for outputting information on unused time slot of the time slot specifying signal from the time slot allocation circuit to the time slot allocation circuit as time slot information; a frame compression circuit, which is input with the priority control processing data from the distribution unit, for compressing time width of the priority control processing data and outputting compressed data; a multiplexing circuit for writing the compressed data from the frame compression circuit to the shift register allocated by the time slot specifying signal from the time slot allocation circuit, and outputting multiplexed data at completion of the writing of the compressed data; and a frame decompression circuit, which is input with the multiplexed data from the multiplexing circuit, for decompressing the time width of the multiplexed data and outputting decompressed data.

The priority control signal contained in the header information of the packet data is identified and the time slot is allocated, and thus the allocation of the time slot is performed before all the data of the packet data which header information has been received are input to the input buffer unit. Furthermore, the buffer for data processing inside the exchange node is not necessary and the delay time in communication is reduced since the priority control processing data is preferentially processed, the time slot information monitored by the time slot information acquiring unit is obtained and the unused time slot is specified as the write destination of the priority control processing data. Moreover, a great number of time slots are formed in one frame of the time division multiplexing line by compressing the time width of the priority control processing data by means of the frame compression circuit, a great amount of data are multiplexed in a short period of time and the delay time in communication is reduced. The number of connections of the input side transmission path can be increased since the time slot in one frame can be increased.

The exchange node according to the present invention further preferably includes a shift register for storing the compressed data output from the frame compression unit, and outputting the compressed data to the multiplexing circuit when the time slot specifying signal is input from the time slot allocation circuit.

A waiting adjustment of a very small time can be performed even if a slight delay exists in the processing in the time slot allocation circuit or the time slot information acquiring unit since the shift register for temporarily storing the compressed data is further arranged.

Preferably, the time slot allocation circuit outputs the time slot specifying signal to the multiplexing circuit at a constant time from when the input data is input to the input buffer unit, and preferentially allocates the time slot of write destination of the priority control processing data to time slot allocated with the packet identifying information when the priority control signal of the packet identifying information same as the packet identifying information contained in the time slot information is input; and the time slot information acquiring unit outputs the information of the unused time slot of the time slot specifying signal from the time slot allocation circuit and the packet identifying information allocated to the time slot to the time slot allocation circuit as time slot information, and erases the packet identifying information allocated to the unused time slot after a constant time set in advance has elapsed.

By temporarily providing a time slot group, communication can be performed in a minimum delay time in the exchange node using the time slot position reserved in advance in the exchange node after the packet of the packet identifying information permitted with allocation arrives in the exchange node. Therefore, communication can be performed in a minimum delay time in the exchange node for the input data of the packet identifying information defined in advance.

Preferably, the time slot allocation circuit outputs the time slot specifying signal to the multiplexing circuit at a constant time set in advance, stores the already allocated time slot as reserved time slot if the priority control processing data not completed with allocation of the time slot is remaining, specifies the remaining time slot when the priority control signal containing the packet identifying information same as the packet identifying information contained in the priority control processing data allocated with the reserved time slot is input, and completes the allocation of the time slot of the priority control processing data of the priority control signal.

The communication time in the exchange node is reduced since the input data allocated with the time slot up to the middle is effectively used without being discarded.

The exchange node according to the present invention further preferably includes a non-priority control processing data allocation circuit for allocating a time slot of the non-priority control processing data not requesting for priority control of the input data, and outputting the non-priority control processing data allocated with the time slot, wherein the distribution unit outputs the input data not requesting for priority control to the non-priority control processing data allocation circuit as non-priority control processing data by a priority control signal indicating that the input data is the priority control processing data; and the multiplexing circuit further multiplexes the non-priority control processing data output by the non-priority control processing data allocation circuit on the multiplexed data.

The priority connectionless type packet data and the non-priority connection type packet data are allocated with time slot and multiplexed. The priority connectionless communication and the non-priority connection communication thus can be mixed.

The exchange node according to the present invention further preferably includes a connection type data allocation circuit for allocating a time slot of the connection type packet data output from the distribution unit and outputting the packet data allocated with the time slot, wherein the distribution unit outputs to the connection type data allocation circuit as connection type data when the input data input to the input buffer unit is connection type packet data; and the multiplexing circuit further multiplexes the connection type data output by the connection type data allocation circuit.

The connectionless type packet data and the connection type packet data are allocated with time slot and multiplexed. The connectionless communication and the connection communication thus can be mixed.

In the exchange node according to the present invention, the required time e for each step is calculated as, $$e < \MIN_{i=1,2,\ldots N} \{B(i)/A(i)\}/(N \times d) \qquad \text{[Eq. 1]}$$

where number of lines for inputting the input data to the input buffer unit is N, $i^{th}$ (i is an integer from 1 to N) line speed of the line is A(i), minimum size of the $i^{th}$ packet data of the line is B(i), and number of execution process until the time slot is allocated by the time slot allocation circuit is d steps.

In equation 1, MIN{X1,X2, ... Xn} indicates selecting the smallest of {X1,X2, ... Xn}. According to the present invention, when the time slot allocation circuit simultaneously allocation-process the time slots for all accommodating lines, communication can be performed in minimum delay time in the exchange node if the time required for each processing step is shorter than equation 1.

The exchange node according to the present invention further preferably includes a priority determination circuit for detecting the priority contained in the priority control processing data and outputting the priority information to the time slot allocation circuit, wherein the time slot allocation circuit specifies the time slot according to the priority of the priority information.

The data having priority can be transmitted without delay by specifying the time slot prior to the data without priority if the priority control processing data has priority.

The exchange node according to the present invention further preferably includes a priority determination circuit for detecting priority contained in the priority control processing data and outputting priority information to the time slot allocation circuit, wherein the time slot allocation circuit varies the number of time slot to be specified according to the priority of the priority information.

The empty time slot can be efficiently used, and the delay time in communication can be reduced since the number of time slots is distinguished between the data having priority and the data without priority.

In the exchange node according to the present invention, the multiplexing circuit preferably includes a plurality of shift registers which can perform parallel processing.

The priority control processing data having large data amount is divided and simultaneously multiplexed in parallel, and the delay time in communication can be reduced by arranging a plurality of shift registers which can perform parallel processing in the multiplexing circuit.

In the exchange node according to the present invention, the time slot allocation circuit preferably specifies the time slot according to the priority with respect to the priority control processing data containing the priority information of two or more stages.

If the priority is two or more stages, the data having high priority can be transmitted without delay by specifying the time slot in order of high priority.

In the exchange node according to the present invention, the time slot allocation circuit preferably specifies the number of time slots according to the length of the priority control processing data.

If the priority control processing data exceeds the data amount that can be written in one time slot, one frame of the time division multiplexing line can be used without waste by specifying the appropriate number of time slots with respect to the length of the priority control processing data. The delay in communication is thereby reduced.

In the exchange node according to the present invention, the time slot allocation circuit preferably specifies the time slot regardless of communication speed of a transmission path for transmitting the input data to the input buffer unit.

The priority control processing data is written in the time slot and output to the transmission path of different communication speed regardless of the communication speed of the transmission path of the input data. Therefore, transmission at maximum value of the physical line speed becomes possible in the communication between the relay nodes depending on the traffic congestion state. If the transmission path of a certain communication speed is in traffic congestion, the relevant transmission path can be avoided thereby reducing the delay time of the entire communication network.

In the exchange node according to the present invention, the time slot allocation circuit preferably outputs a "time-series order" of each time slot to the multiplexing circuit as "time-series order" of time slot signal when specifying a plurality of time slots for the priority control processing data; and the multiplexing circuit writes the priority control processing data in the order of the "time-series order" of time slot signal.

If the priority control processing data exceeds the data amount that can be written in one time slot, and if a plurality of time slots is to be specified, the "time-series order" of time slot signal indicating which order each specified time slot is at in the "time-series order" is output to the multiplexing circuit. The multiplexing circuit thereby writes the priority control processing data divided in "time-series order". Reordering is thereby facilitated and damage of the data is avoided when external exchange node or terminal receives the output of the exchange node according to the present invention.

In the exchange node according to the present invention, the time slot allocation circuit preferably resets specification of the time slot after a predetermined time has elapsed after specifying the time slot.

The state in which the time slot cannot be specified although it is in an empty state is avoided by resetting the time slot information specified by the time slot allocation circuit after a predetermined time has elapsed.

In the exchange node according to the present invention, the time slot allocation circuit preferably resets specification of the time slot by a priority control release signal contained in the priority control signal after specifying the time slot.

The state in which the time slot cannot be specified although it is in an empty state is avoided by containing the priority control release signal in the priority control signal, identifying the same, and resetting the time slot information specified by the time slot allocation circuit.

In the exchange node according to the present invention, the time slot allocation circuit preferably resets specification of the time slot by writing another packet data to the input buffer unit after specifying the time slot.

The state in which the time slot cannot be specified although it is in an empty state for each input data is avoided by resetting every time another packet data is input to the exchange node.

An exchange node according to the present invention further preferably includes a plurality of multiplexing circuits; a plurality of distributors, connected to a plurality of outgoing lines, for distributing the multiplexed data output from each multiplexing circuit for each outgoing line; and a selector circuit, arranged between the multiplexing circuit and the distributor, for distributing the priority control processing data multiplexed to the multiplexed data to the distributor corresponding to the direction path.

The communication path can be extended without newly arranging the multiplexing circuit and the common bus since a plurality of multiplexing circuits is connected to the multiplexing circuit in parallel, and the multiplexed data output from each multiplexing circuit are distributed by the selector circuit for each dividing circuit.

An exchange node control method according to the present invention includes the steps of an input step in which an input buffer unit writes input data which is connectionless type packet data to a shift register and outputs input buffer data at completion of the writing of the input data; a distribution step in which a distribution unit, which is input with the input buffer data output in the input step, outputs the input buffer data output in the input step as priority control processing data by a priority control signal indicating that the input data input in the input step is priority control processing data; an identification step in which an identification unit identifies the priority control signal contained in the input data input in the input step, and outputs the priority control signal to the distribution unit; a time slot allocation step in which a time slot allocation circuit obtains time slot information indicating that a time slot for writing the priority control processing data is unused and the priority control signal from the identification unit, and outputs a time slot specifying signal specifying a time slot of write destination of the priority control processing data from the unused time slots; a time slot information acquiring step in which a time slot information acquiring unit outputs information of the unused time slot of the time slot specifying signal output in the time slot allocation step to the time slot allocation circuit as the time slot information; and a multiplexing step in which a multiplexing circuit writes the priority control processing data output in the distribution step to the shift register allocated by the time slot specifying signal output in the time slot allocation step, and outputs multiplexed data at completion of the writing of the priority control processing data.

The priority control signal contained in the header information of the packet data is identified and the time slot is allocated, and thus the allocation of the time slot is performed before all the data of the packet data which header information has been received are input to the input buffer unit. Furthermore, the buffer for data processing inside the exchange node is not necessary and the delay time in communication is reduced since the priority control processing data is preferentially processed, the time slot information monitored by the time slot information acquiring unit is obtained and the unused time slot is specified as the write destination of the priority control processing data.

An exchange node control method according to the present invention includes an input step in which an input buffer unit writes input data which is connectionless type packet data to a shift register and outputs input buffer data at completion of the writing of the input data; a distribution step in which a distribution unit, which is input with the input buffer data output in the input step, outputs the input buffer data output in the input step as priority control processing data by a priority control signal indicating that the input data input in the input step is priority control processing data; an identification step in which an identification unit identifies the priority control signal contained in the input data input in the input step, and outputs the priority control signal to the distribution unit; a time slot allocation step in which a time slot allocation circuit obtains time slot information indicating that a time slot for writing the priority control processing data is unused and the priority control signal from the identification unit, and outputs a time slot specifying signal specifying a time slot of write destination of the priority control processing data from the unused time slots; a time slot information acquiring step in which a time slot information acquiring circuit outputs information of the unused time slot of the time slot specifying signal output in the time slot allocation step to the time slot allocation circuit as the time slot information; a frame compression step in which a frame compression circuit, which is input with the priority control processing data output in the distribution step, compresses time width of the priority control processing data and outputs compressed data; a multiplexing step in which a multiplexing circuit writes the compressed data output in the frame compression step to the shift register allocated by the time slot specifying signal output in the time slot allocation step, and outputs multiplexed data at completion of the writing of the compressed data; and a frame decompression step in which a frame decompression circuit, which is input with the multiplexed data output in the multiplexing step, decompresses time width of the multiplexed data and outputs decompressed data.

The priority control signal contained in the header information of the packet data is identified and the time slot is allocated, and thus the allocation of the time slot is performed before all the data of the packet data which header information has been received are input to the input buffer unit. Furthermore, the buffer for data processing inside the exchange node is not necessary and the delay time in communication is reduced since the priority control processing data is preferentially processed, the time slot information monitored by the time slot information acquiring unit is obtained and the unused time slot is specified as the write destination of the priority control processing data. Moreover, a great number of time slots are formed in one frame of the time division multiplexing line by compressing the time width of the priority control processing data by means of the frame compression circuit, a great amount of data are multiplexed in a short period of time and the delay time in communication is reduced. The number of connections of the input side transmission path can be increased since the time slot in one frame can be increased.

In the exchange node control method according to the present invention, the time slot allocation circuit preferably outputs the time slot specifying signal to the multiplexing circuit at a constant time from when the input data is input to the input buffer unit, and preferentially allocates the time slot of write destination of the priority control processing data to time slot allocated with the packet identifying information when the priority control signal of the packet identifying information same as the packet identifying information contained in the time slot information is input in the time slot allocation step; and the time slot information acquiring unit outputs the information of the unused time slot of the time slot specifying signal output in the time slot allocation step and the packet identifying information allocated to the time slot to the time slot allocation circuit as the time slot information, and erases the packet identifying information allocated to the unused time slot after a constant time set in advance has elapsed in the time slot information acquiring step.

By temporarily providing a time slot group, communication can be performed in a minimum delay time in the exchange node using the time slot position reserved in advance in the exchange node after the packet of the packet identifying information permitted with allocation arrives in the exchange node. Therefore, communication can be performed in a minimum delay time in the exchange node for the input data of the packet identifying information defined in advance.

In the exchange node control method according to the present invention, the time slot allocation circuit preferably outputs the time slot specifying signal to the multiplexing circuit at a constant time set in advance, stores the already allocated time slot as reserved time slot if the priority control processing data not completed with allocation of the time slot is remaining, specifies the remaining time slot when the priority control signal containing the packet identifying information same as the packet identifying information contained in the priority control processing data allocated with the reserved time slot is input, and completes the allocation of the time slot of the priority control processing data of the priority control signal in the time slot allocation step.

The communication time in the exchange node is reduced since the input data allocated with the time slot up to the middle is effectively used without being discarded.

The exchange node control method according to the present invention further preferably includes a priority determination step in which a priority determination circuit detects priority contained in the priority control processing data and outputs priority information to the time slot allocation circuit, wherein the time slot allocation circuit specifies a time slot according to the priority of the priority information in the time slot allocation step.

The data having priority can be transmitted without delay by specifying the time slot prior to the data without priority if the priority control processing data has priority.

The exchange node control method according to the present invention further preferably includes a priority determination step in which a priority determination circuit detects priority contained in the priority control processing data and outputs priority information to the time slot allocation circuit, wherein the time slot allocation circuit varies the specified number of time slots according to the priority of the priority information in the time slot allocation step.

The empty time slot can be efficiently used, and the delay time in communication can be reduced since the number of time slots is distinguished between the data having priority and the data without priority.

In the exchange node control method according to the present invention, the multiplexing step preferably includes a step in which the multiplexing circuit writes data to a plurality of shift registers which can perform parallel processing.

The priority control processing data having large data amount is divided and simultaneously multiplexed in parallel, and the delay time in communication can be reduced by arranging a step in which the multiplexing circuit writes the data to plurality of shift registers which can perform parallel processing.

In the exchange node control method according to the present invention, the time slot allocation circuit preferably specifies the time slot according to the priority with respect to the priority control processing data containing the priority information of two or more stages in the time slot allocation step.

If the priority is two or more stages, the data having high priority can be transmitted without delay by specifying the time slot in order of high priority.

In the exchange node control method according to the present invention, the time slot allocation circuit preferably specifies the number of time slots according to the length of the priority control processing data in the time slot allocation step.

If the priority control processing data exceeds the data amount that can be written in one time slot, one frame of the time division multiplexing line can be used without waste by specifying the appropriate number of time slots with respect to the length of the priority control processing data. The delay in communication is thereby reduced.

In the exchange node control method according to the present invention, the time slot allocation circuit preferably specifies the time slot regardless of communication speed when the input data is input to the input buffer unit in the time slot allocation step.

The priority control processing data is written in the time slot and output to the transmission path of different communication speed regardless of the communication speed of the transmission path of the input data. Therefore, transmission at maximum value of the physical line speed becomes possible in the communication between the relay nodes depending on the traffic congestion state. If the transmission path of a certain communication speed is in traffic congestion, the relevant transmission path can be avoided thereby reducing the delay time of the entire communication network.

In the exchange node control method according to the present invention, the time slot allocation circuit preferably outputs a "time-series order" of each time slot to the multiplexing circuit as "time-series order" of time slot signal when specifying a plurality of time slots for the priority control processing data in the time slot allocation step; and the multiplexing circuit writes the priority control processing data in the order of the "time-series order" of time slot signal.

If the priority control processing data exceeds the data amount that can be written in one time slot, and if a plurality of time slots is to be specified, the time slot "time-series order" signal indicating which order each specified time slot is at in the "time-series order" is output to the multiplexing circuit. The multiplexing circuit thereby writes the priority control processing data divided in "time-series order". Reordering is thereby facilitated and damage of the data is avoided when external exchange node or terminal receives the output of the exchange node according to the present invention.

In the exchange node control method according to the present invention, the time slot allocation circuit preferably resets specification of the time slot after a predetermined time has elapsed after specifying the time slot in the time slot allocation step.

The state in which the time slot cannot be specified although it is in an empty state is avoided by resetting the time slot information specified by the time slot allocation circuit after a predetermined time has elapsed.

In the exchange node control method according to the present invention, the time slot allocation circuit preferably resets specification of the time slot by a priority control release signal contained in the priority control signal after specifying the time slot in the time slot allocation step.

The state in which the time slot cannot be specified although it is in an empty state is avoided by containing the priority control release signal in the priority control signal, identifying the same, and resetting the time slot information specified by the time slot allocation circuit.

In the exchange node control method according to the present invention, the time slot allocation circuit preferably resets specification of the time slot by writing another packet data to the input buffer unit after specifying the time slot in the time slot allocation step.

The state in which the time slot cannot be specified although it is in an empty state for each input data is avoided by resetting every time another packet data is input to the exchange node.

EFFECT OF THE INVENTION

The present invention provides an exchange node and an exchange node control method in which the delay time is made extremely short by monitoring the output/distribution unit of the exchange node, specifying the unused time slot as the write destination of the data and performing priority control by the priority control signal contained in the data, the traffic congestion is resolved by performing write output to the specified time slot irrespective of the communication speed of the transmission path of the data, and the communication quality is ensured by using the connection type as the communication method since the delay time in communication can be reduced.

The present invention also provides an exchange node and an exchange node control method which can avoid the occurrence of delay time in the exchange node regardless of the communication traffic congestion by adding the priority control bit, differentiating the transfer control with the non-priority connectionless type communication packet, and rapidly allocating the time slot in the common bus at ultra-high speed as the time slot in multiplexing to the common bus within a certain time using the time where the packet is received by the input buffer installed corresponding to the line.

BRIEF DESCRIPTION OF THE DRAWINGS

FIG. 37 is a view showing a first example of the time slot map in which the time slot allocation circuits specifies the time slot.

DESCRIPTION OF THE REFERENCE NUMERALS

Figure 1:
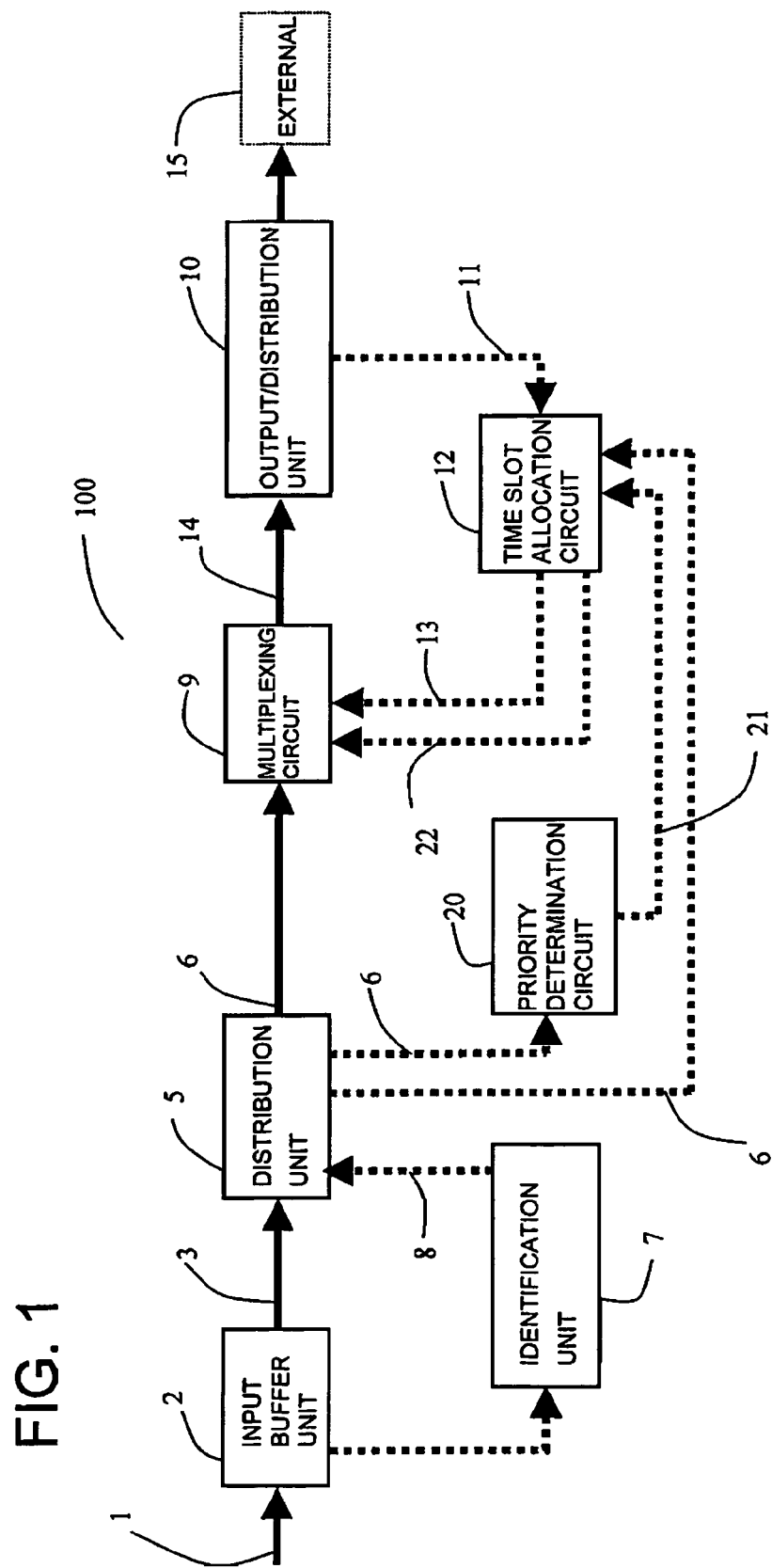
FIG. 1 is a schematic view of an exchange node 100 according to a first embodiment.

1 input data
2 input buffer unit
3 input buffer data
5 distribution unit
6 priority control processing data
7 identification unit
8 priority control signal
9 multiplexing circuit
10 output/distribution unit
11 time slot information
12 time slot allocation circuit
13 time slot specifying signal
14 multiplexed data
15 external
16 frame compression circuit
17 compressed data
18 frame decompression circuit
19 decompressed data
20 priority determination circuit
21 priority information
22 "time-series order" of time slot signal
31 input data
32 input buffer unit
33 input buffer data
35 distribution unit
36 priority control processing data
37 identification unit
38 priority control signal
39 multiplexing circuit
40 time slot information acquiring unit
41 time slot information
42 time slot allocation circuit
43 time slot specifying signal
44 multiplexed data
46 frame compression circuit
47 compressed data
48 frame decompression circuit
49 decompressed data
51 shift register
52 non-priority time slot specifying signal
53 non-priority control processing data allocation circuit
54 connection type data
55 connection type data allocation circuit
56 distributor
57 selector circuit
81 input side line control unit
82 common control unit
83 common memory
84 common bus
85 output side line control unit
86 multiplexing unit
87 input data
88 input side clock
89 output side clock
90 conventional exchange node
100, 200, 201, 202, 207, 208, 209 exchange node
400, 205 embodiment used in optical communication using optical switch
301 header
302 information other than header
304 band signal of line
305 direction path signal
311 number of time slots
312 empty/blocked display
313 direction path number
314 time slot map
S315 input procedure of priority control signal
S316 update procedure of time slot map
S317 ensuring request confirming procedure
S318 confirming procedure
S319, 5320 procedure of updating time slot map 314
321, 322 multiplexing/separating device
323 connectionless type data allocation circuit
324 synchronization clock
325,326 multiplexing line
327, 328 terminal
329 connection type data allocation circuit 330 non-priority control data allocation circuit
333 clock pulse
334 SFQ-PG circuit
335 DC/SFQ circuit
336 SFQ
337 D-F/F circuit
338 Josephson junction element
339 frame compression unit
341 threshold value of DC/SFQ
342 reset pulse
343 frame length (before compression)
344 frame length (after compression)
345 input pulse
346 DC-SFQ output
347 clock pulse train
348 D-F/F circuit output
349 output of frame compression circuit
351 frame compression unit
352 serial input/parallel output register
353 parallel input/serial output register
354 clock pulse
355 output of D-F/F circuit (before compression)
356 frame compression unit output (after compression)
357 CB
360 DC/SFQ circuit
361 bias current
362 SFQ
363 SFQ of reverse polarity
364 priority control processing data
367 signal amplitude of output pulse
368 output pulse width
371 bias current
384 splitter
390 CB circuit
393 merge
395, 396 shift register output
398 CB output
401 shift register circuit
405 buffer loop
406 storage loop
408 shift register output
409 one bit worth of shift register
411 packet (before compression)
412 packet (after compression)
413 multiplexing unit
414 input CH-1 (after compression)
415 input CH-2 (after compression)
416 input CH-3 (after compression)
417 input CH-4 (after compression)
418 delay circuit
419 CB circuit
420 CB output
421, SFQ-PG circuit
422, SFQ/DC circuit
423 frame decompression unit
424 compressed data
425 clock pulse
426 decompressed data
427 frame decompression unit output
428 SFQ/DC output
429 SFQ/DC circuit
431 optical switch
432 EO conversion
433 OE conversion
441 decoder
442 selector
443 AND gate
444 delay element of delay 2D
445 delay element of delay D
446 OR gate
447 CB circuit
448 VD
449 CHn
450 decoder
451 VD
452 CB
453a CH1 after compression
453b CH2 after compression
453c CH3 after compression
453d CH4 after compression
454 multiplexed data
455 IP data 1 (128 bytes)
456 IP data 2 (64 bytes)
457 IP data 3 (64 bytes)
458 IP data 4 (128 bytes)
459 1 frame (125 vec)
460 1 frame (125 vec)
461a direction path 1
461b direction path 2
461c direction path 3
462a transmission path 1 of 100 Mb/s
462b transmission path 2 of 100 Mb/s
463 IP data 1 (128 bytes)
464 IP data 2 (64 bytes)
465 IP data 3 (128 bytes)
466 IP data 4 (64 bytes)
467 transmission path 1 of 100 Mb/s
468 transmission path 1 of 1 Gb/s
469 time slot 3
470 time slot 4
471 IP data 1
472 IP data 2
473 time slot 1
474 time slot 2
475 IP data 3
476 IP data 4
477 direction path
480 optical communication using conventional optical switch
481, 482 IP switching
483, 484 OE/EO conversion
485 optical switch 1
486 optical switch 2
487 optical transmission path #3 ($\lambda 3$)
488 exchange node 1
489 exchange node 2
490 exchange node 3
491 exchange node 4
492 optical transmission path #1 ($\lambda 1$)
493 optical transmission path #2 ($\lambda 2$)
494 optical transmission path #4 ($\lambda 1$)
495 optical transmission path #5 ($\lambda 2$)
496 optical communication using conventional optical switch
497 IP switching
501 application example to MPLS communication
502a #1 node
502b #2 node
502c #3 node
502d #4 node
502e #5 node
503a packet (destination: Y)
503b packet (destination: X)
503c packet (address: Y)
503d packet|address: X)
504a, 504b label 505A terminal A
505B terminal B
505X terminal X
505Y terminal Y
511 application to backbone exchange network
512a, 512b, 512c, 512d, 512e, 512f access system
513a, 513b, 513c, 513d edge router
514a, 514b, 514c core router
515 core relay network
516a identification header of control packet (layer 2 header)
516b transfer label in network
516c, identification label of VPN (use as priority control signal label)
516d IP data+data
521 monitor of packet amount
531 time slot map
532 time slot number
533 empty/block display (0/1=empty/blocked)
534 direction path number
S535 priority control signal input
S536 update time slot map in release request
S537 determine ensuring request
S538 check unused time slot and direction path
5539 execute specification of requested time slot and update empty/block map
S540 execute specification of time slot close to request and update empty/block map
S541 addition step
5542 clock output step
S543 reset signal output step
545 connection identifying number
546 used/unused distinction (0/1=used/unused)
547a, 547b, 547c latch
548 stack memory
549 allocatable time slot number
550 acquiring request of time slot for every time slot allocation
551 stack pointer
552 empty time slot number
553 output side direction path number
554 number of empty time slots
555 counter control (subtraction process)
S556 check if output side direction path matching request time slot number is present
557a, 557b, 557c header
558a, 558b, 558c identifier
559a, 559b, 559c data
560a, 560b, 560c packet data
561a, 561b multiplexing line
571 time slot allocation control information creating unit
572 decoder
573 variable delay circuit
574 CB circuit
575 input terminal of time slot allocation circuit
576 input terminal of multiplexing circuit
581 time slot allocation control unit
582 common control unit
583 SFQ-PG circuit
584 common control unit
601 application example to MPLS communication
602a #1 node
602b #2 node
602c #3 node
602d #4 node
602e #5 node
603a packet (destination: Y)
603b packet (destination: X)
603c packet (address: Y)
603d packet|address: X)
604a, 504b label
605A terminal A
605B terminal B
605×terminal X
605Y terminal Y

BEST MODE FOR CARRYING OUT THE INVENTION

The embodiments of the present invention will be described in detail, but the present invention should not be construed as being limited thereto. The exchange node and the exchange node control method according to the present embodiment will now be described with reference to FIGS. 1 to 67.

First Embodiment

Figure 2:
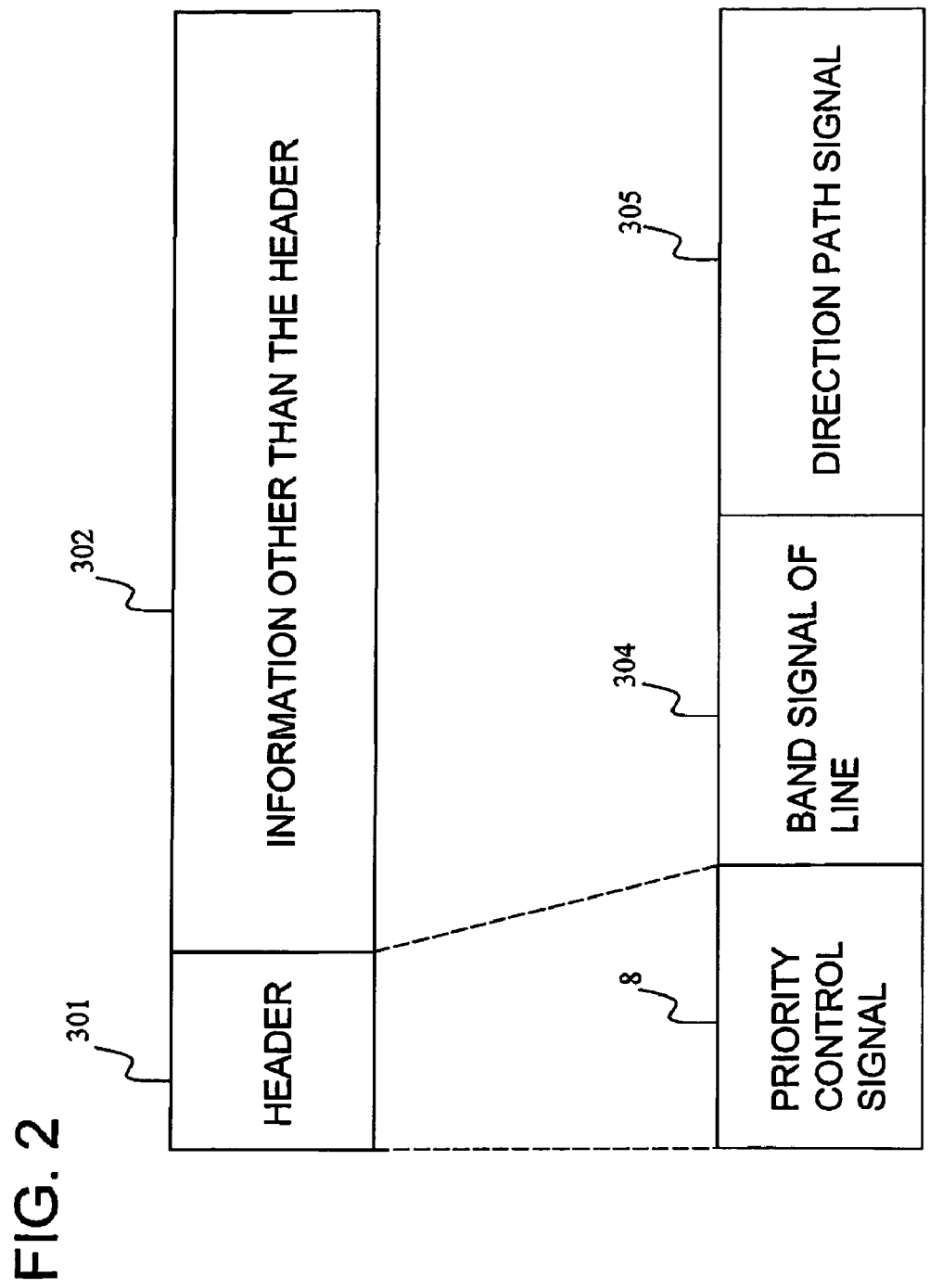
FIG. 2 is a view showing a format of input data.

FIG. 1 is a schematic view showing one form of an exchange node 100 according to the present embodiment. The exchange node 100 includes an input buffer unit 2, an identification unit 7, a distribution unit 5, a multiplexing circuit 9, a time slot allocation circuit 12, and an output/distribution unit 10. More preferably, a frame compression circuit 46 and a frame decompression circuit 18 and a priority judgment circuit 20 described in FIG. 2 are further arranged. The solid line shown in FIG. 1 indicates the flow of main data, and the broken line indicates the flow of control data.

The input buffer unit 2, connected to a transmission path of the input data 1 which is connection type packet data, writes the input data 1 to a shift register. After the writing of the input data 1 is completed, the input buffer data 3 is output. The exchange node 100 according to the present embodiment performs priority controls when the input data 1 is connection type packet data that contains priority control signal, but data may be written in the input buffer unit 2 even if the input data 1 is connection type packet data that does not contain priority control signal, connection type data other than packet data or connectionless type data.

The identification unit 7 identifies the priority control signal 8 contained in the input data 1 input to the input buffer unit 2. The priority control signal 8 is a signal indicating that the input data is the target to be priority-controlled. The format of the input data 1 which is the connection type packet data contains the priority control signal 8 at the header as shown by way of example in FIG. 2. The identification unit 7 identifies the presence of the priority control signal 8, and outputs "present" or "not present". "Present" and "not present" of the priority control signal 8 may be output as "1" and "0". The priority control signal 8 is contained in the header, and band signal and direction path signal of the line are contained in the packet data as shown in FIG. 2. The priority control signal 8 contains priority information 21, length data of priority control processing data, priority control release signal and the like. The format of the input data 1 shown in FIG. 2 contains a header 301 and information other than the header 302. The header 301 contains the priority control signal 8. The priority control signal 8 is priority information 21, length of priority control processing data or priority control release signal. The information other than the header 302 contains the band signal 304 and the direction path signal 305 of the line.

Figure 24:
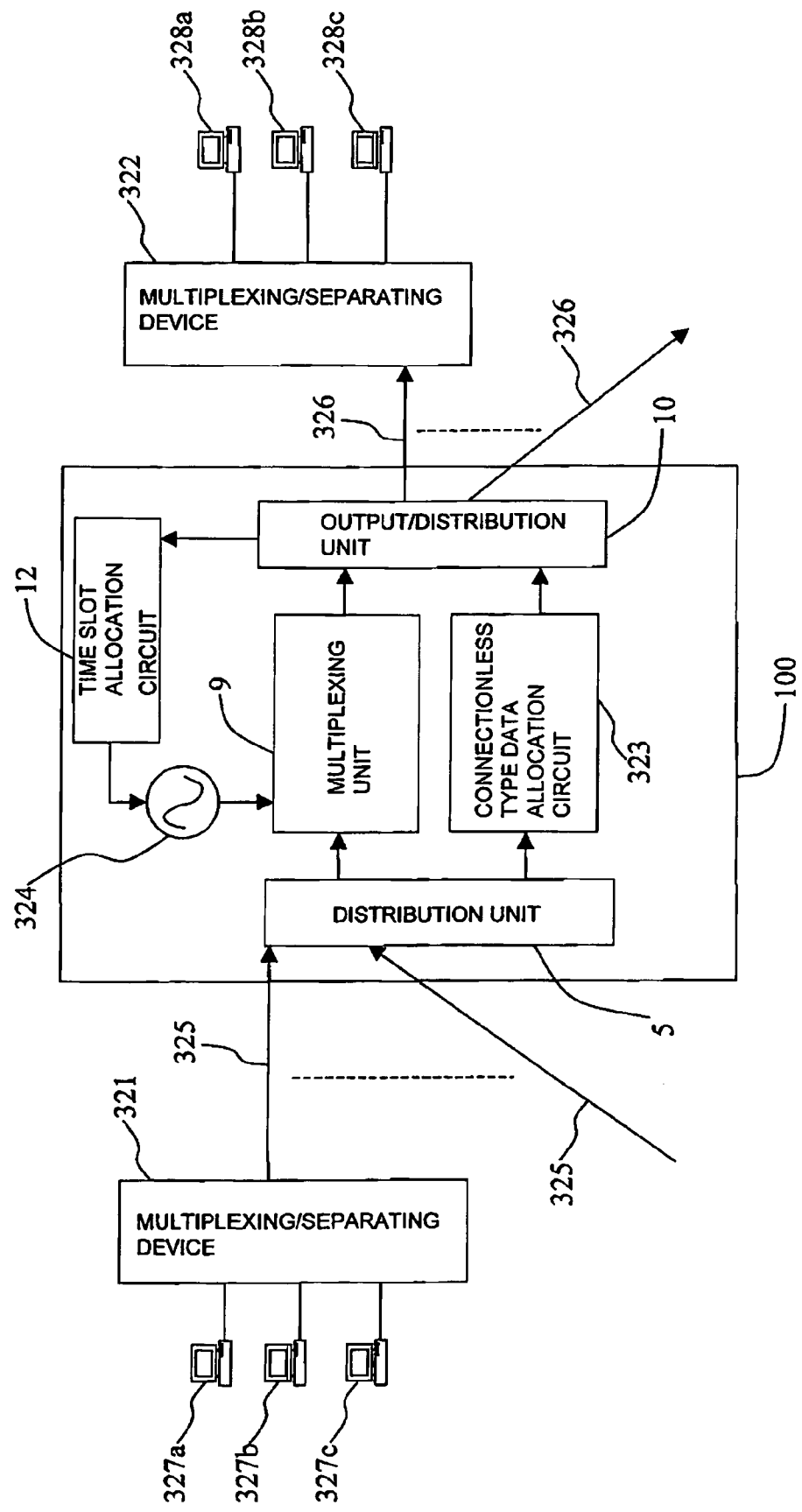
FIG. 24 is a view showing an example of distribution control of a distribution unit of the exchange node according to the first embodiment.
Figure 25:
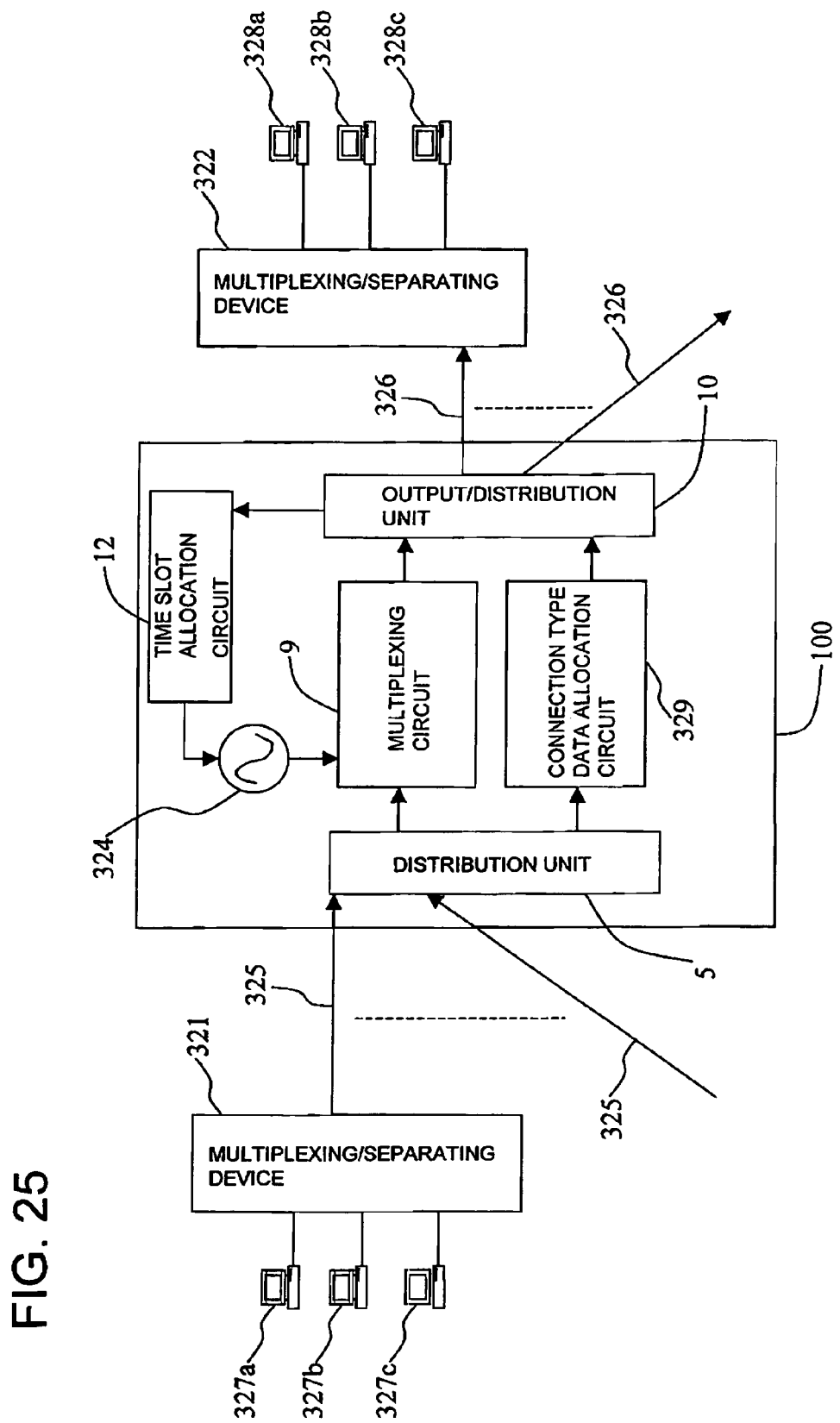
FIG. 25 is a view showing an example of distribution control of the distribution unit of the exchange node according to the first embodiment.

The distribution unit 5 shown in FIG. 1 is input with the input buffer data 3 from the input buffer unit 2, and the priority control signal 8 from the identification unit 7. If the priority control signal 8 is present, the input buffer data 3 is output as the priority control processing data 6. If the priority control signal 8 is not present, the non-priority control processing data (not shown) is output with the input buffer data 3 not to be priority-controlled. The distribution unit 5 distributes on whether or not the input buffer data is to be priority-controlled based on the presence of priority control identified in the identification unit 7, and thus the input buffer data 3 does not need to be buffered in the distribution unit 5. The distribution control by the distribution unit 5 may include distribution shown in FIGS. 24 and 25. FIG. 24 shows a case of performing distribution of distributing the data to be priority-controlled at the distribution unit 5 and processing by a connection type communication path, and distributing the data not to be priority-controlled at the distribution unit 5 and processing by connectionless type communication path. The configuration of the exchange node 100 in FIG. 24 is the same as the configuration shown in FIG. 1, but only the distribution unit 5, the multiplexing circuit 9, the output/distribution unit 10 and the time slot allocation circuit 12 are shown. FIG. 25 is a view showing a case of performing distribution of distributing the data to be priority-controlled at the distribution unit 5 and priority control processing the same, and distributing the data not to be priority-controlled by the distribution unit 5 and then processing by the conventional buffering priority control. The configuration of the exchange node 100 in FIG. 25 is the same as the configuration shown in FIG. 1, but only the distribution unit 5, the multiplexing circuit 9, the output/distribution unit 10 and the time slot allocation circuit 12 are shown. The multiplexing circuit shown in FIGS. 24 and 25 include synchronization clock 324 for replacing a time slot specifying signal to the time in the frame to write in the time slot in the frame of a specified time division multiplexing line. In FIG. 24, a connectionless type data allocation circuit 323 for performing the connectionless type communication control output from the distribution unit 5, and outputting to the output/distribution unit 10 is arranged. In FIG. 25, a non-priority control data allocation circuit 330 for performing communication control that carries out buffering of packets without priority control output from the distribution unit 5 is shown. In FIGS. 24 and 25, a transmission side terminal 327, a multiplexing/separating device 321 for multiplexing or separating the data from the transmission side terminal 327, a multiplexing line 325 for transmitting the multiplexed input data from the multiplexing/separating device 321 and inputting the input data to the exchange node 100, a multiplexing line 326 for transmitting the multiplexed data from the output/distribution unit 10, a multiplexing/separating device 322 for multiplexing or separating the multiplexed data transmitted from the multiplexing line 326, and a reception side terminal 328 for receiving the separated data of the multiplexing/separating device 322 are shown.

The time slot allocation circuit 12 shown in FIG. 1 is input with the time slot information 11 indicating that the time slot monitored in the output/distribution unit 10 is unused. The time slot allocation circuit 12, which has been input with the time slot information 11, specifies the time slot of write destination of the priority control processing data 6 from the unused time slots, and outputs a time slot specifying signal 13. The information of the unused time slot is obtained by the output/distribution unit 10 to appropriately obtain the information of the unused time slot.

Figure 3:
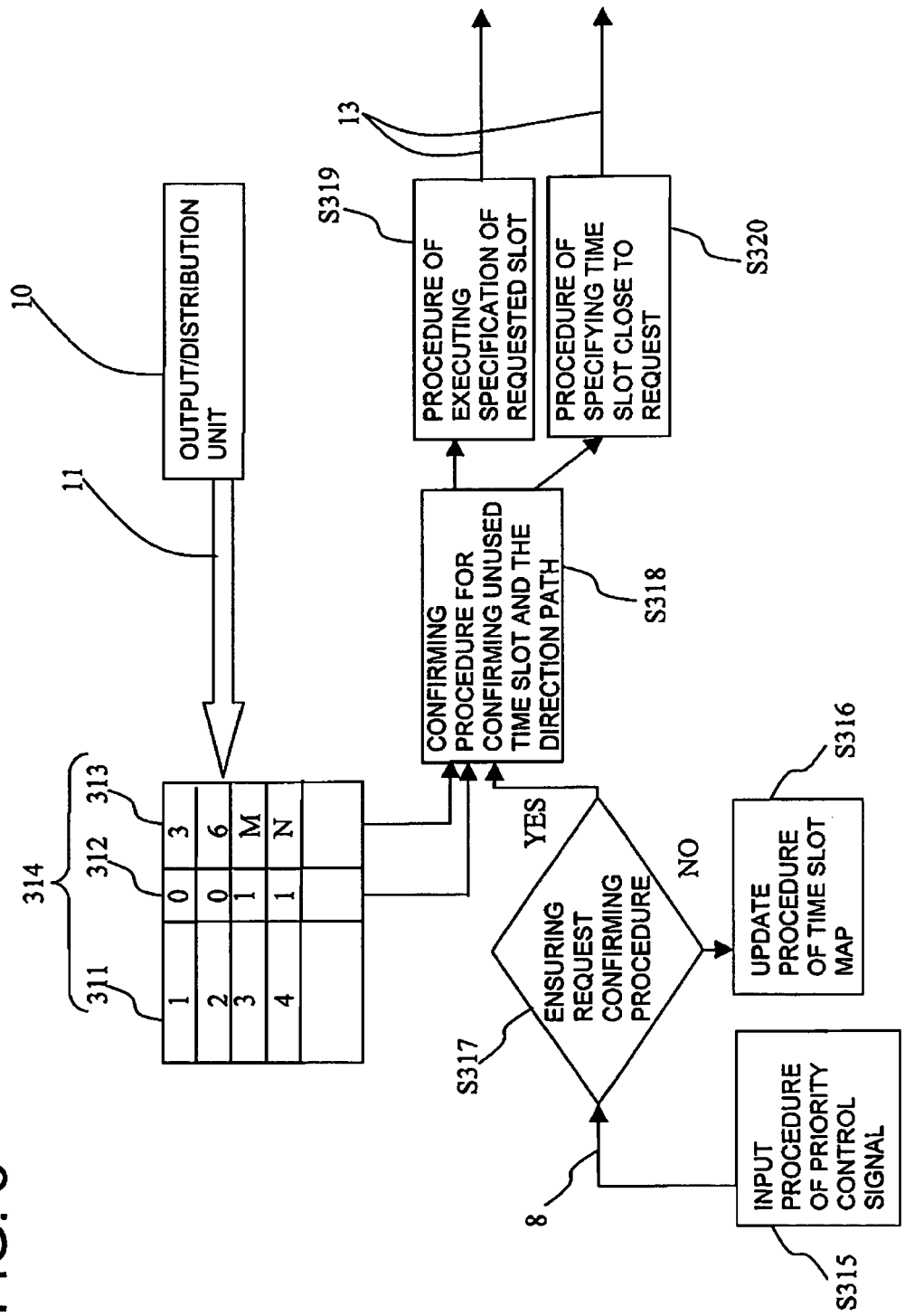
FIG. 3 is a view showing a flow of specifying a time slot.

The flow of specifying the time slot by the time slot allocation circuit 12 is shown in FIG. 3. In order for the time slot allocation circuit 12 to accurately specify the time slot, the time slot allocation circuit 12 preferably includes the time slot map shown in FIG. 3. The time slot map is updated by the time slot information 11 obtained by the output/distribution unit 10. The unused time slot is checked from the time slot map, the time slot is specified when the unused time slot is present, and the time slot specifying signal 13 is output. In this case, the specified time slot then becomes the used state, and the time slot map is updated. If the unused time slot that does not comply with the request is not present, for example, if the unused time slot corresponding to the direction path requested by the priority control signal 8 is not present, the time slot is specified if the unused time slot is present in the direction path that ensures the connection path with respect to the connection is present through the procedure of the call set up process between the relay nodes, and the time slot specifying signal 13 is output. In FIG. 3, 311 is the number of time slots, 312 is an empty/blocked display where 0 indicates empty and 1 indicates blocked, 313 is the direction path number and 314 is the time slot map. S315 is the input procedure of the priority control signal. The priority control signal 8 contains time slot ensuring request, time slot releasing request or target direction path number. S316 is the update procedure of the time slot map in time of release request. S317 is the ensuring request confirming procedure. S318 is the confirming procedure for confirming the unused time slot and the direction path. S319 is the procedure of executing the specification of the requested slot, updating the time slot map 314, and outputting the time slot specifying signal 13 when the unused number of time slots is present in the requested direction path. S320 is the procedure of specifying the time slot close to the request, updating the time slot map 314, and outputting the time slot specifying signal 13 when the unused number of time slots is not present in the requested direction path.

Figure 26:
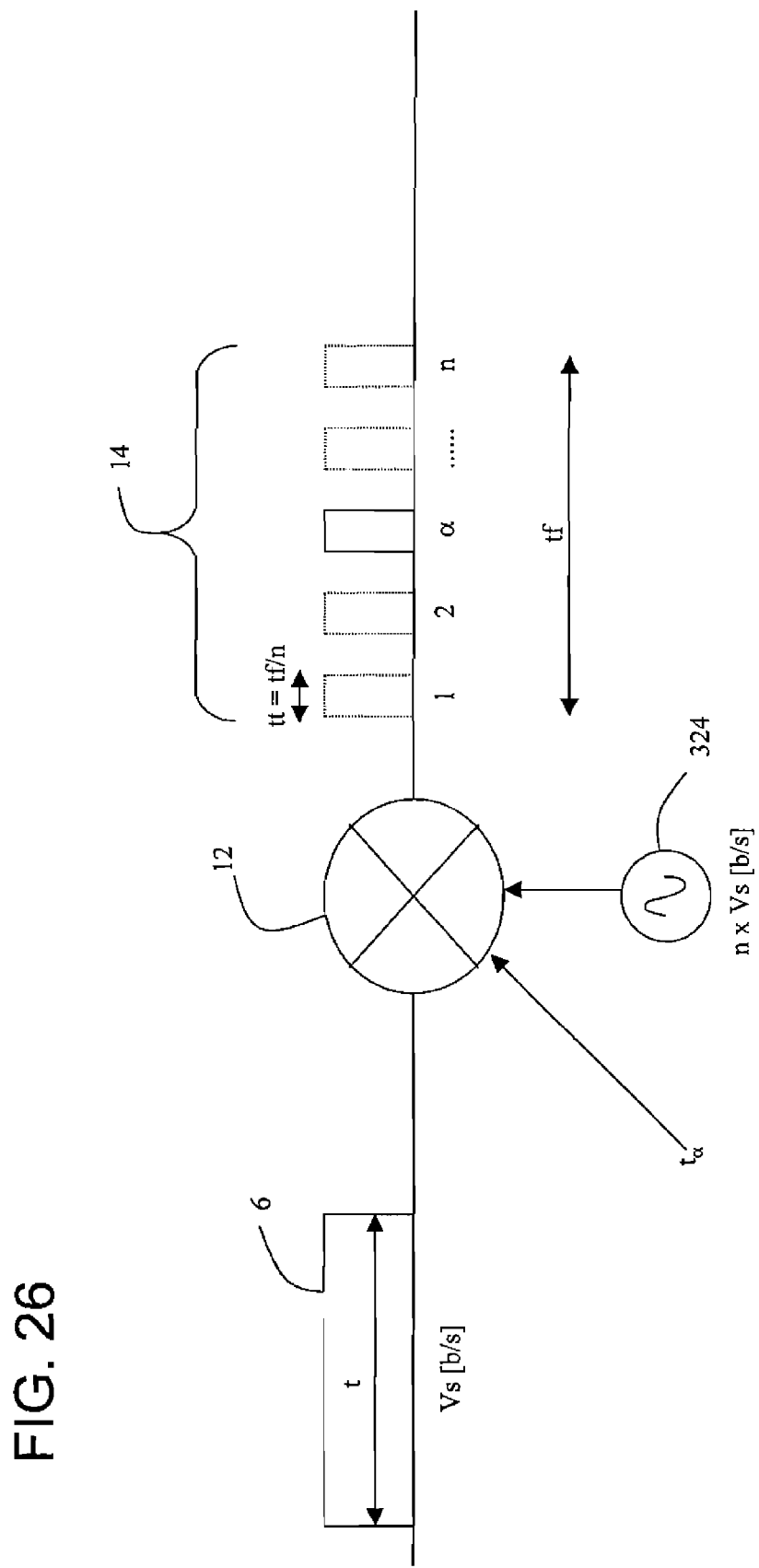
FIG. 26 is a conceptual view of a time division multiplexing of the exchange node according to the first embodiment.

FIG. 26 is a conceptual view in which the time slot allocation circuit 12 specifies the time slot and the multiplexing circuit 9 performs time division multiplexing. The time slot allocation circuit 12 divides the time tf of one frame of the time division multiplexing line by the necessary number of time slots n, and defines the time tt of one time slot. The amount of the priority control processing data 6 that can be written in one time slot is obtained from the speed Vs of the throughput of the exchange node 100. In the period corresponding to one time slot, the amount of data that can be written from the transmission line is tt×Vs. The time slot allocation circuit 12 in the exchange node obtains the unused time slot information corresponding to the output side direction path of the destination of the time division multiplexing line and recognizes the time α. The time is obtained by the time information from the synchronization clock. When the time reaches α, the multiplexing circuit 9 shown in FIG. 1 described above writes the priority control processing data 6 to the time slot specified by the time slot allocation circuit 12, and outputs the multiplexed data 14. If the length is N times the basic packet length, the N number of unused time slot information are obtained from the time slot group corresponding to the output side direction path of the destination, and recognizes α1 to αn corresponding to the relevant time. In FIG. 26, 324 is the synchronization clock.

Assume a case in which the packet data having a time width t on the line having the transmission speed of Vs (b/s) corresponds to the expected basic packet length in advance (specifically, minimum packet data length converted to one time slot on the common bus in the exchange node) in the exchanged node. In this case, the packet data having time width t on the line having the transmission speed of Vs (b/s) is read at high-speed using one time slot at time tt on the common bus. The data of basic packet length is expanded to bit parallel on the common bus having a parallel bus (bit) configuration at a bit width in basic packet length unit immediately after being stored in the input side line compliant buffer of the exchange node, and read at high-speed using one time slot of time (tt). Furthermore, the amount of the priority control processing data (packet data) 6 read at the time of one time slot is independently defined in arbitrary different exchange nodes in the network independent from the speed Vs of the throughput of the transmission line accommodated in the exchange node 100. However, regarding the accommodating line of different speeds in the same exchange node, the data amount to be allocated to one time slot on the common bus and to be the target of routing to the output side direction path are the same. If the required time on the transmission path of the packet data equivalent to the basic data length on the line having transmission speed of Vs (b/s) is t, the amount of data that can be read in one time slot in the exchange node becomes n×Vs×tt (=t×Vs=basic packet data length). If the packet data length on the line having transmission speed of Vs (b/s) is N times the basic packet length expected by the exchange node in advance, N time slots are used on the common bus and the data is expanded in parallel at high-speed on the common bus and then read, whereby the operation principle of the present invention can be easily applied to the packet data of variable length.

Furthermore, if the priority control processing data 6 continued over a period of time t is present on the transmission path having speed Vs (b/s) of the throughput of the exchange node 100, and all the priority control processing data 6 are multiplexed and converted to the multiplexed data 14 of one time slot on the common bus, the amount of packet data of the priority control processing data 6 per one line when n transmission paths of the same speed are accommodated becomes Vs×t=n×Vs×tt=n×Vs×(tf/n)=tf×Vs. That is, the relationship tf=t is met. Therefore, the time slot allocation circuit 12 preferably has the time tf of one frame of the multiplexed data 14 of the time division multiplexing line and the continuing time t of the priority control processing data 6 equal.

Moreover, if the priority control processing data 6 continued over a period of time t is present on the transmission path having speed Vs (b/s) of the throughput of the exchange node 100, and the priority control processing data 6 are multiplexed and converted to the multiplexed data 14 of m number of time slots on the common bus, the amount of packet data of the priority control processing data 6 per one line when n transmission paths of the same speed are accommodated becomes Vs×t=n×Vs×tt×m=n×Vs×(tf/n)×m=tf×Vs×m. That is, the relationship tf=t/m is met. Therefore, the time slot allocation circuit 12 preferably has the time tf of one frame of the multiplexed data 14 of the time division multiplexing line and the continuing time t of the packet data divided by m number of time slots of the multiplexed data 14 converted from the priority control processing data such that the time tf and the continuing time t are preferably equal to each other.

The time slot allocation circuit 12 preferably obtains the priority information 21 from the priority determination circuit 20 as shown in FIG. 1, specifies the time slot according to the priority of the priority information 21 and outputs the time slot specifying signal 13. More preferably, the time slot allocation circuit 12 varies the number of time slots according to the priority of the priority information 21. Still more preferably, the time slot allocation circuit 12 specifies the time slot according to the priority with respect to the priority control processing data containing the priority information 21 of two or more stages. The priority determination circuit 20 detects the priority contained in the priority control processing data 6, and outputs the priority information 21 to the time slot allocation circuit 12. The priority information 21 is contained in the header of the priority control processing data 6, as shown in FIG. 2. The priority of the priority information 21 may be divided to without priority in which the priority is not particularly indicated and with priority, or may have the priority indicated in a plurality of stages. The time slot allocation circuit 12 specifies the time slot according to the priority information 21 to process the priority control processing data 6 to be priority-controlled without delay. Furthermore, the unused time slot can be efficiently used and the delay time in communication can be reduced since the time slot allocation circuit 12 varies the number of time slots according to the presence of priority or the stages of the priority of the priority information 21.

The time slot allocation circuit 12 shown in FIG. 1 preferably specifies the number of time slots according to the length of the priority control processing data 6. The time slot allocation circuit 12 is input with the priority control processing data 6 from the distribution unit 5 to obtain the information on the length of the priority control processing data 6 contained in the header of the priority control processing data 6. The information on the length of the priority control processing data 6 may be contained in the input data 1 from the beginning. When the input data 1 is written in the shift register in the input buffer unit 2, a counter is arranged in the input buffer unit so that the information on the length of the data can be detected, the information on the length of the data is input to the distribution unit 5, and the information on the length of the data may be written in the header of the priority control processing data 6 to be output from the distribution unit 5. If the priority control processing data exceeds the amount of data that can be written in one time slot, an appropriate number of time slots is specified with respect to the length of the priority control processing data to use one frame of the time division multiplexing line without waste. The delay time in communication is thereby reduced.

The time slot allocation circuit 12 further preferably specifies the time slot for every connection and outputs the time slot specifying signal. The connection is recognized when the exchange node sets up a call. The time slot allocation circuit 12 specifies the time slot according to the condition of every connection such as the communication speed of the transmission path of the input data 1. One frame of the time division multiplexing line is thereby used without waste.

The time slot allocation circuit 12 preferably specifies the time slot regardless of the communication speed of the transmission path transmitting the input data 1 to the input buffer unit 2. For example, if the communication speed of the transmission path of the input data 1 is Va, the time slot in the time division multiplexing line frame having a communication speed Vb faster than Va is specified. In the communication between the relay nodes, the data communication may be performed with the communication speed changed, where if the transmission path of a certain communication speed has traffic congestion, such traffic path is avoided thereby reducing the delay time of the entire communication network.

The time slot allocation circuit 12 outputs a "time-series order" of each time slot as a "time-series order" of time slot signal 22 when specifying a plurality of time slots for the priority control processing data 6. If the priority control processing data 6 exceeds the amount of data that can be written in one time slot and a plurality of time slots are to be specified, the time slot time-series signal 22 indicating which number in the "time-series order" each time slot to be specified corresponds to is output to the multiplexing circuit. The time slot allocation circuit 12, which is input with the priority control processing data 6 from the distribution unit 5, obtains the information on the length of the priority control processing data 6 at the header of the priority control processing data 6.

The information on the length of the priority control processing data 6 and the amount of data that can be written per one time slot are compared, and a plurality of time slots are specified if the data mount of the priority control processing data 6 is larger. The "time-series order" of time slot signal 22 is defined for each of the plurality of time slots, and output to the multiplexing circuit 9. Reordering is thereby facilitated when an external exchange node or terminal receives the output of the exchange node of the present invention.

The time slot allocation circuit 12 preferably resets the specification of the time slot after a predetermined time has elapsed from the specification of the time slot. After the time slot is specified, the specification of the time slot may be reset by the priority control release signal contained in the priority control signal 8. Moreover, after specifying the time slot, the specification of the time slot may be reset by writing another packet data to the input buffer unit 2. A state in which the time slot cannot be specified although it is in the unused state is avoided by resetting the information of the time slot specified by the time slot allocation circuit 12. Resetting of the information of the time slot is performed by having the usage information of the time slot of the above described time slot map unused.

The multiplexing circuit 9 is input with the priority control processing data 6 from the distribution unit 5. The time slot specifying signal 13 and the "time-series order" of time slot signal 22 are also input from the time slot allocation circuit 12. The priority control processing data 6 is written in the shift register equivalent to the time slot specified by the input time slot specifying signal 13. After the writing of the priority control processing data 6 is completed, the multiplexed data 14 is output. Since the priority control processing data 6 is written in the specified time slot, as necessary, the buffer of the priority control processing data 6 is not necessary, and waiting time until multiplexing process is also not necessary. Therefore, the delay time in communication can be reduced. The multiplexing circuit 9 preferably includes a plurality of shift registers which can perform parallel processing. If the data amount of the priority control processing data 6 is large and is to be written in a plurality of time slots, the priority control processing data 6 is divided and respectively written in different shift registers simultaneously, whereby the delay time in communication is reduced.

The output/distribution unit 10 transmits the multiplexed data 14 from the multiplexing circuit 9 to the external 15 line. If the external 15 line is in plurals, the multiplexed data is transmitted towards each direction path. The output/distribution unit 10, which is input with the multiplexed data 14 from the multiplexing circuit 9, monitors the usage state of the multiplexed data 14 and outputs the unused time slot information 11 to the time slot allocation circuit 12. In monitoring the usage state of the multiplexed data 14, the usage rate may be estimated by searching for the history of the write state of the shift register to which the multiplexed data 14 is written, or in performing multiplexing in the multiplexing circuit 9, the usage rate for each shift register used for the header of the multiplexed data 14 may be extracted in advance or the history of the unused shift register number or the like may be stored, and such information may be extracted in monitoring.

Second Embodiment

Figure 4:
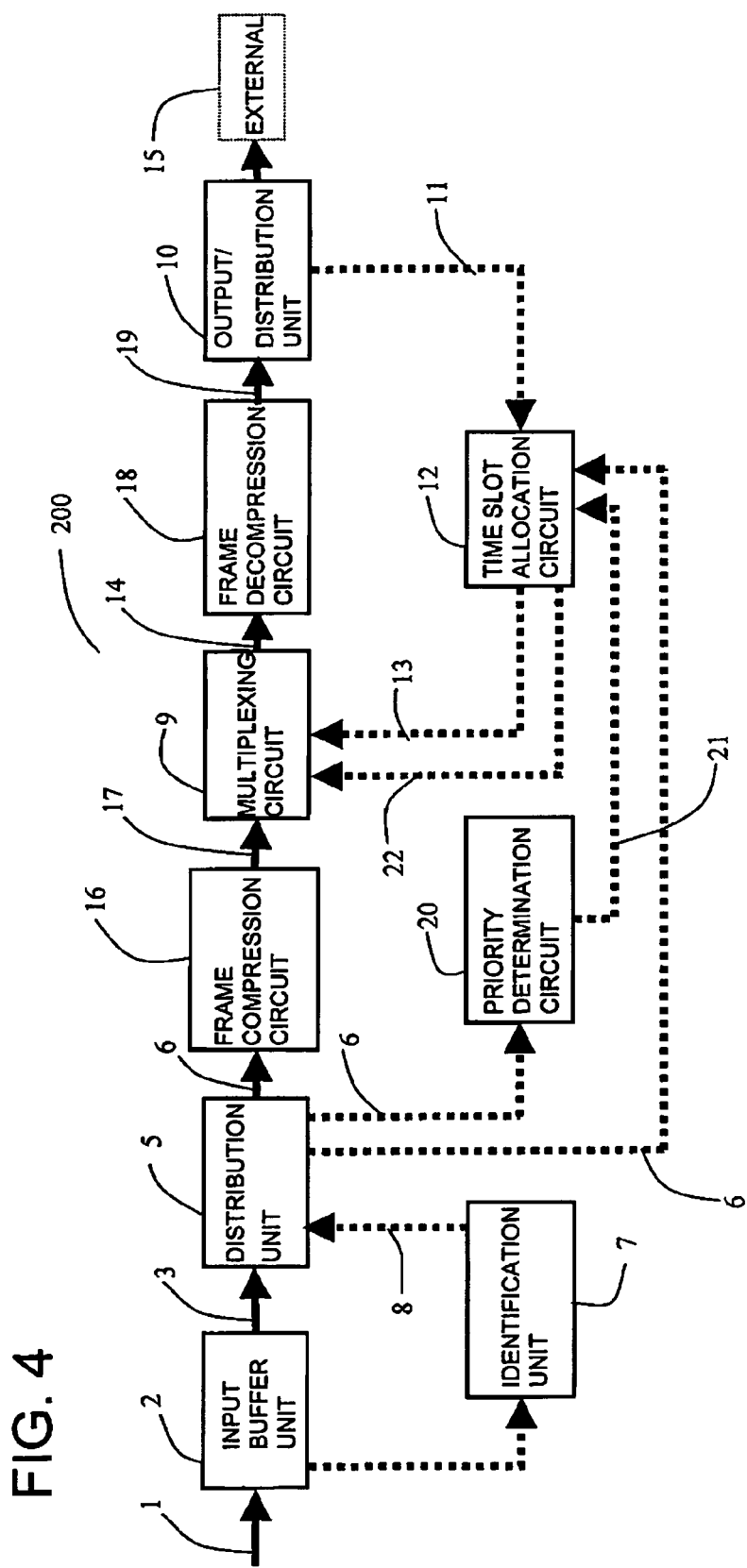
FIG. 4 is a schematic view of an exchange node 200 according to a second embodiment.

FIG. 4 is a schematic view showing one form of an exchange node 200 according to the present embodiment. The difference in configuration from the exchange node 100 according to the first embodiment is that a frame compression circuit 16 and a frame decompression circuit 18 are further arranged. The frame compression circuit 16, which is input with the priority control processing data 6 from the distribution unit 5, compresses the time width of the priority control processing data 6 and outputs compressed data 17. The multiplexing circuit 9, which is input with the compressed data 17 as opposed to the priority control processing data 6 of the exchange node 100 according to the first embodiment, outputs the multiplexed data 14 by the time slot specifying signal 13 and the "time-series order" of time slot signal 22 from the time slot allocation circuit 12. The frame decompression circuit 18, which is input with the multiplexed data 14 from the multiplexing circuit 9, decompresses the time width of the multiplexed data 14 and outputs decompressed data 19. The output/distribution unit 10, which is input with the decompressed data 19 as opposed to the multiplexed data 14 of the exchange node 100 according to the first embodiment, outputs to the external 15 transmission path. A great number of time slots are formed in one frame of the time division multiplexing line by compressing the time width of the priority control processing data 6 by the frame compression circuit 16, whereby a great amount of data can be multiplexed in a short time and the delay time in communication is reduced. The number of connections of the input side transmission path can be increased since the time slot in one frame can be increased. The delay time in communication is thereby reduced. The frame compression circuit 16 also performs the operation of the multiplexing circuit 9 of multiplexing the compressed data 17 in the exchange node 200 according to the present embodiment of FIG. 4, but the frame compression circuit 16 and the multiplexing circuit 9 may be separated. The operations and effects of the exchange node 200 according to the present embodiment are the same as those of the exchange node 100 according to the first embodiment other than those of the frame compression circuit 16 and the frame decompression circuit 18. Therefore, frame compression circuit 16 and the frame decompression circuit 18 will be specifically described below.

Figure 5:
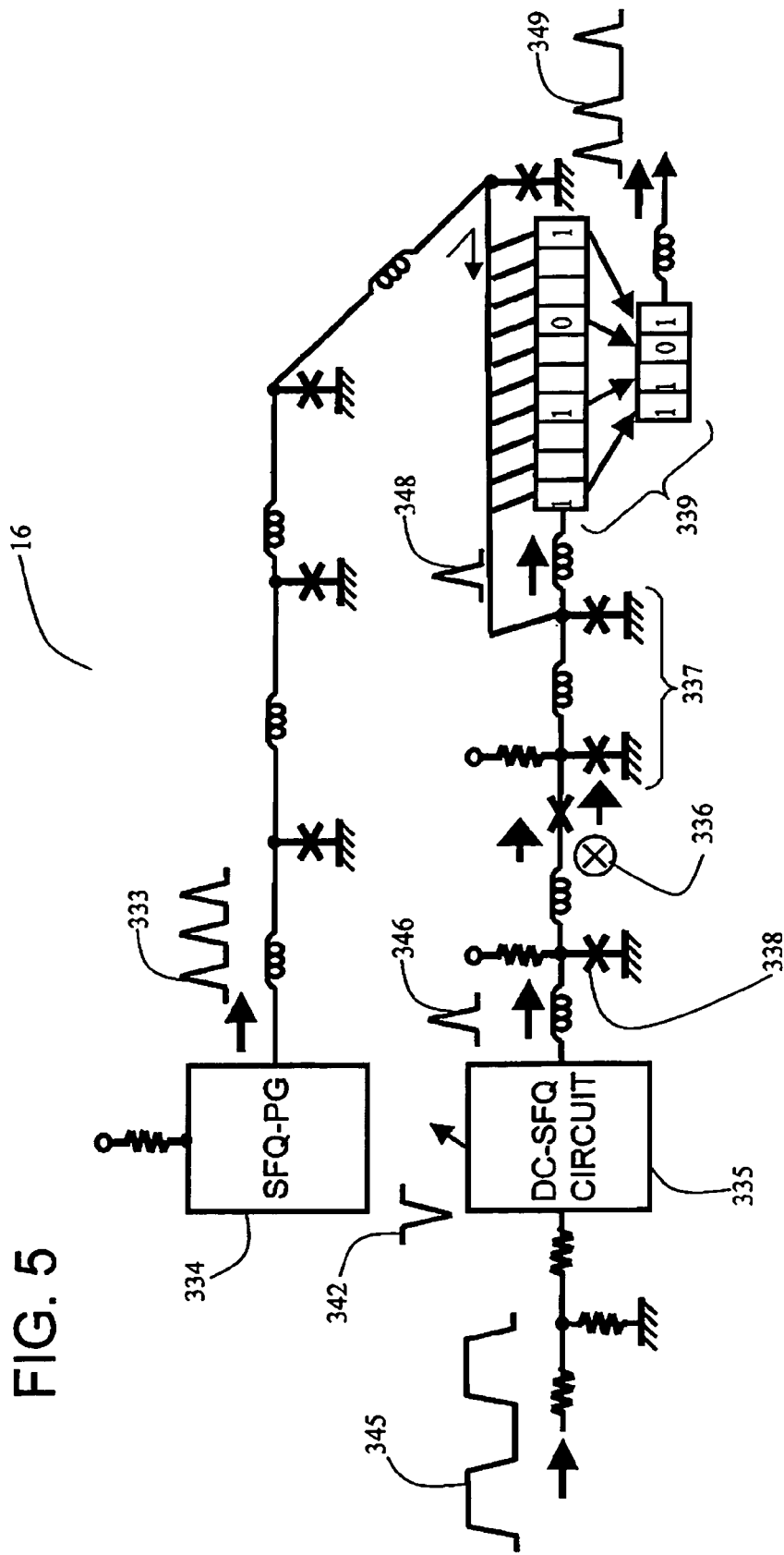
FIG. 5 is a schematic view showing a configuration of a frame compression circuit.

One example of the frame compression circuit 16 is shown in FIG. 5. The frame compression circuit 16 of FIG. 5 is configured by a superconductive SFQ circuit. The frame compression circuit 16 is configured by the superconductive SFQ circuit in FIG. 5, but may be configured by a semiconductor circuit. The degree of compression can be enhanced and a great number of time slots can be formed in one frame of the time division multiplexing line by configuring the frame compression circuit 16 with the superconductive SFQ circuit as opposed to being configured with the semiconductor circuit. SFQ is an abbreviation for Single Flux Quantum, which means a single magnetic flux quantum. The magnetic flux is quantized in terms of quantum mechanic in a space surrounded by superconductors, and acts as particles that can be counted as one, two etc. This is the magnetic flux quantum. The logic circuit having the magnetic flux quantum as information carrier is the SFQ logic circuit. In the majority of the semiconductor logic circuits, the high and low of the output voltage level corresponds to "1" and "0" of logic, whereas in the SFQ logic circuit, the presence of SFQ corresponds to "1" and "0" of logic. The SFQ circuit is configured by a superconductive circuit including a Josephson junction, and operates at a high-speed clock of a few 100 GHz. The SFQ circuit has a superior feature in that the power consumption at a certain point in time is lower by about three digits compared to the semiconductor circuit. The logic operation is performed at a very sharp pulse of pulse width of about one picosecond generated with SFQ in the SFQ circuit. The X mark in FIG. 5 is the Josephson junction element, which is an active device equivalent to the transistor of the semiconductor circuit. DC/SFQ (Direct Current/Single Flux Quantum) circuit of FIG. 5 is a pulse width conversion circuit that converts the pulse train from the semiconductor circuit having a pulse width of a few 100 ps to a pulse train having a narrow pulse width of about 1 ps. SFQ-PG (Single Flux Quantum-Pulse Generator) of FIG. 5 is an SFQ pulse generator that generates a high-speed clock pulse train for synchronously operating the circuit. The D-F/F (Delay Flip-Flop) circuit is a delay flip-flop. The frame compression unit temporally compresses the packet which is a pulse train of narrow width, and outputs the pulse of short time length. In FIG. 5, 345 is the input pulse, 342 is the reset pulse, 333 is the clock pulse, 334 is the SFQ-PG, 335 is the DC/SFQ circuit, 336 is the SFQ circuit, 337 is the D-F/F circuit, 338 is the Josephson junction element, 339 is the frame compression unit, 346 is the DC-SFQ output, 348 is the D-F/F circuit output and 349 is the output of the frame compression circuit.

Figure 6:
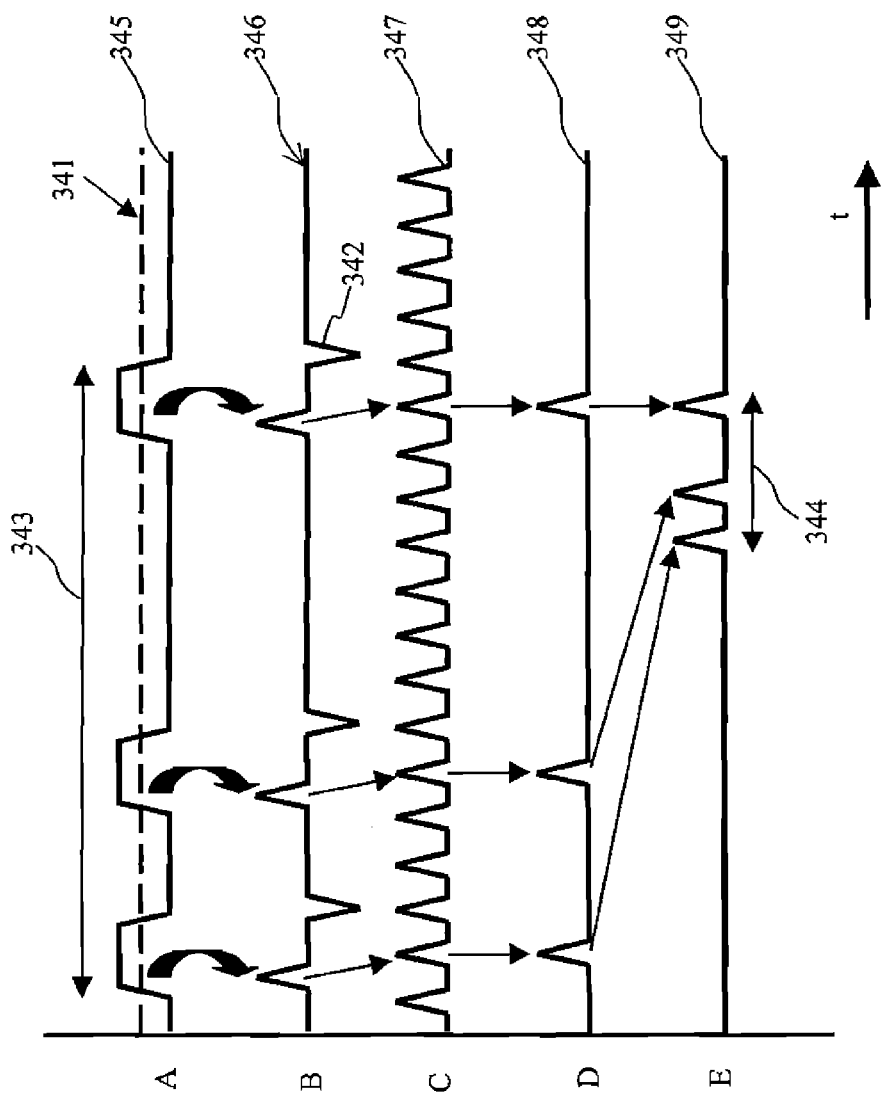
FIG. 6 is a view showing a timing chart of the frame compression circuit.

FIG. 6 shows one example of a timing chart of the frame compression circuit 16. The horizontal axis is the time axis. A is the pulse train of the priority control processing data 6. B is the output from the DC/SFQ circuit. A sharp SFQ pulse corresponding to the data of A is output from the DC/SFQ. C is the output of the SFQ-PG circuit. This is the high-speed repetitive pulse train that becomes the synchronous signal of the entire circuit. D is the output of the D-F/F circuit which is the delay flip-flop. The train of SFQ pulse of B is output in synchronization with the clock pulse of C. E is the output of the frame compression unit. The temporally sparse pulse train output from the D-F/F circuit is compressed on the time axis by the frame compression unit, and output as dense pulse train in the short frame length. In FIG. 6, 341 is the threshold value of DC/SFQ, 342 is the reset pulse, 343 is the frame length (before compression), 344 is the frame length (after compression), 345 is the input pulse train, 346 is the DC/SFQ output, 347 is the clock pulse train, 348 is the output of the D-F/F circuit, 349 is the output of the frame compression circuit, and t is time.

Figure 7:
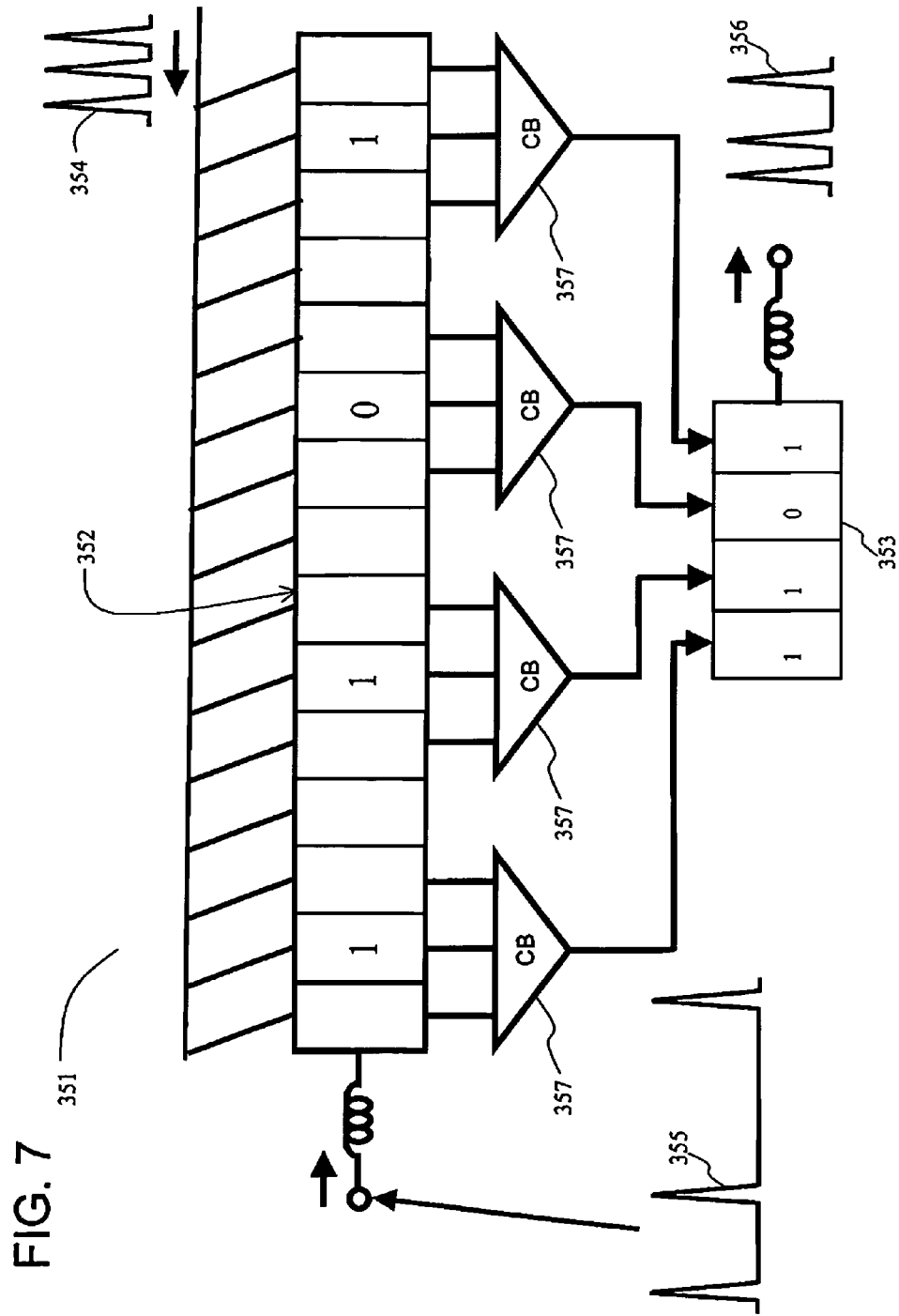
FIG. 7 is a schematic view showing a configuration of a frame compression unit of the frame compression circuit.

FIG. 7 shows one example of the configuration of the frame compression unit. The frame compression unit is configured by two tapped SFQ shift registers. The shift registers are the shift register of serial input parallel output on the input side and the shift register of parallel input serial output on the output side. The input side shift register is a register of long bit length (time length) of before the compression and the output side shift register is a register of short bit length (time length) of after the compression. The parallel tap of the two registers are connected by way of a merging circuit of the SFQ at the multiplexing unit referred to as confluence buffer (CB) for every few bits. The D-F/F circuit output or the pulse train before compression is input, and the frame compression unit output which is the pulse train after compression is output. Merging is carried out at every few bits to absorb the jitter in the clock pulse of the SFQ pulse generated in the DC/SFQ. In FIG. 7, 351 is the frame compression unit, 352 is the serial input/parallel output register, 353 is the parallel input serial output register, 354 is the clock pulse, 355 is the D-F/F circuit output (before compression), 356 is the frame compression unit output (after compression), and 357 is the CB.

Figure 8:
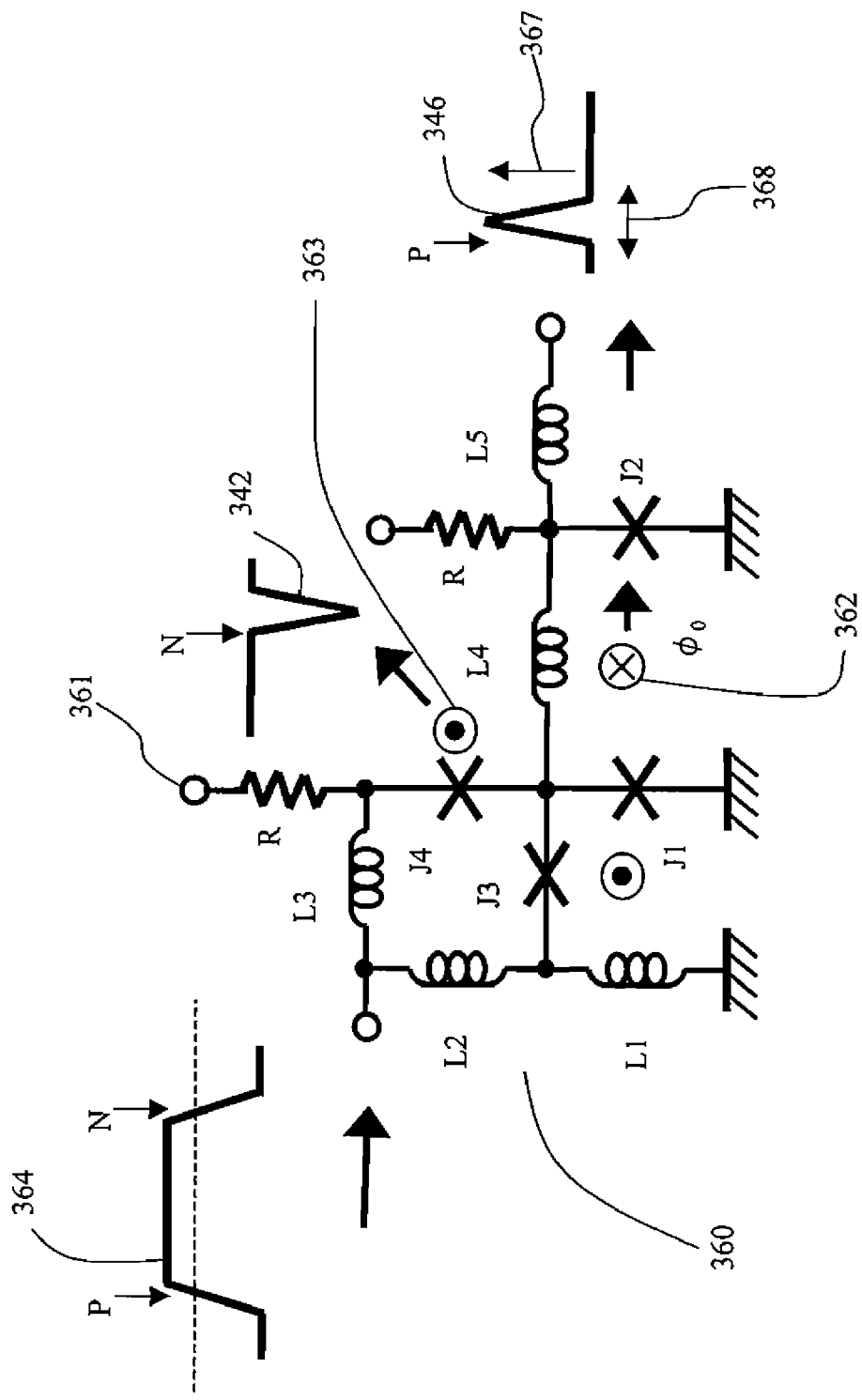
FIG. 8 is a schematic view showing a configuration of a DC/SFQ circuit of the frame compression circuit.

FIG. 8 shows one example of the configuration of the DC/SFQ circuit. In FIG. 8, R is the resistor, L1 to L5 are inductance of superconductors, Φ0 is the magnetic flux quantum, J1 to J4 are Josephson junction elements, P is the leading edge of the input pulse and N is the trailing edge of the input pulse. The priority control processing data in which the width to be input is wide and leading edge/trailing edge gradually changes is input, and then differentiated to be converted to the pulse of sharp and narrow width, the leading edge P of the pulse is output as the DC/SFQ data output, and the trailing edge N of the pulse is output as the DC/SFQ reset output. The SFQ pulse is output from the Josephson junction J2 in response to the DC/SFQ data output, and the SFQ pulse of reverse polarity is discharged from the Josephson junction J4 in response to the DC/SFQ reset output. In FIG. 8, 360 is the DC/SFQ circuit, 361 is the bias current, 362 is the SFQ circuit, 363 is the SFQ circuit of reverse polarity, 364 is the priority control processing data, 342 is the reset pulse of the DC/SFQ, 346 is the DC/SFQ output, 367 is the signal amplitude of the output pulse, and 368 is the output pulse width. The DC/SFQ data output 346 has a signal amplitude 367 of the output pulse of about 1mV, and the output pulse width 368 of about 2 psec.

Figure 9:
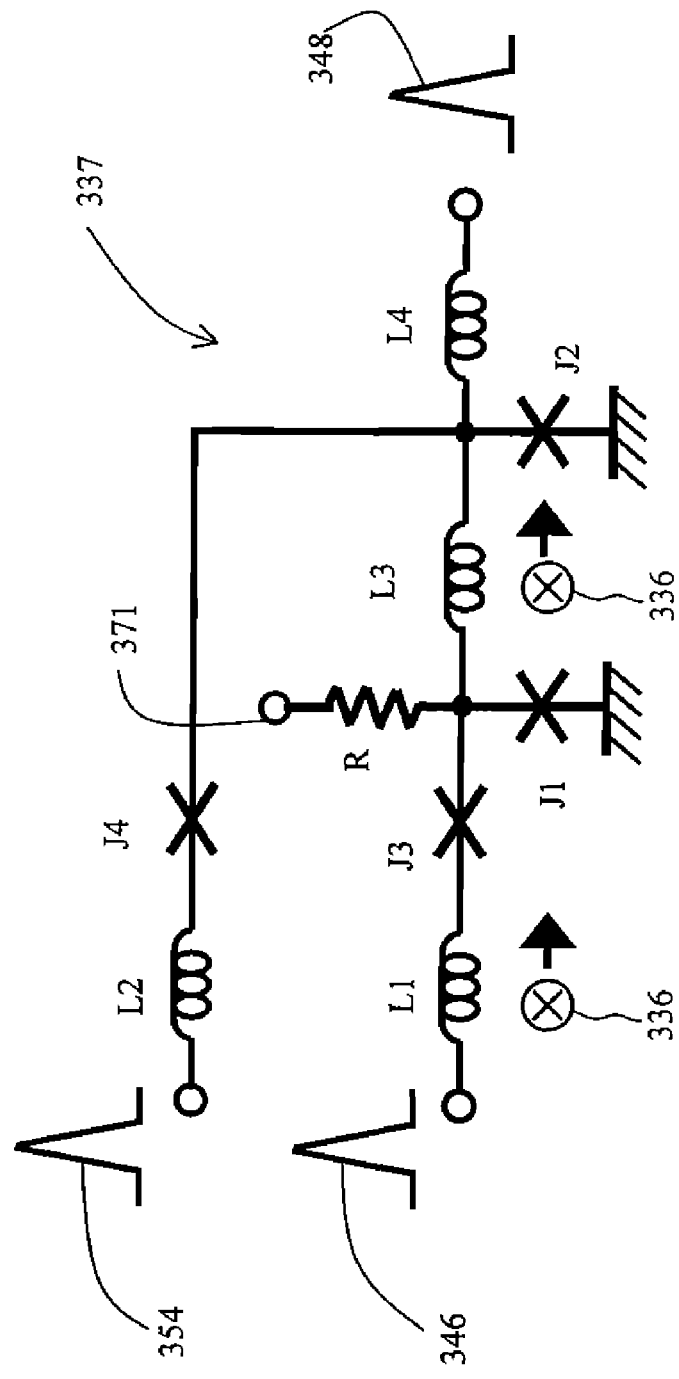
FIG. 9 is a schematic view showing a configuration of a D-F/F circuit of the frame compression circuit.

FIG. 9 shows one example of the configuration of the D-F/F circuit. In FIG. 9, R is the resistor, L1 to L4 are inductance of superconductors, and J1 to J4 are Josephson junction elements. The DC/SFQ data output is input as the set input, and the clock pulse is input as the reset input, whereby the D-F/F circuit outputs an output synchronized with the clock pulse. Synchronization by the clock pulse is performed for multiplexing. In FIG. 9, 337 is the D-F/F circuit, 371 is the bias current, 336 is the SFQ circuit, 354 is the clock pulse, 346 is the DC/SFQ data output, and 348 is the D-F/F output.

Figure 10:
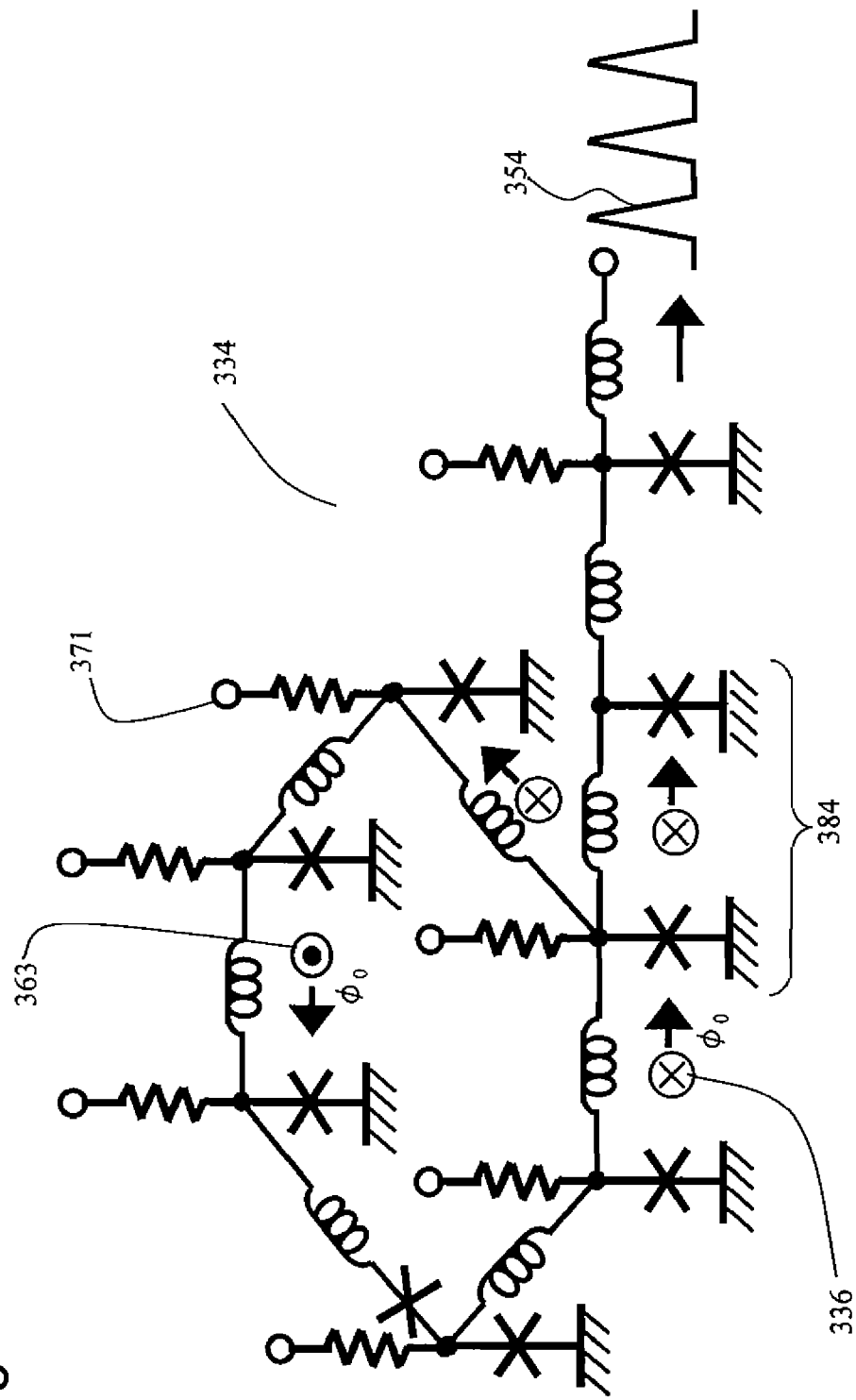
FIG. 10 is a schematic view showing a configuration of a SFQ-PG circuit of the frame compression circuit.

FIG. 10 shows one example of the configuration of the SFQ-PG circuit. The SFQ-PG circuit generates a sharp clock pulse of a pulse width of about one picosecond at high-speed. The SFQ-PG circuit is a circuit form referred to as a ring oscillator that generates a clock pulse of a continuous equidistance pulse train from a splitter when the SFQ cyclic-moves in the ring shaped circuit. The frame compression circuit 16 operates in synchronization with the high-speed timing pulse train generated by the SFQ-PG circuit. In FIG. 10, 334 is the SFQ-PG circuit, 363 is the SFQ circuit of reverse polarity, 336 is the SFQ circuit, 371 is the bias current, 384 is the splitter and 354 is the clock pulse.

Figure 11:
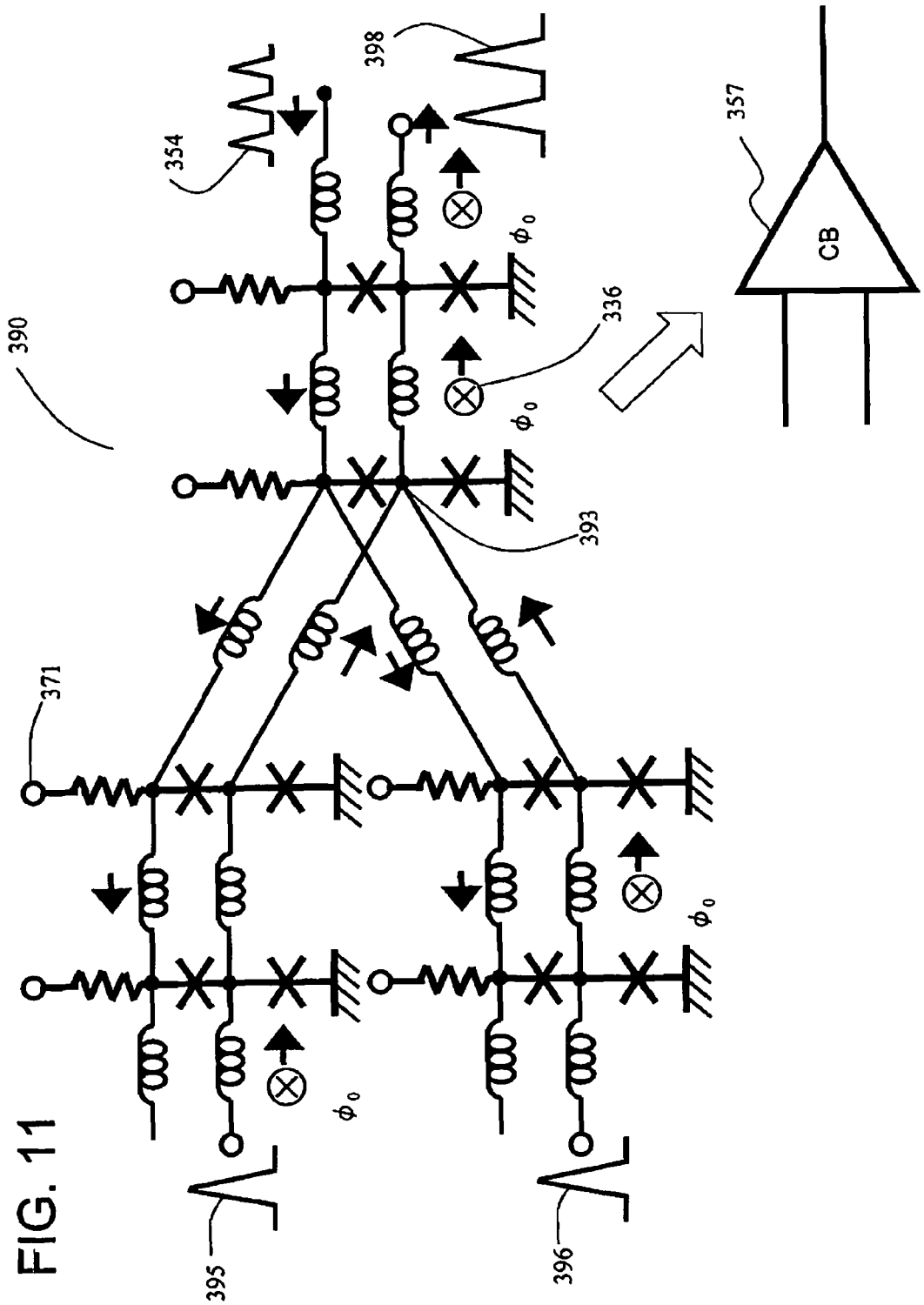
FIG. 11 is a schematic view showing a configuration of a CB circuit of the frame compression circuit.

FIG. 11 shows one example of the configuration of the CB circuit functioning as the multiplexing unit. The SFQ circuit is configured by a circuit that outputs the CB output for merging the shift register outputs incoming from a plurality of input lines to one line. The input side shift register and the output side shift register are synchronous type in FIG. 11 and thus the CB circuit used in connecting the shift registers is also a synchronous type, but may be an asynchronous type. The operating condition of the synchronous type CB circuit is that a plurality of input data does not overlap. In FIG. 11, 390 is the CB circuit, 371 is the bias current, 336 is the SFQ circuit, 393 is the merge, 357 is the CB, 395 and 396 are shift register outputs, 354 is the clock pulse, and 398 is the CB output. The CB 357 performs symbolization.

Figure 12:
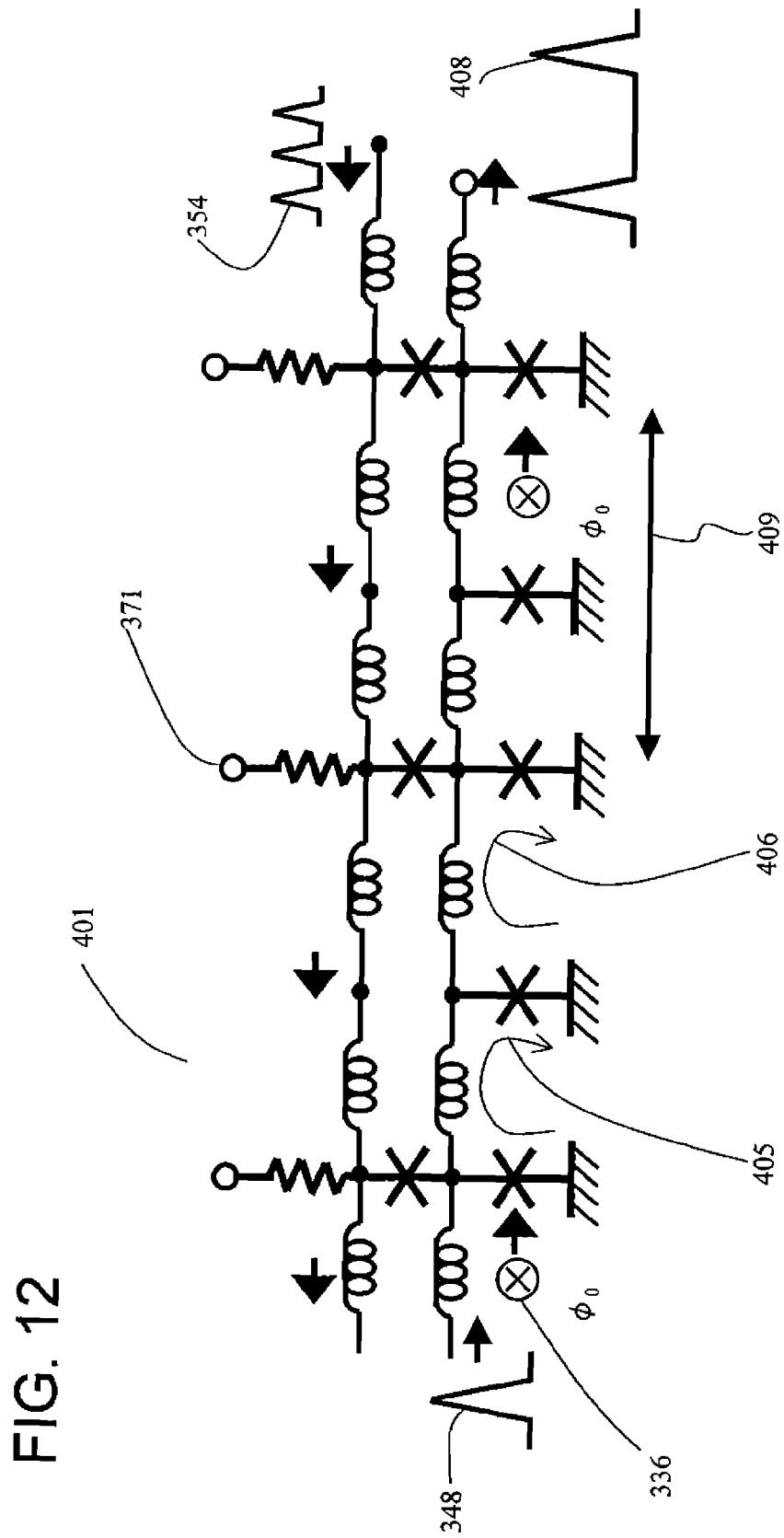
FIG. 12 is a schematic view showing a configuration of a shift register circuit of the frame compression circuit.

FIG. 12 shows one example of a configuration of the shift register circuit using the SFQ circuit. The shift register circuit is a circuit for the input side shift register that is input with the D-F/F output and the clock pulse output, and that outputs the shift register output. In FIG. 12, two bits worth of shift register are extracted. One bit of the shift register is configured by a storage loop for holding the data and a buffer loop at the pre-stage thereof. Two or more buffer loops may be used for one bit of the shift register. The shift register circuit of FIG. 12 transfers data in synchronization with the clock pulse train provided from the post-stage side of the register to the loop on the upper side of each bit. The data shifts from left to right in the register. Parallel output tap can be provided by arranging two output lines in the storage loop of the shift register. In FIG. 12, 401 is the shift register circuit, 336 is the SFQ circuit, 371 is the bias current, 348 is the D-F/F output, 405 is the buffer loop, 406 is the storage loop, 354 is the clock pulse, 408 is the shift register output, and 409 is one bit worth of the shift register.

Figure 13:
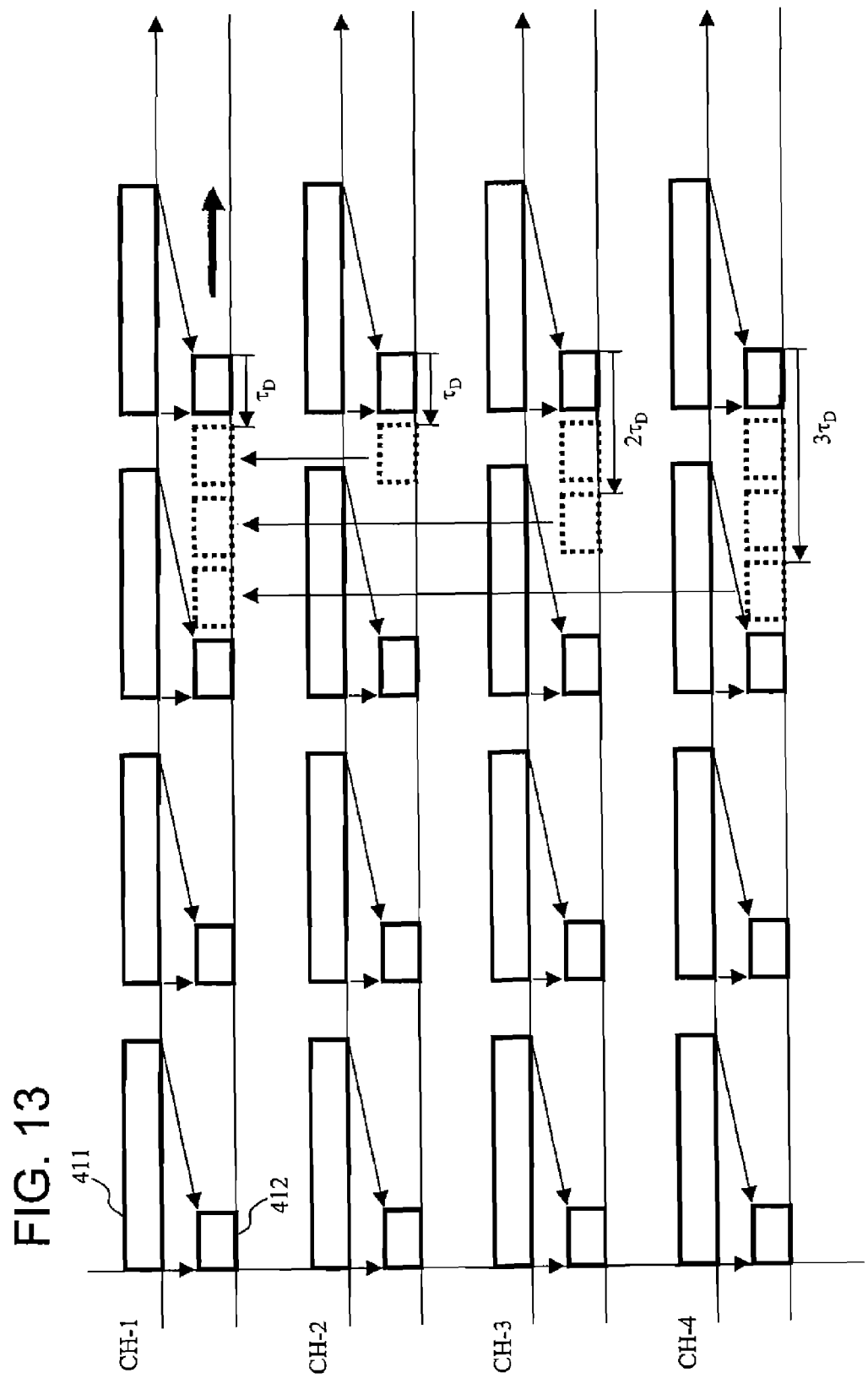
FIG. 13 is a view showing the operation of a multiplexing unit of the frame compression circuit.

FIG. 13 shows one example of the operation of the multiplexing unit. FIG. 13 describes a case when the degree of compression of frame is n=4. The input priority control processing data 6 is assumed to be synchronized among channels of CH-1 to CH-4 in the D-F/F circuit. In the multiplexing unit, the data after compression of CH-2 to CH-4 is delayed by one data length+α in order and multiplexed on CH-1. α is the data interval after multiplexing. Smooth multiplexing can be realized since data does not overlap with each other. In FIG. 13, 411 is the packet (before compression), and 412 is the packet (after compression). The packets from CH-1 to CH-4 are all multiplexed on CH-1. The delay $\tau_D$ is expressed as $\tau_D$=packet length (after compression)+α.

Figure 14:
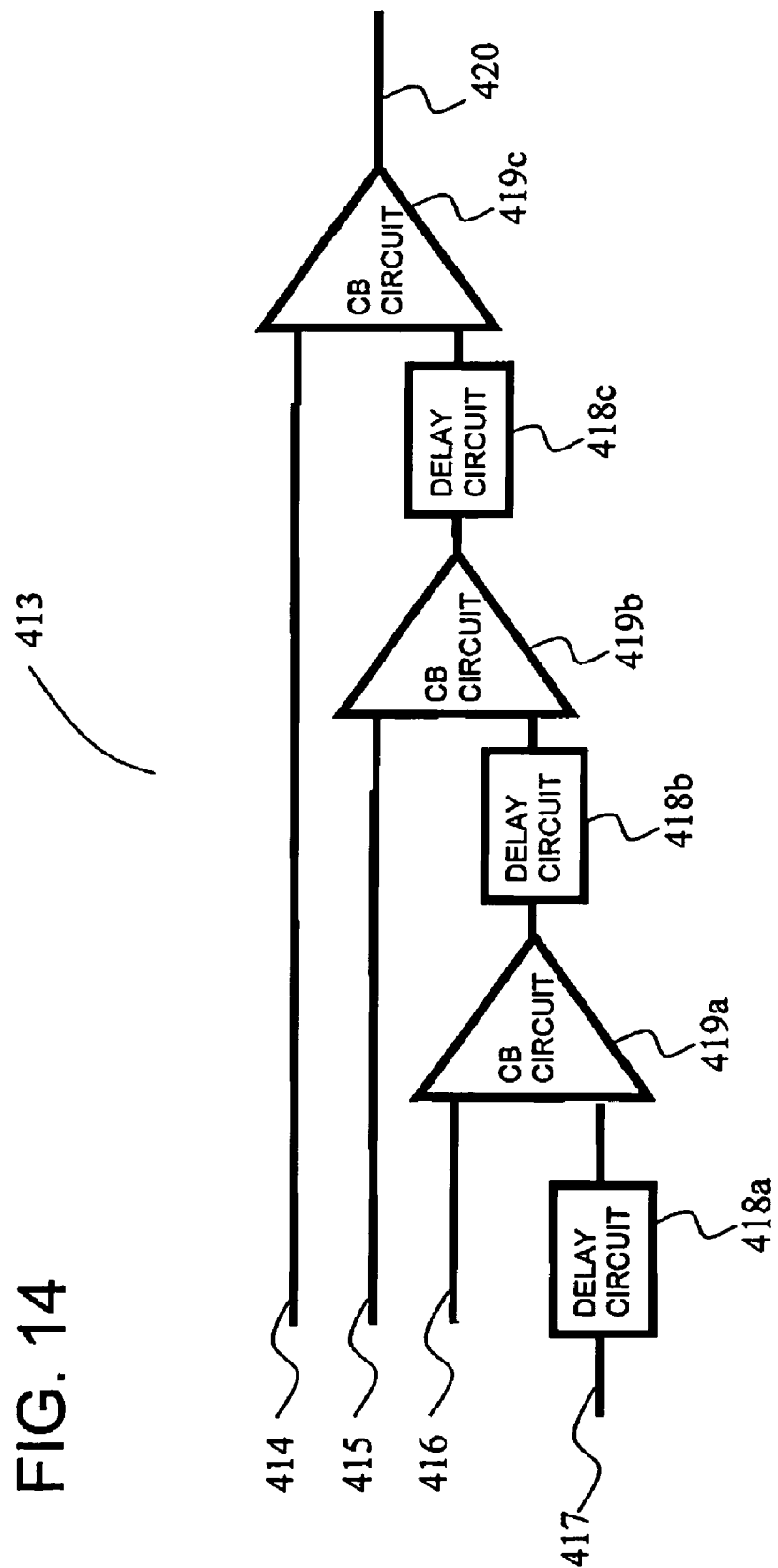
FIG. 14 is a schematic view showing a circuit configuration of the multiplexing unit of the frame compression circuit.

FIG. 14 shows one example of a circuit configuration of the multiplexing unit. The multiplexing unit is input with the shift register output from the shift register circuit configuring one part of the frame compression unit to each channel, and outputs the CB output. The data worth of one channel and the data worth of another channel are merged in the CB circuit by way of delay circuits 418a, 418b, 418c. The delay circuits are cascade-connected to merge in order, so that all the packets are multiplexed on CH-1 without overlapping. The delay circuits 418a, 418b, 418c of delay time $\tau_D$ can be realized by inserting a superconductive Josephson transmission line of an appropriate length. In FIG. 14, 413 is the multiplexing unit, 414 is the input CH-1 (after compression), 415 is the input CH-2 (after compression), 416 is the input CH-3 (after compression), 417 is the input CH-4 (after compression), 418 is the delay circuit, 419 is the CB circuit, and 420 is the CB output. The delay $\tau_D$ of the delay circuit 418 is expressed as $\tau_D$=packet length (after compression)+α.

Figure 15:
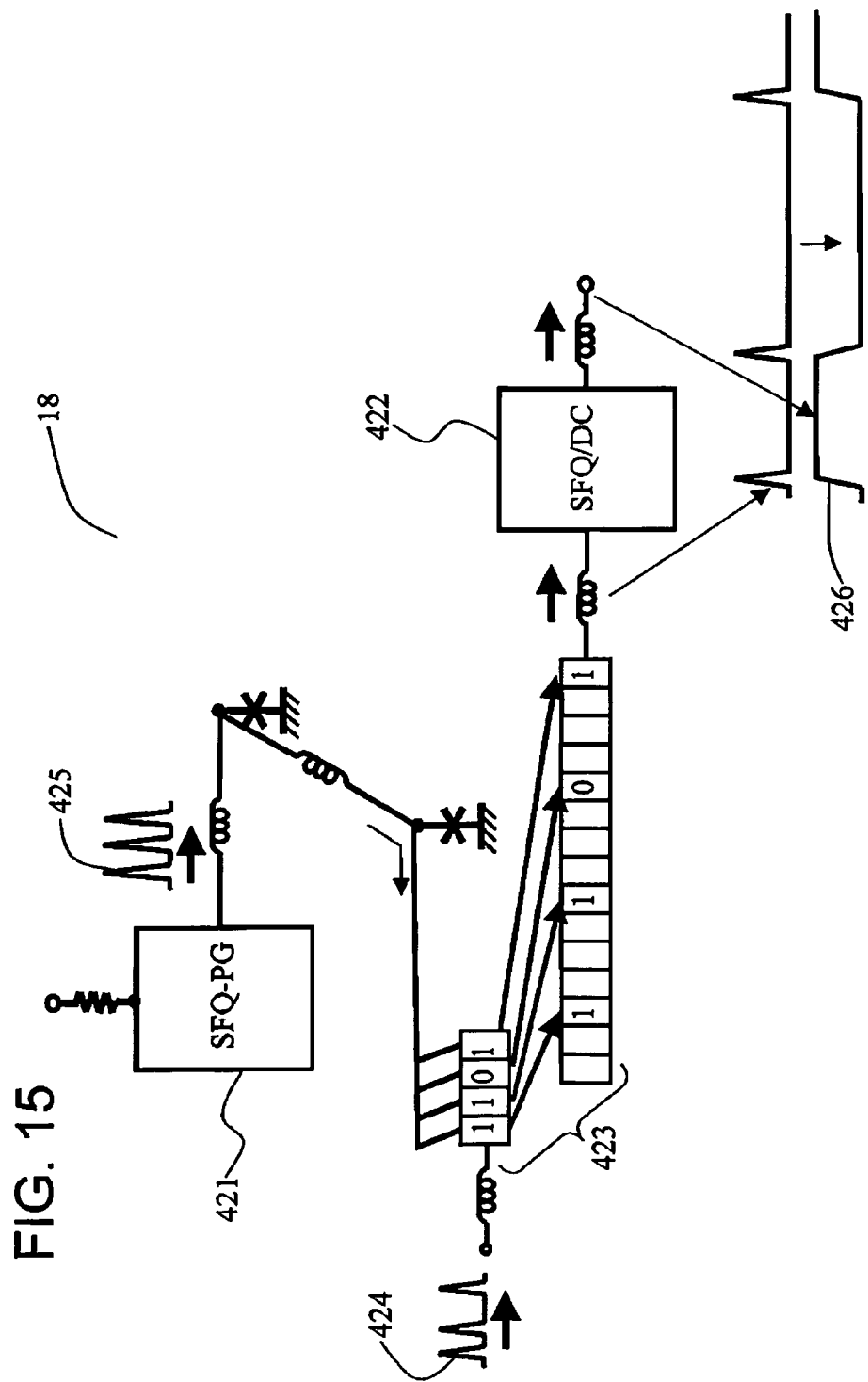
FIG. 15 is a schematic view showing a configuration of a frame decompression circuit.

One example of the configuration of the frame decompression circuit 18 is shown in FIG. 15. The frame decompression circuit 18 of FIG. 15 is configured by the superconductive SFQ circuit. The frame decompression circuit is configured by the superconductive SFQ circuit in FIG. 15, but may be configured by the semiconductor circuit. The decompressed data obtained by decompressing the frame length of the compressed data compressed and output from the frame compression circuit 16 is output, so that the pulse width is widened and the external terminal or other nodes of the exchange node 200 according to the present embodiment can detect the data. SFQ/DC (Single Flux Quantum/Direct Current) circuit is the pulse width conversion circuit. In FIG. 15, 421 is the SFQ-PG, 422 is the SFQ/DC, 423 is the frame decompression unit, 424 is the compressed data, 425 is the clock pulse, and 426 is the decompressed data.

Figure 16:
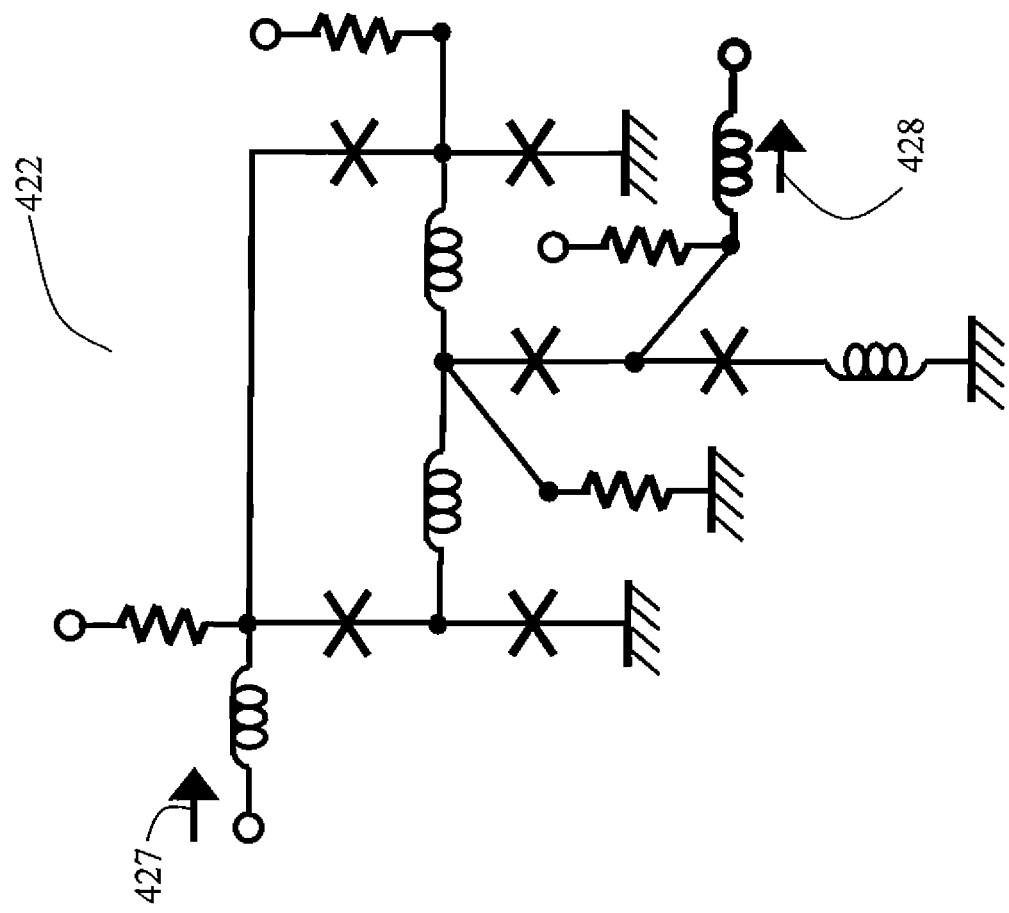
FIG. 16 is a schematic view showing a configuration of a SFQ/DC circuit of the frame decompression circuit.

FIG. 16 shows one example of the configuration of the SFQ/DC circuit. It is a circuit in which the "0" and "1" of the output are inverted when the frame decompression unit output is input. The SFQ/DC output, or the output of the relevant circuit, is not a pulse but a level signal having amplitude. The level output in which "0" and "1" inverts in response to the sharp leading and trailing pulse as in the SFQ pulse is obtained. The output is detected in the semiconductor circuit. In FIG. 16, 427 is the frame decompression unit output, 428 is the SFQ/DC output, and 422 is the SFQ/DC circuit.

Figure 27:
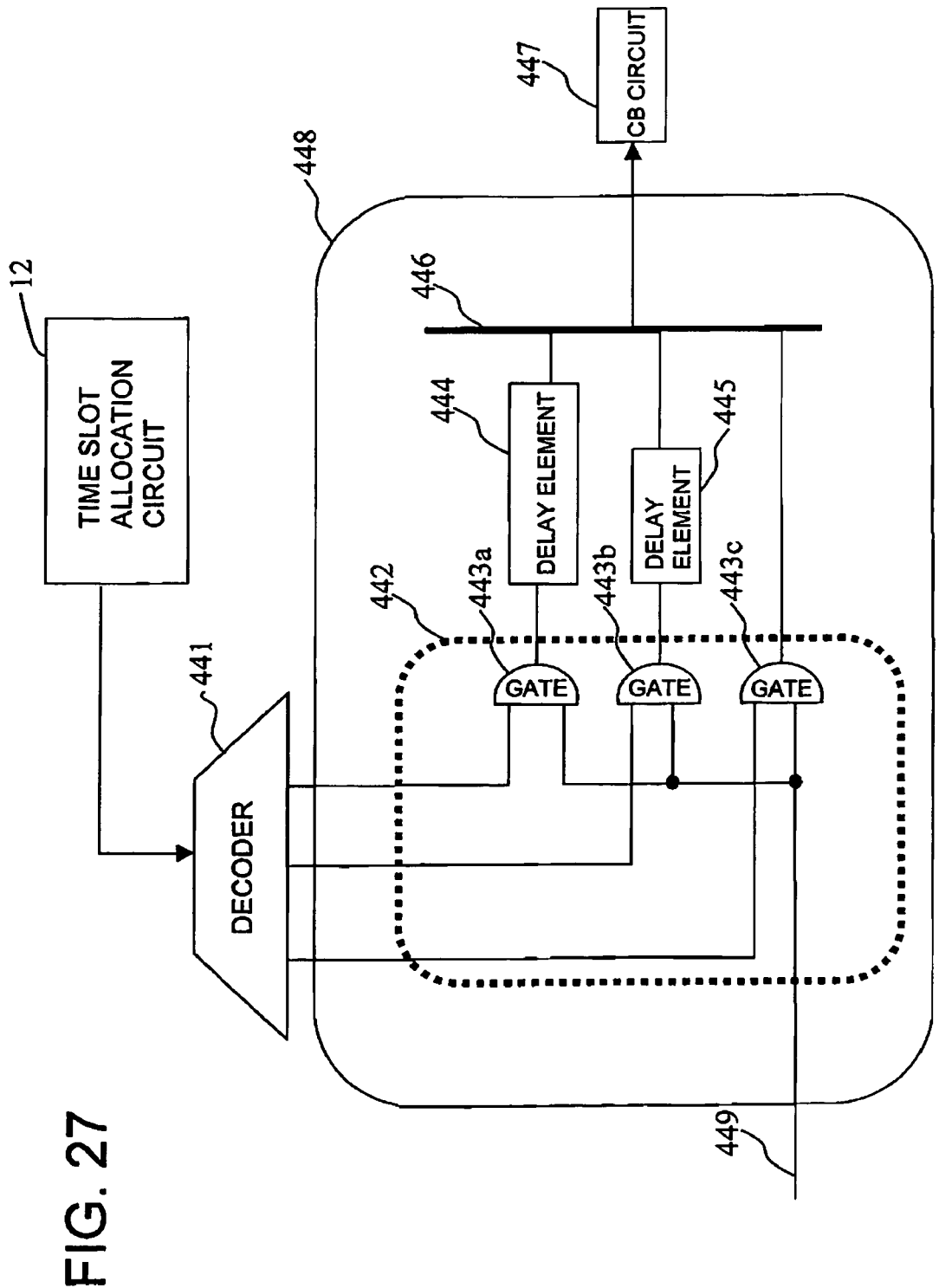
FIG. 27 is a schematic view of a variable delay circuit of the multiplexing circuit.

FIG. 27 shows one example of a variable delay circuit that enables multiplexing in the multiplexing circuit. The variable delay circuit VD (Variable Delay element) of FIG. 27 is configured by a selector including an AND gate, a delay element (delay D, delay 2D), and an OR gate. The selector outputs the input data of an arbitrary channel n(CHn) on the transmission path on the input side delayed by the required time when connection is established. The delay time can be selected among when the delay element is not present, when the delay time is delayed by the delay D, when the delay time is delayed by the delay 2D and the like. In FIG. 27, an example of setting of the delay in three stages has been described but is not limited thereto. The delayed input data is output to the CB circuit via the OR gate. The delay request to the selector may be inputting the time slot specifying signal specified by the time slot allocation circuit 12 to a decoder and selecting the delay time by a signal from the decoder. The delay time setting varies for every connection, but once the connection is established, the relevant state is maintained until the command to release the connection is made. In FIG. 27, 441 is the decoder, 442 is the selector, 443 is the AND gate, 444 is the delay element of delay 2D, 445 is the delay element of delay D, 446 is the OR gate, 447 is the CB circuit, 448 is the VD, and 449 is the CHn.

Figure 28:
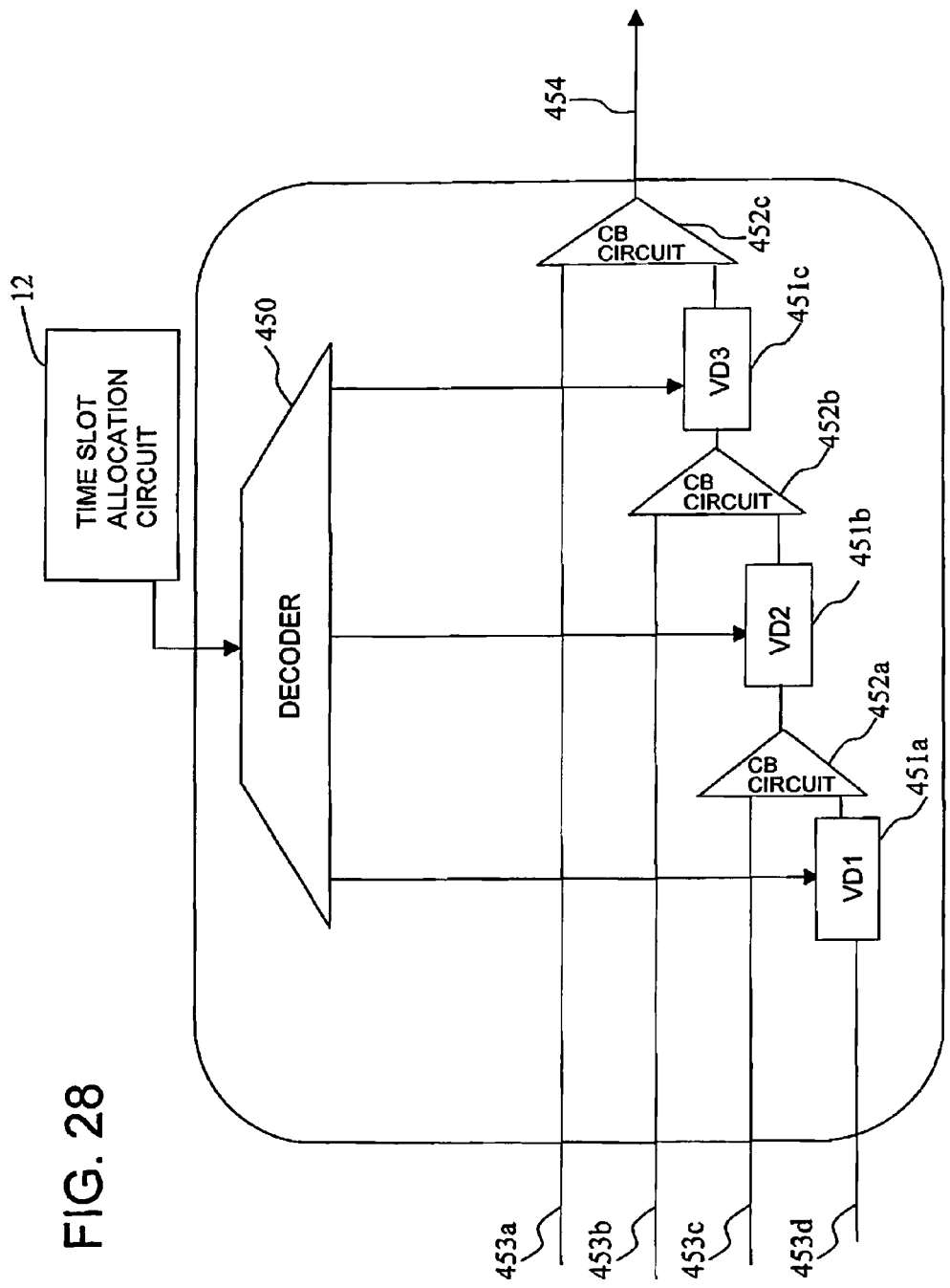
FIG. 28 is a configuration example in which the variable delay circuit and the multiplexing circuit are combined.

FIG. 28 is a configuration example in which the variable delay circuit VD is combined with the CB circuit and the decoder to variably set the multiplexing position of the time slot. In the example of FIG. 28, the phase of the compressed multiplexed data (channel 1 (CH1) to channel 4 (CH4)) is converted to the desired time slot position corresponding to the target direction path using three types of variable delay circuit VD (VD1, VD2, VD3). In FIG. 28, 12 is the time slot allocation circuit, 450 is the decoder, 451 is the VD, 452 is the CB, 453a is CH1 after compression, 453b is CH2 after compression, 453c is CH3 after compression, 453d is CH4 after compression, and 454 is the multiplexed data.

Third Embodiment

Figure 29:
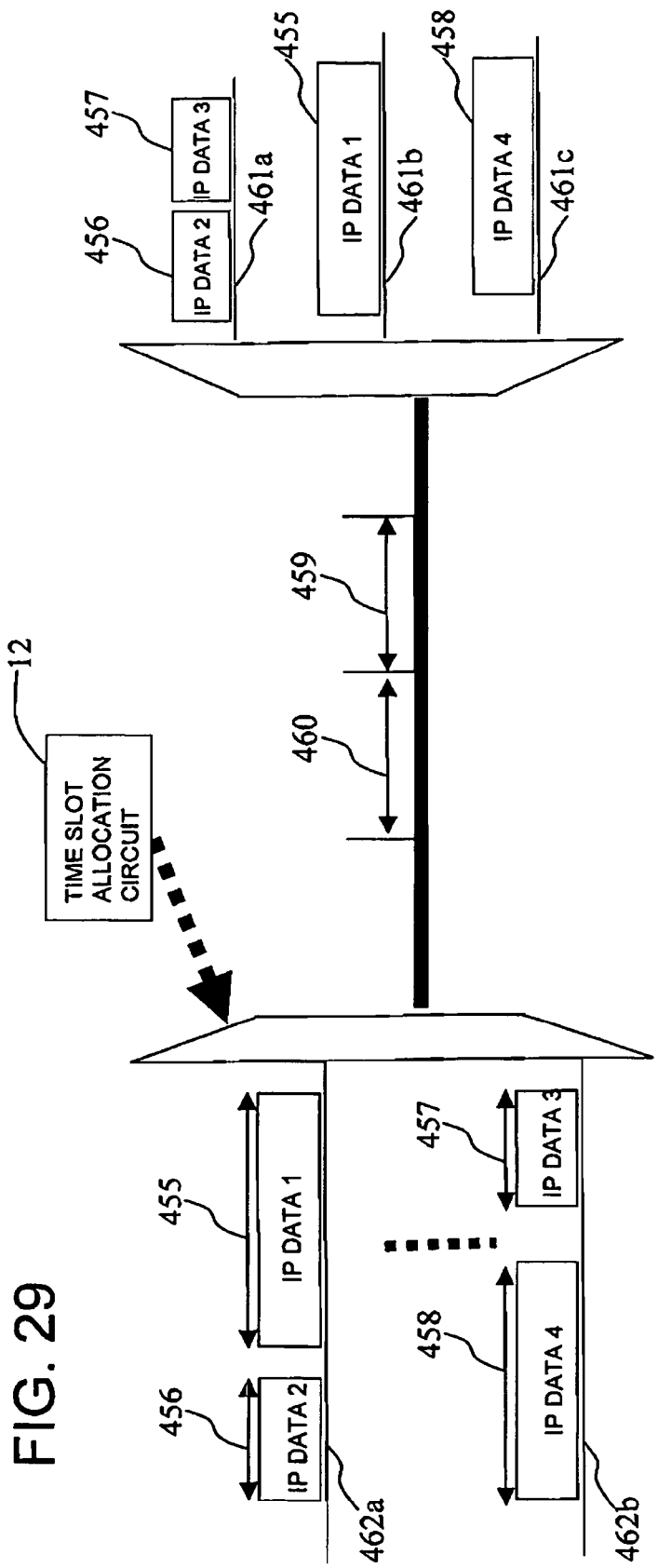
FIG. 29 is a specific example of a time slot specification corresponding to the input data (if transmission path speed is the same) of the third embodiment.

FIG. 29 shows an example of a correspondence relationship of a time slot in one frame of the time division multiplexing line and the direction path on the output side using the exchange node 100 according to the first embodiment or the exchange node 200 according to the second embodiment. In FIG. 29, one example on how each input data (IP data) of different data length transferred with an IP address is specified with the time slot number when a plurality of connections having the same speed for the input side transmission path is established is shown. One frame of the time division multiplexing line in the exchange node is assumed as 125 μsec in FIG. 29. The IP data 1 of 128 bytes and the IP data 2 of 64 bytes are input from the transmission path 1 of 100 Mb/s. The IP data 3 of 64 bytes and the IP data 4 of 128 bytes are input from the transmission path 2 of 100 Mb/s. With regards to the inputs, the time slot allocation circuit 12 specifies two time slots in time of call set-up for the IP data of 128 bytes. One time slot is specified in time of call set-up with respect to the IP data of 64 bytes. Therefore, a method of efficiently specifying the time slot even if packet data of different length are mixed by specifying the number of time slots in units of 64 bytes is provided. The time slot map shown in FIG. 29 is held in a table form while the connection is being established. Although not shown in FIG. 29, a memory circuit for buffering the data worth of 64 bytes is arranged in correspondence to the transmission path speed on the input side, and thus the delay for the buffering occurs at the entrance of the exchange node. However, in the exchange node, the data of 64 bytes are uniformly transferred to the target output side direction path in a minimum delay time as ultra high-speed one time slot in the time division multiplexing frame. In FIG. 29, 12 is the time slot allocation circuit, 455 is the IP data 1 (128 bytes), 456 is the IP data 2 (64 bytes), 457 is the IP data 3 (64 bytes), 458 is the IP data 4 (128 bytes), 459 is the frame of 125 μsec, 460 is the frame of 125 μsec, 461a is the direction path 1, 461b is the direction path 2, 461*c* is the direction path 3, 462*a* is the transmission path 1 of 100 Mb/s, and 462*b* is the transmission path 2 of 100 Mb/s. Furthermore, FIG. 29 shows one example of 8 bit parallel to 512 bit parallel. Time slot 1 and time slot 2 are assumed as direction path 1, time slot 3 and time slot 4 as direction path 2, and time slot 5 and time slot 6 as direction path 3. The direction path desired by the IP data 1 is direction path 2, the direction path desired by the IP data 2 and the IP data 3 is direction path 1, and the direction path desired by the IP data 4 is direction path 3. In this case, the IP data 1 of head command (1) is allocated by 128B to time slot 3, the IP data 3 is allocated by 64B to time slot 1, the IP data 1 of the last command (0) is allocated by 128B to time slot 4, the IP data 2 is allocated by 64B to time slot 2, the IP data of head command (1) is allocated by 128B to time slot 5, and the IP data 4 of last command (0) is allocated by 128B to time slot 6.

When occupying a plurality of time slots, a control bit for identifying whether the time slot corresponds to the first time slot or the last time slot in the time slot map is effectively used. For example, if the connection is terminated, a technique of searching for the time slots in order from the front, and terminating such search at the stage determination is made on whether the time slot is the last time slot, thereby releasing the time slot and using the same for other connections may be combined. Since the IP data 1 is 128 bytes in FIG. 29, the time slot 3 (TS3) and the time slot 4 (TS4) are specified as being directed to the output side direction path 2 based on the time slot map, whereas since the IP data 2 is 64 bytes, the time slot 2 (TS2) is specified as being directed to the output side direction path 1 based on the time slot map, thereby being multiplexed on time slot positions corresponding to the transfer to each direction path number on the output side.

Figure 30:
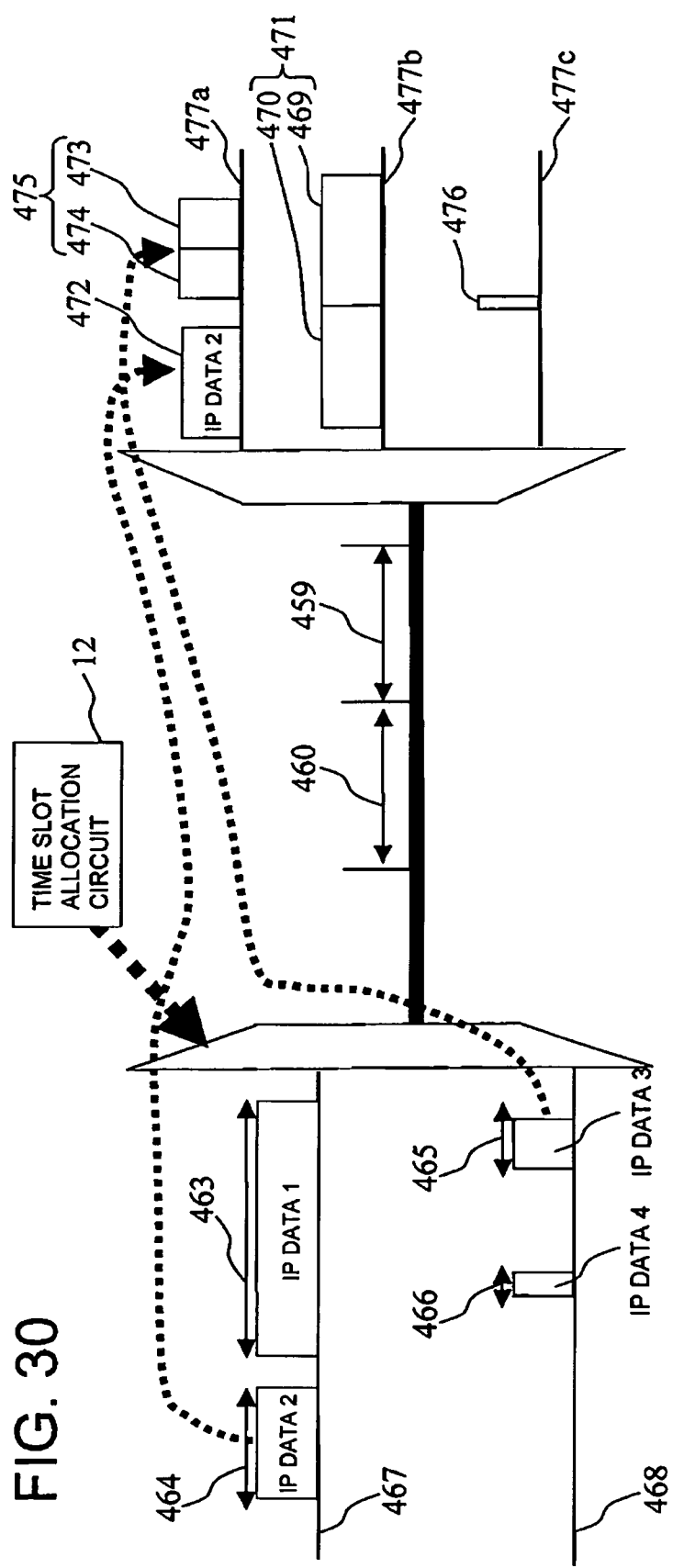
FIG. 30 is a specific example of a time slot specification corresponding to the input data (if transmission path speed is different) of the third embodiment.

FIG. 30 shows an example of a correspondence relationship of the time slot in one frame of the time division multiplexing line and the direction path on the output side when the speed of the input side transmission path differs in the embodiment of FIG. 29. One frame of the time division multiplexing line in the exchange node is assumed as 125 vec. The IP data 1 of 128 bytes and the IP data 2 of 64 bytes are input from the transmission path 1 of 100 Mb/s. The IP data 3 of 128 bytes and the IP data 4 of 64 bytes are input from the transmission path 1 of 1 Gb/s. With regards to the inputs, the time slot allocation circuit 12 specifies two time slots in one of call set-up for the IP data of 128 bytes. One time slot is specified in time of call set-up with respect to the IP data of 64 bytes. In this case as well, a memory circuit for buffering the data worth of 64 bytes is arranged in correspondence to the transmission path speed on the input side, and thus the delay for the buffering occurs at the entrance of the exchange node. However, the data of 64 bytes are uniformly transferred to the target output side direction path in a minimum delay time as ultra high-speed one time slot in the time division multiplexing frame. With regards to the packet data of 128 bytes, a control bit for identifying whether the time slot corresponds to the first time slot or the last time slot is used. In FIG. 30, 12 is the time slot allocation circuit, 463 is the IP data 1 (128 bytes), 464 is the IP data 2 (64 bytes), 465 is the IP data 3 (128 bytes), 466 is the IP data 4 (64 bytes), 467 is the transmission path 1 of 100 Mb/s, 468 is the transmission path 1 of 1 Gb/s, 469 is the time slot 3, 470 is the time slot 4, 471 is the IP data 1, 472 is the IP data 2, 473 is the time slot 1, 474 is the time slot 2, 475 is the IP data 3, 476 is the IP data 4, 477*a* is the direction path 1, 477*b* is the direction path 2, and 477*c* is the direction path 3. Furthermore, FIG. 30 shows one example of 8 bit parallel to 512 bit parallel. Time slot 1 and time slot 2 are assumed as direction path 1, time slot 3 and time slot 4 as direction path 2, and time slot 5 and time slot 6 as direction path 1. The direction path desired by the IP data 1 is direction path 2, the direction path desired by the IP data 2 and the IP data 3 is direction path 1, and the direction path desired by the IP data 4 is direction path 3. In this case, the IP data 1 of head command (1) is allocated to time slot 3 of the direction path 2, the IP data 3 of the head command (1) is allocated to time slot 1 of the direction path 1, the IP data 3 of the last command (0) is allocated to time slot 2 of the direction path 1, the IP data 1 of the last command (0) is allocated to time slot 4 of the direction path 2, the IP data 4 of last command (0) is allocated to time slot 5 of direction path 3, and the IP data 2 of last command (0) is allocated to time slot 6 of the direction path 1.

Since the IP data 1 is 128 bytes in FIG. 30, the time slot 3 (TS3) and the time slot 4 (TS4) are specified as directed to the output side direction path 2 and transferred to the output side direction path 2. Similarly, since the IP data 2 is 64 bytes, the time slot 6 (TS6) directed to the output side direction path 1 is specified and transferred to the output side direction path 1. Furthermore, since the IP data 3 of the transmission path 1 of 1 Gb/s is 128 bytes, the time slot 1 (TS1) and the time slot 2 (TS2) are specified as being directed to the output side direction path 1 and transferred to the output side direction path 1. As described above, the packets of different length accommodated in different transmission speeds can be transferred at a minimum delay time through the exchange node and transferred to the target output side direction path by allocating an appropriate time slot when establishing the connection through the principle of the present invention. An example of limiting the time slot to be provided to one that corresponds to the maximum speed for all calls of any speed in one frame in the exchange node, and allowing empty data to be sent for calls of low speed has been described in the above description, but the present invention is not limited to such conditions. Even if, for example, a control to allocate a plurality of time slots individually by speed in one frame is required, up to how many time slots to allocate to the relevant call in time of call set up is negotiated in advance with the exchange node using the priority control signal. After such negotiation is terminated, the band can be ensured on the exchange node side so that the number of time slots is always sufficient even if data transmission using maximum number of time slots is performed during the data communication of the relevant call.

Fourth Embodiment

Figure 17:
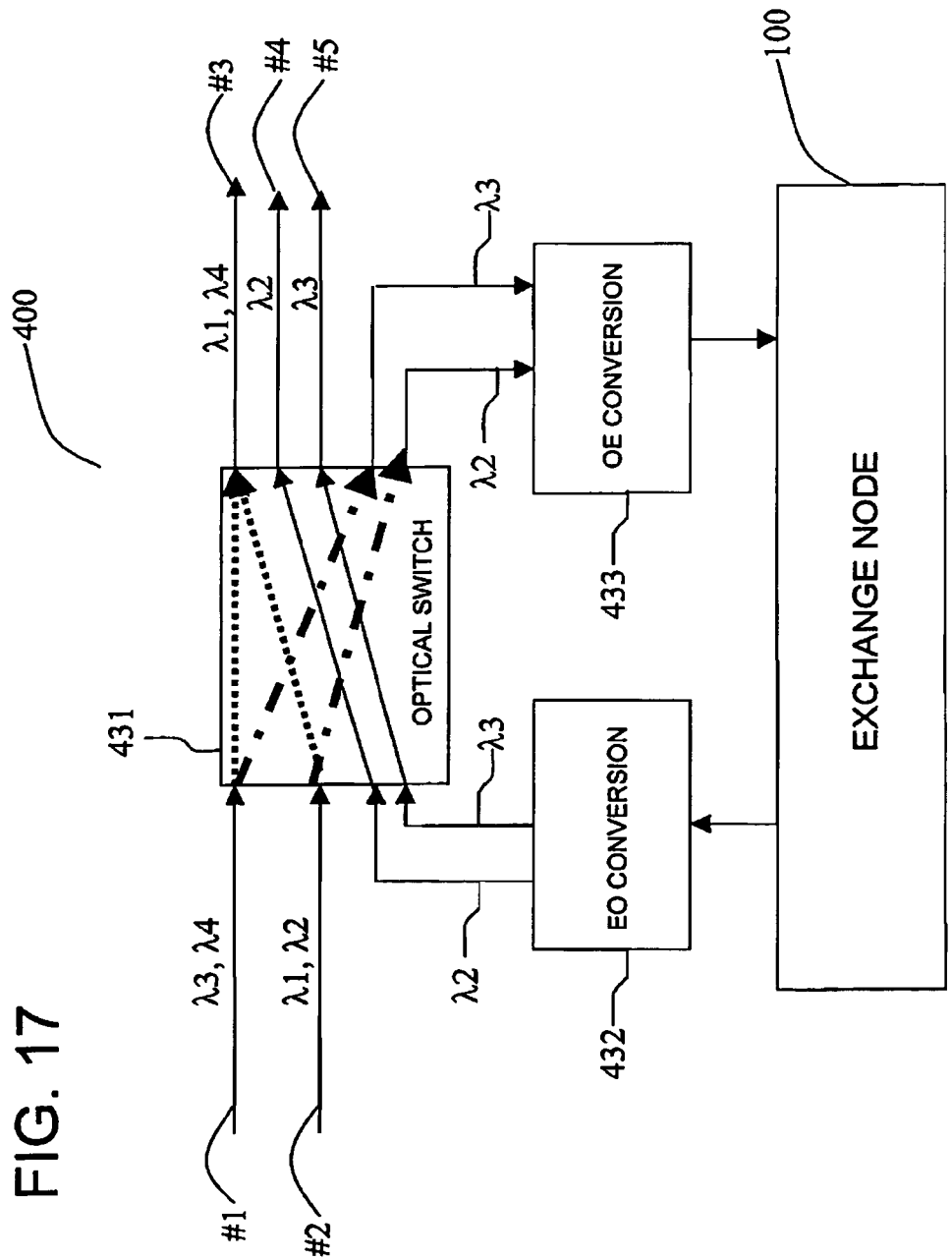
FIG. 17 is a schematic view of an embodiment applied to an optical communication using an optical switch according to the fourth embodiment.
Figure 18:
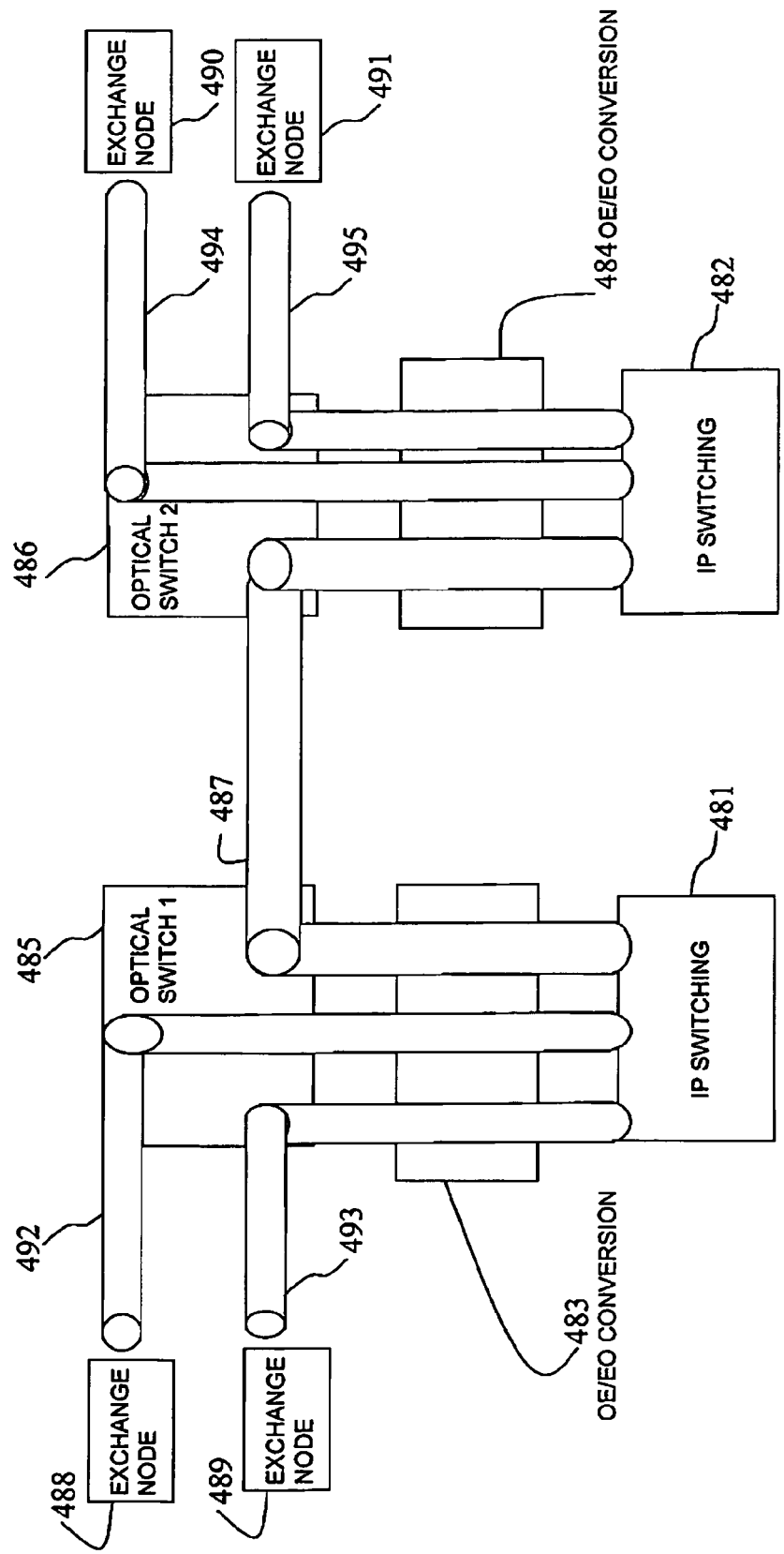
FIG. 18 is a schematic view showing a configuration example of the optical communication using the conventional optical switch.

FIG. 17 is a schematic view showing one form of the fourth embodiment of an embodiment 400 used in an optical communication using the exchange node of the first embodiment to the third embodiment as the optical switch. Before explaining the present embodiment 400, a configuration example of an optical communication using the conventional optical switch will be described in FIG. 18. An optical transmission path #1 for transmission using wavelength λ1 from the exchange node 488 and an optical transmission path #2 for transmission using wavelength λ2 from the exchange node 489 are accommodated in the optical switch 1, transmission to the optical switch 2 using wavelength λ3 to the optical switch 2 is carried out using an optical relay transmission path #3, and converted to wavelengths λ1, λ2 at the exchange node 490 and the exchange node 491, respectively, in the optical switch 2. In this case, when the data traffic sent from the exchange node 1 and the exchange node 2 is small, and data occupying rate at the wavelength of the exchange node 1 and the exchange node 2 is very large, a switching function for every wavelength is provided to the optical switch 1 and the optical switch 2. However, when the traffic amount for each wavelength is small and the necessity to efficiently use the optical relay transmission path #3 arises, or when the multiplexed traffics are mixed for each wavelength and the necessity to multiplex or exchange arises, the wavelength data on the input side is OE converted, electrical IP switching process is performed, EO conversion is again performed after processing, and after converting to an appropriate wavelength, a sending process must be performed on the output side transmission path, as shown in FIG. 18. In this case, a large capacity of buffer memory is required for IP switching, and the processing delay at the relevant portion is inevitable. In FIG. 17, 100 is the exchange node, 431 is an optical switch, 432 is EO conversion, and 433 is OE conversion. Furthermore, in FIG. 18, 480 is the optical communication using the conventional optical switch, 481 and 482 are IP switching, 483 and 484 are OE/EO conversion, 485 is an optical switch 1, 486 is an optical switch 2, 487 is an optical transmission path #3 ($\lambda$3), 488 is an exchange node 1, 489 is an exchange node 2, 490 is an exchange node 3, 491 is an exchange node 4, 492 is an optical transmission path #1 ($\lambda$1), 493 is an optical transmission path #2 ($\lambda$2), 494 is an optical transmission path #4 ($\lambda$1), 495 is an optical transmission path #5 ($\lambda$2).

Figure 19:
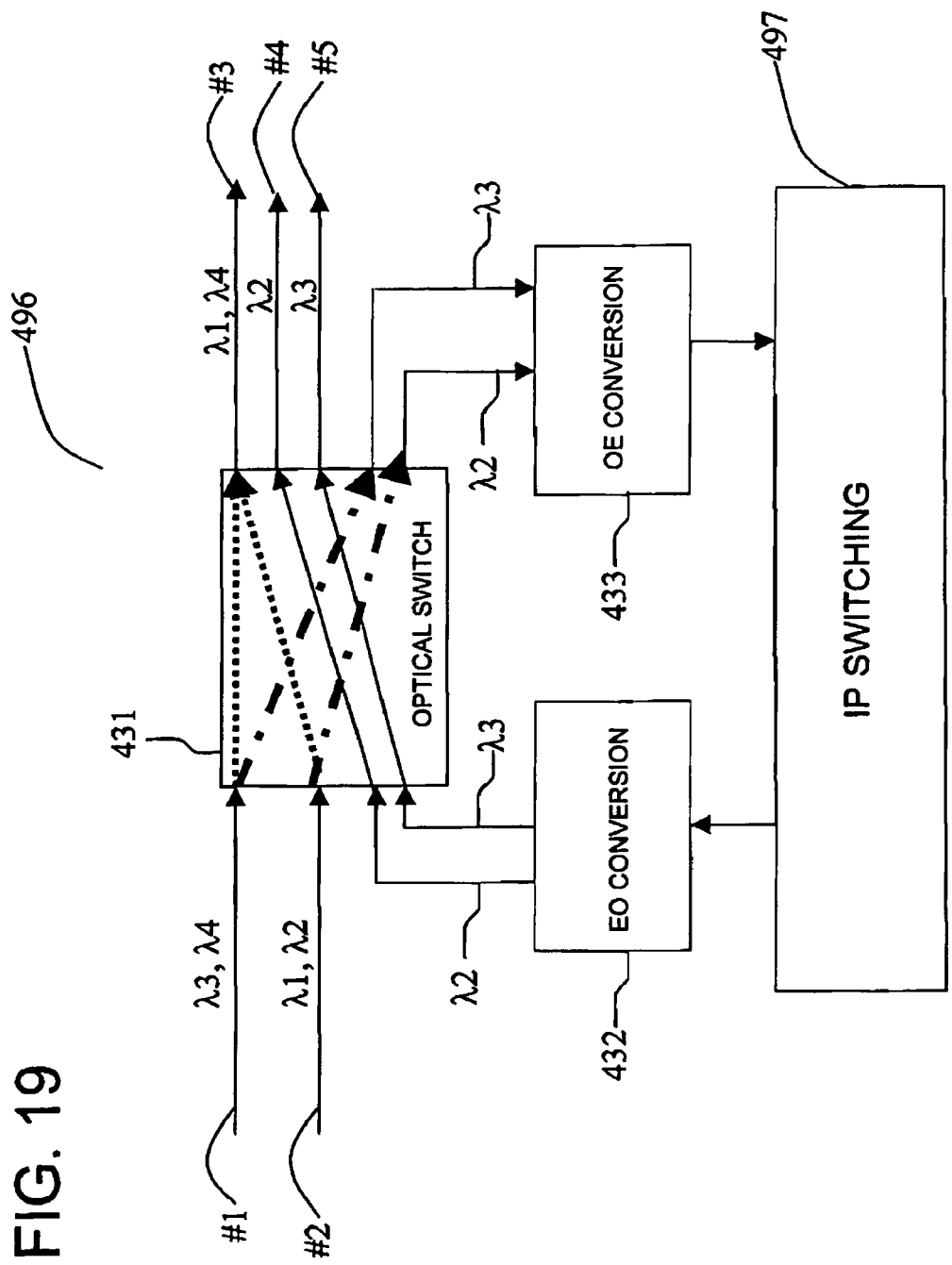
FIG. 19 is a schematic view showing another configuration example of the optical communication using the conventional optical switch.

FIG. 19 is a different configuration example using the conventional optical switch. The input side line #1 multiplexed with wavelengths $\lambda$3 and $\lambda$4, and the input side line #2 multiplexed with wavelengths $\lambda$1 and $\lambda$2 are input to the optical switch. The wavelength $\lambda$1 and the wavelength $\lambda$4 are output to the output side line #3, the wavelength $\lambda$2 to the output side line #4, and the wavelength $\lambda$3 to the output side line #5. In this case, OE conversion is performed once on the transmission line data transmitted at the wavelength, and buffering is performed at the electrical level. After performing the IP switching process, EO conversion is performed, and direction path conversion is performed. Therefore, delay involved in the buffering process occurs, and the quality of delay may be affected. In FIG. 19, 496 is the optical communication using the conventional optical switch, 497 is the IP switching, 431 is the optical switch, 432 is EO conversion, and 433 is OE conversion.

FIG. 17 is a configuration example of the embodiment 400 used in the optical communication using the optical switch according to the fourth embodiment. The input side line #1 multiplexed with wavelengths $\lambda$3 and $\lambda$4, and the input side line #2 multiplexed with wavelengths $\lambda$1 and $\lambda$2 are input to the optical switch. The wavelength $\lambda$1 and the wavelength $\lambda$4 are output to the output side line #3, the wavelength $\lambda$2 to the output side line #4, and the wavelength $\lambda$3 to the output side line #5. The IP switching processing unit of the configuration using the conventional optical switch of FIG. 19 is replaced with the exchange node of the first embodiment to the third embodiment. The operation from the input side to the output side is similar to the configuration example using the conventional optical switch, but the processing delay time is fixed and always guaranteed at the minimum value since the exchange node of the first embodiment to the third embodiment is used.

Fifth Embodiment

Figure 20:
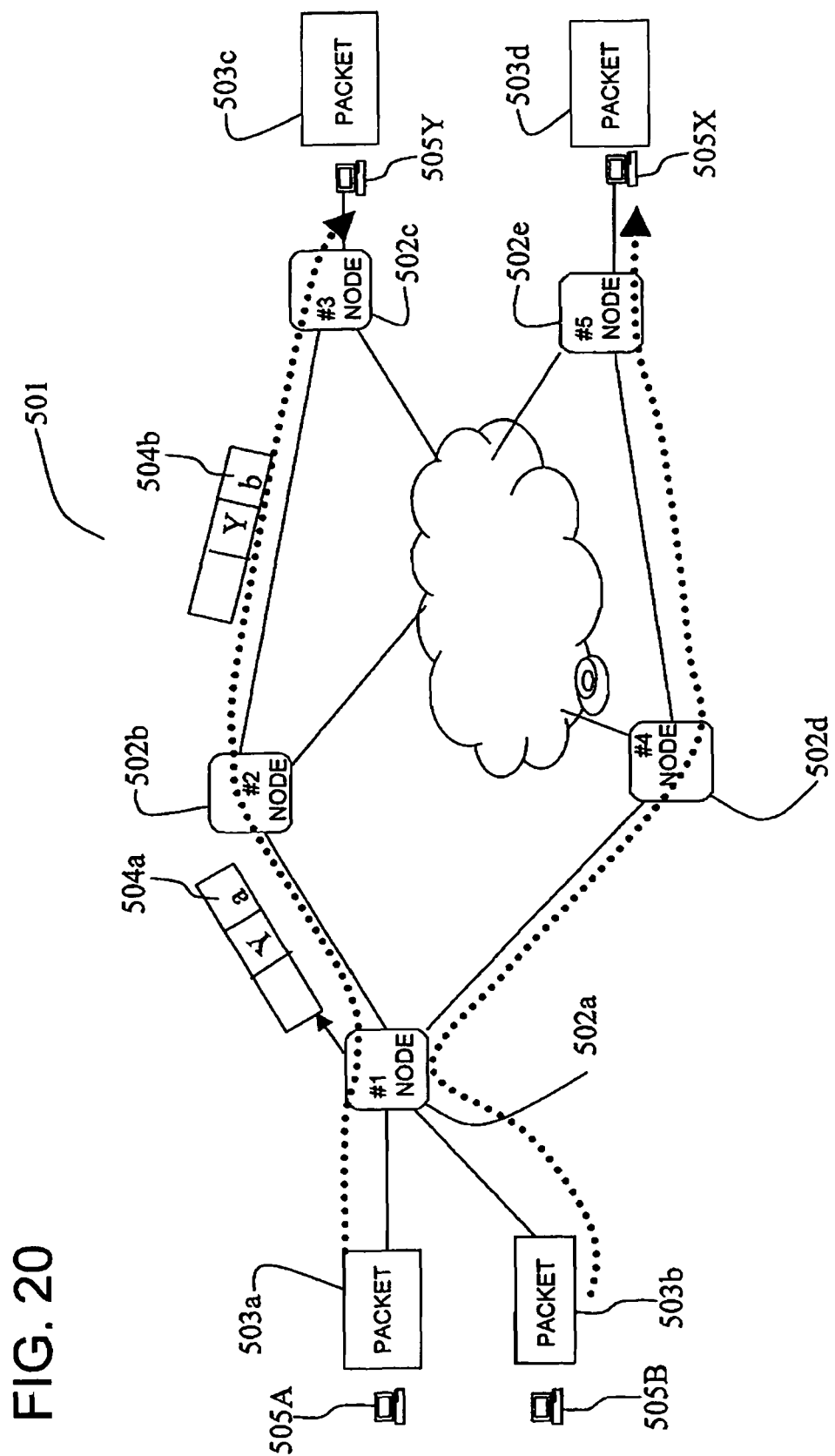
FIG. 20 is a schematic view showing a configuration example applied to MPLS according to a fifth embodiment.

FIG. 20 is a configuration example of applying the exchange node of the first embodiment to the fourth embodiment to MPLS communication. MPLS (Multi-Protocol Label Switching) communication is a communication method in which the node at the entrance of the network performs forwarding by looking only at the newly added mark called label instead of looking at IP address. The node at the entrance of the network newly uses the information of the label as the priority control signal in the exchange node of the first embodiment to the fourth embodiment, and reduces the delay time in the MPLS communication. In FIG. 20, the label a is added to the virtual connection having the destination IP address of Y at the #1 node 502a and transported to the #2 node. The flow of adding b which is the connection identifier on the direction path to the #3 node 502c, which is the target node, at #2 node 502b, removing the label b at #3, and arriving at the final destination host (correspond to IP address Y) is shown. In the MPLS communication form, the label does not need to be determined so as to be unique for the entire network, and may be unique to each link. Generally, in VPN (Virtual Private Network) applied with the MPLS, the node for exchanging the label information is called LSR (Label Switching Router), and in particular, adds corresponding label information to the specific IP packet at the entrance to the network. Furthermore, the node for removing the label information at the exit of the network is called PE (Provider Edge) device, where #1 node, #3 node and #5 node correspond to the PE device in FIG. 20. In each exchange node, the time slot is always fixedly allocated to the communication of the MPLS connection, and the input data is output to the output side link always at a constant delay time. That is, the MPLS label used in each exchange node is guaranteed as long as the LSP (Label Switched Path) is set. In FIG. 20, the MPLS label is allocated in correspondence to the specific destination IP address, but is not limited to the method, and the method may be applied to all the IP addresses directed to the #3 node, or the MPLS label may be allocated to the specific IP address group in the #3 node and a specific port number and high-speed-transferred on the relay link. In the LSR for performing label exchange in the network applied with the MPLS, the destination IP address and the FEC (Forward Equivalent Class) corresponding to the QoS (Quality of Service) label required from the user are identified, and the required high quality QoS is provided to the connection type communication traffic, which is the target of the present invention. In FIG. 20, 501 is an application example to the MPLS communication, 502a is the #1 node, 502b is the #2 node, 502c is the #3 node, 502d is the #4 node, 502e is the #5 node, 503a is the packet (destination: Y), 503b is the packet (destination: X), 503c is the packet (address: Y), 503d is the packet (address: X), 504a and 504b are labels, 505A is the terminal A, 505B is the terminal B, 505X is the terminal X, and 505Y is the terminal Y. The #1 node 502a, #2 node 502b and #3 node 502c include the PE device. The #1 node 502a reattaches the label, and outputs the label 504a. The #2 node 502b reattaches the label, and outputs the label 504b. The #3 node 502c detaches the label 504b.

Figure 31:
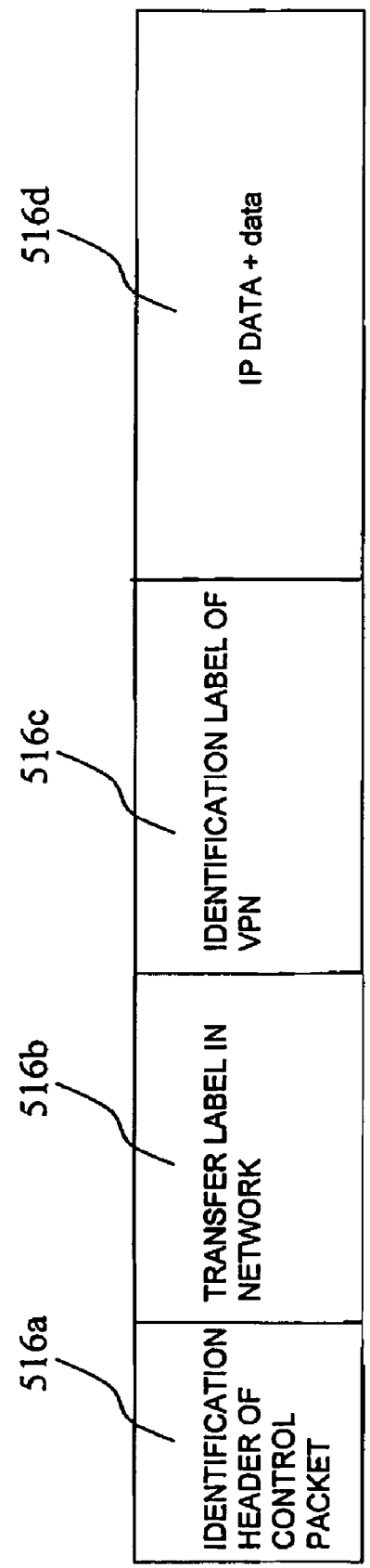
FIG. 31 is a format of input data when applied to the MPLS according to the fifth embodiment.

ATM may be used for layer 2 instead of the MPLS label, and VPI (Virtual Path Identifier)/VCI (Virtual Channel Identifier) may be applied, or DLCI (Date Link Connection Identifier) may be applied as the MPLS label for frame relay. Generally, since the header for VPN identifying information is provided, as shown in FIG. 31, the information may be used as the priority control signal. In FIG. 31, 516a is the identification header (layer 2 header) of the control packet, 516b is the transfer label in the network, 516c is the identification label of VPN (may be used as priority control signal label), and 516d is the (IP data+data).

Sixth Embodiment

Figure 21:
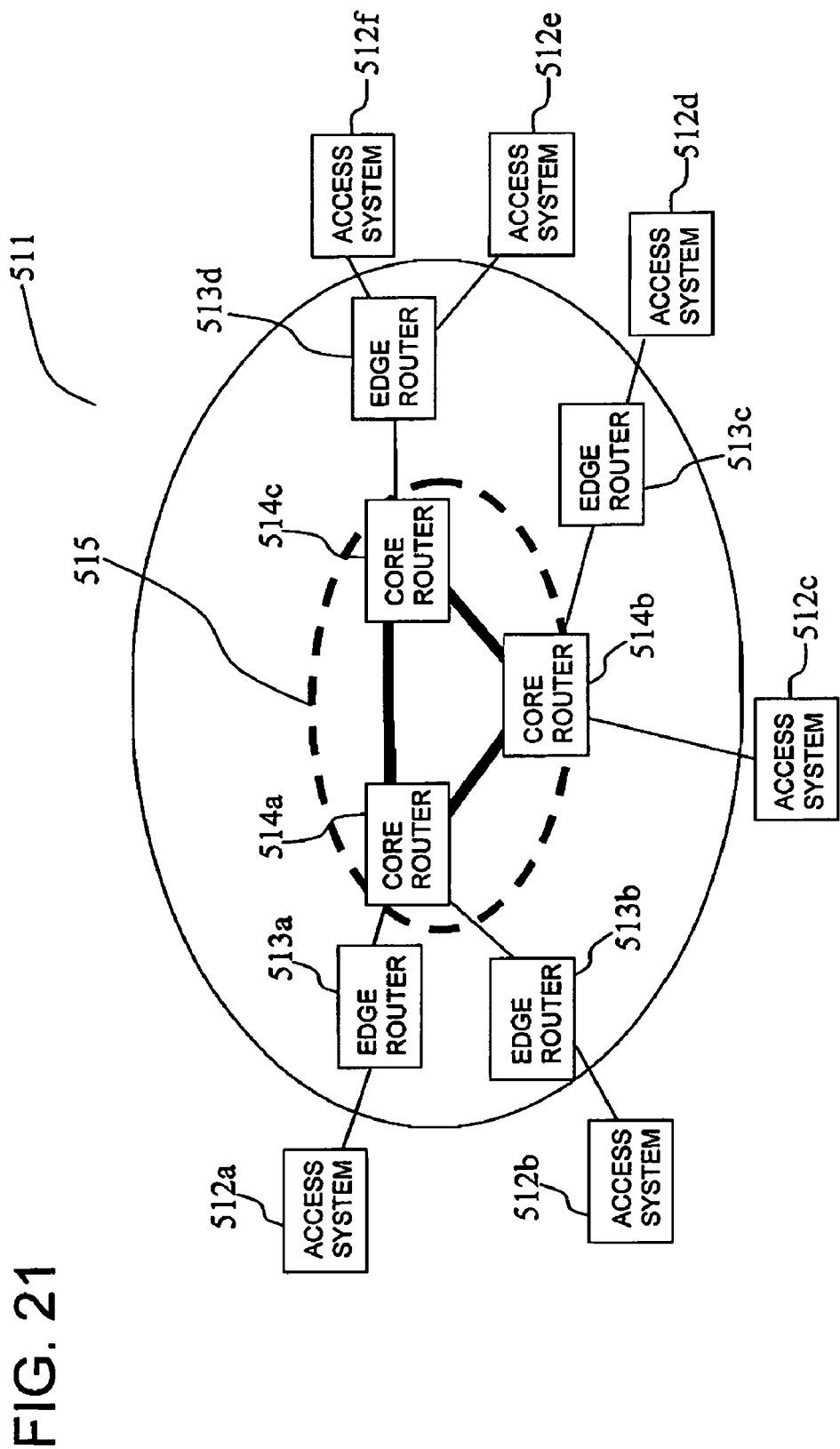
FIG. 21 is a schematic view showing a configuration example applied to a backbone exchange network according to a sixth embodiment.
Figure 22:
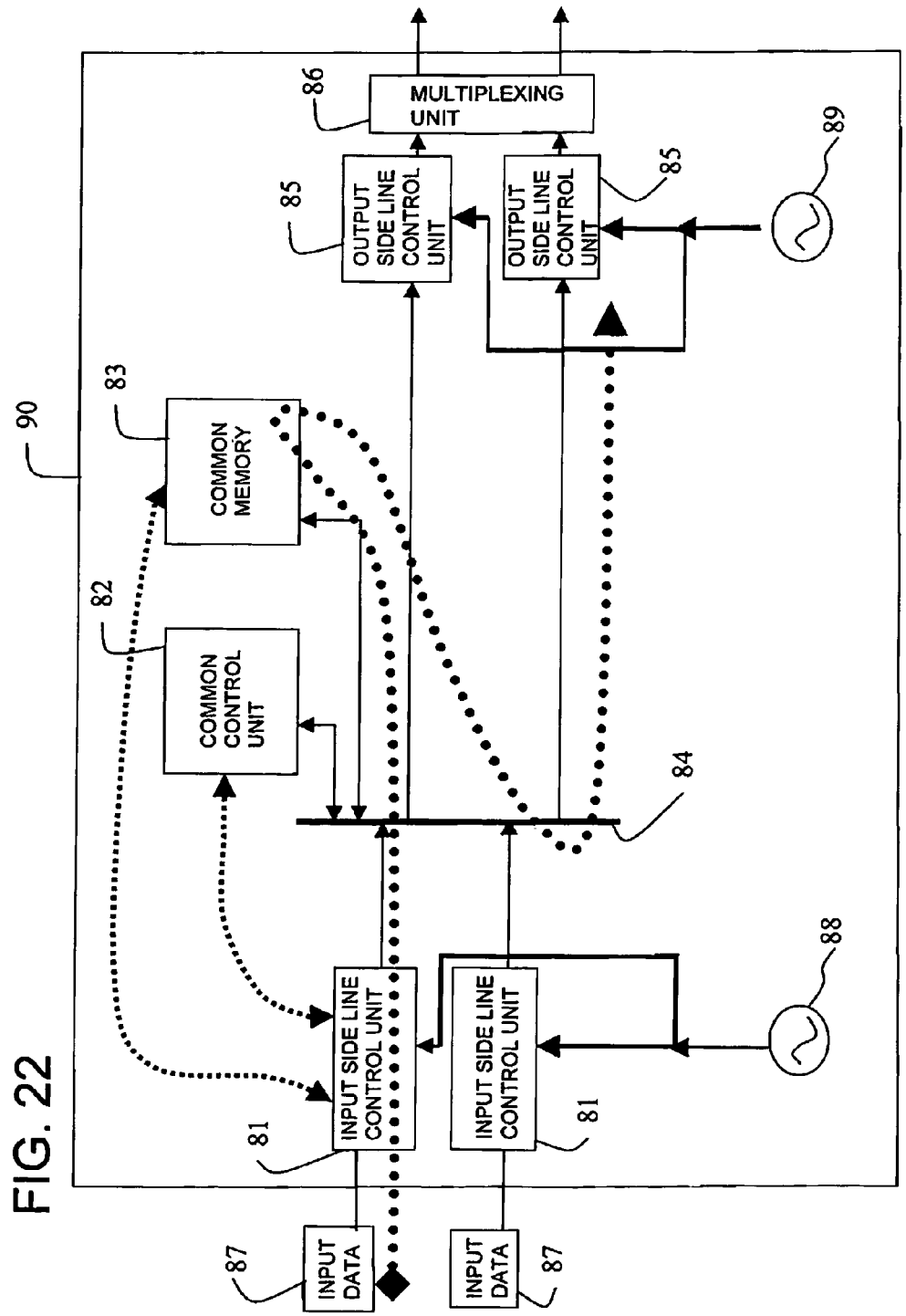
FIG. 22 is a schematic view showing a configuration example of a conventional exchange node.
Figure 23:
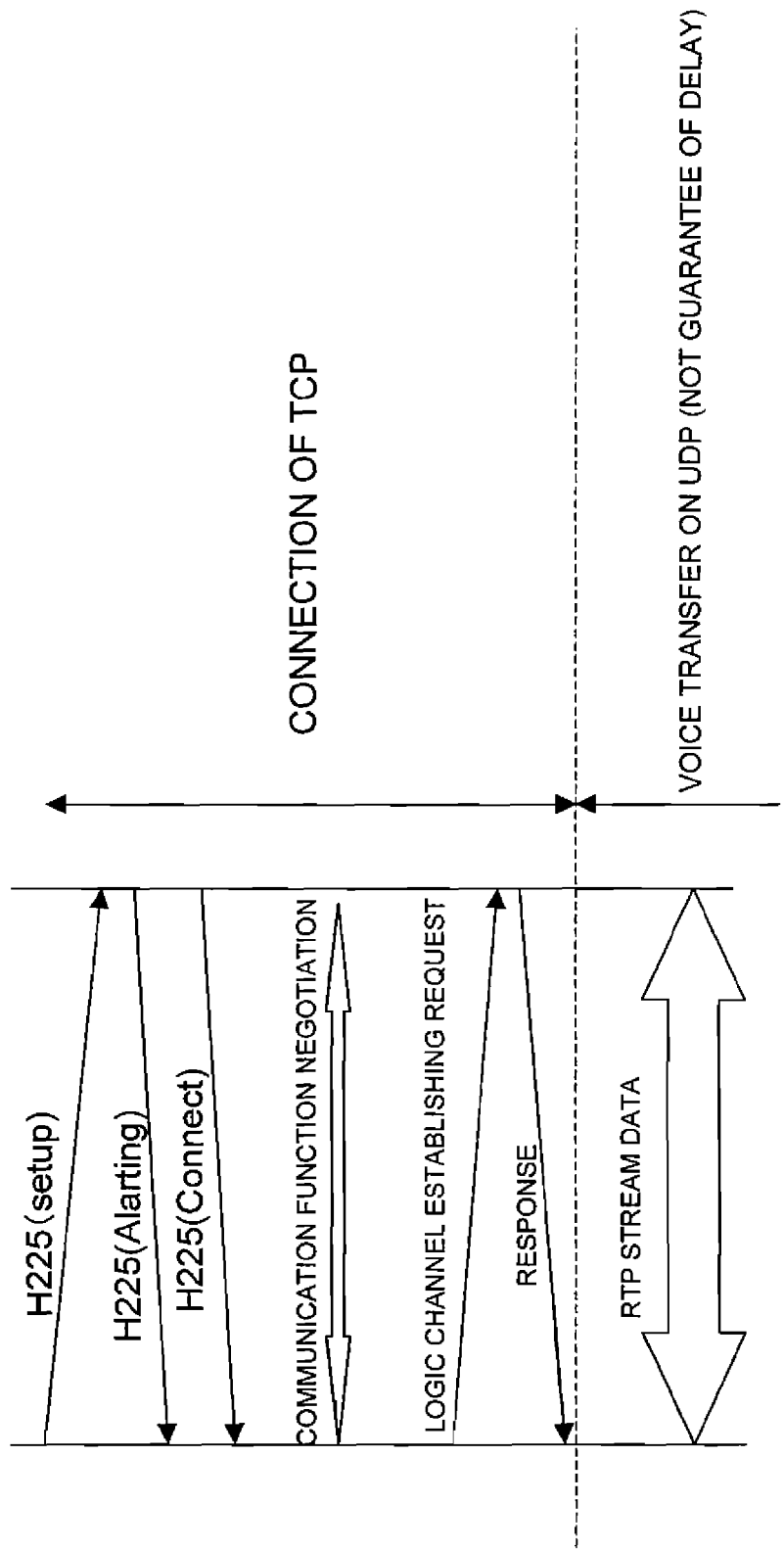
FIG. 23 is a schematic view showing a communication model of a conventional voice communication.

FIG. 21 is a configuration example when the exchange node of first embodiment to fifth embodiment is applied to a backbone exchange network. The core routers are connected in the core relay network. The core router is connected with an edge router, and the edge router is connected to an access system such as ATM (Asynchronous Transfer Mode) media converter, ADSL (Asynchronous Digital Subscriber Line), PON (Passive Optical Network) and the like. In FIG. 21, the exchange node of the first embodiment to the fifth embodiment is applied to the communication between the edge router and the core router, and between the core routers. The delay time of the entire backbone exchange network is reduced and the communication quality is improved by applying the exchange node of the first embodiment to the fifth embodiment to the backbone exchange network. In FIG. 21, 511 is the application to the backbone exchange network, 512a, 512b, 512c, 512d, 512e, 512f are access systems, 513a, 513b, 513c are edge routers, 514a, 514b, 514c are core routers, and 515 is a core relay network.

Seventh Embodiment

Figure 32:
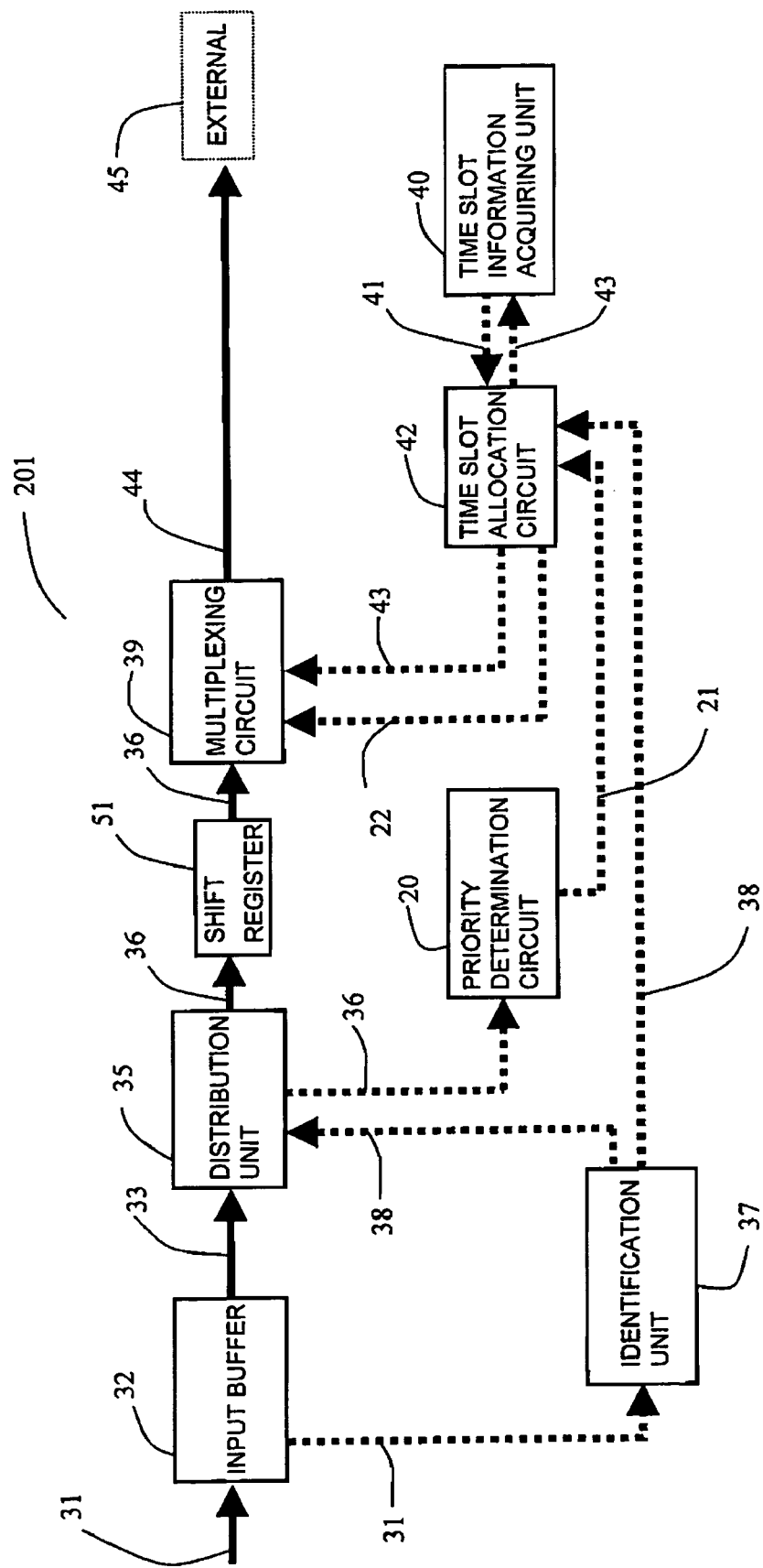
FIG. 32 is a schematic view showing a first form of an exchange node according to a seventh embodiment.

FIG. 32 is a configuration view showing a first form of an exchange node 201 according to the present embodiment. The exchange node 201 according to the present embodiment includes an input buffer unit 32, an identification unit 37, a distribution unit 35, a multiplexing circuit 39, a time slot allocation circuit 42 and a time slot information acquiring unit 40. More preferably, the priority determination circuit 20 and the shift register 51 are further arranged.

The input buffer unit 32 is connected to the transmission path of the input data 31 which is the connectionless type packet data, and writes the input data 31 to the shift register. After the writing of the input data 31 is completed, an input buffer data 33 is output. The exchange node 201 according to the present embodiment priority-controls when the input data 31 is connectionless type packet data that contains priority control signal 38, but data may be written in the input buffer unit 32 even if the input data 31 is connectionless type packet data that does not contain priority control signal 38, connectionless type data other than packet data, data connection type data and the like.

Figure 33:
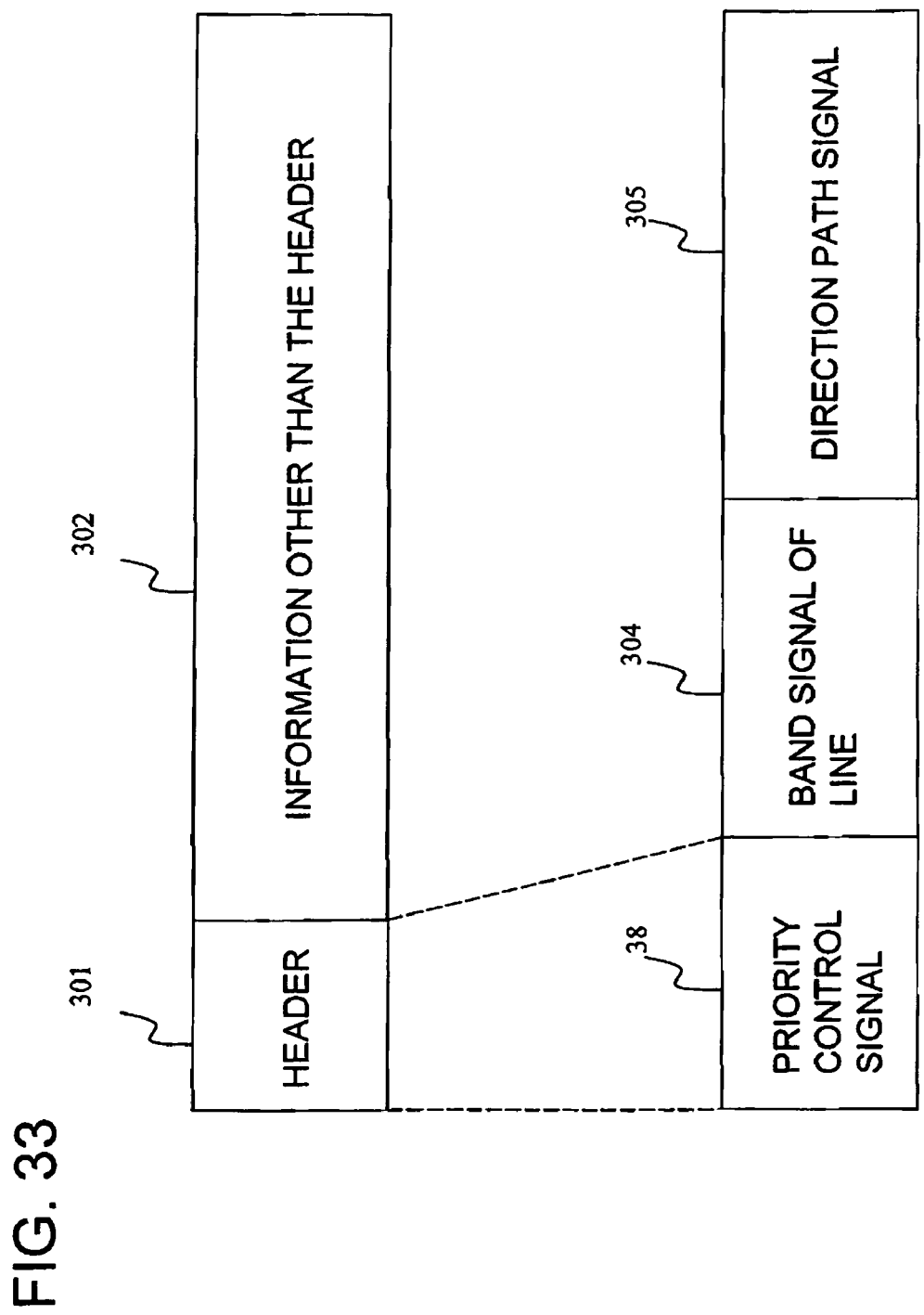
FIG. 33 is a view showing one example of the format of the input data.

The identification unit 37 identifies the priority control signal 38 contained in the input data 31 input to the input buffer unit 32. The identification unit 37 also outputs the priority control signal 38 to the distribution unit 35. The priority control signal 38 is a signal indicating that the input data 31 is to be priority-controlled. The format of the input data 31 which is the connectionless type packet data contains the priority control signal 38 at the header 301 as shown by way of example in FIG. 33. The identification unit 7 identifies the presence of the priority control signal 38, and outputs "present" or "not present". "Present" and "not present" of the priority control signal 38 may be output as "1" and "0". The priority control signal 38 is contained in the header, and band signal, direction path signal of the line is contained in the packet data as shown in FIG. 33. The priority control signal 38 contains priority information 21, length data of priority control processing data 36, priority control release signal and the like. The format of the input data 31 shown in FIG. 33 contains a header 301 and information other than the header 302. The header 301 contains the priority control signal 38. The priority control signal 38 is priority information 21, length of priority control processing data or priority control release signal. The information other than the header 302 is the packet data and contains the band signal 304 and the direction path signal 305 of the line.

Figure 34:
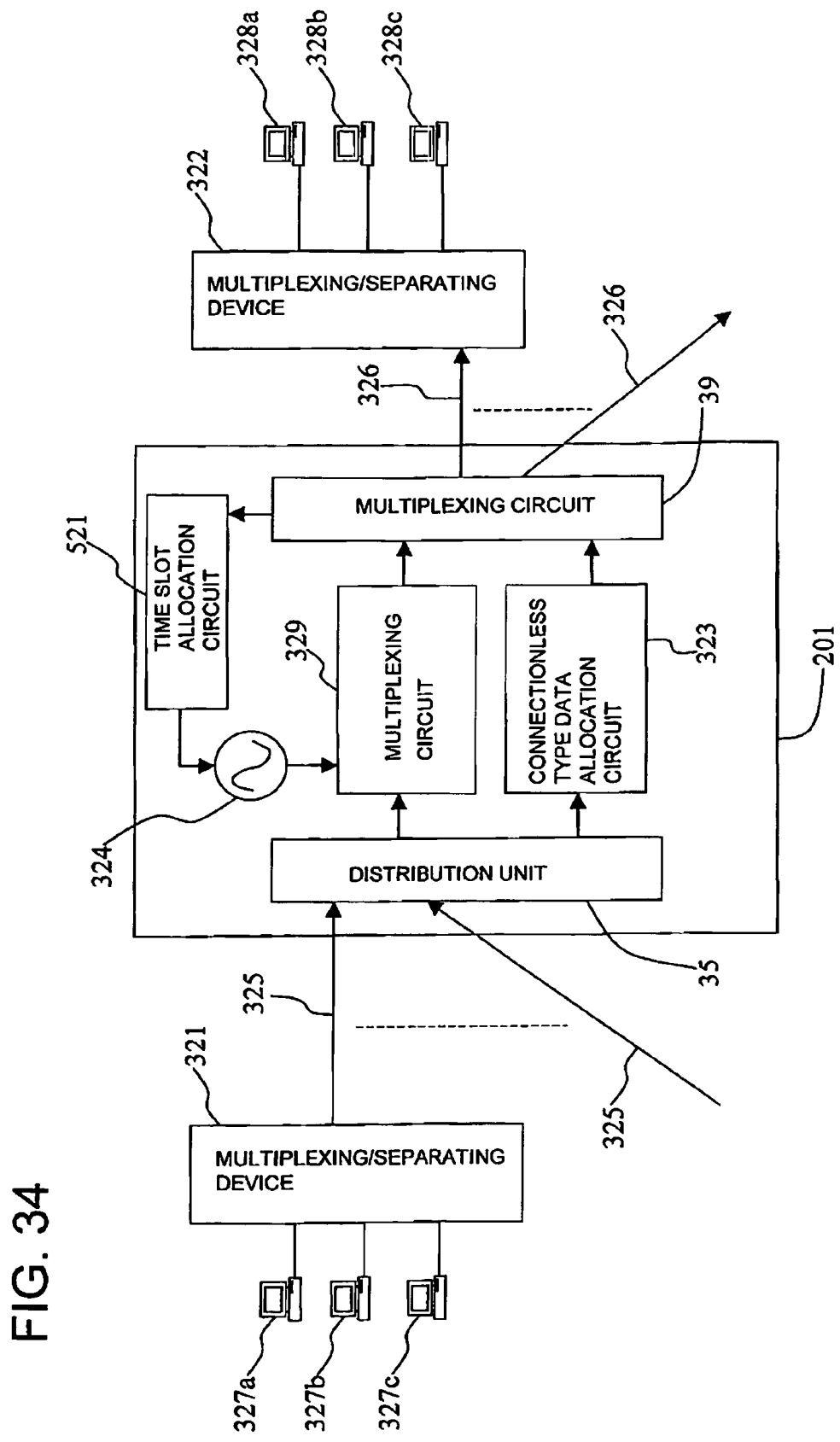
FIG. 34 is a schematic view showing a second form of an exchange node according to a seventh embodiment.
Figure 35:
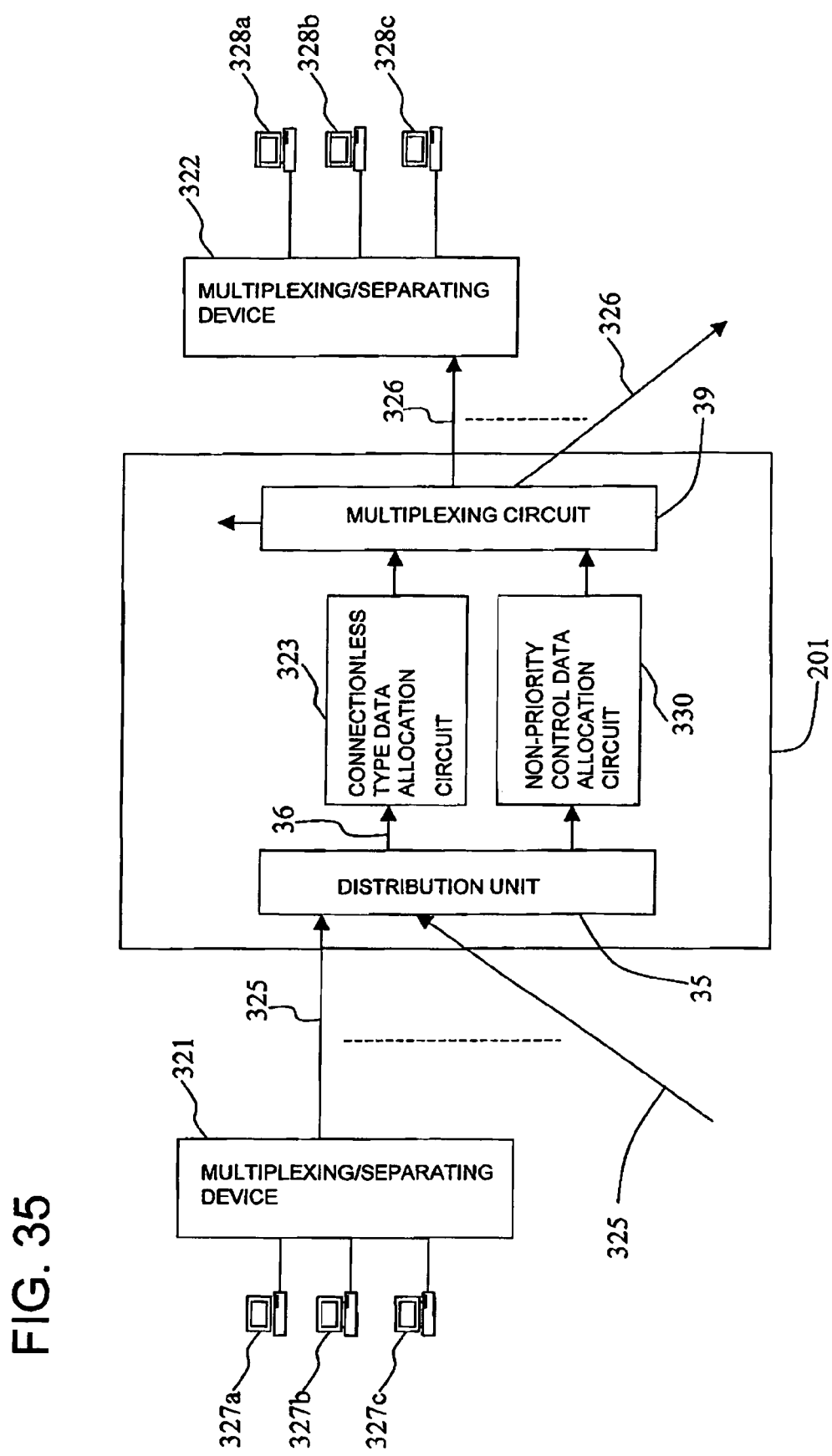
FIG. 35 is a schematic view showing a third form of an exchange node according to a seventh embodiment.

The distribution unit 35 is input with the input buffer data 33 from the input buffer unit 32, and the priority control signal 38 from the identification unit 37. If the priority control signal 38 is present, the input buffer data 33 is output as the priority control processing data 36. If the priority control signal 38 is not present, the non-priority control processing data (not shown) is output with the input buffer data 33 not to be priority-controlled. The distribution unit 35 distributes whether or not the input buffer data 33 is to be priority-controlled based on the presence of priority control identified in the identification unit 37, and thus the input buffer data 33 does not need to be buffered in the distribution unit 35. The distribution control by the distribution unit 35 may include distributing as shown in FIGS. 34 and 35. In FIG. 34, a connectionless type data allocation circuit 323 for performing connectionless communication control output from the distribution unit 35 and outputting to the multiplexing circuit 39 is arranged. Furthermore, a connection type data allocation circuit 329 for performing the connection type communication control output from the distribution unit 35 and outputting to the multiplexing circuit 39 is arranged. In FIG. 35, a non-priority control data allocation circuit 330 for performing the communication control of executing the buffering of packets for packet data that does not require priority control output from the distribution unit 5. In FIG. 34 and FIG. 35, a transmission side terminal 327, a multiplexing/separating device 321 for multiplexing or separating the data from the transmission side terminal 327, a multiplexing line 325 for transmitting the multiplexed input data from the multiplexing/separating device 321 and inputting the input data to the exchange node 201, a multiplexing line 326 for transmitting the multiplexed data from the multiplexing circuit 39, a multiplexing separating device 322 for multiplexing or separating the multiplexed data transmitted on the multiplexing line 326, and a reception side terminal 328 for receiving the separated data of the multiplexing/separating device 322 are shown.

FIG. 34 is a configuration view showing a second form of the exchange node according to the present embodiment. A case of distributing the connection type data and the connectionless type data in the distribution unit is shown. The configuration of the exchange node 201 in FIG. 34 has the same configuration shown in FIG. 32, but the distribution unit 35, the multiplexing circuit 39, and the connectionless type data allocation circuit 323 including the time slot allocation circuit 42 shown in FIG. 32 are shown. The connection type data distributed in the distribution unit 35 is processed by the connection type data allocation circuit 329 in the connection type communication path, and the connectionless type data distributed in the distribution unit 35 is processed by the connectionless type data allocation circuit 323 in the connectionless type communication path. The connection type data allocation circuit 329 includes a connection type data time slot allocation circuit 12 for allocating the time slot of the connection type packet data, and outputting the packet data allocated with the time slot. The distribution unit 35 outputs to the connection type data allocation circuit 329 as the connection type data if the input data 31 input to the input buffer unit 32 shown in FIG. 32 is the connection type packet data, and the multiplexing circuit 39 multiplexes the connection type data on the multiplexed data 44.

The allocation of the time slot of the connection type packet data is the same as the exchange node described in the above first embodiment to the sixth embodiment. For example, the time slot allocation circuit 12 and the output/distribution unit 10 shown in FIG. 1 may be used as the connection type data allocation circuit 329. The time slot allocation circuit 42 may be used as the connectionless type data allocation circuit 329. If the time slots of the connectionless type packet data and the connection type packet data are allocated and multiplexed, the connectionless communication and the connection communication may exist in a mixed manner.

FIG. 35 is a configuration view showing a third form of the exchange node according to the present embodiment. A case when distribution and priority control processing is performed on the data not to be priority-controlled in the distribution unit 35, and the data to be priority-controlled is distributed in the distribution unit 35 and processed by the conventional buffering priority control is shown. The configuration of the exchange node 201 in FIG. 35 is the same as the configuration shown in FIG. 32, but the distribution unit 35, the multiplexing circuit 39, the connectionless type data allocation circuit 323, and the non-priority control data allocation circuit 330 are shown. Furthermore, the exchange node 201 shown in FIG. 34 and FIG. 35 includes a synchronization clock for replacing the time slot specifying signal to the time in the frame to write in the time slot in the frame of the specified time division multiplexing line. In this case, the distribution unit 35 preferably outputs the input data not requiring priority control to the non-priority control data allocation circuit 330 as the non-priority control processing data by the priority control signal instructing that the input data is the priority control processing data. In this case, the exchange node 201 further allocates the time slot of the non-priority control processing data not requiring the priority control of the input data and outputs the non-priority control processing data allocated with the time slot. In this case, the multiplexing circuit 39 multiplexes the non-priority control processing data on the multiplexed data 44 described in FIG. 32 above. Therefore, the time slots of the priority type connectionless communication packet data and the non-priority type connectionless communication packet data are allocated and the data are multiplexed. The priority type connectionless communication and the non-priority type connectionless communication thus can exist in a mixed manner.

The time slot allocation circuit 42 shown in FIG. 32 specifies the time slot of the destination of the priority control processing data 36 from the unused time slot, and outputs the time slot specifying signal 43. The time slot allocation circuit 42, which is input with the time slot information 41, specifies the time slot of the destination of the priority control processing data 36 from the unused time slot, and outputs as the time slot specifying signal 43. The information of the unused time slot is obtained by the time slot information acquiring unit 40 to appropriately obtain the information of the unused time slot.

Figure 36:
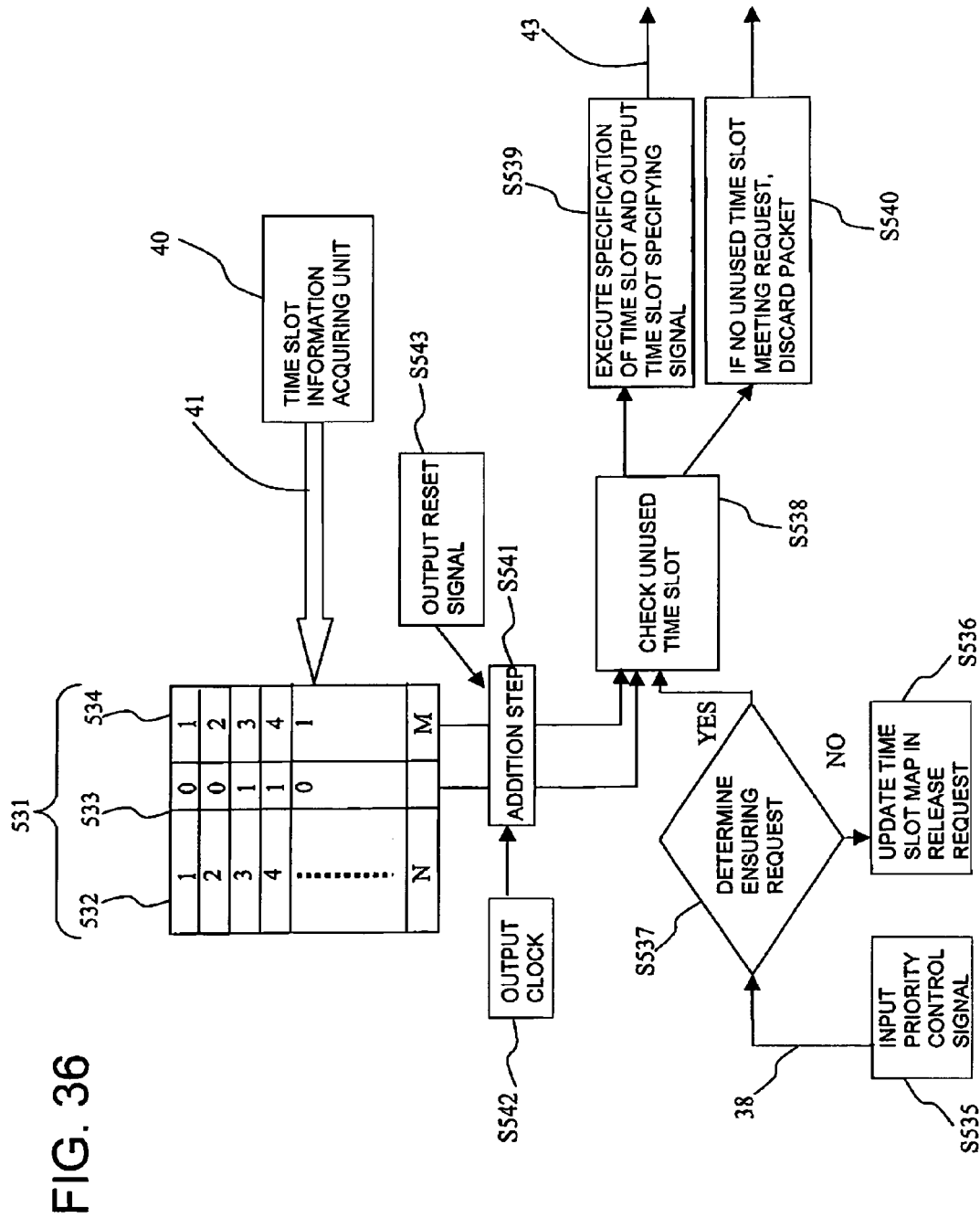
FIG. 36 is a view showing a first example of the flow for the time slot allocation circuit to specify the time slot.

The flow for the time slot allocation circuit 42 to specify the time slot is shown in FIG. 36. In FIG. 36, 40 is the time slot information acquiring unit, 41 is the time slot information, 43 is the time slot specifying signal, 531 is the time slot map, 532 is the number of time slots, 533 is an empty/blocked display (0/1=empty/blocked), 534 is the direction path number and S535 is the priority control signal input. In order for the time slot allocation circuit 42 to accurately specify the time slot, the time slot allocation circuit 42 preferably includes the time slot map 531 shown in FIG. 36. The time slot allocation circuit 42 updates the time slot map 531 by the time slot information 41 obtained by the time slot information acquiring unit 40. In the priority control signal input S535, the priority control signal 38 is input. The priority control signal 38 contains time slot ensuring request, time slot releasing request, target direction path number and the like. In S537, determination on the ensuring request is performed. In 5536, the time slot map in time of release request is updated. In S538, the unused time slot is checked from the time slot map 531, and if the unused time slot is present, the time slot is specified, and the time slot specifying signal 43 is output (S539). In this case, the specified time slot is in the used state, and thus the time slot map 531 is updated. The update of empty/block map and the like is performed. In the addition step S541, a selective addition calculation is performed on the time slot directed to the direction path in accordance with the clock. It is matched with the clock output in clock output S542 according to the reset signal for every one period output in the reset signal output S543, the empty/block display of the time slot map, and the direction path number 534. If the unused time slot that complies with the request is not present, the packet is discarded (S540).

FIG. 37 is a first example of the time slot map in which the time slot allocation circuit specifies the time slot. The time slot map shown in FIG. 37 shows a case in which all the time slot number corresponding to the output side direction path number is not allocated. Address is the address. CID (Call Identification Number) is the Call ID. TS is an abbreviation of the time slot, and TSF is a TS allocation flag. TS1, TS2, ... TSN are time slot numbers from 1 to N. Des-IPA (Destination IP Address) shows the destination IP address. Sor-IPA (Source IP Address) is the originating IP address. $\alpha$, $\beta$ are fields indicating the allocation state of the time slot. For example, the allocation state of the time slot is shown with $\alpha\beta=10$ as meaning currently in use, $\alpha\beta=11$ as not all are allocated, $\alpha\beta=01$ as in use for maintenance and test, and $\alpha\beta=00$ as request for connection not made. Assuming that the number of simultaneous connections correspond to N, the field of the address of TS allocation flag "0" indicates that overwriting use is possible. CID in which the TS allocation flag is "1" is cleared within a suitable defined time, in which case, the usage state of TS is cleared in synchronization therewith. The mechanism of the present embodiment described above is similarly applicable to the VPN (Virtual Private Network) applied with the MPLS (Multi-Protocol Label Switching) network. That is, as long as the MPLS path (LSP: Label Switched Path) is set, the packet communication for an arbitrary connectionless communication is also guaranteed with the quality at the same time. The application of the present embodiment to the MPLS network or the VPN is easily realized by performing allocation to the specific LSP of the optimum traffic flow of the LSP. Using the methods of traffic engineering described above, protocols and the like for efficiently operation-managing the band of the network, and balancing the load balance of the entire network is possible to the connectionless type communication having the identifier of the degree of priority. The ATM (Asynchronous Transfer Mode) may be used for layer 2 in place of the MPLS label, and VPI (Virtual Path Identifier)/VCI (Virtual Channel Identifier) may be applied, or DLCI (Date Link Connection Identifier) may be applied as the MPLS label for frame relay. In FIG. 37, TS is the time slot number, CID (Call ID) is the identification number of the IP call, TS1 is the time slot of #1, TS2 is the time slot of #2, TSN is the time slot of #N.

Figure 38:
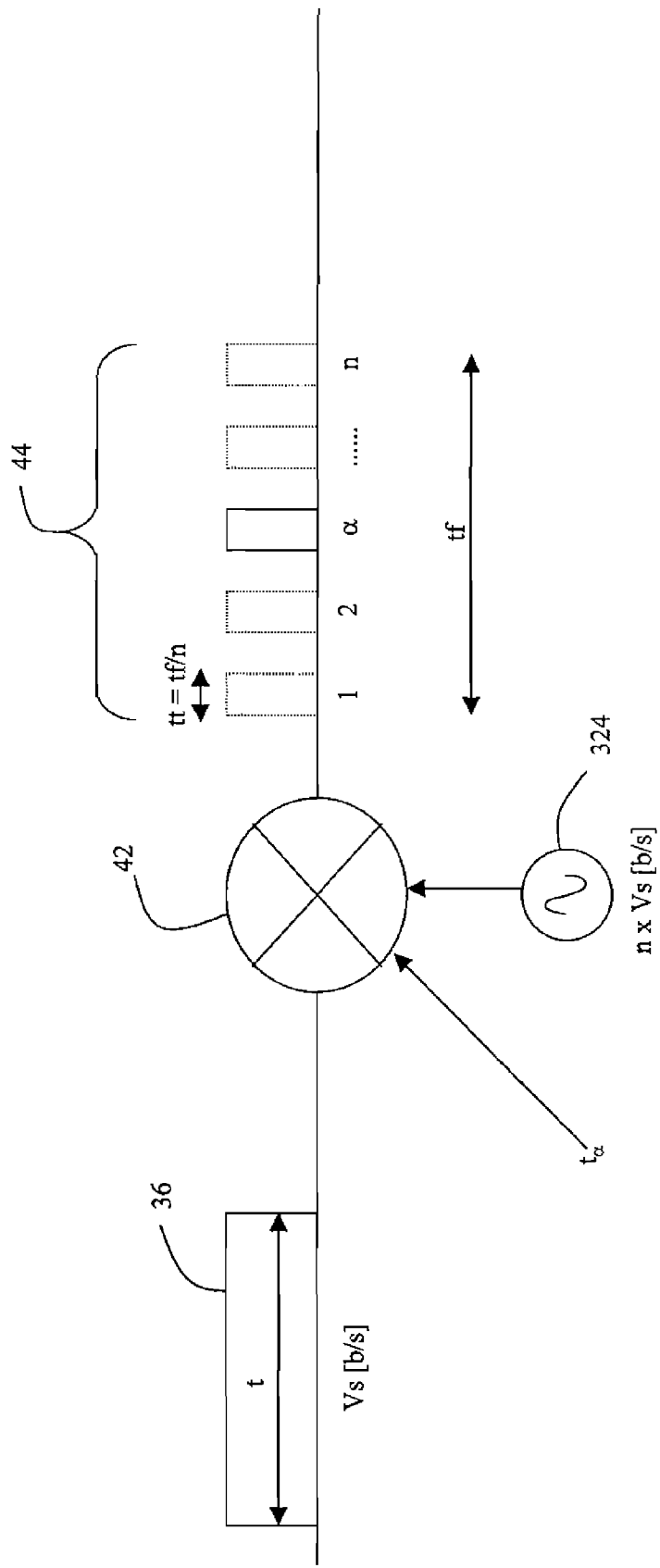
FIG. 38 is a conceptual view of time division multiplexing of the exchange node according to the seventh embodiment.

FIG. 38 is a conceptual diagram in which the time slot allocation circuit specifies the time slot and the multiplexing circuit performs time division multiplexing. The time slot allocation circuit 42 divides the time tf of one frame of the time division multiplexing line by the necessary number of time slots n, and defines the time tt of one time slot. The amount of the priority control processing data 36 that can be written in one time slot results from the speed Vs of the throughput of the exchange node 201. In the period corresponding to one time slot, the amount of data that can be written from the transmission line is tt×Vs. The time slot allocation circuit 42 in the exchange node obtains the unused time slot information 41 and recognizes the time $\alpha$. The time is obtained by the time information from the synchronization clock. When the time reaches $\alpha$, the multiplexing circuit 39 writes the priority control processing data 36 to time slot specified by the time slot allocation circuit 42, and outputs the multiplexed data 44. If the length is N times the basic packet length, the N number of unused time slot information are obtained from the time slot group corresponding to the output side direction path of the destination, and recognizes α1 to αN corresponding to the relevant time. In FIG. 38, 324 is the synchronization clock.

Assume a case in which the packet data having a time width t on the line having the transmission speed of Vs (b/s) corresponds to the expected basic packet length in advance (specifically, minimum packet data length converted to one time slot on the common bus in the exchange node) in the exchanged node. In this case, the packet data having time width t on the line having the transmission speed of Vs (b/s) is read at high-speed using one time slot at time tt on the common bus. The data of basic packet length is expanded to bit parallel on the common bus having a parallel bus (bit) configuration at a bit width in basic packet length unit immediately after being stored in the input side line responding buffer of the exchange node, and read at high-speed using one time slot of time (tt). Furthermore, the amount of the priority control processing data (packet data) 36 read at the time of one time slot is independently defined in arbitrary different exchange nodes in the network independent from the speed Vs of the throughput of the transmission line accommodated in the exchange node 201. However, regarding the accommodating line of different speeds in the same exchange node, the data amount to be allocated to one time slot on the common bus and to be the target of routing to the output side direction path are the same. If the required time on the transmission path of the packet data equivalent to the basic data length on the line having transmission speed of vs (b/s) is t, the amount of data that can be read in one time slot in the exchange node becomes $n \times Vs \times tt$ (=$t \times Vs$=basic packet data length). If the packet data length on the line having transmission speed of Vs (b/s) is N times the basic packet length expected by the exchange node in advance, N time slots are used on the common bus and the data is expanded in parallel at high-speed on the common bus and then read, whereby the operation principle of the present invention can be easily applied to the packet data of variable length.

Furthermore, if the priority control processing data 36 continued over a period of time t is present on the transmission path having speed Vs (b/s) of the throughput of the exchange node 201, and all the priority control processing data 36 are multiplexed and converted to the multiplexed data 44 of one time slot on the common bus, the amount of packet data of the priority control processing data 36 per one line when n transmission paths of the same are accommodated becomes $Vs \times t = n \times Vs \times tt = n \times Vs \times (tf/n) = tf \times Vs$. That is, the relationship tf=t is met. Therefore, the time slot allocation circuit 42 preferably has the time tf of one frame of the multiplexed data 44 of the time division multiplexing line and the continuing time t of the priority control processing data 36 such that the time tf and the continuing time t are equal to each other.

Moreover, if the priority control processing data 36 continued over a period of time t is present on the transmission path having speed Vs (b/s) of the throughput of the exchange node 201, and the priority control processing data 36 are multiplexed and converted to the multiplexed data 44 of m number of time slots on the common bus, the amount of packet data of the priority control processing data 36 per one line when n transmission paths of the same are accommodated becomes $Vs \times t = n \times Vs \times tt \times m = n \times Vs \times (tf/n) \times m = tf \times Vs \times m$. That is, the relationship tf=t/m is met. Therefore, the time slot allocation circuit 42 preferably has the time tf of one frame of the multiplexed data 44 of the time division multiplexing line and the continuing time t of the packet data divided by m number of time slots of the multiplexed data 44 converted from the priority control processing data 36 such that the time tf and the continuing time t are equal to each other.

Figure 39:
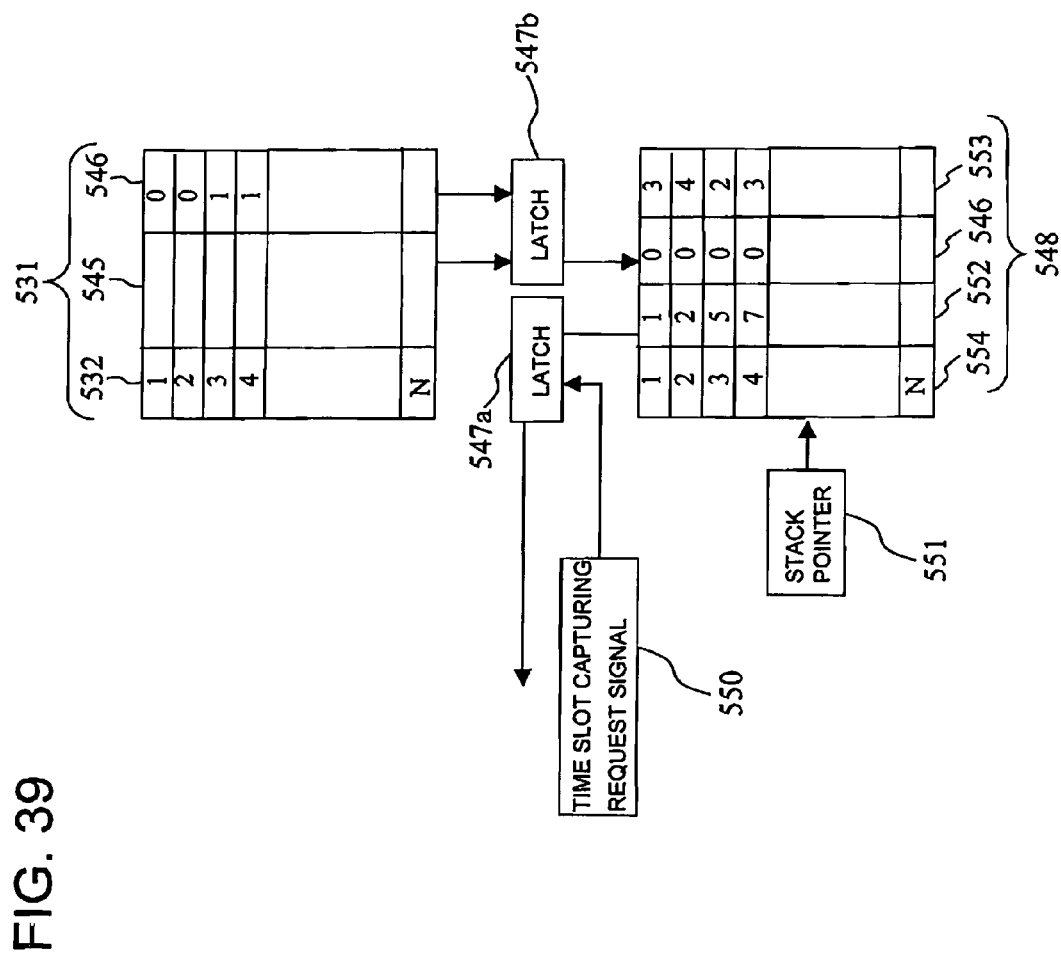
FIG. 39 is a view showing a second example of the flow in which the time slot allocation circuit specifies the time slot.

FIG. 39 is a view showing a second example of the flow in which the time slot allocation circuit specifies the time slot. One example of a mechanism for acquiring one time slot with hardware in the direction of the direction path when the time slot allocation circuit 42 specifies the time slot is shown. In FIG. 39, 531 is the time slot map, 532 is the time slot number, 545 is the connection identifying number, 546 is the used/unused distinction (0/1=used/unused), 547*a* and 547*b* are latches, 548 is the stack memory, 550 is a acquiring request signal of the time slot for every time slot allocation, 551 is the stack pointer, 552 is the empty time slot number, 553 is the output side direction path number, and 554 is the number of empty time slots. The latch 547*a* outputs the time slot number in the node to be allocated. The latch 547*b* outputs the available time slot number. It is enabled if unused "1" with reference to the used/unused distinction 546, and the time slot number 532 which was used "0" in the used/unused distinction 546 is output to the stack memory 548 as the empty time slot number 552. The stack pointer 551 references the used/unused distinction 546 of the stack memory 548. The number of empty time slot numbers 554 can be counted by referencing the stack pointer 551. The time slot acquiring request 550 sends the enable signal until counting of the number of empty time slot numbers 554 is completed.

Figure 40:
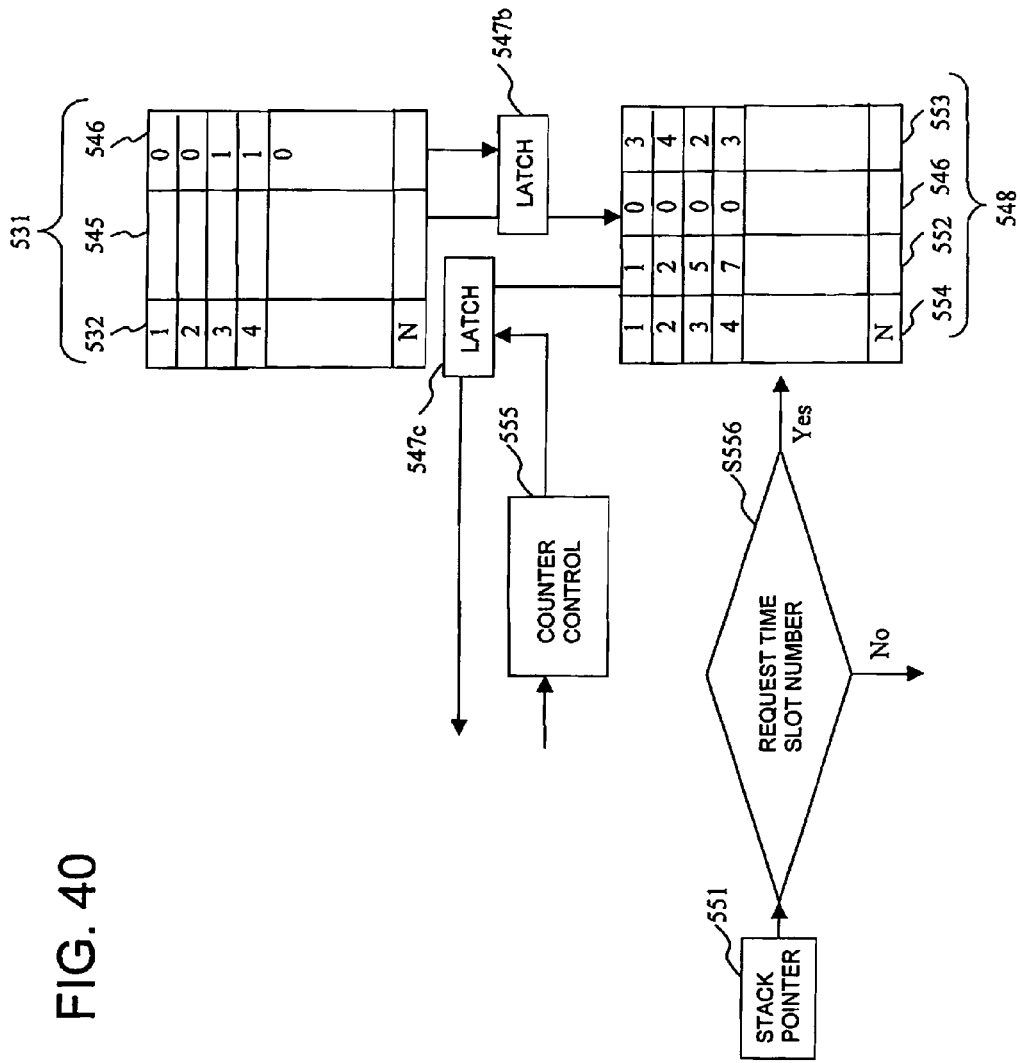
FIG. 40 is a view showing a third example of the flow in which the time slot allocation circuit specifies the time slot.

FIG. 40 is a view showing a third example of the flow in which the time slot allocation circuit specifies the time slot. One example of a mechanism of acquiring a plurality of time slots with hardware in the direction of the direction path when the time slot allocation circuit specifies the time slot is shown. In FIG. 40, 555 is the counter control (subtraction process), S556 is a step for checking whether the output side direction path that matches the request time slot number is present. The counter control 555 acquires the set information (maximum packet length notified in the header information and the like) of the number of time slots requested for every CID (Call ID), and sends the enable signal while in unused "1" until used "0" is counted. The latch 547*c* references the empty time slot number 552 recorded in the stack memory 548, acquires the enable signal from the counter control 555, and outputs the time slot number that can be allocated to the CID. S556 determines whether the output side direction path number that matches the request time slot number referenced by the stacker pointer 551 is present. If the output side direction path number that matches the request time slot number referenced by the stacker pointer 551 is present, the empty slot number 552 recorded in the stack memory 548 is counted. If the output side direction path number that matches the request time slot number referenced by the stacker pointer 551 is not present, the packet referenced by the stacker pointer is discarded.

In either methods of FIG. 39 or FIG. 40, the empty time slot number available in the stack memory can be given characteristic of automatically performing the writing in the stack memory at the FILO base. In controlling, the packets are immediately discarded if sufficient empty time slots are not present in the direction path with respect to the packets requiring a plurality of time slots and the request condition of the packets cannot be responded. Regarding the mechanisms, all the equivalent logic functions may be realized with software logic or may be realized with hardware logic using the superconductive element. Use of superconductive element is desirable for ultra high-speed operation.

The time slot allocation circuit 42 preferably obtains the priority information 21 from the priority determination circuit 20, specifies the time slot according to the priority of the priority information 21, and outputs the time slot specifying signal 43, as shown in FIG. 32. More preferably, the time slot allocation circuit 42 varies the number of time slots according to the priority of the priority information 21. Still more preferably, the time slot allocation circuit 42 specifies the time slot according to the priority with respect to the priority control processing data 36 containing priority information 21 of two or more stages. The priority determination circuit 20 detects the priority contained in the priority control processing data 36, and outputs the priority information 21 to the time slot allocation circuit 42. The priority information 21 is contained in the header of the priority control processing data 36, as shown in FIG. 33. The priority of the priority information 21 may be divided to without priority in which the priority is not particularly indicated and with priority, or may have the priority indicated in a plurality of stages. The time slot allocation circuit 42 specifies the time slot according to the priority information 21 to process the priority control processing data 36 to be priority-controlled without delay. Furthermore, the unused time slot can be efficiently used and the delay time in communication can be reduced since the time slot allocation circuit 42 varies the number of time slots according to the presence of priority or the stages of the priority of the priority information 21.

The time slot allocation circuit 42 outputs the time slot specifying signal 43 to the multiplexing circuit 39 in a constant time from when the input data 31 is input to the input buffer unit 32, and preferentially allocate the time slot of the write destination of the priority control processing data 36 to the time slot allocated for the relevant packet identifying information when the priority control signal 38 of the packet identifying information same as the packet identifying information contained in the time slot information 41 is input. The packet identifying information may be the transmitting address or the destination address. In this case, the time slot information acquiring unit 40 outputs the information of the unused time slot and the packet identifying information allocated to the relevant time slot of the time slot specifying signal 43 from the time slot allocation circuit 42 as the time slot information 41, and after a constant time set in advance has elapsed, erases the packet identifying information allocated to the unused time slot. Therefore, by temporarily providing the time slot group, communication can be subsequently performed in the minimum delay time within the exchange node using the time slot position reserved in advance in the exchange node after the packet of the packet identifying information permitted for allocation arrives at the exchange node. Therefore, communication can be performed with the minimum delay time within the exchange node for the input data 31 of the packet identifying information defined in advance.

The time allocation circuit 42 outputs the time slot specifying signal 43 to the multiplexing circuit 39 in a constant time set in advance, and stores the already allocated time slot as reserved time slot if the priority control processing data 36 which allocation of the time slot is not completed is remaining, and when the priority control signal 38 containing the packet identifying information same as the packet identifying information contained in the priority control processing data 36 allocated with the reserved time slot is input, the remaining time slots are specified to complete the allocation of the time slot of the priority control processing data 36 of the relevant priority control signal 38. Since the input data 31 to which the time slot has been allocated to the middle is effectively used without being discarded, the communication time in the exchange node can be reduced.

The time slot allocation circuit 42 preferably specifies the time slot according to the priority with respect to the priority control processing data 36 containing the priority information 21 of two or more stages. If the priority is two or more stages, the data of high priority is transmitted without delay by specifying the time slot in the order of high priority.

The time slot allocation circuit 42 preferably specifies the time slot irrespective of the communication speed of the transmission path transmitting the input data 31 to the input buffer unit 32. For example, if the communication speed of the transmission path of the input data 31 is Va, the time slot in the time division multiplexing line frame having a communication speed Vb faster than Va is specified. In the communication between the relay nodes, the data communication may be performed with the communication speed changed, where if the transmission path of a certain communication speed has traffic congestion, such traffic path is avoided thereby reducing the delay time of the entire communication network.

The time slot allocation circuit 42 preferably specifies the number of time slots according to the length of the priority control processing data 36. The time slot allocation circuit 42 is input with the priority control processing data 36 from the distribution unit 35, and obtains the information on the length of the priority control processing data 36 contained in the header of the priority control processing data 36. The information on the length of the priority control processing data 36 may be contained in the input data 31 from the beginning. When writing the input data 31 to the shift register in the input buffer unit 32, a counter is arranged in the input buffer unit 32 and the information on the length of the data is detected, and the information on the length of the data is input to the distribution unit 35 and the information on the length of the data may be written in the header of the priority control processing data 36 output from the distribution unit 35. If the priority control processing data 36 exceeds the amount of data that can be written in one time slot, an appropriate number of time slots is specified with respect to the length of the priority control processing data 36 to use one frame of the time division multiplexing line without waste. The delay time in communication is reduced.

The time slot allocation circuit 42 outputs a "time-series order" of each time slot as a "time-series order" of time slot signal 22 to the multiplexing circuit 39 when specifying a plurality of time slots for the priority control processing data 36. If the priority control processing data 36 exceeds the amount of data that can be written in one time slot and a plurality of time slots are to be specified, the time slot time-series signal 22 indicating which number in the "time-series order" each time slot to be specified corresponds to is output to the multiplexing circuit 39. The time slot allocation circuit 42 is input with the priority control processing data 36 from the distribution unit 35 and obtains the information on the length of the priority control processing data 36 at the header of the priority control processing data 36. The information on the length of the priority control processing data 36 and the amount of data that can be written per one time slot are compared, and a plurality of time slots are specified if the data mount of the priority control processing data 36 is larger. The "time-series order" of time slot signal 22 is defined for each of the plurality of time slots, and output to the multiplexing circuit 39. Reordering is thereby facilitated when an external exchange node or terminal receives the output of the exchange node of the present invention.

The time slot allocation circuit 42 preferably resets the specification of the time slot after a predetermined time has elapsed from the specification of the time slot. After the time slot is specified, the specification of the time slot may be reset by the priority control release signal contained in the priority control signal 38. Moreover, after specifying the time slot, the specification of the time slot may be reset by writing another packet data to the input buffer unit 32. A state in which the time slot cannot be specified although it is in the unused state is avoided by resetting the information of the time slot specified by the time slot allocation circuit 42. Resetting of the information of the time slot is performed by having the usage information of the time slot of the above described time slot map unused.

A priority determination circuit 20 for detecting the priority contained in the priority control processing data 36 and outputting the priority information 21 to the time slot allocation circuit 42 is preferably further arranged. In this case, the time slot allocation circuit 42 preferably varies the number of time slots specified according to the priority of the priority information 21. Since specification is made by distinguishing the number of time slots to the data having priority and data not having priority, the empty time slots are efficiently used, and the delay time in communication can be reduced.

The time slot information acquiring unit 40, which is input with the time slot specifying signal 43 from the time slot allocation circuit 42, monitors the allocation state of the time slot, and outputs the unused time slot information 41 to the time slot allocation circuit 42. In monitoring the allocation state of the time slot, the usage rate can be estimated by searching for the empty slot of the time slot map.

The multiplexing circuit 39 is input with the priority control data 36 from the distribution unit 35. The time slot specifying signal 43 and the "time-series order" of time slot signal 22 are also input from the time slot allocation circuit 42. The priority control processing data 36 is written in the shift register equivalent to the time slot specified by the input time slot specifying signal 43. After the writing of the priority control processing data 36 is completed, the multiplexed data 44 is output. Since the priority control processing data 36 is written in the specified time slot, as necessary, the buffer of the priority control processing data 36 is not necessary, and waiting time until multiplexing process is also not necessary. Therefore, the delay time in communication can be reduced. The multiplexing circuit 39 preferably includes a plurality of shift registers which can perform parallel processing. If the data amount of the priority control processing data 36 is large and is to be written in a plurality of time slots, the priority control processing data 36 is divided and respectively written in different shift registers at the same time, whereby the delay time in communication is reduced.

If the priority determination circuit 20 is further arranged, the multiplexing circuit 39 preferably writes the priority control processing data 36 in the order of the "time-series order" of time slot signal 22. The multiplexing circuit 39 writes the priority control processing data 36 divided in "time-series order". Therefore, reordering is thereby facilitated when an external exchange node or terminal receives the output of the exchange node of the present invention, and the damage of the data can be avoided.

A shift register 51 for storing the priority control processing data 36 output from the distribution unit 35, and outputting the priority control processing data 36 to the multiplexing circuit 39 when the time slot specifying signal 43 is input from the time slot allocation circuit 42 is preferably further arranged. Since the shift register for temporarily storing the priority control processing data 36 is further arranged, a waiting adjustment of very small time can be performed even if a slight delay occurs in the process in the time slot allocation circuit 42 or the time slot information acquiring unit 40.

The exchange node control method of the exchange node 201 according to the present embodiment includes an input step, a distribution step, an identification step, a time slot allocation step, a time slot information acquiring step, and a multiplexing step. More preferably, the method includes a priority determination step.

In the input step, the input buffer unit 32 writes the input data 31 which is the connectionless type packet data to the shift register, and outputs the input buffer data 33 at the completion of the writing of the input data 31. The input buffer unit 32 may further write the connectionless type packet data to the shift register.

In the distribution step, the distribution unit 35, which is input with the input buffer data 33 output in the input step, outputs the input buffer data 33 output in the input step as the priority control processing data 36 by the priority control signal 38 instructing that the input data 31 input in the input step is the priority control processing data 36.

In the identifying step, the identification unit 37 identifies the priority control signal 38 contained in the input data 31 input in the input step, and outputs the priority control signal 38 to the distribution unit 35.

In the time slot allocation step, the time slot allocation circuit 42 obtains the time slot information 41 indicating that the time slot for writing the priority control processing data 36 is unused and the priority control signal 38 from the identification unit 37, and outputs the time slot specifying signal 43 specifying the time slot of the write destination of the priority control processing data 36 from the unused time slots. The output of the time slot specifying signal 43 is performed when constant time is reached. The output of the time slot specifying signal 43 may be performed when all the allocating destinations of the priority control processing data 36 to be allocated with the time slot are allocated. Until then, the process proceeds to the time slot information acquiring step after the time slot is allocated.

In the time slot information acquiring step, the time slot information acquiring unit 40 outputs the information on the unused time slot of the time slot specifying signal 43 output in the time slot allocation step as the time slot information 41. After the output as the time slot information 41, the process returns to the time slot allocation step, and allocation of the time slot is again performed.

In the time slot allocation step, the time slot allocation circuit 42 outputs the time slot specifying signal 43 to the multiplexing circuit 39 at the constant time from when the input data 31 is input to the input buffer unit 32, and when the priority control signal 38 of the packet identifying information same as the packet identifying information contained in the time slot information 41 is input, preferentially allocates the time slot of write destination of the priority control processing data 36 to the time slot allocated with the packet identifying information. In this case, in the time slot information acquiring step, the time slot information acquiring unit 40 outputs the unused time slot information and the packet identifying information allocated to the relevant time slot of the time slot specifying signal 43 output in the time slot allocation step as the time slot information 41, and after a constant time set in advance has elapsed, the packet identifying information allocated to the unused time slot is erased. Therefore, by temporarily providing the time slot group, communication can be subsequently performed in the minimum delay time within the exchange node using the time slot position reserved in advance in the exchange node after the packet of the packet identifying information permitted for allocation arrives at the exchange node. Therefore, communication can be performed with the minimum delay time within the exchange node for the input data 31 of the packet identifying information defined in advance.

In the time slot allocation step, the time allocation circuit 42 outputs the time slot specifying signal 43 to the multiplexing circuit 39 in a constant time set in advance, and stores the time slot of the priority control processing data 36 which allocation to the time slot is not completed as reserved time slot, and when the priority control signal 38 containing the packet identifying information same as the packet identifying information contained in the priority control processing data 36 allocated with the reserved time slot is input, the remaining time slots are specified to complete the allocation of the time slot of the priority control processing data 36 of the relevant priority control signal 38. Since the input data 31 to which the time slot has been allocated to the middle is effectively used without being discarded, the communication time in the exchange node can be reduced.

The priority determination circuit 20 further includes a priority control determination step of detecting the priority contained in the priority control processing data 36, and outputting the priority information 21 to the time slot allocation circuit 42. In this case, in the time slot allocation step, the time slot allocation circuit 42 preferably specifies the time slot according to the priority of the priority information 21 of two or more stages. If the priority is two or more stages, the data of high priority is transmitted without delay by specifying the time slot in the order of high priority.

Furthermore, in the time slot allocation step, the time slot allocation circuit 42 preferably varies the number of time slots specified according to the priority of the priority information 21. If the priority control processing data 36 exceeds the amount of data that can be written in one time slot, one frame of the time division multiplexing line is used without waste by specifying an appropriate number of time slots with respect to the length of the priority control processing data 36. The delay time in communication is thereby reduced.

In the time slot allocation step, the time slot allocation circuit 42 preferably specifies the time slot according to the priority with respect to the priority control processing data 36 containing the priority information 21 of two or more stages. If the priority is two or more stages, the data of high priority is transmitted without delay by specifying the time slot in the order of high priority.

In the time slot allocation step, the time slot allocation circuit 42 preferably specifies the number of time slots specified according to the length of the priority control processing data 36. If the priority control processing data 36 exceeds the amount of data that can be written in one time slot, one frame of the time division multiplexing line is used without waste by specifying an appropriate number of time slots with respect to the length of the priority control processing data 36. The delay time in communication is thereby reduced.

In the time slot allocation step, the time slot allocation circuit 42 preferably specifies the time slot regardless of the communication speed of inputting the input data 31 to the input buffer unit 32. The priority control processing data 36 is written irrespective of the communication speed of the transmission path of the input data 31, and output to the transmission path of different communication speed. Therefore, transmission at a maximum value of the physical line speed is possible in the communication between the relay nodes and the like depending on the traffic congestion. Therefore, when the transmission path of a certain communication speed has traffic congestion, such traffic congestion can be avoided thereby reducing the delay time of the entire communication network.

In the time slot allocation step, the time slot allocation circuit 42 preferably outputs the "time-series order" of each time slot to the multiplexing circuit 39 as the "time-series order" of time slot signal 22 when specifying a plurality of time slots for the priority control processing data 36. In this case, the multiplexing circuit preferably writes the priority control processing data 36 in the order of the "time-series order" of time slot signal 22. If the priority control processing data 36 exceeds the amount of data that can be written in one time slot and a plurality of time slots is specified, the "time-series order" of time slot signal 22 indicating to which number of the "time-series order" each specified time slot corresponds to the multiplexing circuit 39. The multiplexing circuit 39 writes the priority control processing data 36 divided in "time-series order". Therefore, reordering is thereby facilitated when an external exchange node or terminal receives the output of the exchange node 201 of the present invention, and the damage of the data can be avoided.

In the time slot allocation step, the time slot allocation circuit 42 preferably resets the specification of the time slot when a predetermined time has elapsed after the specification of the time slot. The time slot information 41 specified by the time slot allocation circuit 42 is reset after a predetermined time has elapsed to avoid a state in which the time slot cannot be specified although it is in an empty state.

In the time slot allocation step, the time slot allocation circuit 42 preferably resets the specification of the time slot by the priority control release signal contained in the priority control signal 38 after the specification of the time slot. The priority control release signal is contained in the priority control signal 38, and is identified to reset the time slot information 41 specified by the time slot allocation circuit 42, so that a state in which the time slot in the empty state cannot be specified is avoided.

In the time slot allocation step the time slot allocation circuit preferably resets specification of the time slot by writing another packet data to the input buffer unit 32 after specifying the time slot. When reset each time other packet data is input to the exchange node, a state in which the time slot in the empty state cannot be specified for every input data 31 is avoided.

In the multiplexing step, the multiplexing circuit 39 writes the priority control processing data 36 output in the distribution step to the shift register allocated by the time slot specifying signal 43 output in the time slot allocation step, and outputs the multiplexed data 44 at the completion of the writing of the priority control processing data 36.

In the multiplexing step, the multiplexing circuit 39 preferably includes a write step of writing the data to a plurality of shift registers which can perform parallel processing. The priority control processing data 36 having large amount of data is thereby divided and simultaneously multiplexed in parallel, whereby the delay time in communication is reduced.

Figure 41:
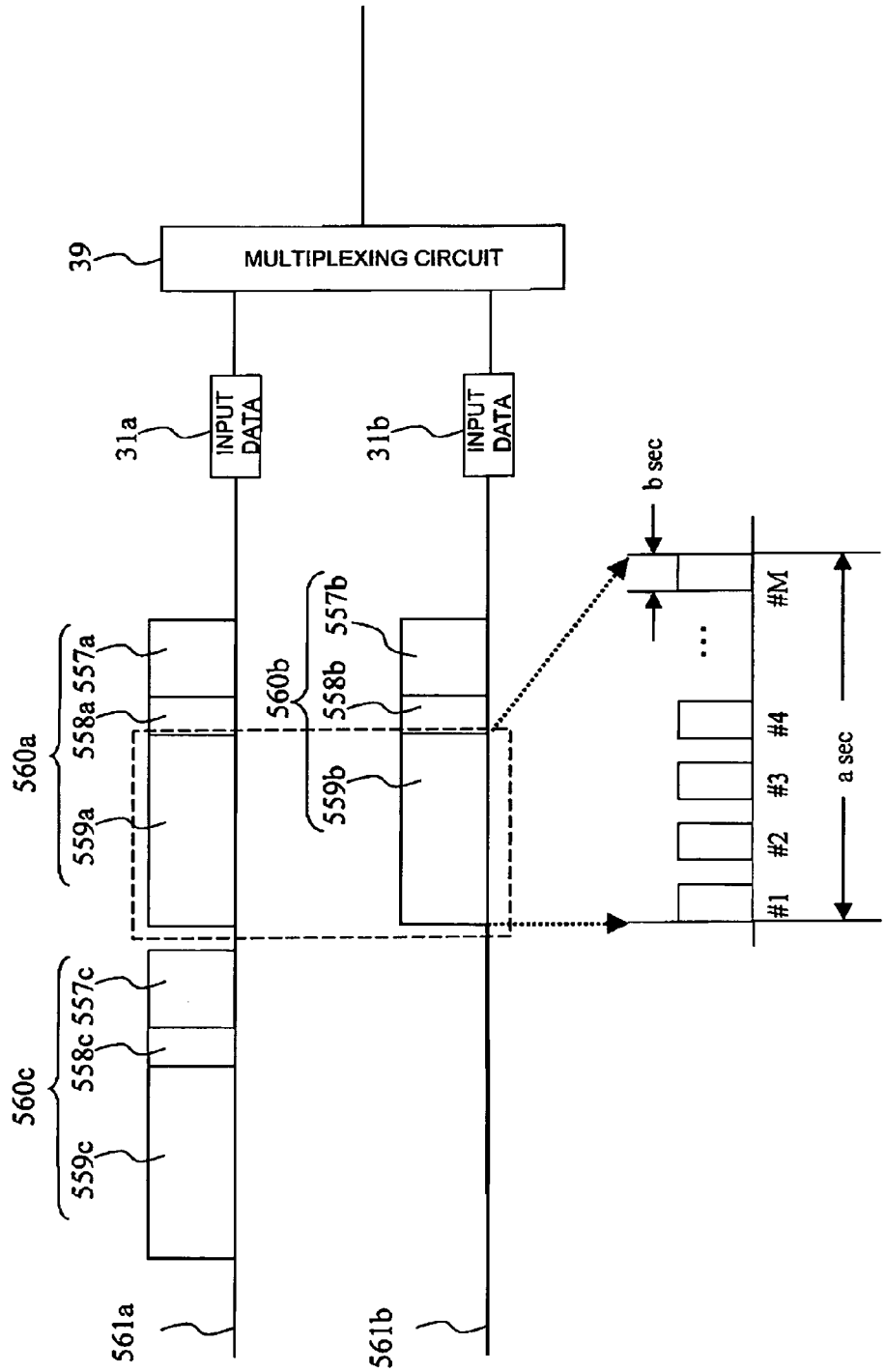
FIG. 41 is a schematic view of an exchange node according to a seventh embodiment.

The operation of the exchange node 201 according to the present embodiment will be described using FIG. 41. FIG. 41 is a schematic view of the exchange node according to the present embodiment. In FIGS. 41, 31*a* and 31*b* are input buffer circuits, 39 is a multiplexing circuit, 557*a*, 557*b* and 557*c* are headers, 558*a*, 558*b* and 558*c* are identifiers, 559*a*, 559*b* and 559*c* are data, 560*a*, 560*b*, and 560*c* are packet data, and 561*a* and 561*b* are multiplexing lines. The packet data 560*a* includes the header 557*a*, the identifier 558*a*, and the data 559a. The packet data 560b contains the header 557b, the identifier 558b and the data 559b. The packet data 560c contains the header 557c, the identifier 558c and the data 559c. The packet data 560a and the packet data 560c are input to the input buffer circuit 31a from the first multiplexing line 561a. The packet data 560b is input to the input buffer circuit 31b from the $m^{th}$ multiplexing line 561b. The timing at which the packet data 560a is input to the input buffer circuit 31a and the timing at which the packet data 560b is input to the input buffer circuit 31b are substantially the same. The time slot allocation circuit preferably allocates the time slot number corresponding to the output side direction path number before multiplexing output to the input packet common bus with respect to the packet data requiring priority control added with the priority control bit even for the connectionless control packet based on the header information of the arriving IP packet.

For example, when the transmission speed of all the lines is assumed as A1 to simplify the description, the required time slot number is allocated and the multiplexing control is performed in the exchange node within the time where the packet data of minimum size is stored in the line input unit if the packet data on the line speed A1 is the minimum size (e.g., 64 bytes). That is, assume the exchange node has m number of transmission lines of the same line speed A1. The operation that satisfies the following conditions is preferable.

The first condition assumes that the minimum value of the portion (e.g., protocol data unit) excluding the header part of the packet transmitted on each line is 64 bytes. The second conditions assumes that the time required to transfer the data of 64 bytes to the input buffer is (64×8)/A1=a(s) since the required time per 1 bit on the line speed A1 is 1/A1($b$/s). For simplification, the multiplexing bus in the exchange node is assumed as parallel bus in units of 64 bytes, and one time slot is allocated for the relevant data length.

The third condition is a temporal condition that is the most severe when allocating the desired time slot number to all the input packets using the analysis result of the header information, and completing the multiplexing control of all the relevant packet data to the desired time slot position on the common bus during the transfer to the input buffer of the relevant packet data for each line when, for example, the packet of 64 bytes length of minimum size arrives at the exchange node simultaneously on m number of lines having the transmission speed of A1 (b/s) regarding the estimation of the processing time amount D (equivalent to number of executing processing steps when assuming software process) when executing the search and allocation process of the desired time slot required by the respective input packet due to program control in the exchange node or the logic control by hardware.

For simplification, in the fourth condition, assuming that only one time slot for each packet of 64 bytes length of minimum size is searched and different time slots on all accommodating lines are simultaneously allocation-processed, a/m>D is met regarding the time D required in the time slot search and the allocation process, and the time D required in the time slot search and the allocation process is preferably performed in a time shorter than a/m. If the time of one frame configuring the time slot group on the common bus is f(s), the total number of time slots multiplexed in f(s) of one frame is M, and the number of accommodating lines is m, f/(a/m)=M, and the relationship M=(mf)/a is met.

According to the explanation of the fourth condition, since a/m>D, a/m=f/M>D is obtained, and the relationship f/D>M is obtained, which matches the basic assumption. Therefore, the allocation of the time slot is constantly possible at real time with respect to the data on arbitrary m number of the same lines if the program processing operation or the hardware logic circuit operation that meets a/m>D regarding the time D required for the time slot search and the allocation process is realized.

If the above four conditions are executed, great delay time is resolved and real time property is guaranteed even for the connectionless type communication based on priority control. Since the time slot allocation control of simultaneously executing the time slot allocation and the time slot release processes in the range of the clock operation of #M cycles is required, the header information of the input data 31 is notified to the time slot allocation circuit, and the allocation of the time slot only needs to be completed before the writing in the input buffer unit of the data part of the input packet is completed. If the processing speed of the superconductive element for realization is slightly not met, a shift register for buffer processing may be arranged before the multiplexing circuit to compensate for the relevant time, and a waiting adjustment of very small time may be performed. Even if the shift register is introduced, the real time property in the connectionless type communication in the present embodiment is guaranteed.

Generally, similar result is obtained even if the line speed Ai (b/s) of the $i^{th}$ line is different. If the minimum data size on the respective line A1 is Bi bytes, assuming that the logic operation of d step is required when performing the allocation process of the time slot simultaneously on all the accommodating lines (total number of lines N), the average required time e required for each process step in the d step is preferably expressed as:

$$e < \min_{i=1,2,\ldots N} \{B(i)/A(i)\}/(N \times d) \qquad [\text{Eq. 2}]$$

This equation assumes that the time slot management is collectively performed on the input packet on all the input lines, but the request operation speed of the hardware may be alleviated by dispersing the processing method in parallel. Furthermore, if N lines for inputting the input data 31 to the input buffer unit 32 are present, the line speed of the $i^{th}$ (i is an integer from 1 to N) of the relevant line is A(i), the minimum size of the $i^{th}$ packet data of the relevant line is B(i), and the number of executing processes until allocating the time slot of the time slot allocation process 42 is d step, the time slot allocation circuit 42 preferably performs the allocation of the time slot of the time slot allocation circuit 42 from when the input data 31 is input to the input buffer unit 32 at a time shorter than equation 2. If the time slot allocation time e of the time slot allocation circuit 42 meets equation 2, the communication is performed in the exchange node at minimum delay time.

As described above, the exchange node 201 according to the present embodiment identifies the priority control signal 38 contained in the header information of the packet data and allocates the time slot, and thus can perform the allocation of the time slot before all the data of the packet data, which header information has been received, are input to the input buffer unit 32. Moreover, since the priority control processing data 36 is preferentially processed, the time slot information 41 monitored by the time slot information acquiring unit 40 is obtained and the unused time slot is specified as the write destination of the priority control processing data, the buffer for the data processing inside the exchange node is not necessary, and the delay time in communication can be reduced.

Eighth Embodiment

Figure 42:
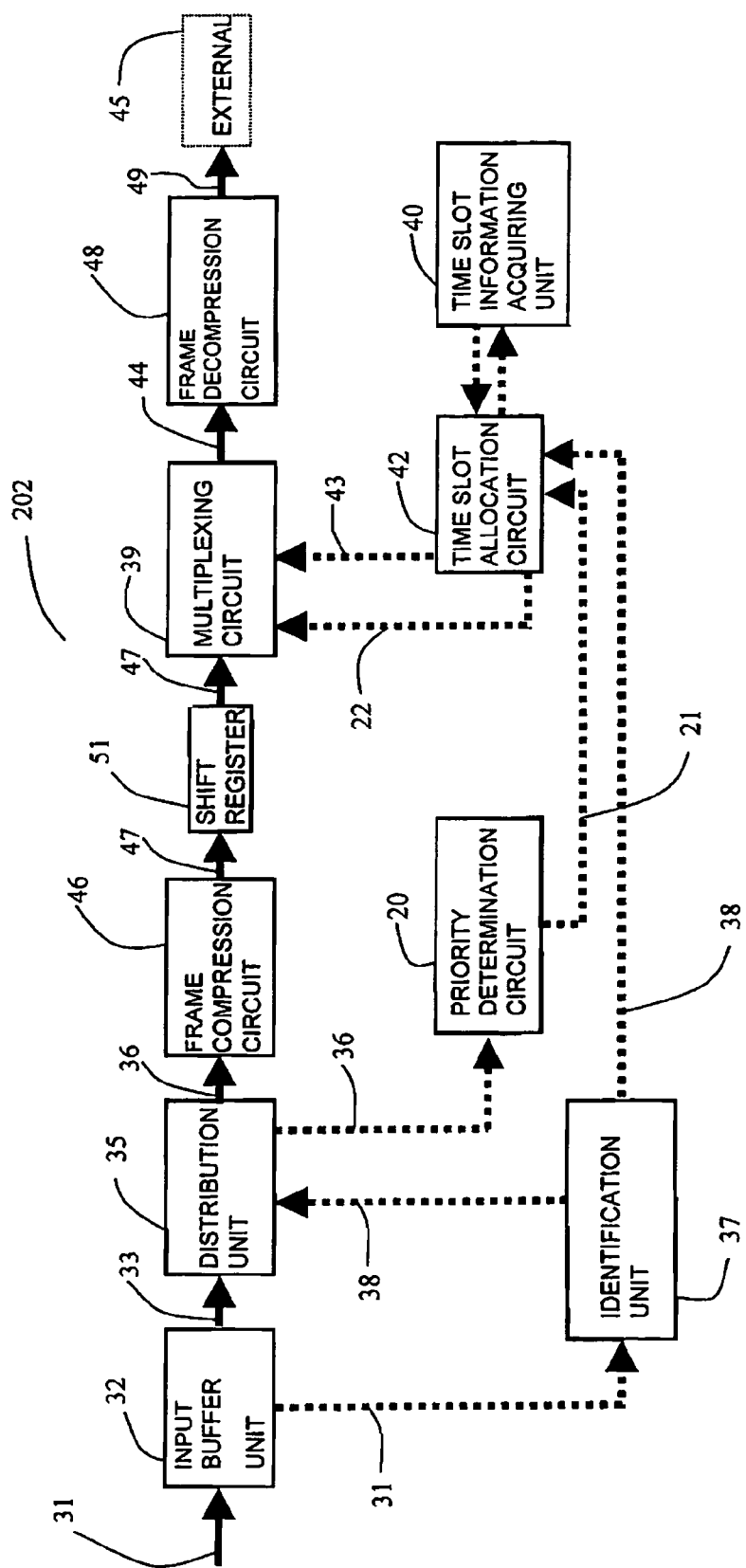
FIG. 42 is a schematic view showing one form of an exchange node according to an eighth embodiment.

FIG. 42 is a schematic view showing one form of an exchange node according to the present embodiment. The difference in configuration from the exchange node 201 according to the seventh embodiment is that a frame compression circuit 46 and a frame decompression circuit 48 are further arranged. The frame compression circuit 46, which is input with the priority control processing data 36 from the distribution unit 35, compresses the time width of the priority control processing data 36 and outputs compressed data 47. The multiplexing circuit 39, which is input with the compressed data 47 as opposed to the priority control processing data 36 of the exchange node 201 according to the seventh embodiment, outputs the multiplexed data 44 by the time slot specifying signal 43 and the "time-series order" of time slot signal 22 from the time slot allocation circuit 42. The frame decompression circuit 48, which is input with the multiplexed data 44 from the multiplexing circuit 39, decompresses the time width of the multiplexed data 44 and outputs decompressed data 49.

A great number of time slots are formed in one frame of the time division multiplexing line by compressing the time width of the priority control processing data 36 by the frame compression circuit 46, whereby a great amount of data can be multiplexed in a short time and the delay time in communication is reduced. The number of connections of the input side transmission path can be increased since the time slot in one frame can be increased. The delay time in communication is thereby reduced. The frame compression circuit 46 also performs the operation of the multiplexing circuit 39 of multiplexing the compressed data 47 in the exchange node 202 according to the present embodiment of FIG. 42, but the frame compression circuit 46 and the multiplexing circuit 39 may be separate configurations. The operations and effects of the exchange node 202 according to the present embodiment are the same as those of the exchange node 201 according to the seventh embodiment other than those of the frame compression circuit 46 and the frame decompression circuit 48. Therefore, frame compression circuit 46 and the frame decompression circuit 48 will be specifically described below.

Figure 43:
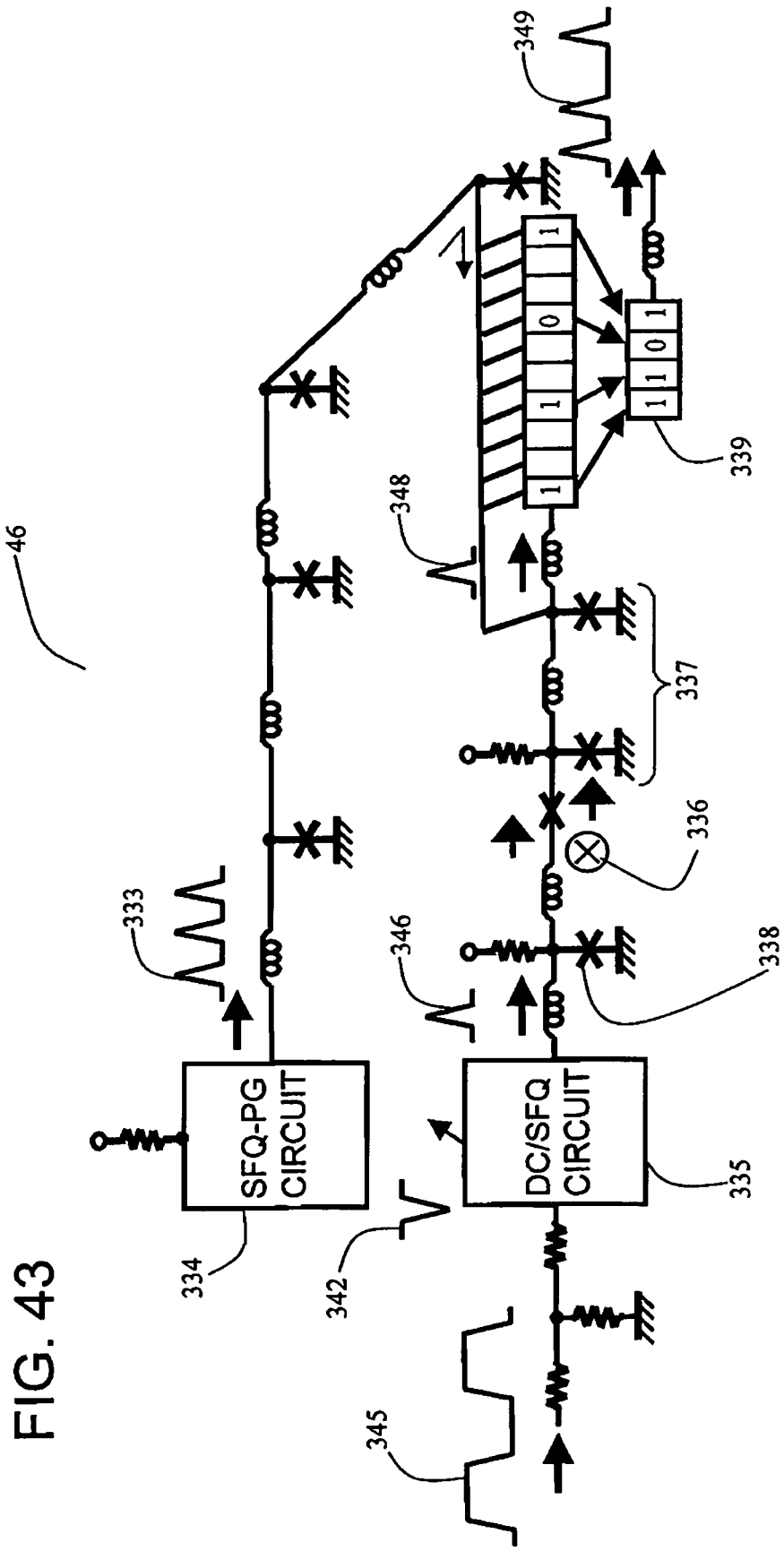
FIG. 43 is a schematic view showing the configuration of a frame compression circuit.

One example of the configuration of the frame compression circuit 46 is shown in FIG. 43. The frame compression circuit 46 of FIG. 43 is configured by a superconductive SFQ circuit. The frame compression circuit 46 is configured by the superconductive SFQ circuit in FIG. 43, but may be configured by a semiconductor circuit. The degree of compression can be enhanced and a great number of time slots can be formed in one frame of the time division multiplexing line by configuring the frame compression circuit 46 with the superconductive SFQ circuit as opposed to being configured with the semiconductor circuit. SFQ is an abbreviation for Single Flux Quantum, which means a single magnetic flux quantum. The magnetic flux is quantized in terms of quantum mechanic in a space surrounded by superconductors, and acts as particles that can be counted as one, two etc. This is the magnetic flux quantum. The logic circuit having the magnetic flux quantum as information carrier is the SFQ logic circuit. In the majority of the semiconductor logic circuits, the high and low of the output voltage level corresponds to "1" and "0" of logic, whereas in the SFQ logic circuit, the presence of SFQ corresponds to "1" and "0" of logic. The SFQ circuit is configured by a superconductive circuit including a Josephson junction, and operates at a high-speed clock of a few 100 GHz. The SFQ circuit has a superior feature in that the power consumption at a certain point in time is lower by about three digits compared to the semiconductor circuit. The logic operation is performed at a very sharp pulse of pulse width of about one picosecond generated with SFQ in the SFQ circuit. The X mark in FIG. 43 is the Josephson junction element, which is an active device equivalent to the transistor of the semiconductor circuit. DC/SFQ (Direct Current/Single Flux Quantum) circuit of FIG. 43 is a pulse width conversion circuit that converts the pulse train from the semiconductor circuit having a pulse width of a few 100 ps to a pulse train having a narrow pulse width of about 1 ps. SFQ-PG (Single Flux Quantum-Pulse Generator) of FIG. 43 is an SFQ pulse generator that generates a high-speed clock pulse train for synchronously operating the circuit. The D-F/F (Delay Flip-Flop) circuit is a delay flip-flop. The frame compression unit temporally compresses the packet which is a pulse train of narrow width, and outputs the pulse of short time length. In FIG. 43, 345 is the input pulse, 342 is the reset pulse, 333 is the clock pulse, 334 is the SFQ-PG, 335 is the DC/SFQ circuit, 336 is the SFQ circuit, 337 is the D-F/F circuit, 338 is the Josephson junction element, 339 is the frame compression unit, 346 is the DC-SFQ output, 348 is the D-F/F circuit output and 349 is the output of the frame compression circuit.

Figure 44:
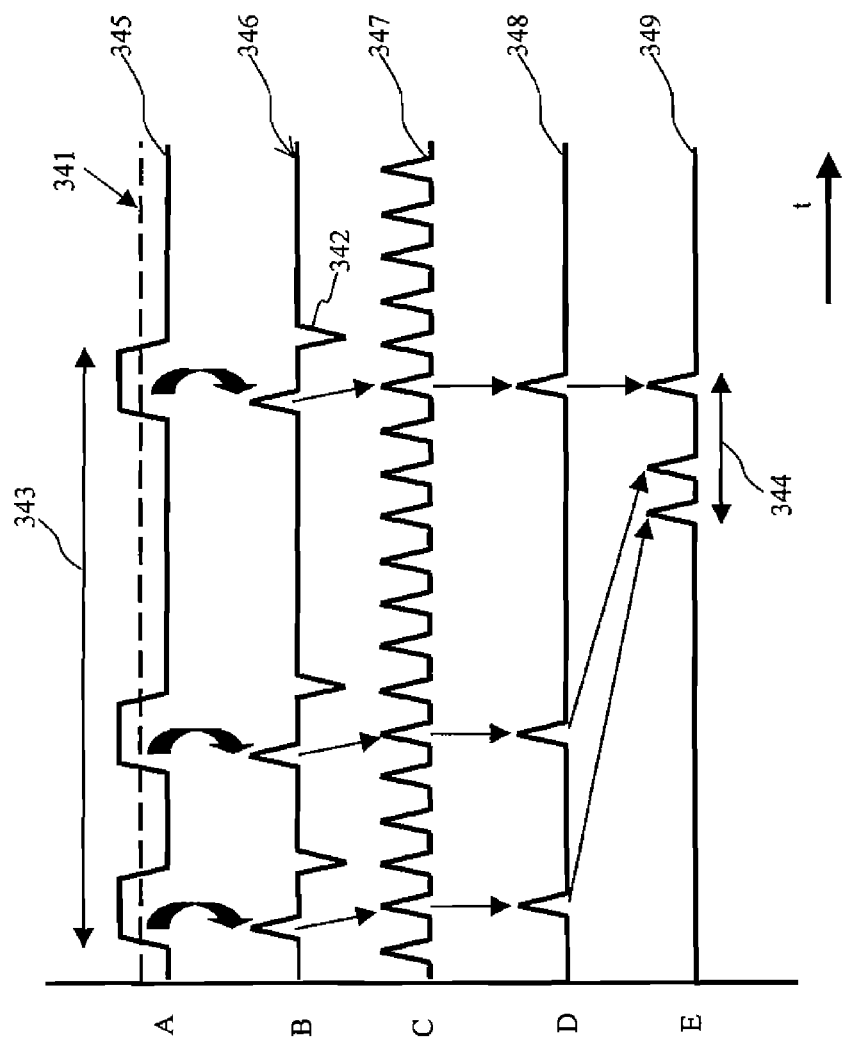
FIG. 44 is a view showing a timing chart of the frame compression circuit.

FIG. 44 shows one example of a timing chart of the frame compression circuit 46. The horizontal axis is the time axis. A is the pulse train of the priority control processing data 36. B is the output from the DC/SFQ circuit. A sharp SFQ pulse corresponding to the data of A is output from the DC/SFQ circuit. C is the output of the SFQ-PG circuit. This is the high-speed repetitive pulse train that becomes the synchronous signal of the entire circuit. D is the output of the D-F/F circuit which is the delay flip-flop. The train of SFQ pulse of B is output in synchronization with the clock pulse of C. E is the output of the frame compression unit. The temporally sparse pulse train output from the D-F/F circuit is compressed on the time axis by the frame compression unit, and output as dense pulse train in the short frame length. In FIG. 44, 341 is the threshold value of DC/SFQ, 342 is the reset pulse, 343 is the frame length (before compression), 344 is the frame length (after compression), 345 is the input pulse train, 346 is the output of the DC/SFQ circuit, 347 is the clock pulse train, 348 is the output of the D-F/F circuit, 349 is the output of the frame compression circuit, and t is time.

Figure 45:
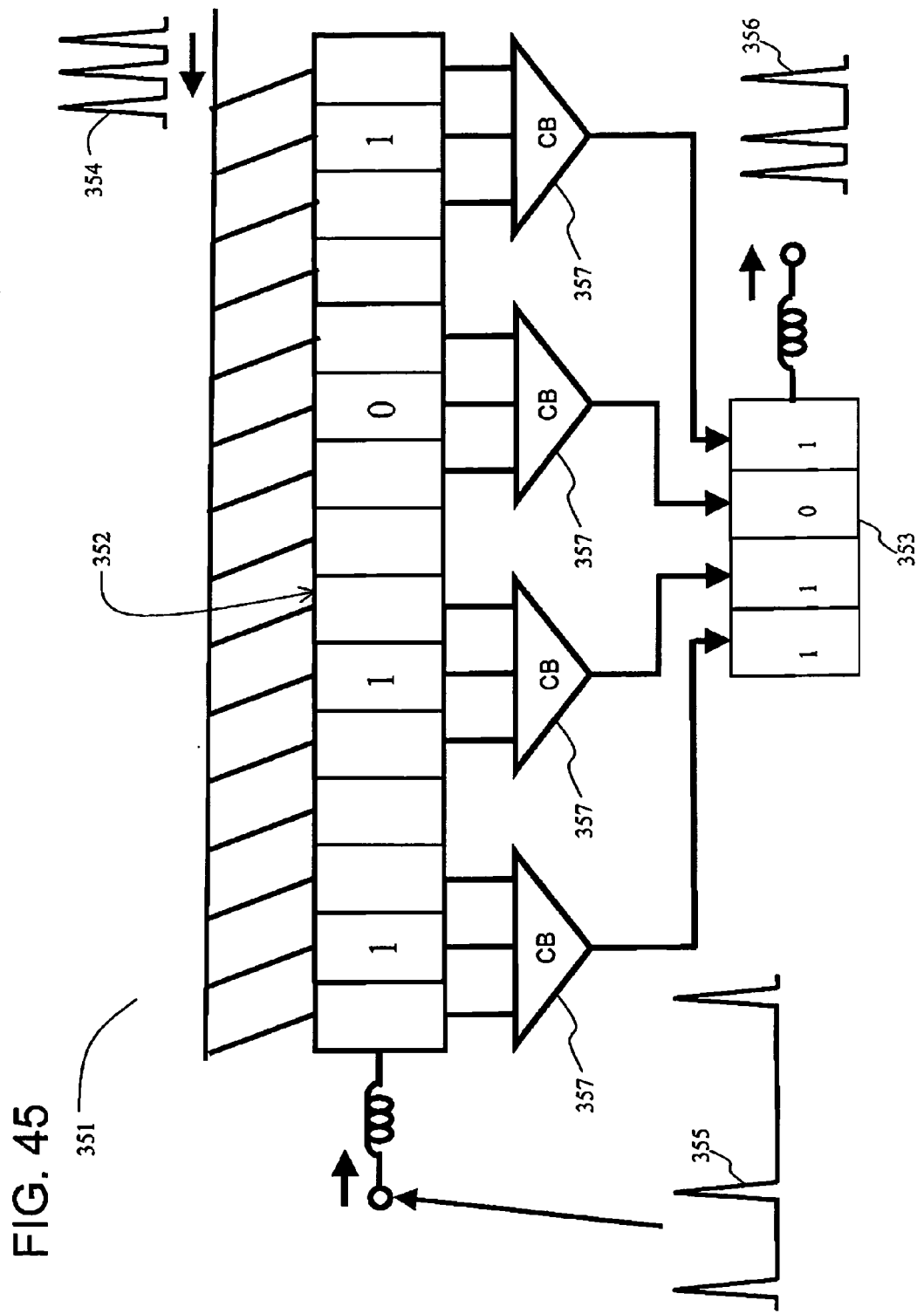
FIG. 45 is a schematic view showing a configuration of a frame compression unit of the frame compression circuit.

FIG. 45 shows one example of the configuration of the frame compression unit. The frame compression unit is configured by two tapped SFQ shift registers. The shift registers are the shift register of serial input parallel output on the input side and the shift register of parallel input serial output on the output side. The input side shift register is a register of long bit length (time length) of before the compression and the output side shift register is a register of short bit length (time length) of after the compression. The parallel tap of the two registers are connected by way of a merging circuit of the SFQ at the multiplexing unit referred to as confluence buffer (CB) for every few bits. The D-F/F output or the pulse train before compression is input, and the frame compression unit output which is the pulse train after compression is output. Merging is carried out at every few bits to absorb the jitter in the clock pulse of the SFQ pulse generated in the DC/SFQ. In FIG. 45, 351 is the frame compression unit, 352 is the serial input/parallel output register, 353 is the parallel input serial output register, 354 is the clock pulse, 355 is the D-F/F circuit output (before compression), 356 is the frame compression unit output (after compression), and 357 is the CB.

Figure 46:
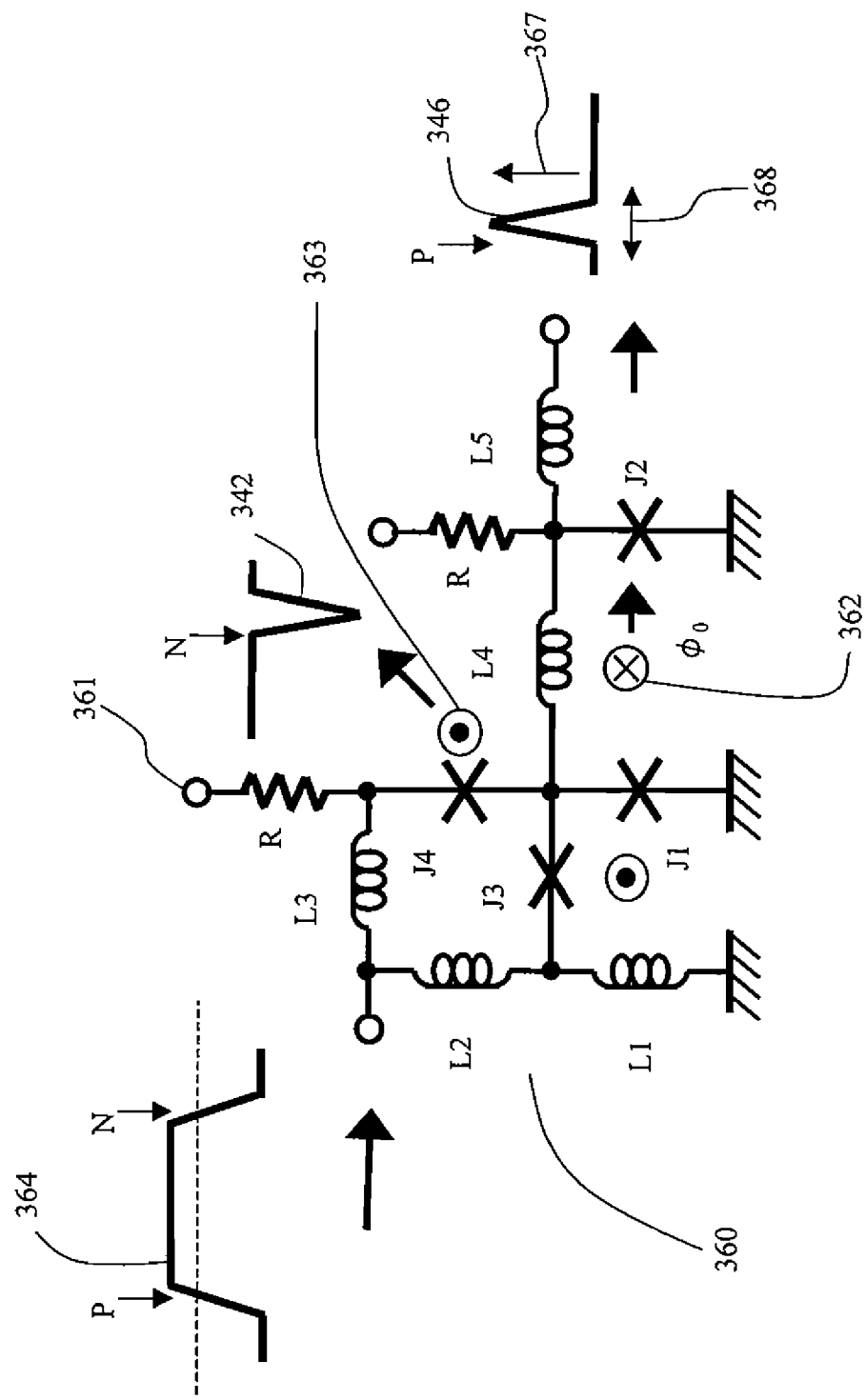
FIG. 46 is a schematic view showing a configuration of a DC/SFQ circuit of the frame compression circuit.

FIG. 46 shows one example of the configuration of the DC/SFQ circuit. In FIG. 46, R is the resistor, L1 to L5 are inductance of superconductors, Φ0 is the magnetic flux quantum, J1 to J4 are Josephson junction elements, P is the leading edge of the input pulse and N is the trailing edge of the input pulse. The priority control processing data 36 in which the width to be input is wide and leading edge/trailing edge gradually changes is input, and then differentiated to be converted to the pulse of sharp and narrow width, the leading edge P of the pulse is output as the DC/SFQ data output, and the trailing edge N of the pulse is output as the DC/SFQ reset output. The SFQ pulse is output from the Josephson junction J2 in response to the DC/SFQ data output, and the SFQ pulse of reverse polarity is discharged from the Josephson junction J4 in response to the DC/SFQ reset output. In FIG. 46, 360 is the DC/SFQ circuit, 361 is the bias current, 362 is the SFQ circuit, 363 is the SFQ circuit of reverse polarity, 364 is the priority control processing data, 342 is the reset pulse of the DC/SFQ, 346 is the DC/SFQ data output, 367 is the signal amplitude of the output pulse, and 368 is the output pulse width. The DC/SFQ data output 346 has a signal amplitude 367 of the output pulse of about 1 mV, and the output pulse width 368 of about 2 psec.

Figure 47:
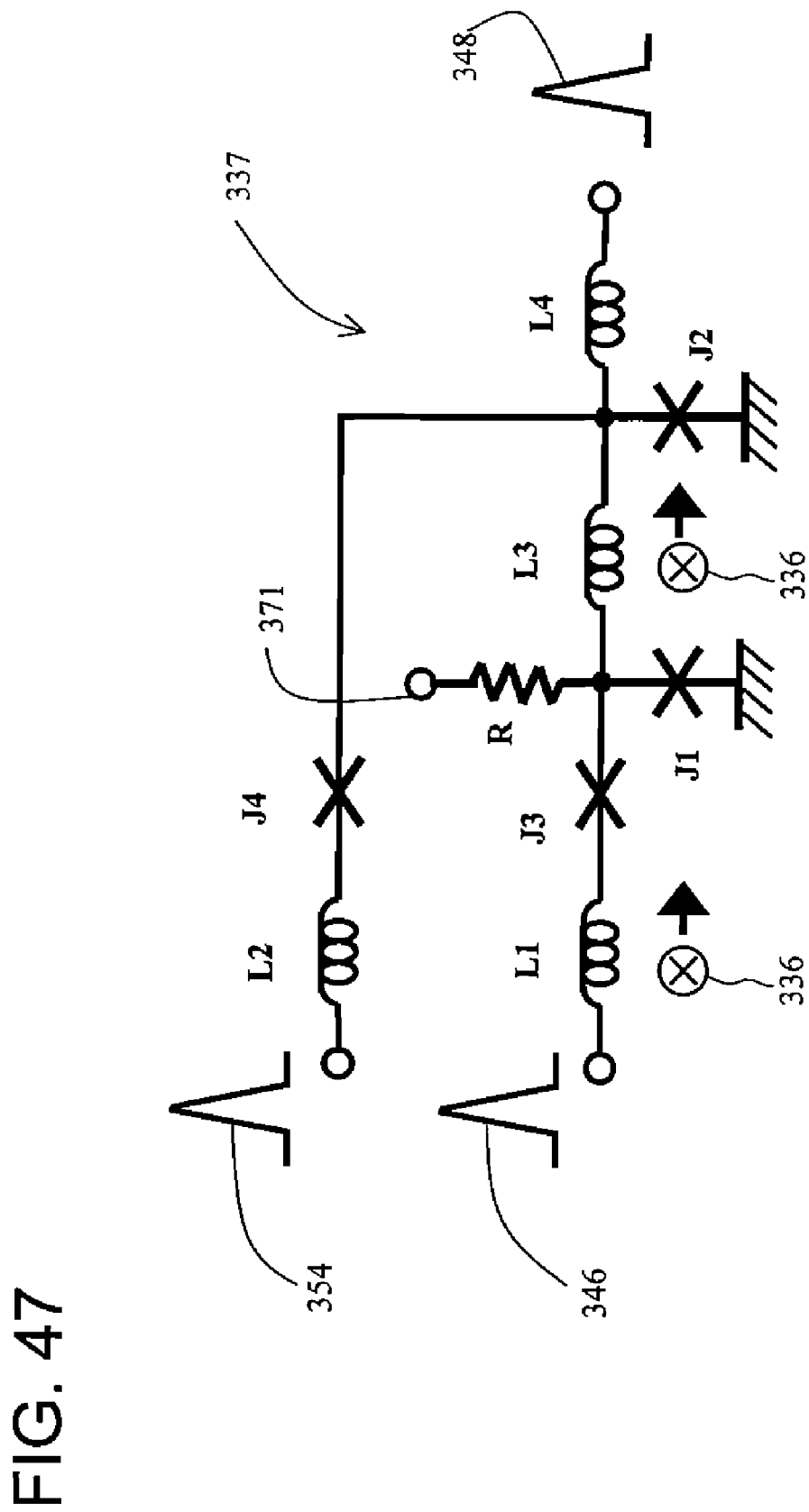
FIG. 47 is a schematic view showing a configuration of a D-F/F circuit of the frame compression circuit.

FIG. 47 shows one example of the configuration of the D-F/F circuit. In FIG. 47, R is the resistor, L1 to L4 are inductance of superconductors, and J1 to J4 are Josephson junction elements. The DC/SFQ data output is input as the set input, and the clock pulse is input as the reset input, whereby the D-F/F circuit outputs an output synchronized with the clock pulse. Synchronization by the clock pulse is performed for multiplexing. In FIG. 47, 337 is the D-F/F circuit, 371 is the bias current, 336 is the SFQ circuit, 354 is the clock pulse, 346 is the DC/SFQ data output, and 348 is the D-F/F output.

Figure 48:
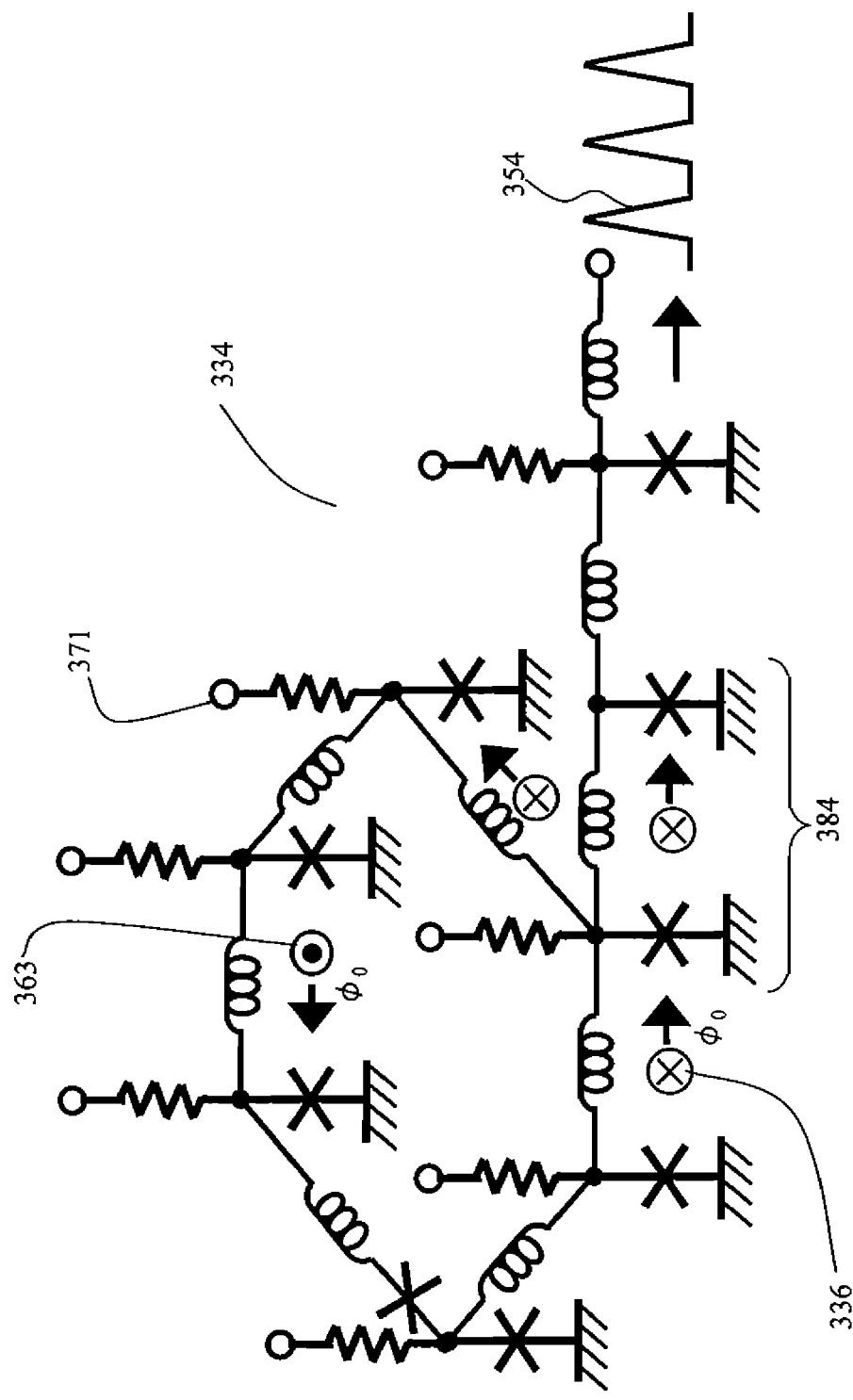
FIG. 48 is a schematic view showing a configuration of a SFQ-PG circuit of the frame compression circuit.

FIG. 48 shows one example of the configuration of the SFQ-PG circuit. The SFQ-PG circuit generates a sharp clock pulse of a pulse width of about one picosecond at high-speed. The SFQ-PG circuit is a circuit form referred to as a ring oscillator that generates a clock pulse of a continuous equidistance pulse train from a splitter when the SFQ cyclic-moves in the ring shaped circuit. The frame compression circuit 46 operates in synchronization with the high-speed timing pulse train generated by the SFQ-PG circuit. In FIG. 48, 334 is the SFQ-PG circuit, 363 is the SFQ circuit of reverse polarity, 336 is the SFQ circuit, 371 is the bias current, 384 is the splitter and 354 is the clock pulse.

Figure 49:
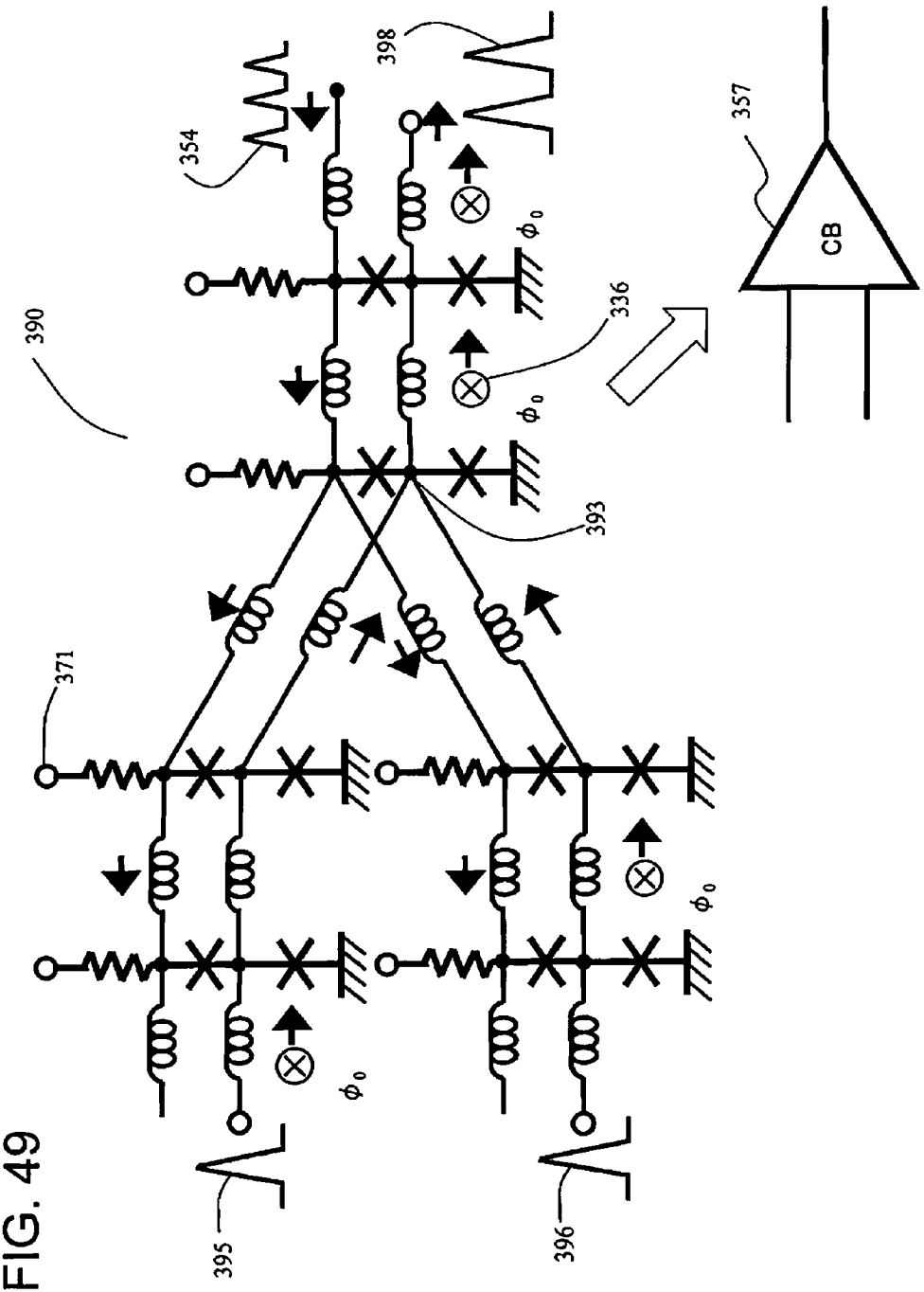
FIG. 49 is a schematic view showing a configuration of a CB circuit of the frame compression circuit.

FIG. 49 shows one example of the configuration of the CB circuit functioning as the multiplexing unit. The SFQ circuit is configured by a circuit that outputs the CB output for merging the shift register outputs incoming from a plurality of input lines to one line. The input side shift register and the output side shift register are synchronous type in FIG. 49 and thus the CB circuit used in connecting the shift registers is also a synchronous type, but may be an asynchronous type. The operating condition of the synchronous type CB circuit is that a plurality of input data 31 does not overlap. In FIG. 49, 390 is the CB circuit, 371 is the bias current, 336 is the SFQ circuit, 393 is the merge, 357 is the CB, 395 and 396 are shift register outputs, 354 is the clock pulse, and 398 is the CB output. The CB 357 performs symbolization.

Figure 50:
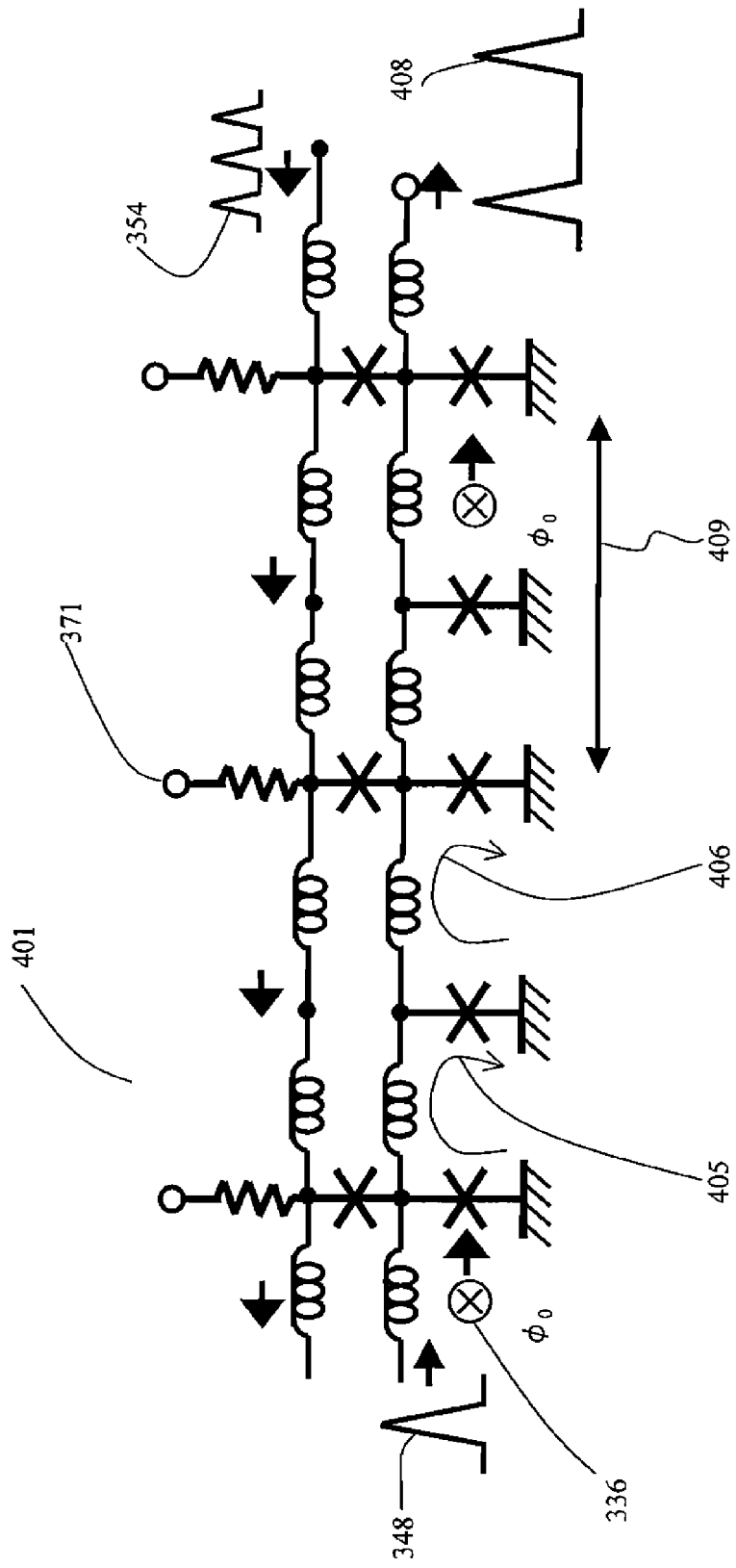
FIG. 50 is a schematic view showing a configuration of a shift register circuit of the frame compression circuit.

FIG. 50 shows one example of a configuration of the shift register circuit using the SFQ circuit. The shift register circuit is a circuit for the input side shift register that is input with the D-F/F output and the clock pulse output, and that outputs the shift register output. In FIG. 50, two bits worth of shift register are extracted. One bit of the shift register is configured by a storage loop for holding the data and a buffer loop at the pre-stage thereof. Two or more buffer loops may be used for one bit of the shift register. The shift register circuit of FIG. 50 transfers data in synchronization with the clock pulse train provided from the post-stage side of the register to the loop on the upper side of each bit. The data shifts from left to right in the register. Parallel output tap can be provided by arranging two output lines in the storage loop of the shift register. In FIG. 50, 401 is the shift register circuit, 336 is the SFQ circuit, 371 is the bias current, 348 is the D-F/F output, 405 is the buffer loop, 406 is the storage loop, 354 is the clock pulse, 408 is the shift register output, and 409 is one bit worth of the shift register.

Figure 51:
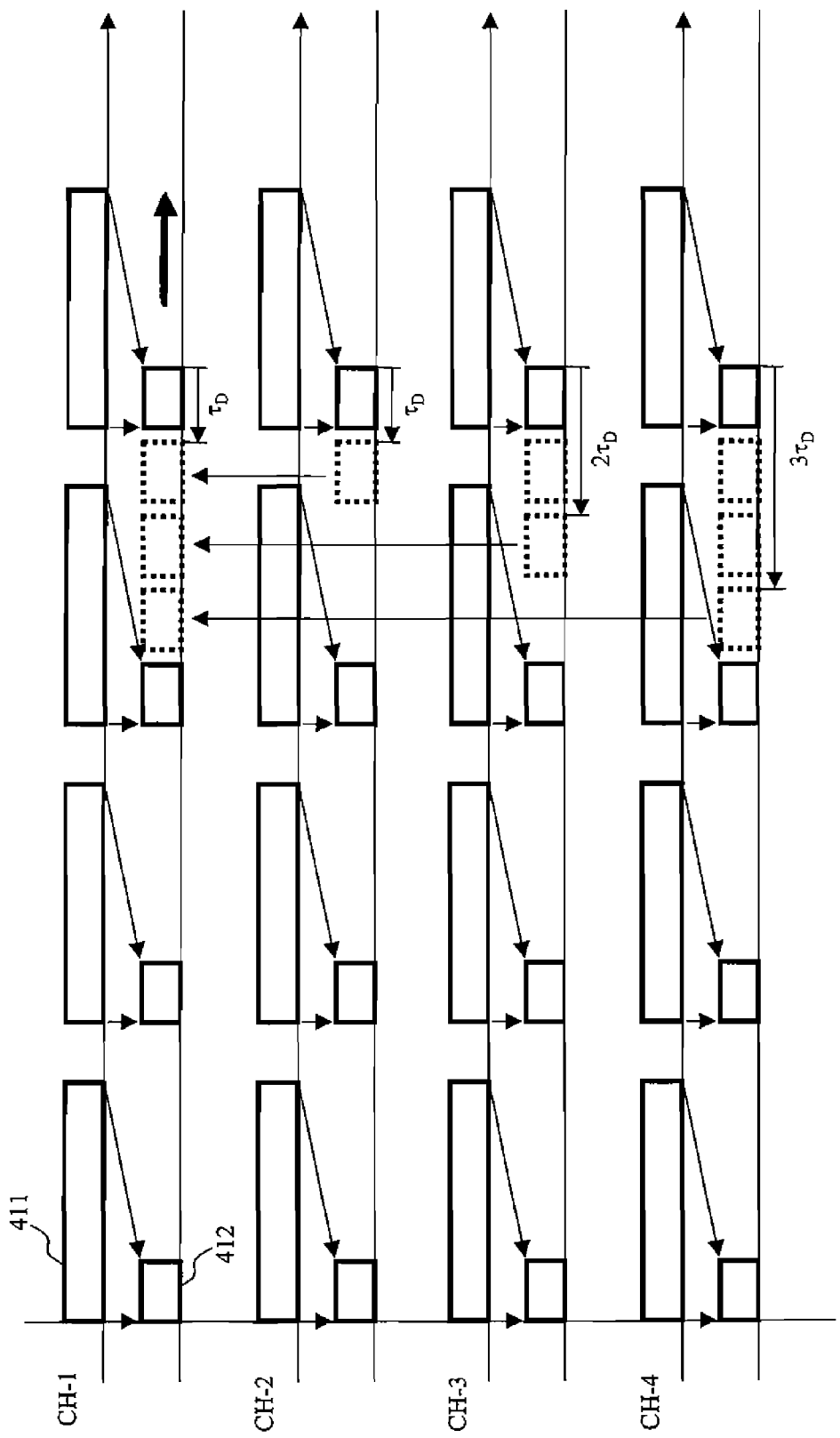
FIG. 51 is a view showing the operation of a multiplexing unit of the frame compression circuit.

FIG. 51 shows one example of the operation of the multiplexing unit. FIG. 51 describes a case when the degree of compression of frame is n=4. The input priority control processing data 36 is assumed to be synchronized between channels of CH-1 to CH-4 in the D-F/F circuit. In the multiplexing unit, the data after compression of CH-2 to CH-4 is delayed by one data length+α in order and multiplexed on CH-1. α is the data interval after multiplexing. Smooth multiplexing can be realized since data does not overlap with each other. In FIG. 51, 411 is the packet (before compression), and 412 is the packet (after compression). The packets from CH-1 to CH-4 are all multiplexed on CH-1. The delay $\tau_D$ is expressed as $\tau_D$=packet length (after compression)+α.

Figure 52:
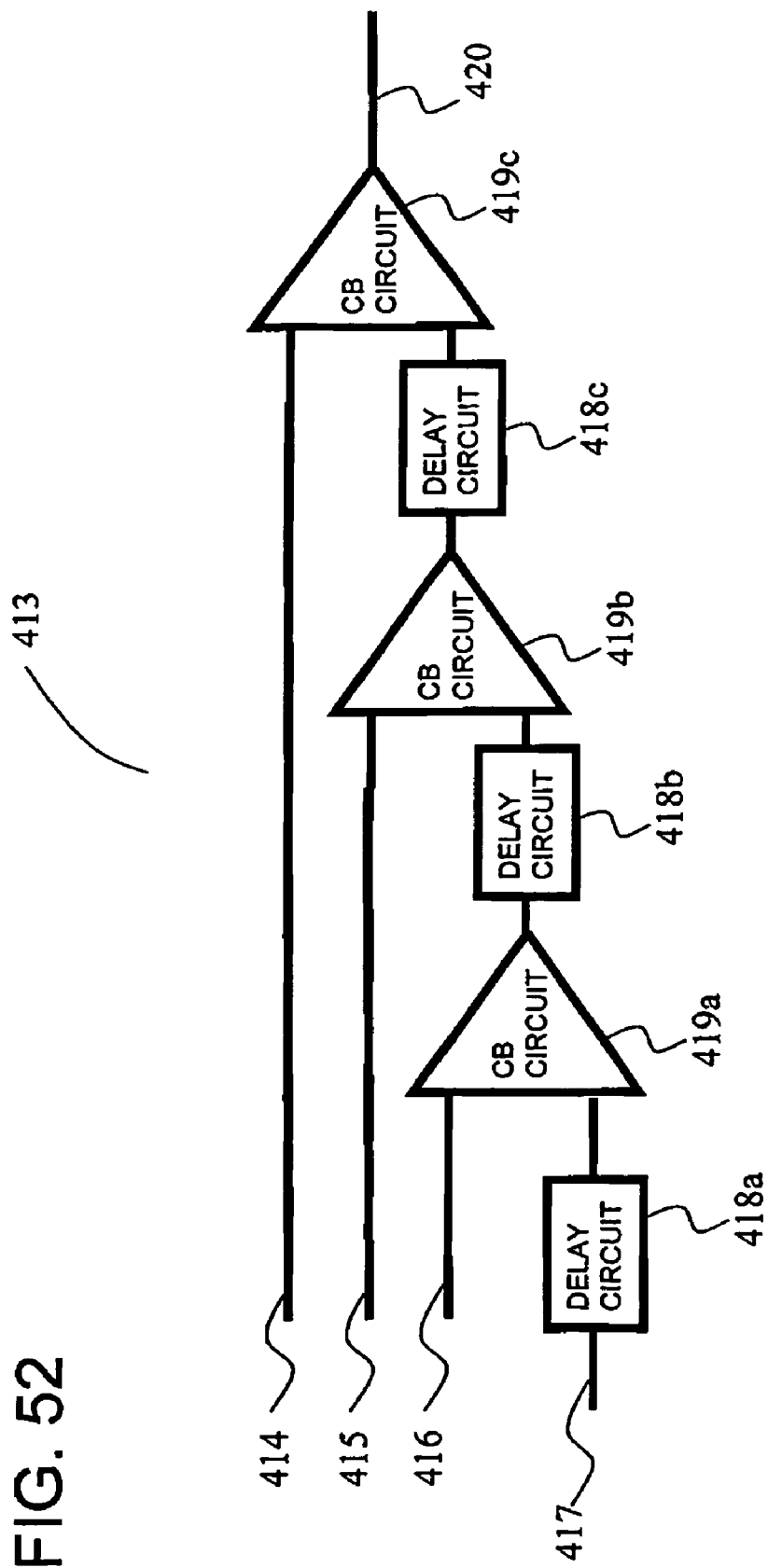
FIG. 52 is a schematic view showing a circuit configuration of the multiplexing unit of the frame compression circuit.

FIG. 52 shows one example of a circuit configuration of the multiplexing unit. The multiplexing unit, which is input with the shift register output from the shift register circuit configuring one part of the frame compression unit to each channel, outputs the CB output. The data worth of one channel and the data worth of another one channel by way of delay circuit D are merged in the CB circuit. The delay circuits are cascade-connected to merge in order, so that all the packets are multiplexed on CH-1 without overlapping. The delay circuit D of delay time $\tau_D$ can be realized by inserting a superconductive Josephson transmission line of an appropriate length. In FIG. 52, 413 is the multiplexing unit, 414 is the input CH-1 (after compression), 415 is the input CH-2 (after compression), 416 is the input CH-3 (after compression), 417 is the input CH-4 (after compression), 418 is the delay circuit, 419 is the CB circuit, and 420 is the CB output. The delay $\tau_D$ of the delay circuit 418 is expressed as $\tau_D$=packet length (after compression)+α.

Figure 53:
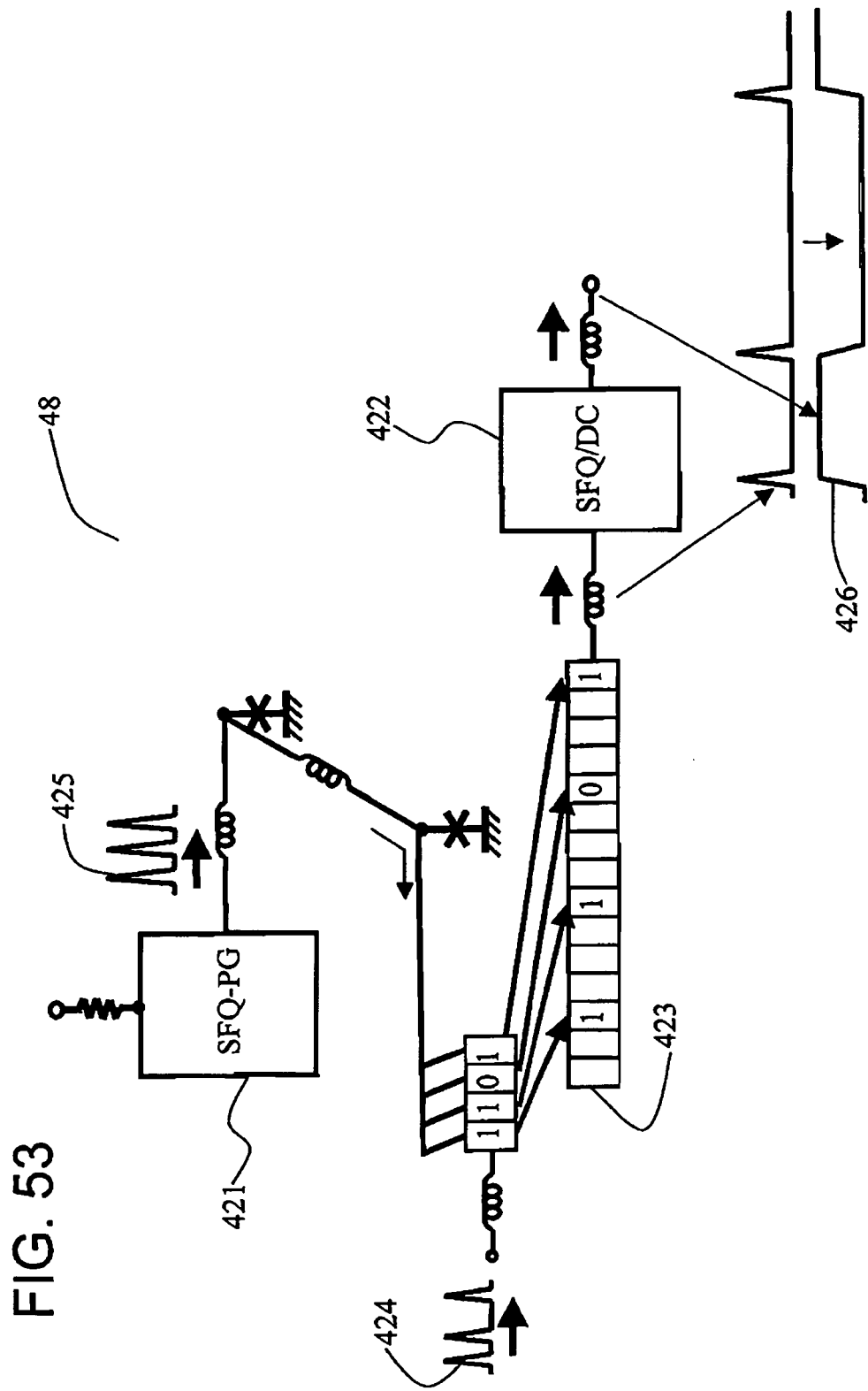
FIG. 53 is a schematic view showing a configuration of a frame decompression circuit.

One example of the configuration of the frame decompression circuit 48 is shown in FIG. 53. The frame decompression circuit 48 of FIG. 53 is configured by the superconductive SFQ circuit. The frame decompression circuit is configured by the superconductive SFQ circuit in FIG. 53, but may be configured by the semiconductor circuit. The decompressed data 49 obtained by decompressing the frame length of the compressed data 47 compressed and output from the frame compression circuit 46 is output, so that the pulse width is widened and the external terminal or other nodes of the exchange node 202 according to the present embodiment can detect the data. SFQ/DC (Single Flux Quantum/Direct Current) is the pulse width conversion circuit. In FIG. 53, 421 is the SFQ-PG circuit, 422 is the SFQ/DC circuit, 423 is the frame decompression unit, 424 is the compressed data, 425 is the clock pulse, and 426 is the decompressed data.

Figure 54:
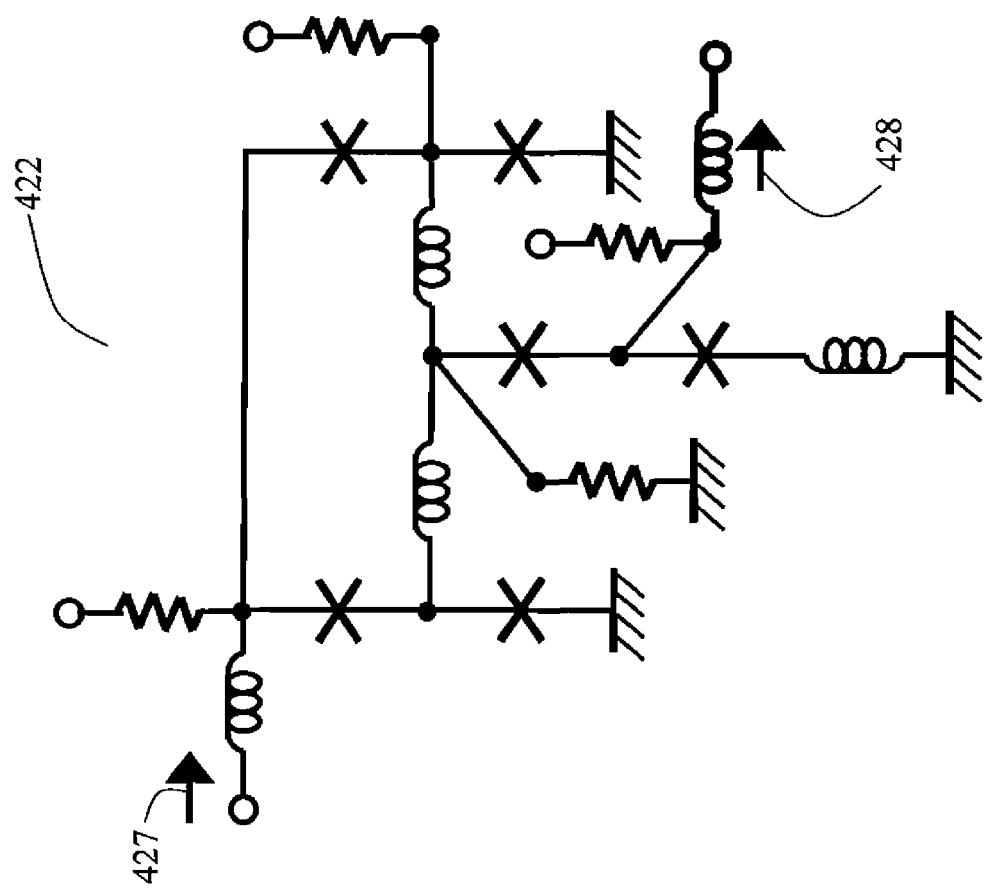
FIG. 54 is a schematic view showing a configuration of a SFQ/DC circuit of the frame decompression circuit.

FIG. 54 shows one example of the configuration of the SFQ/DC circuit. It is a circuit in which the "0" and "1" of the output are inverted when the frame decompression unit output is input. The SFQ/DC output, which is the output of the relevant circuit, is not a pulse but a level signal having amplitude. The level output in which "0" and "1" inverts in response to the sharp leading and trailing pulse as in the SFQ pulse is obtained. The output is detected in the semiconductor circuit.

In FIG. 54, 427 is the frame decompression unit output, 428 is the SFQ/DC output, and 422 is the SFQ/DC circuit.

Figure 55:
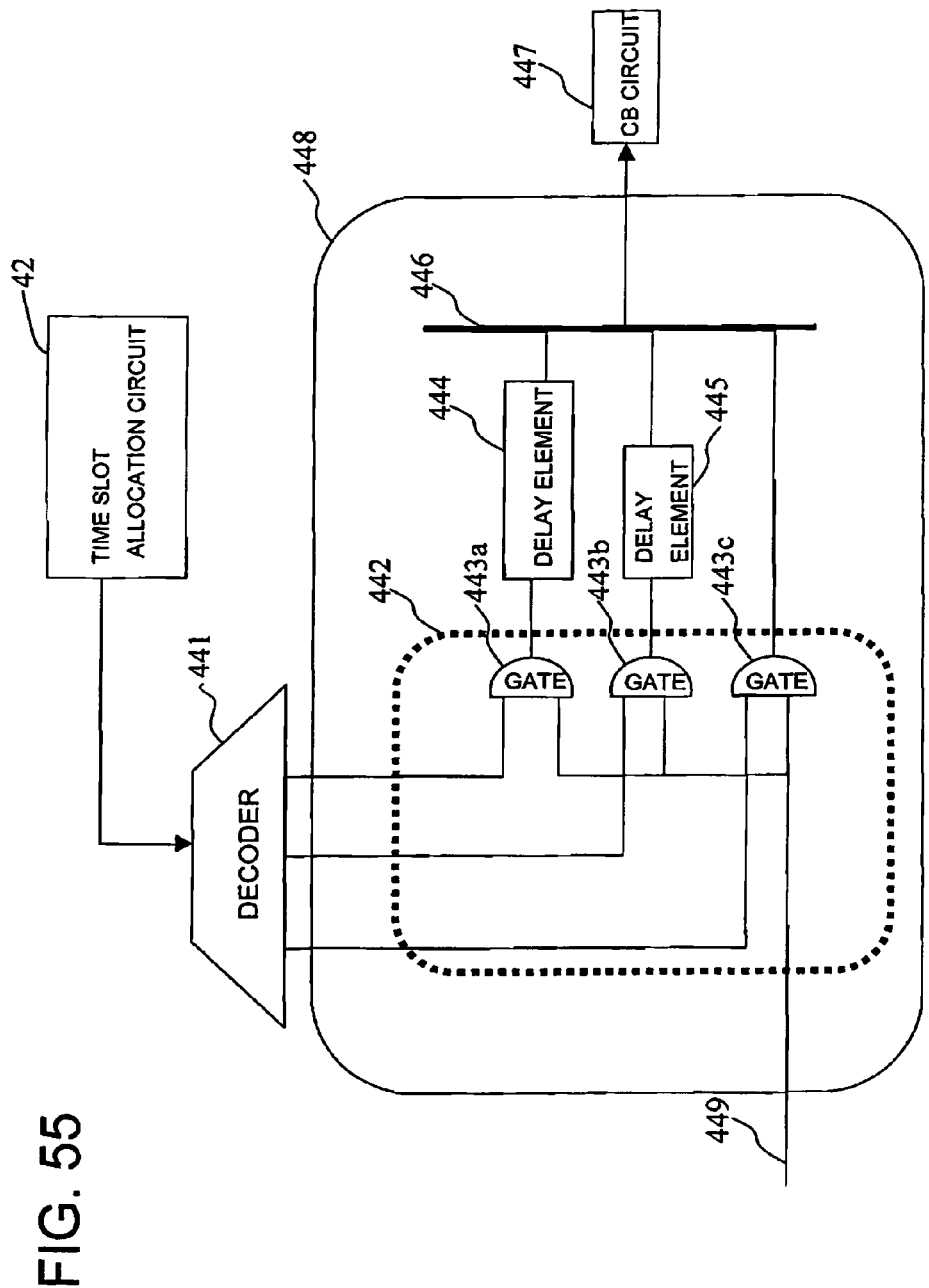
FIG. 55 is a schematic view showing one example of a variable delay circuit of the multiplexing circuit.

FIG. 55 is a schematic view showing one example of a variable delay circuit that enables multiplexing in the multiplexing circuit. The variable delay circuit VD (Variable Delay element) of FIG. 55 is configured by a selector including an AND gate, a delay element (delay D, delay 2D), and an OR gate. The selector outputs the input data 31 of an arbitrary channel (CHn) on the transmission path on the input side delayed by the required time when connection is established. The delay time can be selected among when the delay element is not present, when the delay time is delayed by the delay D, when the delay time is delayed by the delay 2D and the like. In FIG. 55, an example of setting of the delay in three stages has been described but is not limited thereto. The delayed input data 31 is output to the CB circuit via the OR gate. The delay request to the selector may be inputting the time slot specifying signal 43 specified by the time slot allocation circuit 42 to a decoder and selecting the delay time by a signal from the decoder. The delay time setting varies for every connection, but once the connection is established, the relevant state is maintained until the command to release the connection is made. In FIG. 55, 42 is the time slot allocation circuit, 441 is the decoder, 442 is the selector, 443 is the AND gate, 444 is the delay element of delay 2D, 445 is the delay element of delay D, 446 is the OR gate, 447 is the CB circuit, 448 is the VD, and 449 is the CHn.

Figure 56:
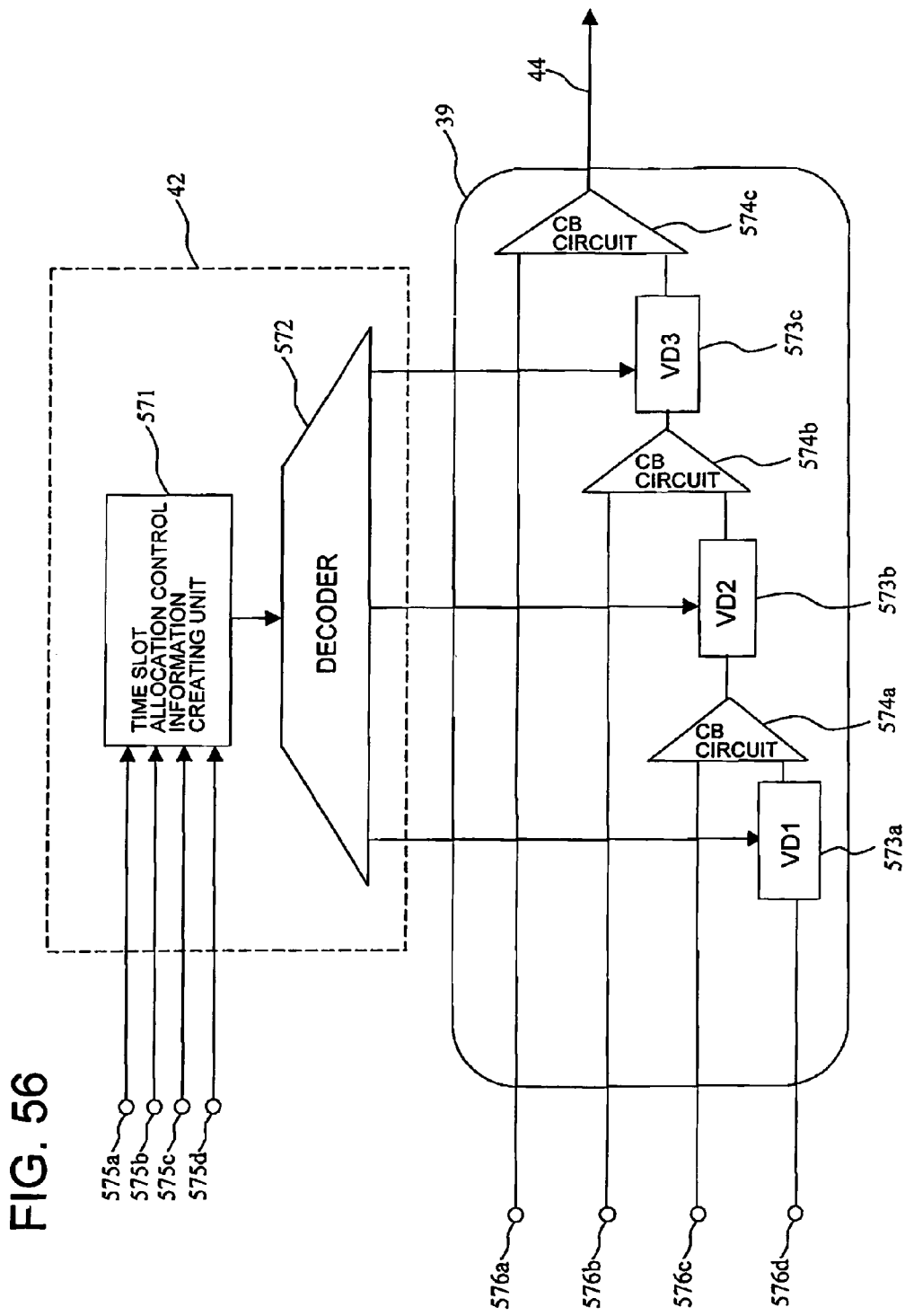
FIG. 56 is a configuration example combining the variable delay circuit to the multiplexing circuit.

FIG. 56 is a configuration example in which the variable delay circuit VD is combined with the CB circuit and the decoder to variably set the multiplexing position of the time slot. In the example of FIG. 56, the phase of the compressed multiplexed data (channel 1 (CH1) to channel 4 (CH4)) is converted to the desired time slot position corresponding to the target direction path using three types of variable delay circuit VD (VD1, VD2, VD3). In FIG. 56, 571 is a time slot allocation control information creating unit, 572 is a decoder, 573 is a variable delay circuit, 574 is a CB circuit, 575 is an input terminal of a time slot allocation circuit, and 576 is an input terminal of a multiplexing circuit. The input terminal 575a, the input terminal 575b, the input terminal 575c, and the input terminal 575d are respectively input with the header information of CH1, CH2, CH3, and CH4. The input terminal 576a, the input terminal 576b, the input terminal 576c, and the input terminal 576d are respectively input with the priority control processing data after compression of CH1, CH2, CH3, and CH4.

The exchange node control method according to the present invention includes a frame compression step in which the frame compression circuit 46, which is input with the priority control processing data 36 output in the distribution step, compresses the time width of the priority control processing data 36 and outputs the compressed data 47 between the distribution step and the multiplexing step described in the seventh embodiment above. A frame decompression step in which the frame decompression circuit 48, which is input with the multiplexed data 44 output in the multiplexing step, decompresses the time width of the multiplexed data 44 and outputs the decompressed data 49 is further arranged.

In the frame compression step, the frame compression circuit 46, which is input with the priority control processing data 36 output in the distribution step, compresses the time width of the priority control processing data 36 and outputs the compressed data 47.

In the frame decompression step, the frame decompression circuit 48, which is input with the multiplexed data 44 output in the multiplexing step, decompresses the time width of the multiplexed data 44 and outputs the decompressed data 49.

Figure 67:
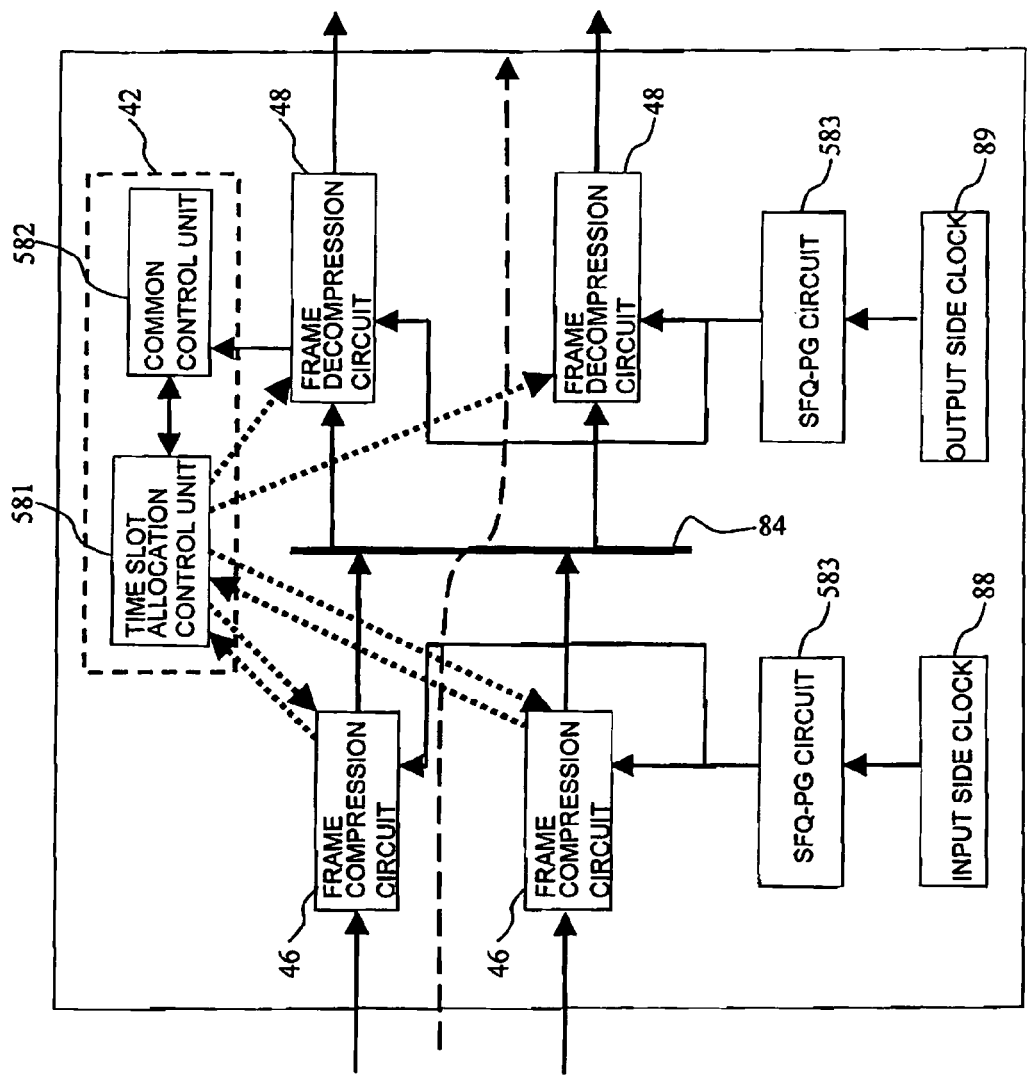
FIG. 67 is a schematic view of an exchange node according to the seventh embodiment.

FIG. 67 is a schematic view of the exchange node 202 according to the present embodiment. In the exchange node 202, the time slot allocation circuit 42 performs priority process based on the header identifying information of the IP packet that arrives as required as described above. In FIG. 67, 42 is the time slot allocation circuit, 46 is the frame compression circuit 48 is the frame decompression circuit, 84 is the common bus, 57 is the input side clock, 58 is the output side clock, 581 is the time slot allocation control unit, 582 is the common control unit, and 583 is the SFQ-PG circuit. Even in the case of the connectionless control packet, the time slot corresponding to the output side direction path number is allocated before the input packet is multiplexed and output to the common bus 84 with respect to packet data that requires the priority control added with the priority control bit. Therefore, in the exchange node 201 described in FIG. 32 or the exchange node 202 described in FIG. 42, the time slot allocation circuit 42 identifies the priority control signal 38 contained in the header information of the packet data and allocates the time slot, and thus the time slot allocation circuit 42 can perform the allocation of the time slot before all the data of the packet data which header information has been received are input to the input buffer unit 32. Since the time slot allocation circuit 42 preferentially processes the priority control processing data 36, obtains the time slot information 41 monitored by the time slot information acquiring unit 40, and specifies the unused time slot as the write destination of the priority control processing data 36, the buffer for data processing inside the exchange node is not necessary and the delay time in communication is reduced. Furthermore, a great number of time slots can be formed in one frame of the time division multiplexing line by compressing the time width of the priority control processing data 36 with the frame compression circuit 46, whereby a great amount of data can be multiplexed in a short period of time, and the delay time in communication can be reduced. Moreover, since the time slot in one frame can be increased, the number of connections on the input side transmission path can be increased.

Ninth Embodiment

Figure 57:
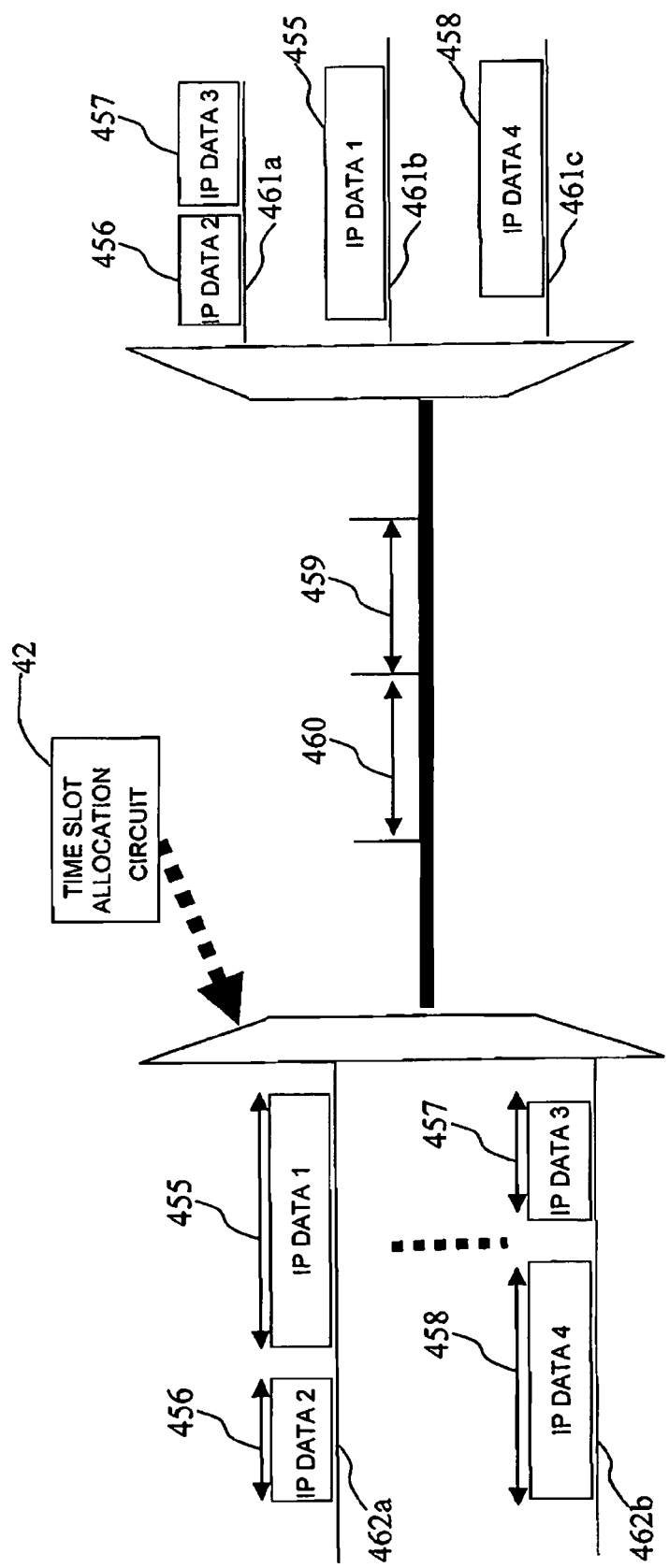
FIG. 57 is a specific example of a time slot specification corresponding to the input data (if transmission path speed is the same) of the seventh embodiment.

FIG. 57 shows an example of a correspondence relationship of a time slot in one frame of the time division multiplexing line and the direction path on the output side using the exchange node 201 according to the seventh embodiment or the exchange node 202 according to the eighth embodiment. In FIG. 57, one example on how each input data 31 (IP data) of different data length transferred with an IP address is specified with the time slot number when a plurality of connections having the same speed for the input side transmission path is established is shown. One frame of the time division multiplexing line in the exchange node is assumed as 125 µsec in FIG. 57. The IP data 1 of 128 bytes and the IP data 2 of 64 bytes are input from the transmission path 1 of 100 Mb/s. The IP data 3 of 64 bytes and the IP data 4 of 128 bytes are input from the transmission path 2 of 100 Mb/s. With regards to the inputs, the time slot allocation circuit 42 specifies two time slots in time of call set-up for the IP data of 128 bytes. One time slot is specified with respect to the IP data of 64 bytes. Therefore, a method of efficiently specifying the time slot by specifying the number of time slots in units of 64 bytes even if packet data of different length are mixed is provided. The time slot map shown in FIG. 57 is held in a table form. Although not shown in FIG. 57, a memory circuit for buffering the data worth of 64 bytes is arranged in correspondence to the transmission path speed on the input side, and thus the delay for the buffering occurs at the entrance of the exchange node. However, in the exchange node, the data of 64 bytes are uniformly transferred to the target output side direction path in a minimum delay time as ultra high-speed one time slot in the time division multiplexing frame. In FIG. 57, 42 is the time slot allocation circuit, 455 is the IP data 1 (128 bytes), 456 is the IP data 2 (64 bytes), 457 is the IP data 3 (64 bytes), 458 is the IP data 4 (128 bytes), 459 is the frame of 125 μsec, 460 is the frame of 125 μsec, 461*a* is the direction path 1, 461*b* is the direction path 2, 461*c* is the direction path 3, 462*a* is the transmission path 1 of 100 Mb/s, and 462*b* is the transmission path 2 of 100 Mb/s. Furthermore, FIG. 57 shows one example of 8 bit parallel to 512 bit parallel. Time slot 1 and time slot 2 are assumed as direction path 1, time slot 3 and time slot 4 as direction path 2, and time slot 5 and time slot 6 as direction path 3. The direction path desired by the IP data 1 is direction path 2, the direction path desired by the IP data 2 and the IP data 3 is direction path 1, and the direction path desired by the IP data 4 is direction path 3. In this case, the IP data 1 of head command (1) is allocated by 128B to time slot 3, the IP data 3 is allocated by 64B to time slot 1, the IP data 1 of the last command (0) is allocated by 128B to time slot 4, the IP data 2 is allocated by 64B to time slot 2, the IP data of head command (1) is allocated by 128B to time slot 5, and the IP data 4 of last command (0) is allocated by 128B to time slot 6.

When occupying a plurality of time slots, a control bit for identifying whether the time slot corresponds to the first time slot or the last time slot in the time slot map is effectively used. For example, a technique of searching for the time slots in order from the front, and terminating such search at the stage where determination is made on whether the time slot is the last time slot, thereby releasing the time slot and using the same for other packet data may be combined. Since the IP data 1 is 128 bytes in FIG. 57, the time slot 3 (TS3) and the time slot 4 (TS4) are specified as being directed to the output side direction path 2 based on the time slot map, whereas since the IP data 2 is 64 bytes, the time slot 2 (TS2) is specified as being directed to the output side direction path 1 based on the time slot map, thereby being multiplexed on time slot positions corresponding to the transfer to each direction path number on the output side.

Figure 58:
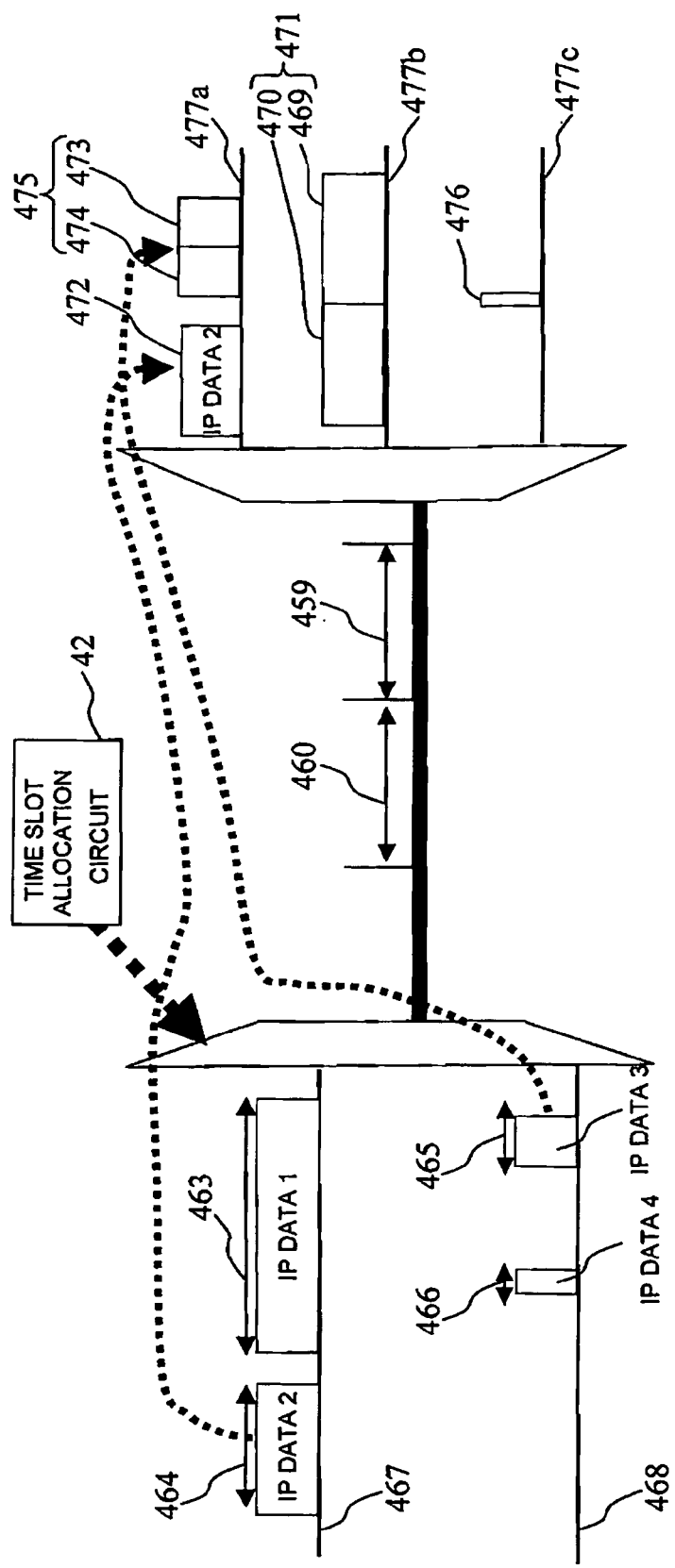
FIG. 58 is a specific example of the time slot specification corresponding to the input data (if transmission path speed is different) of the seventh embodiment.

FIG. 58 shows an example of a correspondence relationship of the time slot in one frame of the time division multiplexing line and the direction path on the output side when the speed of the input side transmission path differs in the embodiment of FIG. 57. One frame of the time division multiplexing line in the exchange node is assumed to be 125 μsec. The IP data 1 of 128 bytes and the IP data 2 of 64 bytes are input from the transmission path 1 of 100 Mb/s. The IP data 3 of 128 bytes and the IP data 4 of 64 bytes are input from the transmission path 1 of 1 Gb/s. With regards to the inputs, the time slot allocation circuit 42 specifies two time slots for the IP data of 128 bytes. One time slot is specified with respect to the IP data of 64 bytes. In this case as well, a memory circuit for buffering the data worth of 64 bytes is arranged in correspondence to the transmission path speed on the input side, and thus the delay for the buffering occurs at the entrance of the exchange node. However, the data of 64 bytes are uniformly transferred to the target output side direction path in a minimum delay time as ultra high-speed one time slot in the time division multiplexing frame. With regards to the packet data of 128 bytes, a control bit for identifying whether the time slot corresponds to the first time slot or the last time slot is used. In FIG. 58, 42 is the time slot allocation circuit, 463 is the IP data 1 (128 bytes), 464 is the IP data 2 (64 bytes), 465 is the IP data 3 (128 bytes), 466 is the IP data 4 (64 bytes), 467 is the transmission path 1 of 100 Mb/s, 468 is the transmission path 1 of 1 Gb/s, 469 is the time slot 3, 470 is the time slot 4, 471 is the IP data 1, 472 is the IP data 2, 473 is the time slot 1, 474 is the time slot 2, 475 is the IP data 3, 476 is the IP data 4, 477*a* is the direction path 1, 477*b* is the direction path 2, and 477*c* is the direction path 3. Furthermore, FIG. 58 shows one example of 8 bit parallel to 512 bit parallel. Time slot 1 and time slot 2 are assumed as direction path 1, time slot 3 and time slot 4 as direction path 2, and time slot 5 and time slot 6 as direction path 3. The direction path desired by the IP data 1 is direction path 2, the direction path desired by the IP data 2 and the IP data 3 is direction path 1, and the direction path desired by the IP data 4 is direction path 3. In this case, the IP data 1 of head command (1) is allocated to time slot 3 of the direction path 2, the IP data 3 of the head command (1) is allocated to time slot 1 of the direction path 1, the IP data 3 of the last command (0) is allocated to time slot 2 of the direction path 1, the IP data 1 of the last command (0) is allocated to time slot 4 of the direction path 2, the IP data 4 of last command (0) is allocated to time slot 5 of direction path 3, and the IP data 2 of last command (0) is allocated to time slot 6 of the direction path 1.

Since the IP data 1 is 128 bytes in FIG. 58, the time slot 3 (TS3) and the time slot 4 (TS4) are specified as directed to the output side direction path 2 and transferred to the output side direction path 2. Similarly, since the IP data 2 is 64 bytes, the time slot 6 (TS6) directed to the output side direction path 1 is specified and transferred to the output side direction path 1. Furthermore, since the IP data 3 of the transmission path 1 of 1 Gb/s is 128 bytes, the time slot 1 (TS1) and the time slot 2 (TS2) are specified as being directed to the output side direction path 1 and transferred to the output side direction path 1. As described above, the packets of different length accommodated in different transmission speeds can be transferred to the target output side direction path by allocating an appropriate time slot through the principle of the present invention. An example of limiting the time slot to be provided to one that corresponds to the maximum speed for all calls of any speed in one frame in the exchange node, and allowing empty data to be sent for calls of low speed has been described in the above description, but the present invention is not limited to such conditions. Even if, for example, a control to allocate a plurality of time slots individually by speed in one frame is required, up to how many time slots to be allocated in the node is negotiated in advance with the exchange node using the priority control signal 38. After such negotiation is terminated, the band can be ensured on the exchange node side.

Tenth Embodiment

Figure 59:
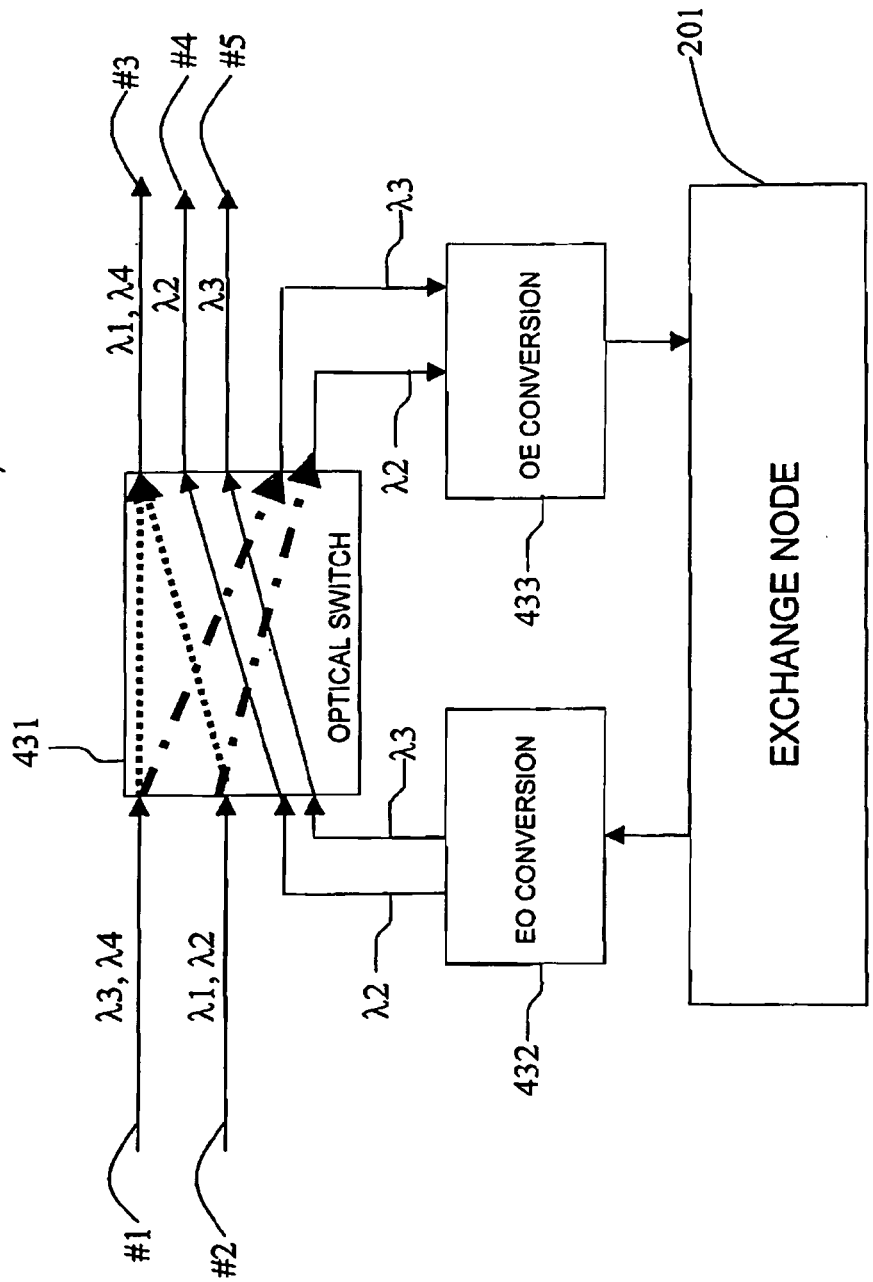
FIG. 59 is a schematic view of an embodiment applied to an optical communication using an optical switch according to the ninth embodiment.
Figure 60:
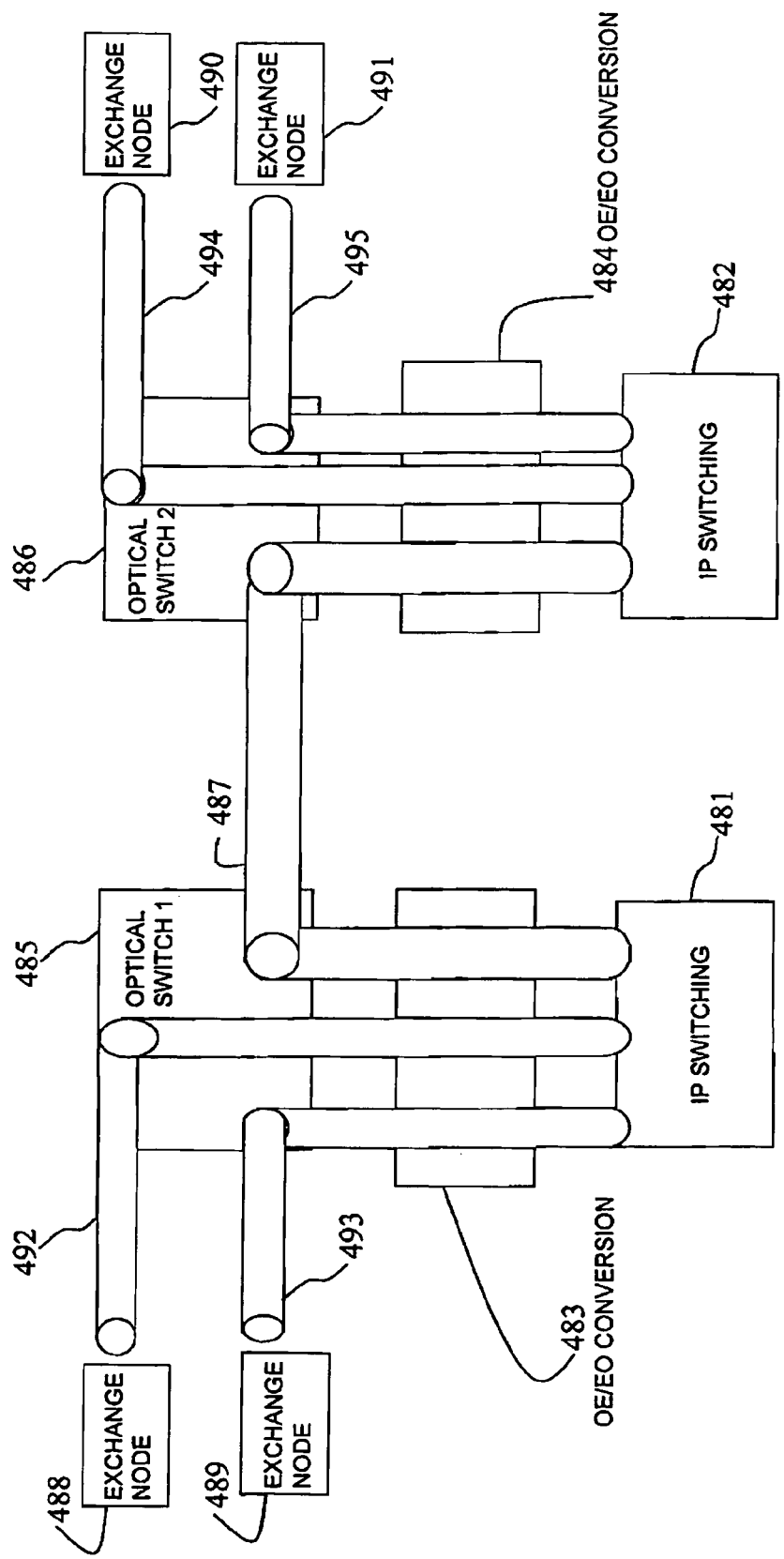
FIG. 60 is a schematic view showing a configuration example of the optical communication using the conventional optical switch.

FIG. 59 is a schematic view showing one form of the tenth embodiment of an embodiment 207 used in an optical communication using the exchange node of the seventh embodiment to the ninth embodiment as the optical switch. Before explaining the present embodiment 207, a configuration example of an optical communication using the conventional optical switch will be described in FIG. 60. An optical transmission path #1 for transmission using wavelength λ1 from the exchange node 1 and an optical transmission path #2 for transmission using wavelength λ2 from the exchange node 2 are accommodated in the optical switch 1, transmission to the optical switch 2 using wavelength λ3 to the optical switch 2 is carried out using an optical relay transmission path #3, and converted to wavelengths λ1, λ2 at the exchange node 3 and the exchange node 4, respectively, in the optical switch 2. In this case, when the data traffic sent from the exchange node 1 and the exchange node 2 is small, and data occupying rate at the wavelength of the exchange node 1 and the exchange node 2 is very large, a switching function for every wavelength is provided to the optical switch 1 and the optical switch 2. However, when the traffic amount for each wavelength is small and the necessity to efficiently use the optical relay transmission path #3 arises, or when the multiplexed traffics are mixed for each wavelength and the necessity to multiplex or convert arises, the wavelength data on the input side is OE converted, electrical IP switching process is performed, EO conversion is again performed after processing, and after converting to an appropriate wavelength, a sending process must be performed on the output side transmission path, as shown in FIG. 60. In this case, a large capacity of buffer memory is required for IP switching, and the processing delay at the relevant portion is inevitable. In FIG. 59, 201 is the exchange node, 431 is an optical switch, 432 is EO conversion, and 433 is OE conversion. Furthermore, in FIG. 60, 480 is the optical communication using the conventional optical switch, 481 and 482 are IP switching, 483 and 484 are OE/EO conversion, 485 is an optical switch 1, 486 is an optical switch 2, 487 is an optical transmission path #3 ($\lambda 3$), 488 is an exchange node 1, 489 is an exchange node 2, 490 is an exchange node 3, 491 is an exchange node 4, 492 is an optical transmission path #1 ($\lambda 1$), 493 is an optical transmission path #2 ($\lambda 2$), 494 is an optical transmission path #4 ($\lambda 1$), 495 is an optical transmission path #5 ($\lambda 2$).

Figure 61:
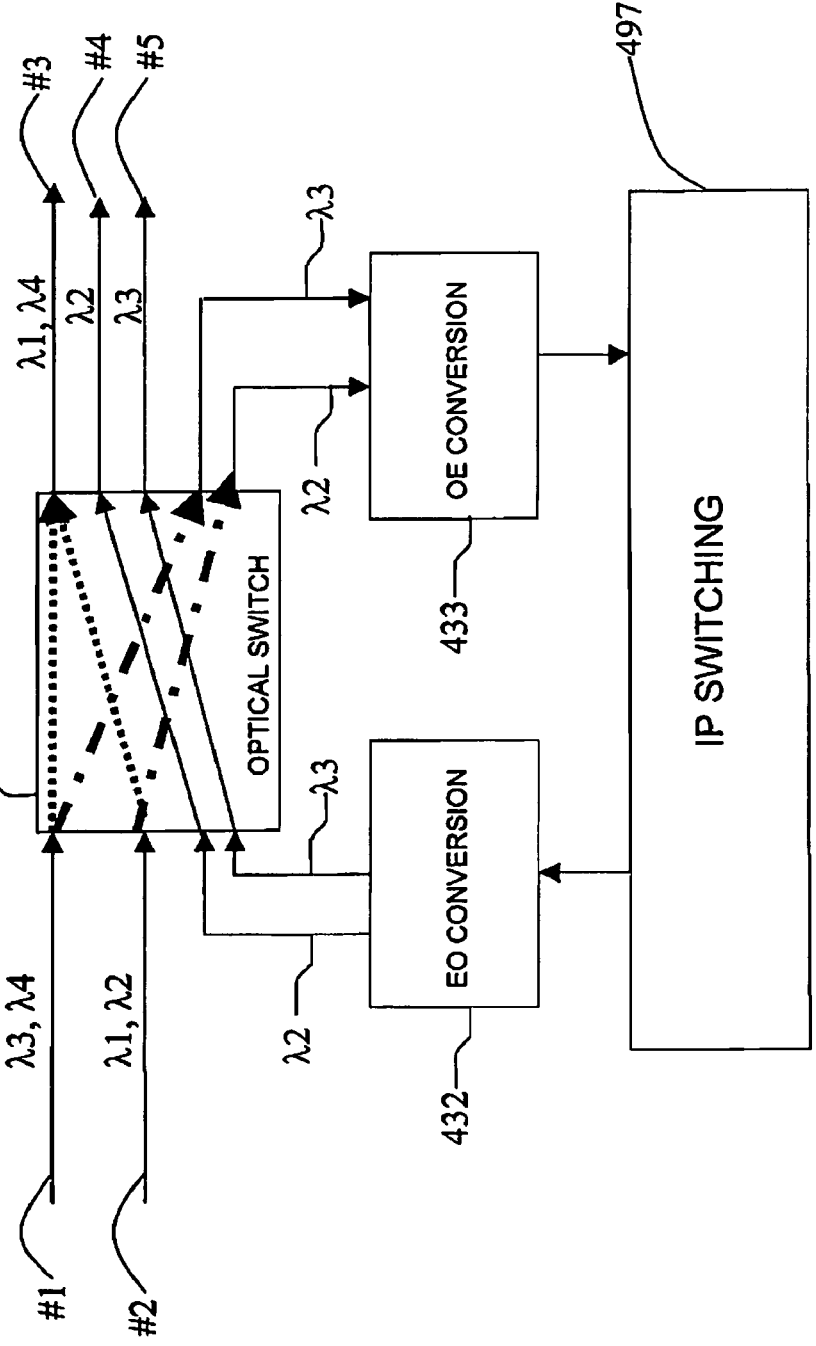
FIG. 61 is a schematic view showing another configuration example of the optical communication using the conventional optical switch.

FIG. 61 is a different configuration example using the conventional optical switch. The input side line #1 multiplexed with wavelengths $\lambda 3$ and $\lambda 4$, and the input side line #2 multiplexed with wavelengths $\lambda 1$ and $\lambda 2$ are input to the optical switch. The wavelength $\lambda 1$ and the wavelength $\lambda 4$ are output to the output side line #3, the wavelength $\lambda 2$ to the output side line #4, and the wavelength $\lambda 3$ to the output side line #5. In this case, OE conversion is performed once on the transmission line data transmitted at the wavelength, and buffering is performed at the electrical level. After performing the IP switching process, EO conversion is performed, and direction path conversion is performed. Therefore, delay involved in the buffering process occurs, and the quality of delay may be affected. In FIG. 61, 496 is the optical communication using the conventional optical switch, 497 is the IP switching, 431 is the optical switch, 432 is EO conversion, and 433 is OE conversion.

FIG. 59 is a configuration example of the embodiment 207 used in the optical communication using the optical switch according to the tenth embodiment. The input side line #1 multiplexed with wavelengths $\lambda 3$ and $\lambda 4$, and the input side line #2 multiplexed with wavelengths $\lambda d$ and $\lambda 2$ are input to the optical switch. The wavelength $\lambda 1$ and the wavelength $\lambda 4$ are output to the output side line #3, the wavelength $\lambda 2$ to the output side line #4, and the wavelength $\lambda 3$ to the output side line #5. The IP switching processing unit of the configuration using the conventional optical switch of FIG. 60 is replaced with the exchange node of the seventh embodiment to the ninth embodiment. The operation from the input side to the output side is similar to the configuration example using the conventional optical switch, but the processing delay time is fixed and always guaranteed at the minimum value since the exchange node of the seventh embodiment to the ninth embodiment is used.

Eleventh Embodiment

Figure 62:
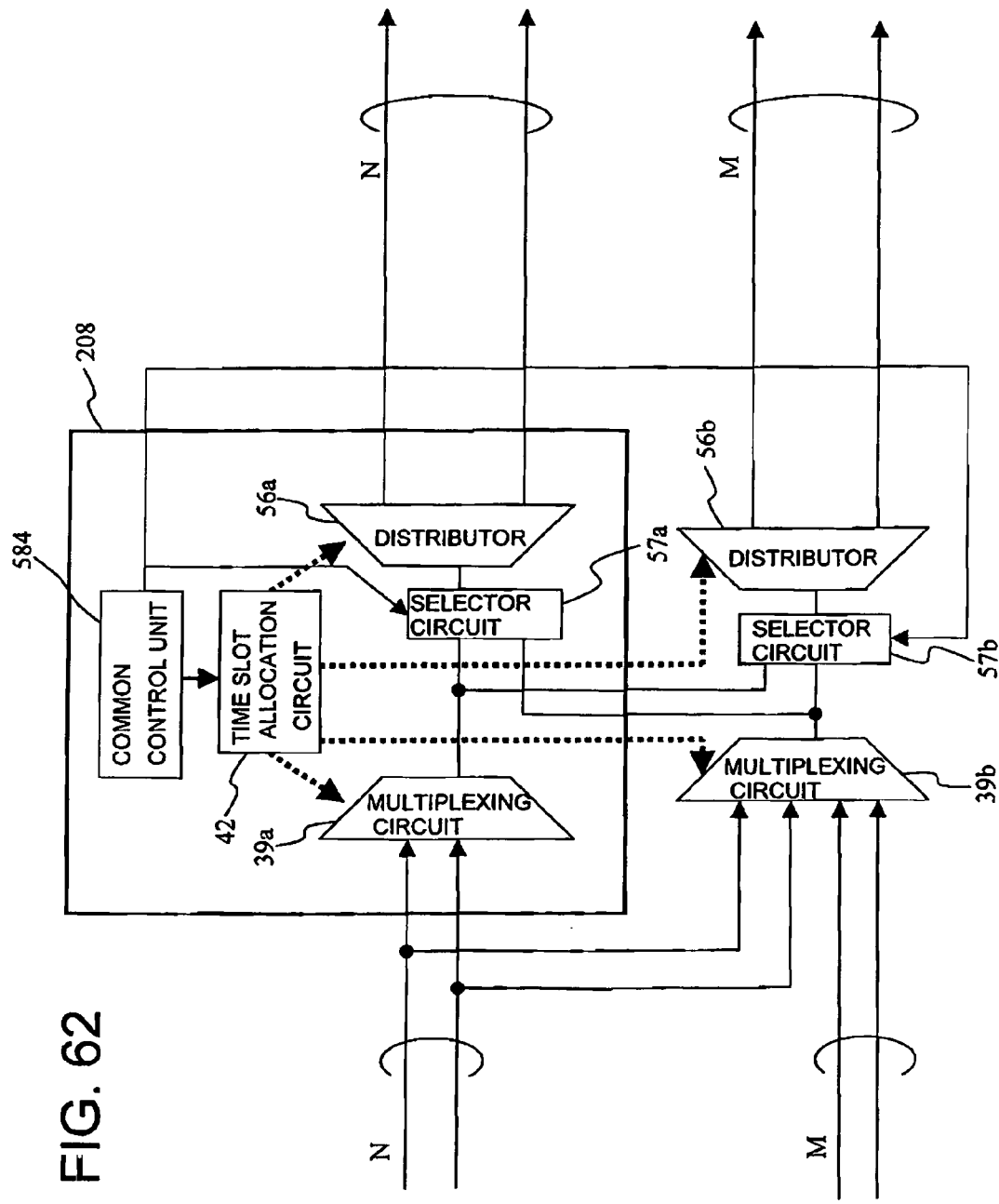
FIG. 62 is a schematic view showing a first form of an exchange node having an extended communication path.

FIG. 62 is a schematic view showing a first form of an exchange node having an extended communication path. The exchange node 208 shown in FIG. 62 includes two multiplexing circuits 39 described in the seventh embodiment, and further preferably includes a plurality of distributors 56a, 56b, connected to a plurality of outgoing lines, for distributing the multiplexed data 44 output from each multiplexing circuit 39 for each outgoing line, and a selector circuit 57, arranged between the multiplexing circuit 39 and the distributor 56, for distributing the priority control processing data 36 multiplexed on the multiplexed data 44 to the distributor 56 corresponding to the direction path. The distributor 56 distributes the multiplexed data 44 for each outgoing line. In FIG. 62, 39a is the multiplexing circuit in the exchange node 208, 39b is the multiplexing circuit outside the exchange node 208, 42 is the time slot allocation circuit, 56a is the distributor in the exchange node 208, 56b is the distributor 56 outside the exchange node 208, 57a is the selector circuit in the exchange node 208, 57b is the selector circuit outside the exchange node 208, and 584 is the common control unit. The selector circuit 57 preferably performs high-speed operation. The selector circuit 57 is preferably installed on the common bus. The circuit scale can be reduced by having the selector circuit 57 appropriately perform the switching operation by the operation of the time slot control unit. The power consumption is also saved. The number of multiplexing circuit 39 is not limited to two, and may be three or more.

Figure 63:
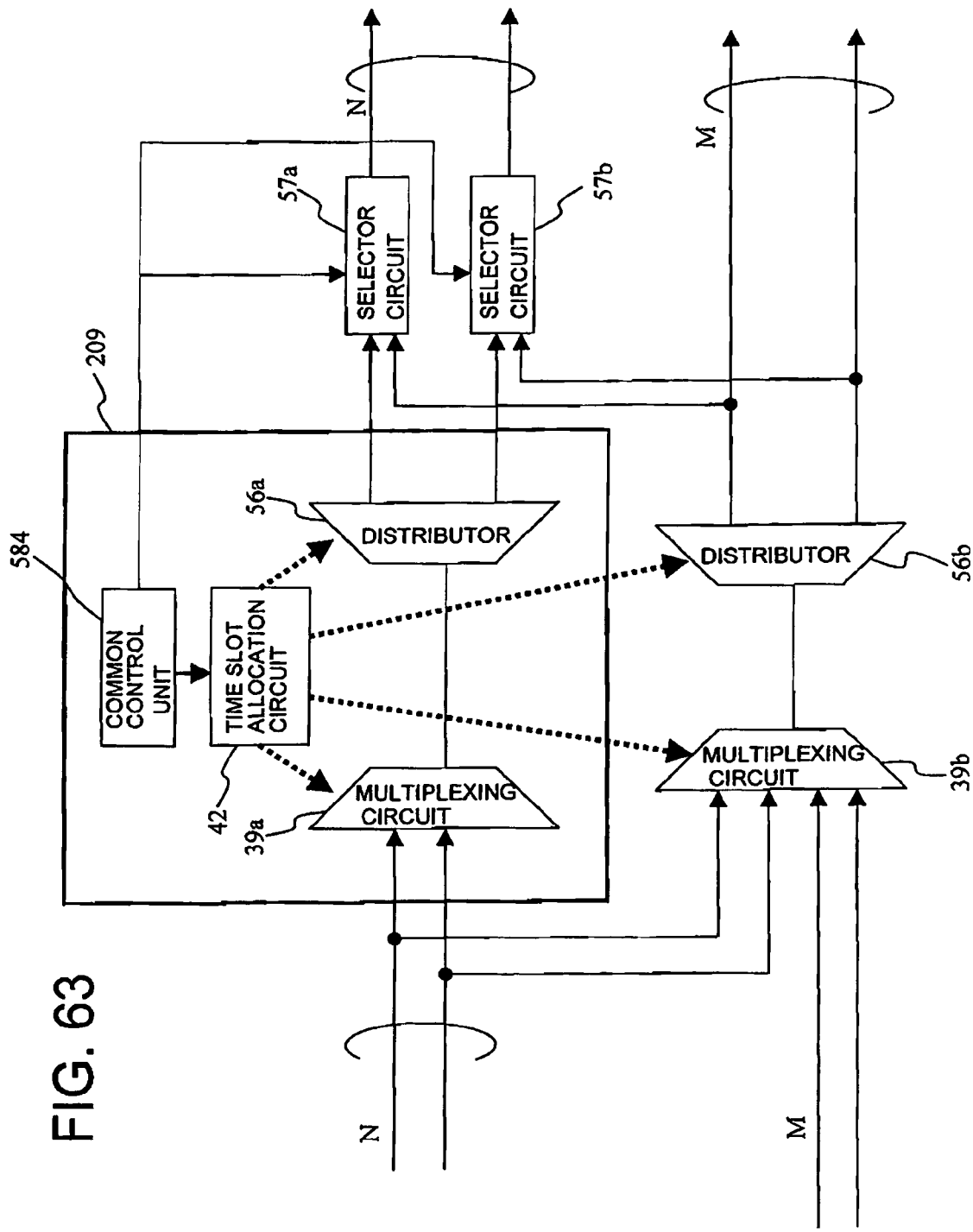
FIG. 63 is a schematic view showing a second form of an exchange node having an extended communication path.

FIG. 63 is a schematic view showing a second form of an exchange node having an extended communication path. The exchange node 209 shown in FIG. 63 differs from the exchange node 208 described in FIG. 62 above in that the selector circuit 57 is arranged at the post-stage of the distributor 56. In this form as well, N lines on the output side of the exchange node for accommodating and exchanging N already installed accommodating lines can be exchanged with one of the line groups of the output side line of the already installed exchange node or the output side line of the newly installed exchange node. In this case, if the number of input/output lines N, M of the exchange node increases, the selector circuit 57 that operates at high-speed is required. Since the plurality of multiplexing circuits 39 is connected to the multiplexing circuit 39 in parallel, and the multiplexed data 44 output by each multiplexing circuit 39 is distributed by the selector circuit 57 for each distributor 56, the communication path can be extended without newly arranging the multiplexing circuit 39 and the common bus.

Twelfth Embodiment

Figure 64:
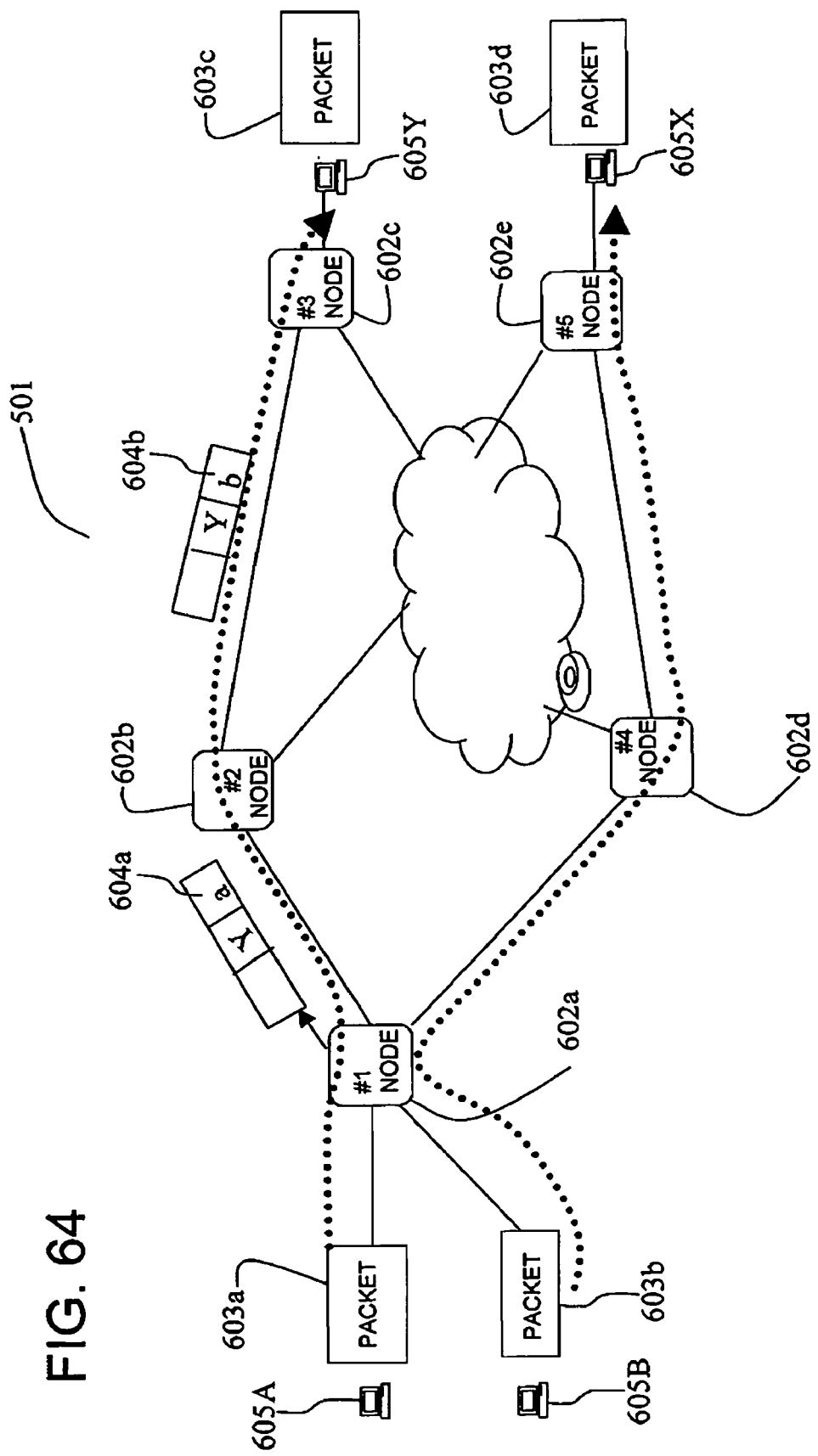
FIG. 64 is a schematic view showing a configuration example applied to MPLS according to a twelfth embodiment.

FIG. 64 is a configuration example of applying the exchange node of the seventh embodiment to the eleventh embodiment to MPLS communication. MPLS (Multi-Protocol Label Switching) communication is a communication method in which the node at the entrance of the network performs forwarding by looking only at the newly added mark called label instead of looking at IP address. The node at the entrance of the network newly uses the information of the label as the priority control signal 38 in the exchange node of the seventh embodiment to the tenth embodiment, and reduces the delay time in the MPLS communication. In FIG. 64, the label a is added to the virtual connection having the destination IP address of Y at the #1 node and transported to the #2 node. The flow of adding b which is the connection identifier on the direction path to the #3 node, which is the target node, at #2 node, removing the label b at #3, and arriving at the final destination host (correspond to IP address Y) is shown. In the MPLS communication form, the label does not need to be determined so as to be unique for the entire network, and may be unique to each link. Generally, in VPN (Virtual Private Network) applied with the MPLS, the node for exchanging the label information is called LSR (Label switching router), and in particular, adds corresponding label information to the specific IP packet at the entrance to the network. Furthermore, the node for removing the label information at the exit of the network is called PE (Provider Edge) device, where #1 node 602a, #3 node 602c and #5 node 602e correspond to the PE device in FIG. 64. In each exchange node, the time slot is always fixedly allocated to the communication of the MPLS connection, and the input data is output to the output side link always at a constant delay time. That is, the MPLS label used in each exchange node is guaranteed as long as the LSP (Label Switched Path) is set. In FIG. 64, the MPLS label is allocated in correspondence to the specific destination IP address, but is not limited to the relevant method, and the method may be applied to all the IP addresses directed to the #3 node, or the MPLS label may be allocated to the specific IP address group in the #3 node and a specific port number and high-speed-transferred on the relay link. In the LSR for performing label exchange in the network applied with the MPLS, the destination IP address and the FEC (Forward Equivalent Class) corresponding to the QoS (Quality of Service) label required from the user are identified, and the required high quality QoS is provided to the connectionless type communication traffic, which is the target of the present invention. In FIG. 64, 501 is an application example to the MPLS communication, 602a is the #1 node, 602b is the #2 node, 602c is the #3 node, 602d is the #4 node, 602e is the #5 node, 603a is the packet (destination: Y), 603b is the packet (destination: X), 603c is the packet (address: Y), 603d is the packet (address: X), 604a and 604b are labels, 605A is the terminal A, 605B is the terminal B, 605X is the terminal X, and 605Y is the terminal Y. The #1 node 602a, #2 node 602b and #3 node 602c include the PE device. The #1 node 602a reattaches the label, and outputs the label 604a. The #2 node 602b reattaches the label, and outputs the label 604b. The #3 node 602c detaches the label 604b.

Figure 65:
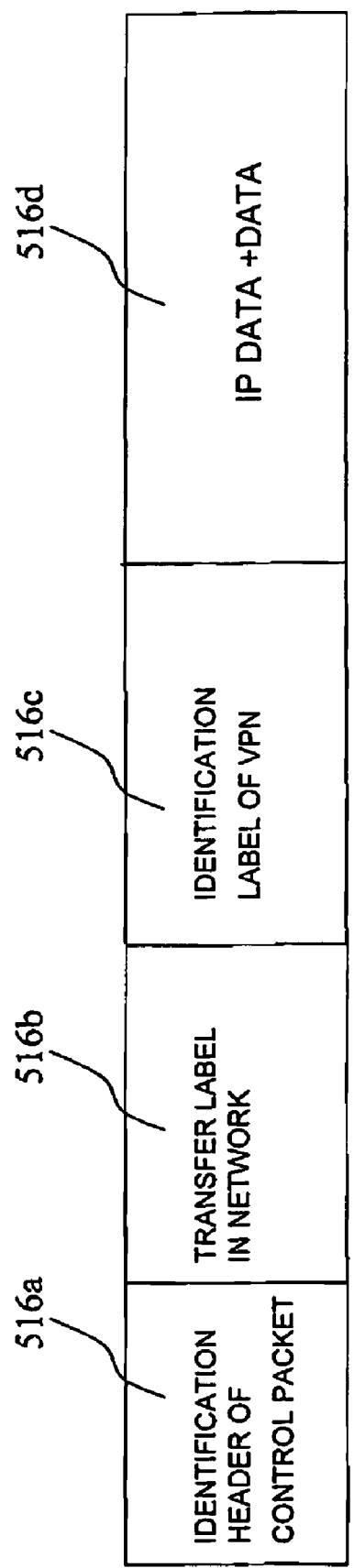
FIG. 65 is a format of the input data when applied to MPLS according to an eleventh embodiment.

ATM may be used for layer 2 instead of the MPLS label, and VPI (Virtual Path Identifier)/VCI (Virtual Channel Identifier) may be applied, or DLCI (Date Link Connection Identifier) may be applied as the MPLS label for frame relay. Generally, since the header for VPN identifying information is provided, as shown in FIG. 65, the information may be used as the priority control signal. In FIG. 65, 516a is the identification header (layer 2 header) of the control packet, 516b is the transfer label in the network, 516c is the identification label of VPN (may be used as priority control signal label), and 516d is the (IP data+data).

Thirteenth Embodiment

Figure 66:
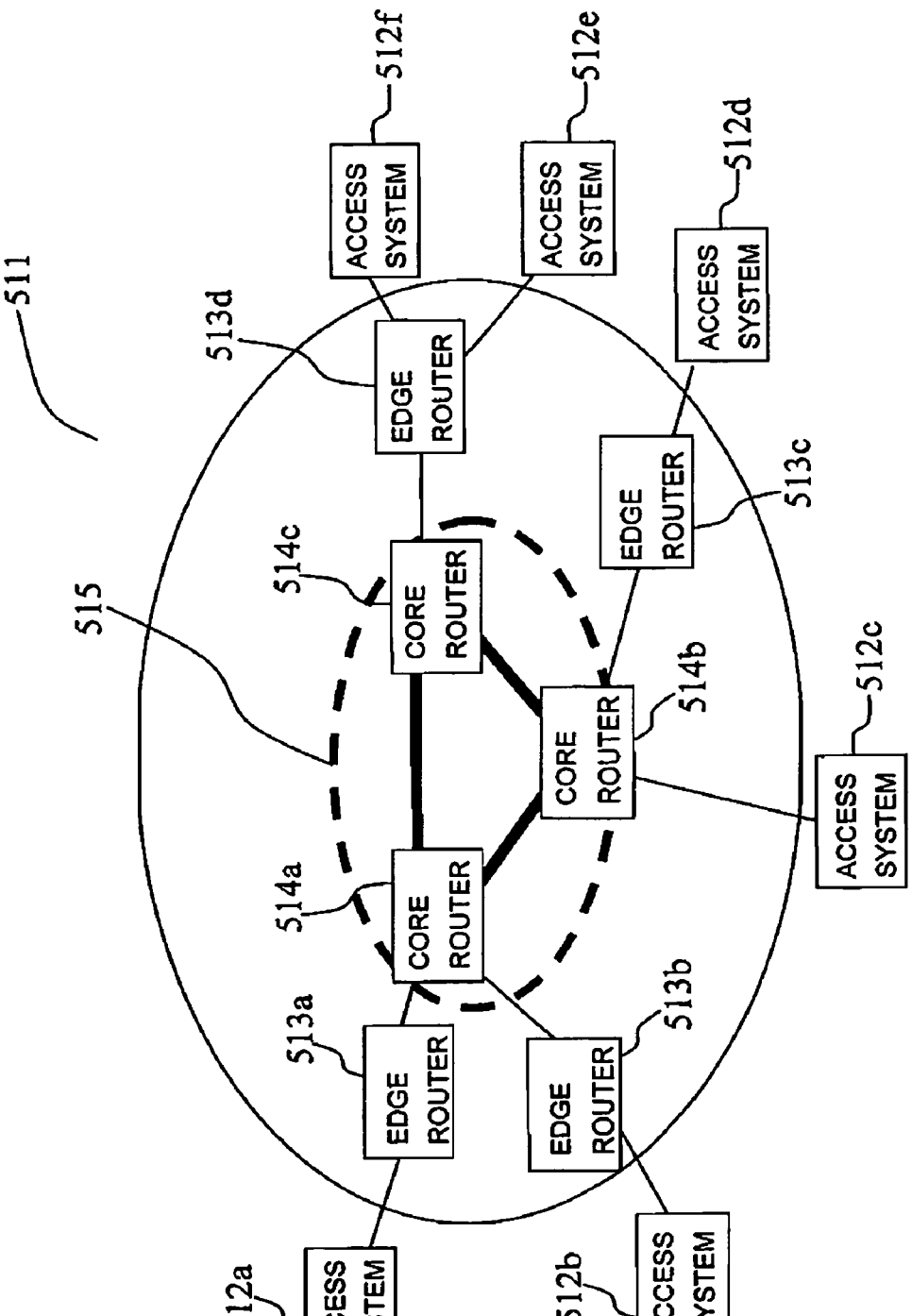
FIG. 66 is a configuration example when the exchange node of the seventh embodiment to twelfth embodiment is applied to a backbone exchange network.

FIG. 66 is a configuration example when the exchange node of seventh embodiment to twelfth embodiment is applied to a backbone exchange network. The core routers are connected in the core relay network. The core router is connected with an edge router, and the edge router is connected to an access system such as ATM (Asynchronous Transfer Mode) media converter, ADSL (Asynchronous Digital Subscriber Line), PON (Passive Optical Network) and the like. In FIG. 66, the exchange node of the seventh embodiment to the twelfth embodiment is applied to the communication between the edge router and the core router, and between the core routers. The delay time of the entire backbone exchange network is reduced and the communication quality is improved by applying the exchange node of the seventh embodiment to the twelfth embodiment to the backbone exchange network. In FIG. 66, 511 is the application to the backbone exchange network, 512a, 512b, 512c, 512d, 512e, 512f are access systems, 513a, 513b, 513c, 513d are edge routers, 514a, 514b, 514c are core routers, and 515 is a core relay network.

The invention claimed is:

1. An exchange node comprising:
an input buffer unit for writing input data which is connection type packet data to a shift register and outputting input buffer data at completion of the writing of the input data;
a distribution unit, which is input with the input buffer data from the input buffer unit, for outputting the input buffer data from the input buffer unit as priority control processing data by a priority control signal indicating that the input data input to the input buffer unit is priority control processing data;
an identification unit for identifying the priority control signal contained in the input data input to the input buffer unit, and outputting the priority control signal to the distribution unit;
a time slot allocation circuit for obtaining time slot information indicating that a time slot for writing the priority control processing data is unused, specifying number of time slots according to the length of the priority control processing data, and outputting a time slot specifying signal specifying a time slot of write destination of the priority control processing data from the unused time slots;
a multiplexing circuit for writing the priority control processing data from the distribution unit to the shift register allocated by the time slot specifying signal from the time slot allocation circuit, and outputting multiplexed data at completion of the writing of the priority control processing data; and
an output/distribution unit for transmitting the multiplexed data from the multiplexing circuit to an outgoing line and outputting information of the unused time slot of the multiplexed data from the multiplexing circuit to the time slot allocation circuit as time slot information.

2. An exchange node comprising:
an input buffer unit for writing input data which is connection type packet data to a shift register and outputting input buffer data at completion of the writing of the input data;
a distribution unit, which is input with the input buffer data from the input buffer unit, for outputting the input buffer data from the input buffer unit as priority control processing data by a priority control signal indicating that the input data input to the input buffer unit is priority control processing data;
an identification unit for identifying the priority control signal contained in the input data input to the input buffer unit, and outputting the priority control signal to the distribution unit;
a time slot allocation circuit for obtaining time slot information indicating that a time slot for writing the priority control processing data is unused, and outputting a time slot specifying signal specifying a time slot of write destination of the priority control processing data from the unused time slots;
a frame compression circuit, which is input with the priority control processing data from the distribution unit, for compressing time width of the priority control processing data and outputting compressed data;
a multiplexing circuit for writing the compressed data from the frame compression unit to the shift register allocated by the time slot specifying signal from the time slot allocation circuit, and outputting multiplexed data at completion of the writing of the compressed data;

a frame decompression circuit, which is input with the multiplexed data from the multiplexing circuit, for decompressing the time width of the multiplexed data and outputting decompressed data; and an output/distribution unit for transmitting the decompressed data from the frame decompression circuit to an outgoing line and outputting information of the unused time slot of the decompressed data from the frame decompression circuit to the time slot allocation circuit as time slot information.

3. An exchange node comprising:

an input buffer unit for writing input data which is connection type packet data to a shift register and outputting input buffer data at completion of the writing of the input data;

a distribution unit, which is input with the input buffer data from the input buffer unit, for outputting the input buffer data from the input buffer unit as priority control processing data by a priority control signal indicating that the input data input to the input buffer unit is priority control processing data;

an identification unit for identifying the priority control signal contained in the input data input to the input buffer unit, and outputting the priority control signal to the distribution unit;

a time slot allocation circuit for obtaining time slot information indicating that a time slot for writing the priority control processing data is unused, specifying a time slot of write destination of the priority control processing data from unused time slots, and outputting a time slot specifying signal for resetting the specification of the time slot: after a predetermined time has elapsed after specifying the time slot; by a priority control release signal contained in the priority control signal after specifying the time slot; or by writing another packet data to the input buffer unit after specifying the time slot;

a multiplexing circuit for writing the priority control processing data from the distribution unit to the shift register allocated by the time slot specifying signal from the time slot allocation circuit, and outputting multiplexed data at completion of the writing of the priority control processing data; and an output/distribution unit for transmitting the multiplexed data from the multiplexing circuit to an outgoing line and outputting information of the unused time slot of the multiplexed data from the multiplexing circuit to the time slot allocation circuit as time slot information.

4. The exchange node as in claims 1, 2, or 3, further comprising a priority determination circuit for detecting priority contained in the priority control processing data and outputting priority information to the time slot allocation circuit, wherein the time slot allocation circuit specifies a time slot according to the priority of the priority information.

5. The exchange node as in claims 1, 2, or 3, further comprising a priority determination circuit for detecting priority contained in the priority control processing data and outputting priority information to the time slot allocation circuit, wherein the time slot allocation circuit varies the number of time slot to be specified according to the priority of the priority information.

6. The exchange node as in claims 1, 2, or 3, wherein the multiplexing circuit includes a plurality of shift registers which can perform parallel processing.

7. The exchange node according to claim 2 or 3, wherein the time slot allocation circuit specifies the number of time slots according to the length of the priority control processing data.

8. The exchange node as in claims 1, 2, or 3, wherein the time slot allocation circuit outputs the time slot specifying signal specifying the time slot for every connection.

9. The exchange node as in claims 1, 2, or 3, wherein the time slot allocation circuit outputs a "time-series order" of each time slot to the multiplexing circuit as "time-series order" of time slot signal when specifying a plurality of time slots for the priority control processing data; and the multiplexing circuit writes the priority control processing data in the order of the "time-series order" of time slot signal.

10. An exchange node comprising:

an input buffer unit for writing input data which is connectionless type packet data to a shift register and outputting input buffer data at completion of the writing of the input data;

a distribution unit, which is input with the input buffer data from the input buffer unit, for outputting the input buffer data from the input buffer unit as priority control processing data by a priority control signal indicating that the input data input to the input buffer unit is priority control processing data;

an identification unit for identifying the priority control signal contained in the input data input to the input buffer unit, and outputting the priority control signal to the distribution unit;

a time slot allocation circuit for obtaining time slot information indicating that a time slot for writing the priority control processing data is unused and the priority control signal from the identification unit, outputting a time slot specifying signal specifying a time slot of write destination of the priority control processing data from the unused time slots, and resetting the specification of the time slot after a predetermined time has elapsed after specifying the time slot;

a time slot information acquiring unit for outputting information of unused time slot of the time slot specifying signal from the time slot allocation circuit to the time slot allocation circuit as time slot information; and a multiplexing circuit for writing the priority control processing data from the distribution unit to the shift register allocated by the time slot specifying signal from the time slot allocation circuit, and outputting multiplexed data at completion of the writing of the priority control processing data.

11. An exchange node comprising:

an input buffer unit for writing input data which is connectionless type packet data to a shift register and outputting input buffer data at completion of the writing of the input data;

a distribution unit, which is input with the input buffer data from the input buffer unit, for outputting the input buffer data from the input buffer unit as priority control processing data by a priority control signal indicating that the input data input to the input buffer unit is priority control processing data;

an identification unit for identifying the priority control signal contained in the input data input to the input buffer unit, and outputting the priority control signal to the distribution unit;

a time slot allocation circuit for obtaining time slot information indicating that a time slot for writing the priority control processing data is unused and the priority control signal from the identification unit, specifying a time slot of write destination of the priority control processing data from the unused time slots, and outputting a time slot specifying signal resetting the specification of the time slot by a priority control release signal contained in the priority control signal after specifying the time slot;

a time slot information acquiring unit for outputting information of unused time slot of the time slot specifying signal from the time slot allocation circuit to the time slot allocation circuit as time slot information; and a multiplexing circuit for writing the priority control processing data from the distribution unit to the shift register allocated by the time slot specifying signal from the time slot allocation circuit, and outputting multiplexed data at completion of the writing of the priority control processing data.

12. An exchange node comprising:

an input buffer unit for writing input data which is connectionless type packet data to a shift register and outputting input buffer data at completion of the writing of the input data;

a distribution unit, which is input with the input buffer data from the input buffer unit, for outputting the input buffer data from the input buffer unit as priority control processing data by a priority control signal indicating that the input data input to the input buffer unit is priority control processing data;

an identification unit for identifying the priority control signal contained in the input data input to the input buffer unit, and outputting the priority control signal to the distribution unit;

a time slot allocation circuit for obtaining time slot information indicating that a time slot for writing the priority control processing data is unused and the priority control signal from the identification unit, specifying a time slot of write destination of the priority control processing data from the unused time slots, and outputting a time slot specifying signal resetting the specification of the time slot by writing another packet data to the input buffer unit after specifying the time slot;

a time slot information acquiring unit for outputting information of unused time slot of the time slot specifying signal from the time slot allocation circuit to the time slot allocation circuit as time slot information; and a multiplexing circuit for writing the priority control processing data from the distribution unit to the shift register allocated by the time slot specifying signal from the time slot allocation circuit, and outputting multiplexed data at completion of the writing of the priority control processing data.

13. The exchange node as in claims 10, 11, or 12, further comprising a priority determination circuit for detecting the priority contained in the priority control processing data and outputting the priority information to the time slot allocation circuit, wherein the time slot allocation circuit specifies the time slot according to the priority of the priority information.

14. The exchange node as in claims 10, 11, or 12, further comprising a priority determination circuit for detecting priority contained in the priority control processing data and outputting priority information to the time slot allocation circuit, wherein the time slot allocation circuit varies the number of time slot to be specified according to the priority of the priority information.

15. The exchange node as in claims 10, 11, or 12, herein the multiplexing circuit includes a plurality of shift registers which can perform parallel processing.

16. The exchange node as in claims 10, 11, or 12, wherein the time slot allocation circuit specifies the number of time slots according to the length of the priority control processing data.

17. The exchange node as in claims 10, 11, or 12, wherein the time slot allocation circuit outputs a "time-series order" of each time slot to the multiplexing circuit as "time-series order" of time slot signal when specifying a plurality of time slots for the priority control processing data; and the multiplexing circuit writes the priority control processing data in the order of the "time-series order" of time slot signal.

* * * * *